US012633965B2

(12) United States Patent
Kouno et al.

(10) Patent No.: US 12,633,965 B2
(45) Date of Patent: May 19, 2026

(54) POWER CONTROL SYSTEM, DEVICE, AND INFORMATION PROCESSING SYSTEM

(71) Applicant: DAIKIN INDUSTRIES, LTD., Osaka (JP)

(72) Inventors: Masaki Kouno, Osaka (JP); Toshiyuki Maeda, Osaka (JP); Reiji Kawashima, Osaka (JP); Keisuke Ohta, Osaka (JP); Hiroki Kojima, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 558 days.

(21) Appl. No.: 18/028,107

(22) PCT Filed: Sep. 21, 2021

(86) PCT No.: PCT/JP2021/034644
§ 371 (c)(1),
(2) Date: Mar. 23, 2023

(87) PCT Pub. No.: WO2022/071033
PCT Pub. Date: Apr. 7, 2022

(65) Prior Publication Data
US 2023/0327706 A1     Oct. 12, 2023

(30) Foreign Application Priority Data

Sep. 30, 2020   (JP) ................................. 2020-164990
Sep. 30, 2020   (JP) ................................. 2020-164991
(Continued)

(51) Int. Cl.
*H04B 3/54*          (2006.01)

(52) U.S. Cl.
CPC .............. *H04B 3/544* (2013.01); *H04B 3/542* (2013.01); *H04B 2203/5487* (2013.01); *H04B 2203/5491* (2013.01)

(58) Field of Classification Search
CPC .................... H04B 3/544; H04B 3/542; H04B qj2203/5487; H04B 2203/5491;
(Continued)

(56) References Cited

U.S. PATENT DOCUMENTS 5,760,492 A       6/1998   Kanoi et al.
9,484,850 B2 *   11/2016   Hyypio ..................... H02J 3/16
(Continued)

FOREIGN PATENT DOCUMENTS

JP          8-140267 A       5/1996
JP          9-154235 A       6/1997
(Continued)

OTHER PUBLICATIONS

Extended European Search Report for European Application No. 21875335.8, dated Mar. 11, 2024.
(Continued)

*Primary Examiner* — Juan A Torres
(74) *Attorney, Agent, or Firm* — Birch, Stewart, Kolasch & Birch, LLP

(57) ABSTRACT

A power control system includes a device that receives power from an electric line of a distribution system via a distribution transformer, an acquisition unit that acquires electric line information on the electric line, and a control unit that causes the device to generate a current used for adjustment of apparent power in the electric line based on the electric line information acquired by the acquisition unit.

51 Claims, 43 Drawing Sheets

(30)          Foreign Application Priority Data

Sep. 30, 2020    (JP) ................................ 2020-164992
Sep. 30, 2020    (JP) ................................ 2020-164995

(58) Field of Classification Search
      CPC .. H02J 3/1821; H02J 3/381; H02J 3/01; H02J
                  13/00; Y02B 30/70; Y02B 70/30; Y02E
                  40/30; Y02E 40/40; Y02E 40/70; Y02E
                  60/00; Y04S 10/12; Y04S 10/22; Y04S
                                              20/221; Y04S 20/224
      USPC ............... 455/402, 400; 340/12.32; 370/485;
                                                                          379/167.01
      See application file for complete search history.

(56)                      References Cited

U.S. PATENT DOCUMENTS

| | | | |
|---|---|---|---|
| 2010/0007333 A1* | 1/2010 | Sekiguchi .............. | H02H 7/261 |
| | | | 324/113 |
| 2010/0177541 A1* | 7/2010 | Lee ........................... | H02J 3/36 |
| | | | 363/127 |
| 2010/0217453 A1 | 8/2010 | Itoh et al. | |
| 2013/0066480 A1* | 3/2013 | Glavic .............. | H02J 13/00034 |
| | | | 700/286 |
| 2015/0097504 A1* | 4/2015 | Lamascus ............. | H02J 3/1892 |
| | | | 318/503 |

| | | | |
|---|---|---|---|
| 2015/0244249 A1* | 8/2015 | Chen ......................... | H02J 3/01 |
| | | | 363/41 |
| 2016/0308465 A1* | 10/2016 | Yoo ..................... | H02M 7/5395 |
| 2019/0280479 A1* | 9/2019 | Rauwolf ................... | H02J 1/12 |
| 2020/0274357 A1 | 8/2020 | Inque et al. | |
| 2021/0159781 A1 | 5/2021 | Kono et al. | |
| 2021/0328456 A1* | 10/2021 | Matan ..................... | H02J 3/381 |
| 2021/0391721 A1 | 12/2021 | Ishihara et al. | |

FOREIGN PATENT DOCUMENTS

| | | | |
|---|---|---|---|
| JP | 2000-224769 | A | 8/2000 |
| JP | 2012-105488 | A | 5/2012 |
| JP | 2013-192345 | A | 9/2013 |
| JP | 2017-46507 | A | 3/2017 |
| JP | 2018-74795 | A | 5/2018 |
| JP | 2019-30190 | A | 2/2019 |
| WO | WO 2012/128137 | A1 | 9/2012 |
| WO | WO 2018/221624 | A1 | 12/2018 |
| WO | WO 2020/121362 | A1 | 6/2020 |

OTHER PUBLICATIONS

International Search Report for PCT/JP2021/034644 (PCT/ISA/210) mailed on Dec. 28, 2021.

* cited by examiner

FIG.5

| ELECTRIC LINE | LATEST VALUE | PREVIOUS VALUE | PREDICTION VALUE | AVAILABLE CAPACITY |
|---|---|---|---|---|
| 14 | P1 | Pa1 | Pr1 | M1 |
| 17A | P2 | Pa2 | Pr2 | M2 |
| 17B | P3 | Pa3 | Pr3 | M3 |

FIG.6

| HPS | PASS–THROUGH ELECTRIC LINE | CAPACITY | HPS NECESSARY AMOUNT |
|---|---|---|---|
| 21A | 17A | 35 | 10 |
| 21B | 17A | 35 | 10 |
| 21C | 17A | 35 | 10 |
| 21D | 17A | 25 | 10 |
| 21E | 17A | 20 | 10 |
| 21F | 17B | 20 | 0 |
| 21G | 17B | 30 | 10 |
| 21H | 17B | 25 | 0 |
| 21I | 17B | 40 | 15 |
| 21J | 17B | 15 | 0 |

FIG.12

| ELECTRIC LINE | POSITION | POWER INFORMATION | THRESHOLD |
|---|---|---|---|
| 14 | SUPPLY SIDE | P1 | T1 |
| 17A | RECEPTION SIDE | P2 | T2 |
| 17B | RECEPTION SIDE | P3 | T3 |
| 17C | RECEPTION SIDE | P4 | T4 |
| 17D | RECEPTION SIDE | P5 | T5 |
| 17E | RECEPTION SIDE | P6 | T6 |
| ... | ... | ... | ... |

FIG.13

| DEVICE | PASS-THROUGH ELECTRIC LINE | | ADJUSTABLE AMOUNT |
|---|---|---|---|
| | SUPPLY SIDE | RECEPTION SIDE | |
| 20XA | 14 | 17A | 50 |
| 20XB | 14 | 17A | 30 |
| 20XC | 14 | 17B | 50 |
| 20XD | 14 | 17B | 10 |
| 20XE | 14 | 17C | 10 |
| 20XF | 14 | 17C | 1 |
| 20XG | 14 | 17D | 30 |
| 20XH | 14 | 17D | 1 |
| 20XI | 14 | 17E | 20 |
| 20XJ | 14 | 17E | 1 |
| ... | ... | ... | ... |

FIG.17

| POWER PLANT | OUTPUT | COUPLED ELECTRIC LINE |
|---|---|---|
| 11A | 40 | 141A |
| 11B | 30 | 142A |
| 11C | 30 | 143A |
| 11D | 50 | 141B |
| 11E | 30 | 142B |
| 11F | 20 | 143B |
| ... | ... | ... |

FIG.18

| ELECTRIC LINE, ETC. | SUPPLY SIDE | CAPACITY | MARGIN | POWER INFORMATION | THRESHOLD |
|---|---|---|---|---|---|
| 141A | — | 70 | 30 | P11 | T11 |
| 142A | 141A | 100 | 30 | P12 | T12 |
| 143A | 142A | 120 | 20 | P13 | T13 |
| 16A | 143A,144 | 30 | 20 | | |
| 17A | 16A | 40 | 30 | P14 | T14 |
| 144 | 143A,143B | 120 | 50 | P15 | T15 |
| 16B | 144 | 30 | 20 | | |
| 17B | 16B | 40 | 30 | P16 | T16 |
| 141B | — | 70 | 20 | P17 | T17 |
| 142B | 141B | 90 | 10 | P18 | T18 |
| 143B | 142B | 110 | 10 | P19 | T19 |
| 16C | 143B,144 | 25 | 15 | | |
| 17C | 16C | 35 | 25 | P20 | T20 |
| ... | ... | ... | ... | ... | ... |

FIG.19

| DEVICE | PASS-THROUGH ELECTRIC LINE | ADJUSTABLE AMOUNT |
|--------|----------------------------|-------------------|
| 20XA | 143A | 5 |
| 20XB | 143A | 5 |
| 20XC | 143B | 5 |
| 20XD | 143B | 5 |
| 20XE | 143B | 5 |
| 20XF | 17A | 4 |
| 20XG | 17A | 4 |
| 20XH | 17A | 3 |
| 20XI | 17B | 4 |
| 20XJ | 17B | 4 |
| 20XK | 17B | 4 |
| 20XL | 17B | 3 |
| 20XM | 17B | 3 |
| 20XN | 17C | 4 |
| 20XO | 17C | 4 |

FIG.26

| HPS | PASS-THROUGH ELECTRIC LINE | | CAPACITY | |
| --- | --- | --- | --- | --- |
| | SUPPLY SIDE | RECEPTION SIDE | POWER CONV. DEVICE | AF |
| 21A | 14 | 17A | 10 | 20 |
| 21B | 14 | 17A | 10 | 30 |
| 21C | 14 | 17B | 10 | 20 |
| 21D | 14 | 17B | 5 | 10 |
| 21E | 14 | 17C | 20 | 30 |
| 21F | 14 | 17C | 30 | 50 |
| 21G | 14 | 17D | 10 | 20 |
| 21H | 14 | 17D | 10 | 20 |
| 21I | 14 | 17E | 10 | 30 |
| 21J | 14 | 17E | 5 | 15 |
| ... | ... | ... | ... | ... |

| DATE AND TIME | DAY OF WEEK | WEATHER | AIR TEMP (°C) | HUMIDITY (%) | OPERATION HISTORY | SETTING VALUE | | USE AMOUNT | |
|---|---|---|---|---|---|---|---|---|---|
| | | | | | | TEMP (°C) | HUMIDITY (%) | POWER CONV. DEVICE | AF |
| 2020/02/03/0:00 | MON | SUNNY | 1 | 50 | — | ／ | ／ | | |
| 2020/02/03/3:00 | MON | SUNNY | 2 | 50 | — | ／ | ／ | | |
| 2020/02/03/6:00 | MON | SUNNY | 3 | 48 | — | ／ | ／ | | |
| 2020/02/03/9:00 | MON | SUNNY | 5 | 45 | O | 22 | 60 | | |
| 2020/02/03/12:00 | MON | SUNNY | 8 | 43 | O | 22 | 60 | | |
| 2020/02/03/15:00 | MON | SUNNY | 10 | 40 | O | 22 | 60 | | |
| 2020/02/03/18:00 | MON | CLOUDY | 6 | 48 | O | 22 | 60 | | |
| 2020/02/03/21:00 | MON | RAINY | 4 | 50 | — | ／ | ／ | | |
| 2020/02/04/0:00 | TUE | CLOUDY | 2 | 50 | — | ／ | ／ | | |
| ... | ... | ... | ... | ... | ... | ... | ... | ... | ... |

| DATE AND TIME | DAY OF WEEK | PREDICTION WEATHER | PREDICTION AIR TEMP (°C) | PREDICTION HUMIDITY (%) | PREDICTION OPERATION SCHEDULE | PREDICTION SETTING VALUE | | PREDICTION USE AMOUNT | | ADJUST-ABLE AMOUNT | |
|---|---|---|---|---|---|---|---|---|---|---|---|
| | | | | | | TEMP (°C) | HUMIDITY (%) | POWER CONV. DEVICE | AF | POWER CONV. DEVICE | AF |
| 2020/02/10/0:00 | MON | CLOUDY | 2 | 60 | — | | | | | | |
| 2020/02/10/3:00 | MON | CLOUDY | 1 | 60 | — | | | | | | |
| 2020/02/10/6:00 | MON | CLOUDY | 2 | 60 | — | | | | | | |
| 2020/02/10/9:00 | MON | RAINY | 3 | 85 | O | | | | | | |
| 2020/02/10/12:00 | MON | RAINY | 6 | 80 | O | | | | | | |
| 2020/02/10/15:00 | MON | RAINY | 6 | 80 | O | | | | | | |
| 2020/02/10/18:00 | MON | RAINY | 4 | 85 | O | | | | | | |
| 2020/02/10/21:00 | MON | CLOUDY | 2 | 60 | — | | | | | | |
| 2020/02/11/0:00 | TUE | CLOUDY | 2 | 60 | — | | | | | | |
| ... | ... | ... | ... | ... | ... | ... | ... | ... | ... | ... | ... |

| DATE AND TIME | DAY OF WEEK | PREDICTION WEATHER | PREDICTION AIR TEMP (°C) | PREDICTION HUMIDITY (%) | PREDICTION OPERATION SCHEDULE | PREDICTION SETTING VALUE TEMP (°C) | PREDICTION SETTING VALUE HUMIDITY (%) | PREDICTION USE AMOUNT POWER CONV. DEVICE | PREDICTION USE AMOUNT AF | ADJUSTABLE AMOUNT POWER CONV. DEVICE | ADJUSTABLE AMOUNT AF |
|---|---|---|---|---|---|---|---|---|---|---|---|
| 2020/02/10/0:00 | MON | CLOUDY | 2 | 60 | — | / | / | | | | |
| 2020/02/10/3:00 | MON | CLOUDY | 1 | 60 | — | / | / | | | | |
| 2020/02/10/6:00 | MON | CLOUDY | 2 | 60 | — | / | / | | | | |
| 2020/02/10/9:00 | MON | RAINY | 3 | 85 | O | 23 | 55 | | | | |
| 2020/02/10/12:00 | MON | RAINY | 6 | 80 | O | 22 | 50 | | | | |
| 2020/02/10/15:00 | MON | RAINY | 6 | 80 | O | 22 | 50 | | | | |
| 2020/02/10/18:00 | MON | RAINY | 4 | 85 | O | 23 | 55 | | | | |
| 2020/02/10/21:00 | MON | CLOUDY | 2 | 60 | — | / | / | | | | |
| 2020/02/11/0:00 | TUE | CLOUDY | 2 | 60 | — | / | / | | | | |
| ... | ... | ... | ... | ... | ... | ... | ... | ... | ... | ... | ... |

| DATE AND TIME | DAY OF WEEK | WEATHER | AIR TEMP (°C) | HUMIDITY (%) | OPERATION HISTORY | SETTING VALUE | | USE AMOUNT | |
|---|---|---|---|---|---|---|---|---|---|
| | | | | | | TEMP (°C) | HUMIDITY (%) | POWER CONV. DEVICE | AF |
| 2020/02/03/0:00 | MON | SUNNY | 1 | 50 | — | | | 0 | 0 |
| 2020/02/03/3:00 | MON | SUNNY | 2 | 50 | — | | | 0 | 0 |
| 2020/02/03/6:00 | MON | SUNNY | 3 | 48 | — | | | 0 | 0 |
| 2020/02/03/9:00 | MON | SUNNY | 5 | 45 | O | 22 | 60 | 2 | 4 |
| 2020/02/03/12:00 | MON | SUNNY | 8 | 43 | O | 22 | 60 | 1 | 2 |
| 2020/02/03/15:00 | MON | SUNNY | 10 | 40 | O | 22 | 60 | 1 | 2 |
| 2020/02/03/18:00 | MON | CLOUDY | 6 | 48 | O | 22 | 60 | 2 | 4 |
| 2020/02/03/21:00 | MON | RAINY | 4 | 50 | — | | | 0 | 0 |
| 2020/02/04/0:00 | TUE | CLOUDY | 2 | 50 | — | | | 0 | 0 |
| ... | ... | ... | ... | ... | ... | ... | ... | ... | ... |

| DATE AND TIME | DAY OF WEEK | PREDICTION WEATHER | PREDICTION AIR TEMP (°C) | PREDICTION HUMIDITY (%) | PREDICTION OPERATION SCHEDULE | PREDICTION SETTING VALUE | | PREDICTION USE AMOUNT | | ADJUST-ABLE AMOUNT | |
|---|---|---|---|---|---|---|---|---|---|---|---|
| | | | | | | TEMP (°C) | HUMIDITY (%) | POWER CONV. DEVICE | AF | POWER CONV. DEVICE | AF |
| 2020/02/10/0:00 | MON | CLOUDY | 2 | 60 | — | / | / | 0 | 0 | | |
| 2020/02/10/3:00 | MON | CLOUDY | 1 | 60 | — | / | / | 0 | 0 | | |
| 2020/02/10/6:00 | MON | CLOUDY | 2 | 60 | — | / | / | 0 | 0 | | |
| 2020/02/10/9:00 | MON | RAINY | 3 | 85 | ○ | 23 | 55 | 3 | 6 | | |
| 2020/02/10/12:00 | MON | RAINY | 6 | 80 | ○ | 22 | 50 | 2 | 4 | | |
| 2020/02/10/15:00 | MON | RAINY | 6 | 80 | ○ | 22 | 50 | 2 | 4 | | |
| 2020/02/10/18:00 | MON | RAINY | 4 | 85 | ○ | 23 | 55 | 3 | 6 | | |
| 2020/02/10/21:00 | MON | CLOUDY | 2 | 60 | — | / | / | 0 | 0 | | |
| 2020/02/11/0:00 | TUE | CLOUDY | 2 | 60 | — | / | / | 0 | 0 | | |
| ... | ... | ... | ... | ... | ... | ... | ... | ... | ... | ... | ... |

| DATE AND TIME | DAY OF WEEK | PREDICTION WEATHER | PREDICTION AIR TEMP (°C) | PREDICTION HUMIDITY (%) | OPERATION SCHEDULE | PREDICTION SETTING VALUE TEMP (°C) | HUMIDITY (%) | PREDICTION USE AMOUNT POWER CONV. DEVICE | AF | ADJUST-ABLE AMOUNT POWER CONV. DEVICE | AF |
|---|---|---|---|---|---|---|---|---|---|---|---|
| 2020/02/10/0:00 | MON | CLOUDY | 2 | 60 | — | | | 0 | 0 | 10 | 20 |
| 2020/02/10/3:00 | MON | CLOUDY | 1 | 60 | — | | | 0 | 0 | 10 | 20 |
| 2020/02/10/6:00 | MON | CLOUDY | 2 | 60 | — | | | 0 | 0 | 10 | 20 |
| 2020/02/10/9:00 | MON | RAINY | 3 | 85 | O | 23 | 55 | 3 | 6 | 7 | 14 |
| 2020/02/10/12:00 | MON | RAINY | 6 | 80 | O | 22 | 50 | 2 | 4 | 8 | 16 |
| 2020/02/10/15:00 | MON | RAINY | 6 | 80 | O | 22 | 50 | 2 | 4 | 8 | 16 |
| 2020/02/10/18:00 | MON | RAINY | 4 | 85 | O | 23 | 55 | 3 | 6 | 7 | 14 |
| 2020/02/10/21:00 | MON | CLOUDY | 2 | 60 | — | | | 0 | 0 | 10 | 20 |
| 2020/02/11/0:00 | TUE | CLOUDY | 2 | 60 | — | | | 0 | 0 | 10 | 20 |
| ... | ... | ... | ... | ... | ... | ... | ... | ... | ... | ... | ... |

| DATE AND TIME | PREDICTION USE AMOUNT | | PREDICTION ADJUSTMENT AMOUNT | | MARGIN AMOUNT | | THRESHOLD | |
|---|---|---|---|---|---|---|---|---|
| | POWER CONV. DEVICE | AF | POWER CONV. DEVICE | AF | POWER CONV. DEVICE | AF | POWER CONV. DEVICE | AF |
| 2020/02/10/0:00 (PRESENT) | 0 | 0 | 5 | 10 | | | 2 | 5 |
| 2020/02/10/3:00 | 0 | 0 | 5 | 10 | | | 2 | 5 |
| 2020/02/10/6:00 | 0 | 0 | 5 | 10 | | | 2 | 5 |
| 2020/02/10/9:00 | 3 | 6 | 5 | 10 | | | 5 | 11 |
| 2020/02/10/12:00 | 2 | 4 | 5 | 10 | | | 4 | 9 |
| 2020/02/10/15:00 | 2 | 4 | 5 | 10 | | | 4 | 9 |
| 2020/02/10/18:00 | 3 | 6 | 5 | 10 | | | 5 | 11 |
| 2020/02/10/21:00 | 0 | 0 | 5 | 10 | | | 2 | 5 |
| 2020/02/11/0:00 | 0 | 0 | 5 | 10 | | | 2 | 5 |
| ... | ... | ... | ... | ... | ... | ... | ... | ... |

| DATE AND TIME | PREDICTION USE AMOUNT | | PREDICTION ADJUSTMENT AMOUNT | | MARGIN AMOUNT | | THRESHOLD | |
|---|---|---|---|---|---|---|---|---|
| | POWER CONV. DEVICE | AF | POWER CONV. DEVICE | AF | POWER CONV. DEVICE | AF | POWER CONV. DEVICE | AF |
| 2020/02/10/0:00 (PRESENT) | 0 | 0 | 5 | 10 | 5 | 10 | 2 | 5 |
| 2020/02/10/3:00 | 0 | 0 | 5 | 10 | 5 | 10 | 2 | 5 |
| 2020/02/10/6:00 | 0 | 0 | 5 | 10 | 5 | 10 | 2 | 5 |
| 2020/02/10/9:00 | 3 | 6 | 5 | 10 | 5 | 10 | 5 | 11 |
| 2020/02/10/12:00 | 2 | 4 | 5 | 10 | 5 | 10 | 4 | 9 |
| 2020/02/10/15:00 | 2 | 4 | 5 | 10 | 5 | 10 | 4 | 9 |
| 2020/02/10/18:00 | 3 | 6 | 5 | 10 | 5 | 10 | 5 | 11 |
| 2020/02/10/21:00 | 0 | 0 | 5 | 10 | 5 | 10 | 2 | 5 |
| 2020/02/11/0:00 | 0 | 0 | 5 | 10 | 5 | 10 | 2 | 5 |
| ... | ... | ... | . | ... | ... | ... | ... | ... |

FIG.36

| ELECTRIC LINE | POWER INFORMATION | THRESHOLD |
|---|---|---|
| 14 | P21 | T21 |
| 17A | P22 | T22 |
| 17B | P23 | T23 |
| 202A | P24 | T24 |
| 202B | P25 | T25 |
| 202C | P26 | T26 |
| 202D | P27 | T27 |
| 202E | P28 | T28 |
| 202F | P29 | T29 |

FIG.37

| ADJUST-MENT TARGET | ELECTRIC LINE | | | | | | | | | | |
|---|---|---|---|---|---|---|---|---|---|---|
| | 14 | | | | 17 | | | | 202 | |
| | LOW-ORDER HARMONIC | | POWER FACTOR | | LOW-ORDER HARMONIC | | POWER FACTOR | | LOW-ORDER HARMONIC | HIGH-ORDER HARMONIC | POWER FACTOR |
| | ADJUST-MENT-NEEDED ORDER | OTHER ORDERS | ADJUST-MENT-NEEDED POWER FACTOR | OTHER POWER FACTORS | ADJUST-MENT-NEEDED ORDER | OTHER ORDERS | ADJUST-MENT-NEEDED POWER FACTOR | OTHER POWER FACTORS | | | |
| PRIORITY ORDER | 1 | 4 | 2 | 5 | 6 | 8 | 7 | 9 | 10 | 3 | 11 |

FIG.38

| HPS | PASS-THROUGH ELECTRIC LINE | | ADJUSTABLE AMOUNT |
| | RECEPTION-SIDE DISTRIBUTION LINE | IN-FACILITY ELECTRIC LINE | |
|---|---|---|---|
| 21A | 17A | 202A | 30 |
| 21B | 17A | 202A | 20 |
| 21C | 17A | 202B | 15 |
| 21D | 17A | 202B | 15 |
| 21E | 17A | 202C | 10 |
| 21F | 17A | 202C | 10 |
| 21G | 17B | 202D | 30 |
| 21H | 17B | 202D | 30 |
| 21I | 17B | 202E | 10 |
| 21J | 17B | 202E | 10 |
| 21K | 17B | 202F | 10 |
| 21L | 17B | 202F | 10 |

POWER CONTROL SYSTEM, DEVICE, AND INFORMATION PROCESSING SYSTEM

TECHNICAL FIELD

The present disclosure relates to a power control system, a device, and an information processing system.

BACKGROUND ART

PTL 1 describes a reactive power adjustment system for a distribution line that is configured such that a power factor adjustment unit receives an input of a control command signal and sequentially operates for each distribution transformer to perform phase modification control and consume or reduce the reactive power of the distribution line.

CITATION LIST

Patent Literature

[PTL 1] Japanese Unexamined Patent Publication No. 2012-105488

SUMMARY OF INVENTION

Technical Problem

In some cases, the current is supplied to an electric line provided closer to a power reception side than a distribution transformer so that the apparent power in an electric line provided closer to a power supply side than the distribution transformer is adjusted. However, in this case, it may be difficult to improve the apparent power in the electric line closer to the power supply side than the distribution transformer depending on the state of the electric line closer to the power reception side than the distribution transformer.

The object of the present disclosure is to reduce the effect of the state in the electric line closer to the power reception side than the distribution transformer on the adjustment of the apparent power in the electric line closer to the power supply side than the distribution transformer, as compared with the case where the apparent power in the electric line on the supply side is adjusted without supplying the current to the electric line closer to the power supply side than the distribution transformer.

Solution to Problem

A power control system according to the present disclosure is a power control system including a device that receives power from an electric line of a distribution system via a distribution transformer, an acquisition unit that acquires electric line information on the electric line, and a control unit that causes the device to generate a current used for adjustment of apparent power in the electric line based on the electric line information acquired by the acquisition unit. In this case, as compared with the case where the apparent power in the electric line on the supply side is adjusted without supplying the current to the electric line closer to the power supply side than the distribution transformer, it is possible to reduce the effect of the state in the electric line closer to the power reception side than the distribution transformer on the adjustment of the apparent power in the electric line closer to the power supply side than the distribution transformer.

Here, the device may be configured to adjust apparent power in the device, and when causing the device to generate the current used for the adjustment of the apparent power in the electric line, the control unit may put a limitation on the adjustment by the device to the apparent power in the device. In this case, it is possible to prevent insufficient adjustment of the apparent power in the electric line, as compared with the case where the apparent power in the device is unconditionally adjusted by the device.

Furthermore, the acquisition unit may acquire capacity information on a capacity of the electric line, and the control unit may put the limitation based on the capacity information. In this case, it is possible to suppress the occurrence of a short circuit or ignition in the electric line, as compared with the case where the apparent power in the device is adjusted regardless of the capacity of the electric line.

Further, the acquisition unit may acquire capability information on a capability of the device to generate the current, and the control unit may put the limitation based on the capability information. In this case, it is possible to suppress the occurrence of a failure in the device, as compared with the case where the apparent power in the device is adjusted regardless of the capability of the device to generate the current.

Further, the control unit may cause the device to generate a current larger than a current necessary for improvement in the apparent power in the electric line. In this case, it is possible to prevent insufficient adjustment of the apparent power in the electric line due to changes in the apparent power in the electric line, as compared with the case where the device generates a current equal to or less than the amount necessary for improvement of the apparent power in the electric line.

Furthermore, the control unit may cause the device to generate a current larger than a current necessary for the improvement when the electric line information satisfies a predetermined condition. In this case, it is possible to prevent insufficient adjustment of the apparent power in the electric line due to changes in the apparent power in the electric line, as compared with the case where the device generates a current equal to or less than the amount necessary for improvement of the apparent power in the electric line regardless of the electric line information.

Further, the electric line information may include information on the electric line in future, and the condition may be set for future apparent power in the electric line. In this case, it is possible to prevent insufficient adjustment of the apparent power in the electric line due to changes in the apparent power in the electric line, as compared with the case where the device generates a current equal to or less than the amount necessary for improvement of the apparent power in the electric line regardless of the future apparent power in the electric line.

Furthermore, from another point of view, a device according to the present disclosure is a device that receives power from an electric line of a distribution system via a distribution transformer, and the device includes an acquisition unit that acquires electric line information on the electric line, and an adjustment unit that adjusts apparent power in the electric line based on the electric line information acquired by the acquisition unit. In this case, as compared with the case where the apparent power in the electric line on the supply side is adjusted without supplying the current to the electric line closer to the power supply side than the distribution transformer, it is possible to reduce the effect of the state in the electric line closer to the power reception side than the distribution transformer on the adjustment of the apparent power in the electric line closer to the power supply side than the distribution transformer.

Further, from another point of view, an information processing system according to the present disclosure is an information processing system including an acquisition unit that acquires electric line information on an electric line of a distribution system, and a control unit that causes a device, which receives power from the electric line via a distribution transformer, to generate a current used for adjustment of apparent power in the electric line based on the electric line information acquired by the acquisition unit. In this case, as compared with the case where the apparent power in the electric line on the supply side is adjusted without supplying the current to the electric line closer to the power supply side than the distribution transformer, it is possible to reduce the effect of the state in the electric line closer to the power reception side than the distribution transformer on the adjustment of the apparent power in the electric line closer to the power supply side than the distribution transformer.

Further, the information processing system may further include an electric line information acquisition unit that acquires electric line identification information for identifying the electric line, a device information acquisition unit that acquires device identification information for identifying the device that controls the device, is configured to adjust apparent power in the electric line, and receives power from the electric line via the distribution transformer, and an output unit that outputs, when any of a plurality of the electric lines satisfies a power condition set for apparent power, information that is related to apparent power, which is adjusted by each of specific devices among a plurality of the devices and corresponds to the device, and that is based on the power information, the electric line information may include the power information on the apparent power in the electric line, and the specific device may be a device specified from the device identification information associated with the electric line identification information on the electric line that satisfies the power condition among the plurality of the devices. In this case, as compared with the case where the information on the apparent power to be adjusted by each device according to the same content is output, the apparent power in the electric line may be adjusted according to the content of adjustment suitable for each device.

Here, the information processing system may further include a device determination unit that determines a device used for the adjustment of the electric line that satisfies the power condition among the plurality of the devices based on a capability of the device for the adjustment of the apparent power in the electric line. In this case, the apparent power may be adjusted by the device having the adjustment capability suitable for the adjustment of the apparent power in the electric line.

Further, the device determination unit may determine that the device that satisfies a capability condition set for the capability is the device used for the adjustment. In this case, it is possible to prevent the device that does not satisfy the capability condition from being used to adjust the apparent power in the electric line.

Further, the capability condition may be set from a relation between the capability and a degree of the adjustment necessary for the electric line that satisfies the power condition. In this case, the apparent power may be adjusted by the device having the adjustment capability suitable for the degree of adjustment necessary for the electric line that satisfies the power condition.

Further, the device that satisfies the capability condition may include a first device having a first capability as the capability and a second device having a second capability higher than the first capability as the capability, and the device determination unit may determine that the second device is the device used for the adjustment and does not determine that the first device is the device used for the adjustment. In this case, the device having a high capability to adjust the apparent power in the electric line may be preferentially used for the adjustment.

Further, in a case where the first device is not used for the adjustment but the second device is used for the adjustment, when the electric line, which is a target for the adjustment, does not satisfy the power condition, the device determination unit may determine that the first device is a device that is not used for the adjustment. In this case, the apparent power in the electric line may be improved without applying a load for adjustment to the first device.

Further, the output unit may output the information based on a capability of the device for the adjustment of the apparent power in the electric line. In this case, the device may adjust the apparent power according to the content of adjustment suitable for the adjustment capability of the device.

Further, the output unit may output the information based on a relation between the capability and a degree of the adjustment necessary for the electric line that satisfies the power condition. In this case, the device may adjust the apparent power according to the content of adjustment suitable for the adjustment capability of the device for the degree of adjustment necessary for the electric line that satisfies the power condition.

Furthermore, the output unit may output the information based on a number of the devices used for the adjustment of the electric line that satisfies the power condition. In this case, the device may adjust the apparent power according to the content of the adjustment suitable for the number used for the adjustment of the apparent power in the electric line.

Further, the electric line may include a first electric line provided closer to a power supply side than the distribution transformer and a second electric line provided closer to a power reception side than the first electric line and closer to the power supply side than the distribution transformer, and the device identification information on the device that receives power via the second electric line may be associated with the electric line identification information on the first electric line and the electric line identification information on the second electric line. In this case, the device that receives the power via the second electric line may be used not only to adjust the apparent power in the second electric line but also to adjust the apparent power in the first electric line.

Further, the electric line may further include a third electric line provided closer to the power reception side than the first electric line and closer to the power supply side than the distribution transformer, and the device identification information on the device that does not receive power via the second electric line but receives power via the third electric line may be associated with the electric line identification information on the first electric line and the electric line identification information on the third electric line. In this case, both the device that receives the power via the second electric line and the device that receives the power via the third electric line may be used to adjust the apparent power in the first electric line.

Further, the information processing system may further include an electric line determination unit that determines an electric line whose apparent power is preferentially adjusted among a plurality of the electric lines that satisfies the power condition. In this case, the apparent power may be adjusted, starting from the electric line having a high necessity of adjusting the apparent power.

Further, the electric line may include a first electric line provided closer to a power supply side than the distribution transformer and a second electric line provided closer to a power reception side than the first electric line and closer to the power supply side than the distribution transformer, and when both the first electric line and the second electric line satisfy the power condition, the electric line determination unit may determine that the first electric line is an electric line to be adjusted in preference to the second electric line. In this case, it is possible to improve the efficiency of improvement in the apparent power in the electric line.

Further, based on apparent power in the electric line for each of the plurality of the electric lines that satisfies the power condition, the electric line determination unit may determine an electric line whose apparent power is preferentially adjusted. In this case, the electric line whose apparent power is to be adjusted may be determined based on the instability of the electric line.

Further, the electric line may include a first electric line and a second electric line through which a current supplied from the device flows, and the output unit may output the information based on apparent power in the second electric line when the first electric line satisfies the power condition. In this case, the apparent power in the first electric line may be adjusted according to the content of adjustment suitable for the apparent power in the second electric line.

Further, a current supplied from the device used for adjustment of the first electric line may flow into the first electric line after the second electric line. In this case, the apparent power in the first electric line may be adjusted according to the content of adjustment suitable for the electric line through which the current flows for the adjustment of the apparent power in the first electric line by the device.

Further, the information processing system may further include a limitation unit that puts a limitation on adjustment of apparent power in the first electric line based on a margin up to a capacity regarding apparent power in the second electric line. In this case, as compared with the case where the adjustment of the apparent power in the first electric line is not limited, it is possible to suppress the occurrence of a failure related to the second electric line when the apparent power in the first electric line is adjusted.

Further, the output unit may output the information based on a margin up to a capacity regarding apparent power of the electric line that satisfies the power condition. In this case, the apparent power in the electric line may be adjusted according to the content of adjustment suitable for the margin up to the capacity regarding the apparent power in the electric line that satisfies the power condition.

Further, the output unit may output the information based on the margin with regard to a power factor to be adjusted by the device. In this case, the apparent power in the electric line may be adjusted according to the power factor suitable for the capacity regarding the apparent power in the electric line that satisfies the power condition.

Further, the device may be a heat pump system that is used to adjust apparent power in the electric line of the distribution system and is configured to adjust temperature and/or humidity, and the information processing system may further include a system information acquisition unit that acquires system information on the heat pump system, and a capability calculation unit that calculates, based on the system information, an index regarding a capability of adjustment of the apparent power in the electric line when the heat pump system adjusts the temperature and/or humidity. In this case, when the heat pump system adjusts the temperature and/or humidity, it is possible to achieve the adjustment by the heat pump system to the apparent power in the electric line of the distribution system.

Here, the information processing system may further include a margin calculation unit that calculates an index regarding a margin of a capability of the adjustment when the heat pump system adjusts the apparent power in the electric line. In this case, the content of the adjustment by the heat pump system for the apparent power in the electric line of the distribution system may be changed based on the index regarding the margin calculated by the margin calculation unit.

Further, the information processing system may further include an output unit that outputs information on the heat pump system when the index regarding the margin satisfies a condition set for the margin. In this case, as compared with the case where the information on the heat pump system is output regardless of whether the index regarding the margin satisfies the condition, it is possible to suppress the output of the information on the heat pump system for which the index regarding the margin having the content unsuitable for the change of adjustment by the heat pump system is calculated.

Further, the condition may be set based on an operating life regarding the heat pump system. In this case, the content of the adjustment of the apparent power in the electric line by the heat pump system may be changed based on the operating life regarding the heat pump system.

Further, the condition may be set based on use of the heat pump system for adjustment of temperature and/or humidity. In this case, the content of the adjustment of the apparent power in the electric line by the heat pump system may be changed based on the use of the heat pump system for adjusting the temperature and/or humidity.

Further, the information processing system may further include an output unit that outputs information on the index that satisfies a condition set for adjustment of apparent power. In this case, as compared with the case where the information regarding the index is output regardless of whether the index satisfies the condition, it is possible to suppress the output of the information on the index having the content unsuitable for the adjustment of the apparent power in the electric line.

Further, the condition may be that the index is an index calculated for the heat pump system that receives power via the electric line that is a target for the adjustment of the apparent power. In this case, as compared with the case where the information regarding the index is output regardless of whether the index satisfies the condition, it is possible to suppress the output of the information on the index regarding the heat pump system to which the power is not supplied via the electric line that is the adjustment target.

Further, the condition may be set for a capability to adjust the apparent power. In this case, as compared with the case where the information on the index is output regardless of whether the index satisfies the condition, it is possible to suppress the output of the information on the index unsuitable for the capability to adjust the apparent power in the electric line.

Further, the condition may be set based on a relation between the capability and a degree of adjustment necessary for the apparent power in the electric line. In this case, as compared with the case where the information on the index is output regardless of whether the index satisfies the condition, it is possible to suppress the output of the information on the index unsuitable for the relation between the capability and the degree of adjustment necessary for the apparent power.

Further, the heat pump system may include a conversion unit that converts received power to supply the converted power to a load used for adjustment of temperature and/or humidity, and an adjustment unit that adjusts apparent power in a power reception path of the conversion unit, both the conversion unit and the adjustment unit may be configured to adjust apparent power in the electric line, and the capability calculation unit may calculate an index regarding a capability of the conversion unit to adjust the apparent power in the electric line and an index regarding a capability of the adjustment unit to adjust the apparent power in the electric line. In this case, when the heat pump system adjusts the temperature and/or humidity, it is possible to achieve the adjustment of the apparent power in the electric line of the distribution system by the conversion unit and the adjustment unit.

Further, the capability calculation unit may calculate a first index regarding a predetermined capability for the adjustment unit and calculate a second index regarding a capability for the conversion unit lower than the capability of the adjustment unit. In this case, as compared with the case where the index regarding a higher capability of the conversion unit than that of the adjustment unit is calculated, it is possible to suppress the effect on the function of adjusting the temperature and/or humidity by the heat pump system.

Further, the system information may include target information on a target whose temperature and/or humidity is adjusted by the heat pump system. In this case, as compared with the case where the index is calculated without using the target information by the capability calculation unit, it is possible to calculate the index suitable for the target whose temperature and/or humidity is adjusted by the heat pump system.

Further, the device may be a heat pump system that is used for adjustment of apparent power in an electric line of a distribution system and is configured to adjust temperature and/or humidity, and the device may further include a system information acquisition unit that acquires system information on the heat pump system, and a calculation unit that calculates, based on the system information, an index regarding a capability to adjust apparent power in the electric line when the heat pump system adjusts temperature and/or humidity. In this case, when the heat pump system adjusts the temperature and/or humidity, it is possible to achieve the adjustment by the heat pump system to the apparent power in the electric line of the distribution system.

Further, the information processing system may be the information processing system causing the device to adjust a plurality of adjustment targets for apparent power in the electric line, the electric line information may include power information on the apparent power in the electric line, and the information processing system may further include a capacity information acquisition unit that acquires capacity information on a capacity of power in the device, and a determination unit that determines a relation of adjustment by the device for each of the plurality of adjustment targets in the electric line based on the power information and the capacity information. In this case, as compared with the case where the device adjusts the plurality of adjustment targets regardless of the index regarding the capacity of power in the device, the device may adjust the plurality of adjustment targets according to the content of adjustment suitable for the device.

Here, the information processing system may further include a limitation unit that puts a limitation on adjustment by the device to at least one of the plurality of adjustment targets based on the capacity information. In this case, as compared with the case where the adjustment by the device is not limited, it is possible to suppress the occurrence of a failure in the device.

Further, the limitation unit may put the limitation based on a relation between the plurality of adjustment targets. In this case, as compared with the case where the adjustment by the device is limited regardless of the relation between the plurality of adjustment targets, it is possible to suppress the limitation on the adjustment of the adjustment target that is not suitable as the target to be limited.

Further, the plurality of adjustment targets may include a power factor in the electric line and a harmonic in the electric line, and the limitation unit may put the limitation on adjustment of the power factor rather than adjustment of the harmonic when the power factor satisfies a predetermined limitation condition. In this case, it is possible to determine the target to which the limitation on the adjustment by the device is preferentially applied according to the power factor of the electric line.

Further, the plurality of adjustment targets may include a power factor in the electric line, and the limitation unit may reduce the limitation on adjustment of the power factor when the power factor satisfies a predetermined reduction condition. In this case, when the adjustment by the device to the power factor in the electric line is limited, the degree of limitation on the adjustment may be determined according to the power factor in the electric line.

Further, the determination unit may determine the relation based on content stored in a storage unit that stores a relation of adjustment by the device for each of the plurality of adjustment targets in the electric line. In this case, it is possible to reduce the processing load of the determination unit for determining the adjustment relation between the plurality of adjustment targets.

Further, the device may be configured to adjust an adjustment target for apparent power in an electric path different from the electric line, and the determination unit may determine a relation of adjustment by the device for the adjustment target in the electric line and the adjustment target in the electric path based on the capacity information. In this case, as compared with the case where the device adjusts the adjustment target in the plurality of electric lines regardless of the index regarding the capacity of power in the device, the device may adjust the adjustment target in the electric line and the electric path according to the content of adjustment suitable for the device.

Further, the device may receive power supplied via the electric line, the electric path may be provided closer to a power reception side than the electric line, and the adjustment target in the electric path may include a specific target that is different from any of the plurality of adjustment targets in the electric line. In this case, as compared with the case where the device adjusts the adjustment target in the electric line and the electric path regardless of the index regarding the capacity of power in the device, the device may adjust the plurality of different adjustment targets depending on the electric line and the electric path according to the content of adjustment suitable for the device.

Further, the determination unit may determine the relation between the electric line and the electric path such that the electric path is adjusted in preference to the electric line when the specific target is adjusted by the device and determine the relation such that the electric line is adjusted in preference to the electric path when the specific target is not adjusted by the device. In this case, the electric line or electric path to be preferentially adjusted may be determined depending on whether a specific target in the electric path is adjusted.

Further, the device may be the device adjusting a plurality of adjustment targets for apparent power in the electric line, the electric line information may include power information on apparent power in the electric line, and the device may further include a determination unit that determines a relation of adjustment for each of the plurality of adjustment targets in the electric line based on the power information and information on a capacity of power in the device. In this case, as compared with the case where the device adjusts the plurality of adjustment targets regardless of the index regarding the capacity of power in the device, the device may adjust the plurality of adjustment targets according to the content of adjustment suitable for the device.

BRIEF DESCRIPTION OF DRAWINGS

FIG. 5 is a diagram illustrating an electric line management table.

FIG. 6 is a diagram illustrating an HPS management table.

FIG. 12 is a diagram illustrating an electric line management table.

FIG. 13 is a diagram illustrating a device management table.

FIG. 17 is a diagram illustrating a power plant management table.

FIG. 18 is a diagram illustrating an electric line, etc. management table.

FIG. 19 is a diagram illustrating a device management table according to the third embodiment.

10

Figure 23:
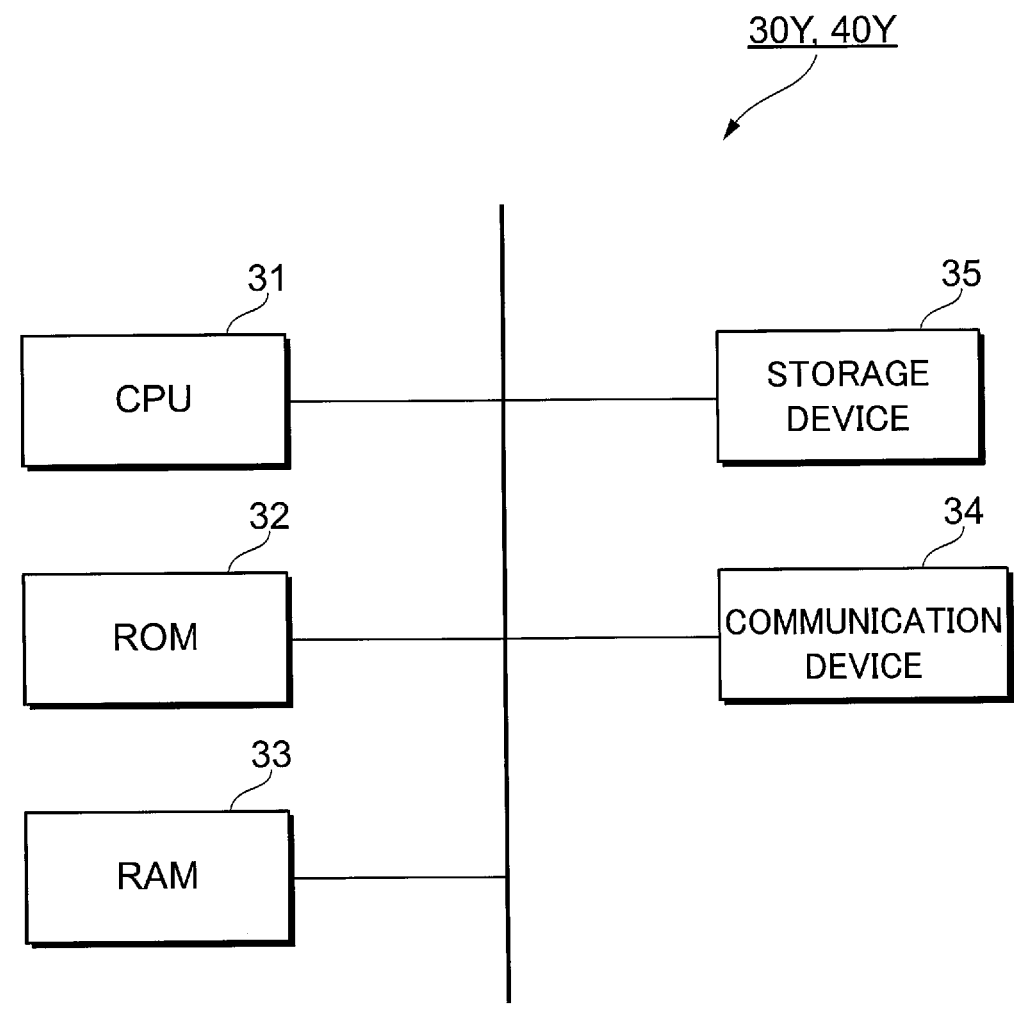

FIG. 23 is a diagram illustrating a hardware configuration of a calculation server and an instruction server.

Figure 24:
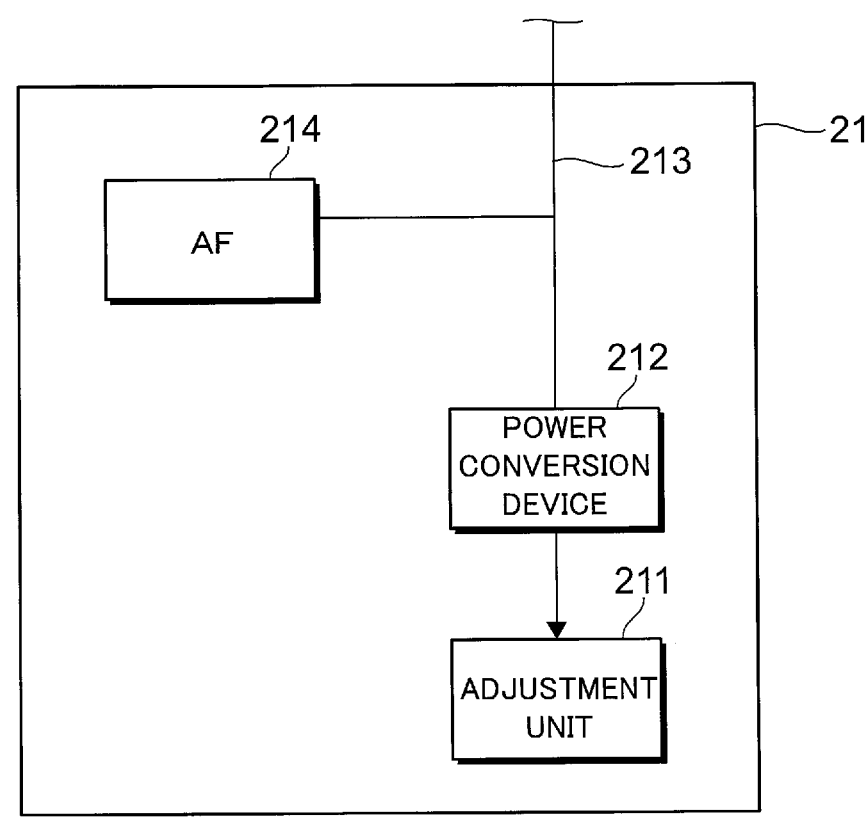

FIG. 24 is a diagram illustrating a functional configuration of the HPS.

Figure 25:
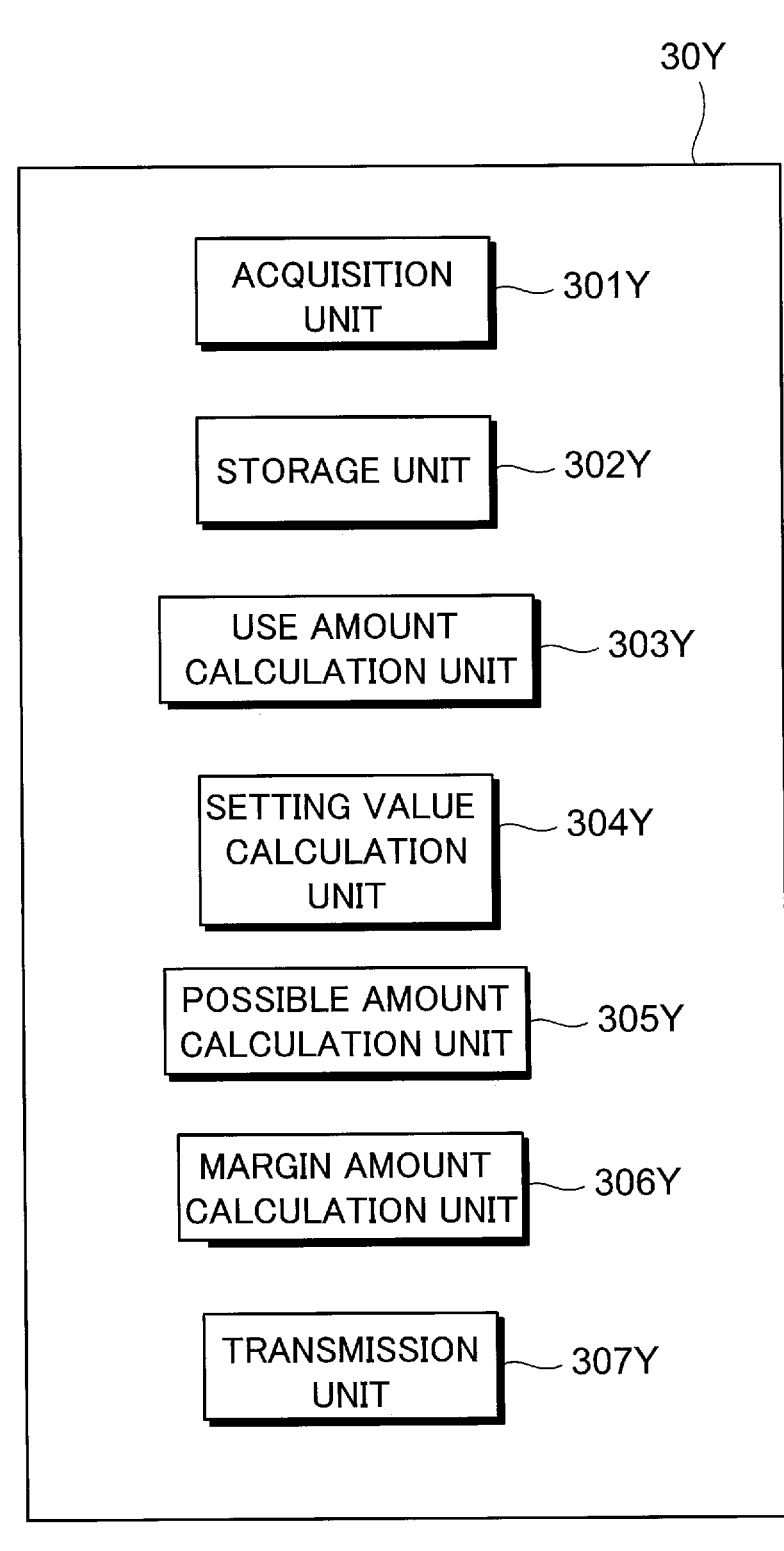

FIG. 25 is a diagram illustrating a functional configuration of a calculation server.

FIG. 26 is a diagram illustrating a relation management table.

FIG. 27A is a diagram illustrating a past information management table, and FIG. 27B is a diagram illustrating a future information management table.

FIG. 28A is a diagram illustrating a future information management table, FIG. 28B is a diagram illustrating a past information management table, and FIG. 28C is a diagram illustrating a future information management table.

Figure 29:
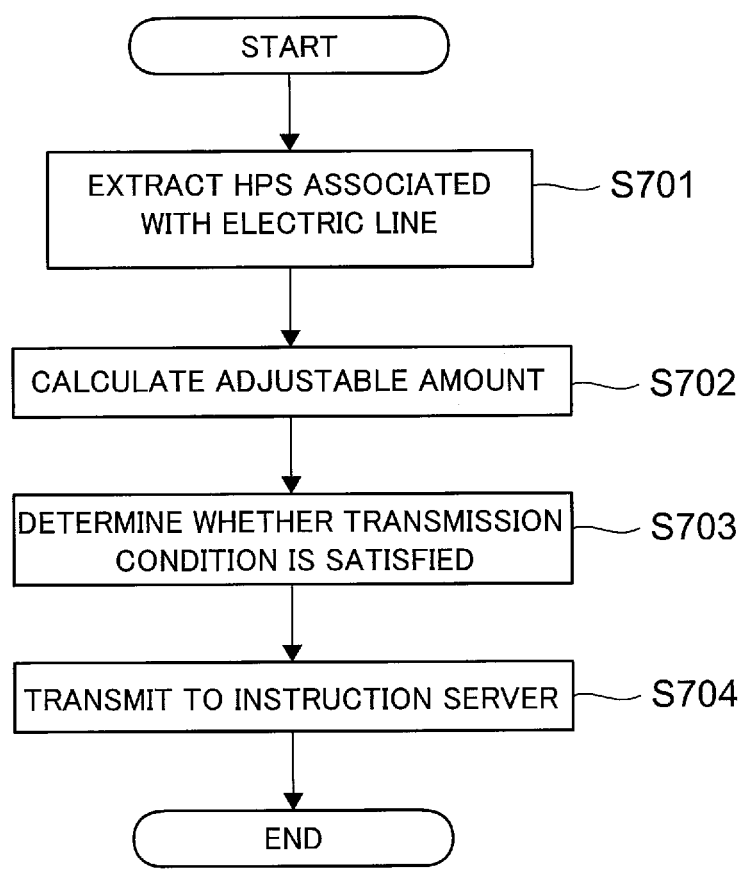

FIG. 29 is a flowchart illustrating a flow of a possible amount calculation process.

FIG. 30 is a diagram illustrating a future information management table.

FIG. 31A and FIG. 31B are diagrams illustrating during-adjustment management tables.

Figure 32:
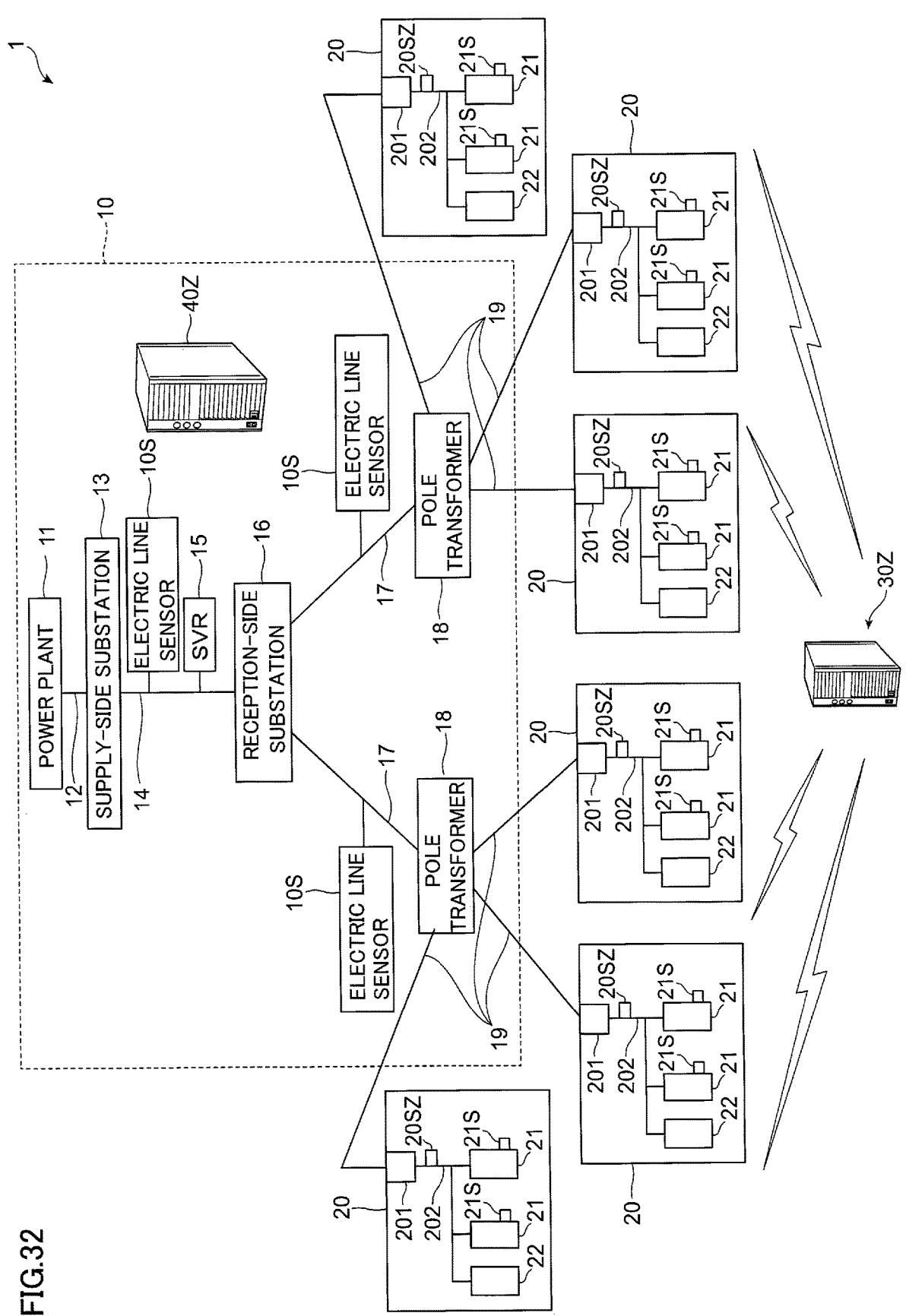

FIG. 32 is a diagram illustrating an example of the power control system according to a fifth embodiment.

Figure 33:
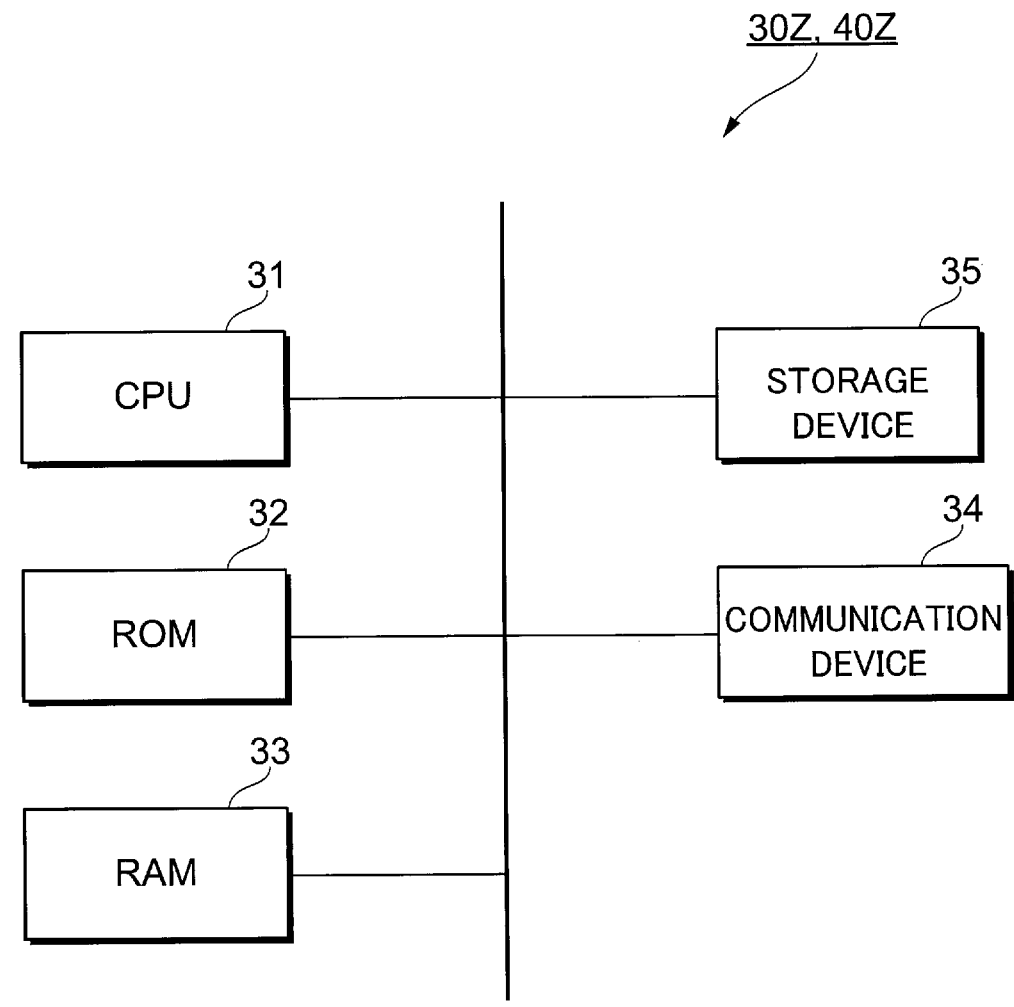

FIG. 33 is a diagram illustrating a hardware configuration of a control server and a management server.

Figure 34:
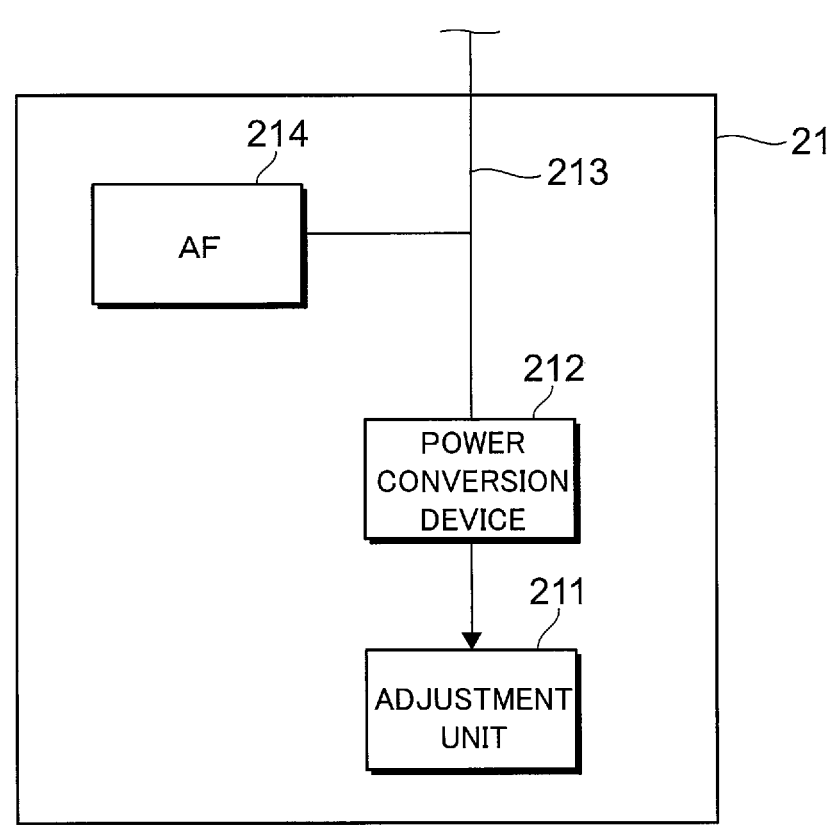

FIG. 34 is a diagram illustrating a functional configuration of the HPS.

Figure 35:
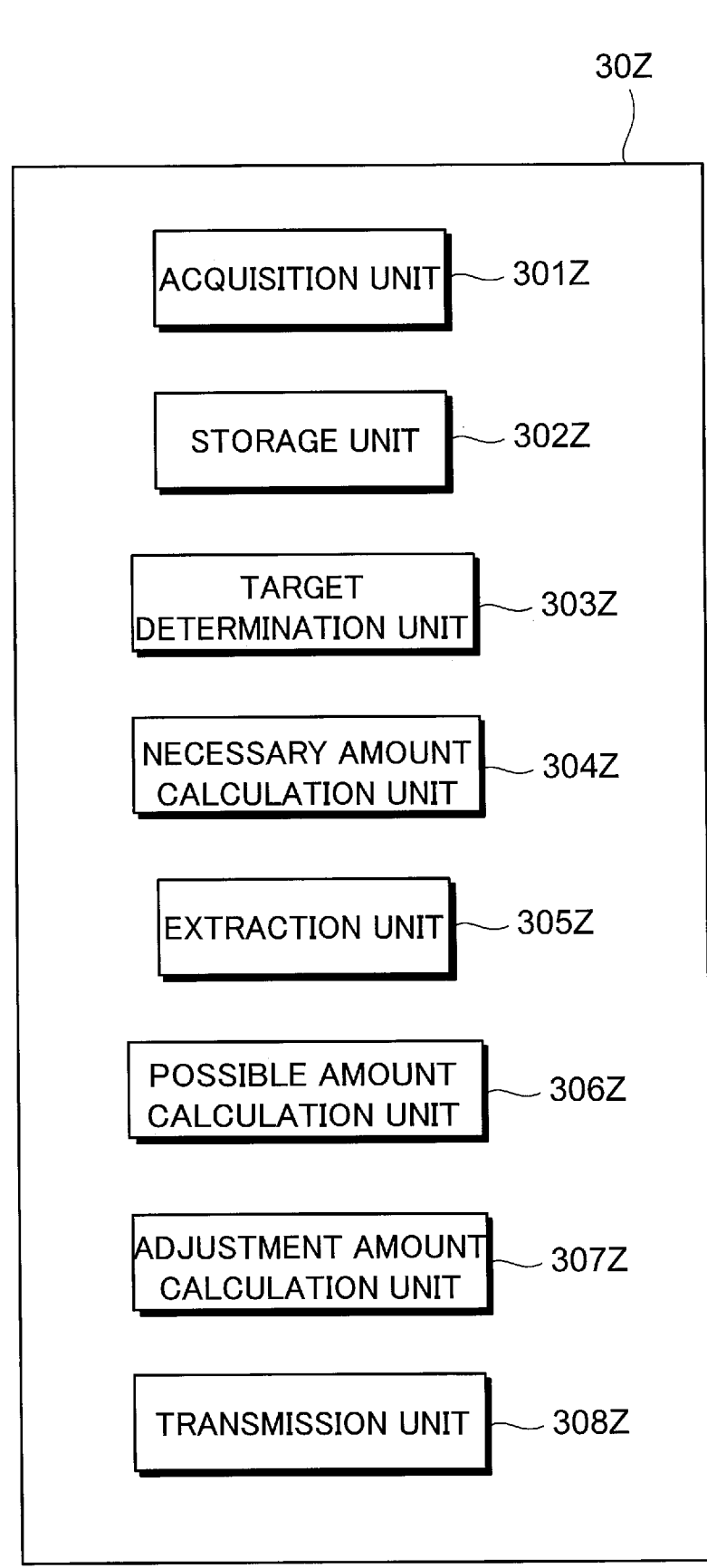

FIG. 35 is a diagram illustrating a functional configuration of a control server.

FIG. 36 is a diagram illustrating an electric line management table.

FIG. 37 is a diagram illustrating a relation management table.

FIG. 38 is a diagram illustrating an HPS management table.

Figure 39:
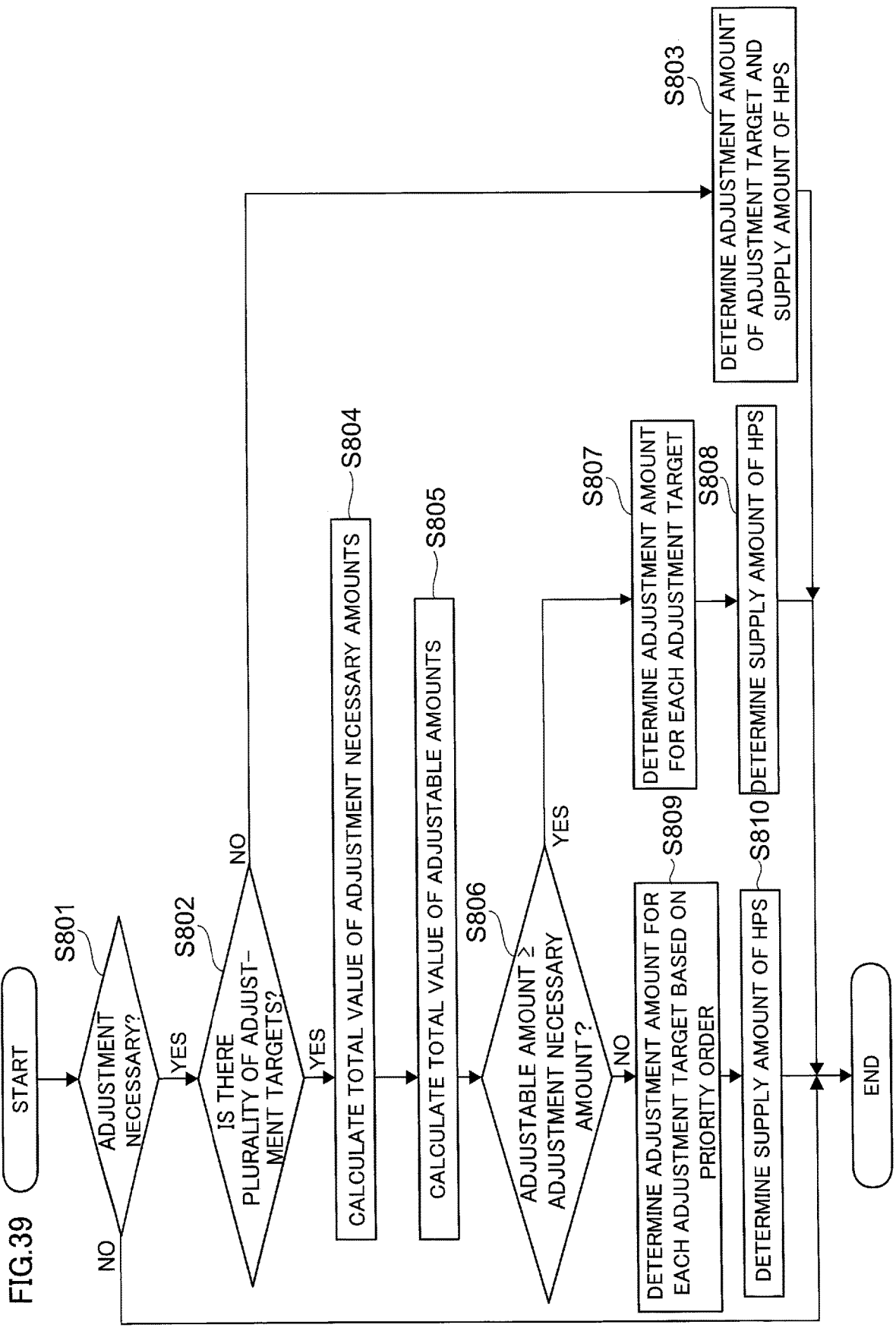

FIG. 39 is a flowchart illustrating a flow of an adjustment amount calculation process.

DESCRIPTION OF EMBODIMENTS

First Embodiment

An embodiment will be described below with reference to the accompanying drawings.

Figure 1:
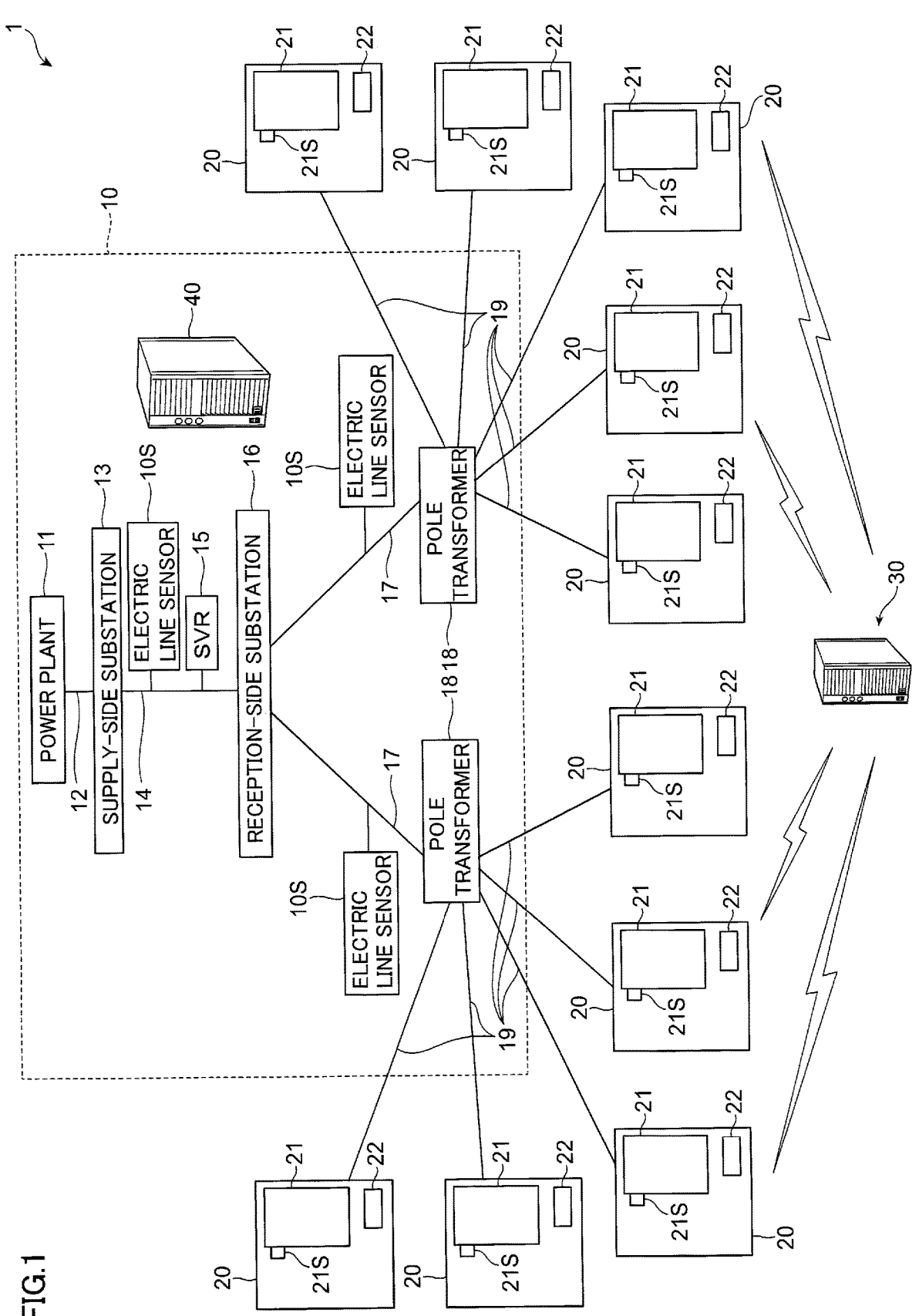
FIG. 1 is a diagram illustrating an example of a power control system according to a first embodiment.

FIG. 1 is a diagram illustrating an example of a power control system 1 according to a first embodiment.

The power control system 1, which is an example of an information processing system, is a system that controls apparent power.

The power control system 1 includes a power system 10, a plurality of power consumption facilities 20, a control server 30, and an instruction server 40.

The power system 10 is a system in which a facility is provided to supply the power to a power demander. The power system 10 includes a power plant 11, a transmission line 12, a supply-side substation 13, a supply-side distribution line 14, an automatic voltage regulator (SVR: Step Voltage Regulator) 15, a reception-side substation 16, a reception-side distribution line 17, a pole transformer 18, and a demander-side distribution line 19.

The power plant 11 is a facility that generates power. Examples of the power plant 11 include a thermal power plant, a hydraulic power plant, a nuclear power plant, a solar power plant, a wind power plant, and a geothermal power plant.

The transmission line 12 is a line to flow the current forming the power generated by the power plant 11. The transmission line 12 is provided from the power plant 11 to the supply-side substation 13.

The supply-side substation 13 is a facility that converts the voltage. The supply-side substation 13 is provided closer to the power supply side than the reception-side substation 16. According to the present embodiment, the facility located closest to the power supply side is the power plant 11. Furthermore, the facility located closest to the power reception side is the power consumption facility 20.

The supply-side substation 13 converts the voltage supplied through the transmission line 12. Examples of the supply-side substation 13 include a substation that converts a voltage of 500000 V into 154000 V, a substation that converts a voltage of 154000 V into 66000 V, and a substation that converts a voltage of 66000 V into 22000 V.

The supply-side distribution line 14 is a line to flow the current generated by applying the voltage converted by the supply-side substation 13. The supply-side distribution line 14 is provided from the supply-side substation 13 to the reception-side substation 16. Furthermore, the supply-side distribution line 14 is provided closer to the power supply side than the reception-side distribution line 17.

The SVR 15 regulates the voltage supplied to the supply-side distribution line 14. More Specifically, the SVR 15 detects the voltage supplied to the supply-side distribution line 14. Further, when the detected voltage does not fall within a predetermined range, the SVR 15 regulates the voltage such that the voltage falls within the predetermined range.

The reception-side substation 16 is a facility that converts the voltage supplied through the supply-side distribution line 14. Examples of the reception-side substation 16 include a substation that converts the supplied voltage into 6600 V.

The reception-side distribution line 17 is a line to flow the current generated by applying the voltage converted by the reception-side substation 16. The reception-side distribution line 17 is provided from the reception-side substation 16 to the pole transformer 18. Further, according to the present embodiment, the supply-side distribution line 14 and the reception-side distribution line 17 may be simply referred to as "electric lines" when they are not distinguished from each other in particular in the description.

The pole transformer 18 is a facility that converts the voltage supplied through the reception-side distribution line 17. Examples of the pole transformer 18 include a transformer that converts a voltage of 6600 V to 200 V and a transformer that converts a voltage of 6600 V to 100 V.

The demander-side distribution line 19 is a line to flow the current generated when the voltage converted by the pole transformer 18 is applied. The power system 10 includes a plurality of the demander-side distribution lines 19. More specifically, the demander-side distribution line 19 is provided for each of the power consumption facilities 20. Each of the demander-side distribution lines 19 is provided from the pole transformer 18 to the power consumption facility 20.

As described above, the power system 10 is a system provided outside the power consumption facility 20 and is a system that distributes the generated power to demanders of the power. Therefore, the power system 10 may also be regarded as a distribution system. The pole transformer 18 may also be regarded as a distribution transformer. Moreover, the reception-side substation 16 is an example of a distribution transformer, too, in a broad sense.

Furthermore, the power system 10 includes a plurality of electric line sensors 10S. The electric line sensor 10S is coupled to the supply-side distribution line 14. More specifically, the electric line sensor 10S is coupled to a portion of the supply-side distribution line 14 closer to the power supply side than the SVR 15. Moreover, the electric line sensors 10S are coupled to the reception-side distribution lines 17, respectively. In other words, the electric line sensor 10S is provided individually for the supply-side distribution line 14 and the reception-side distribution line 17.

The electric line sensor 10S detects a parameter regarding the apparent power in the coupled electric line. The parameter regarding the apparent power is a parameter that affects the apparent power. Examples of the parameter regarding the apparent power include apparent power, reactive power, reactive voltage, harmonic voltage, current, power factor, apparent power amount and reactive power amount in a predetermined period, and the like. The current as a parameter regarding the apparent power includes a harmonic current. Furthermore, the harmonic voltage or the harmonic current may be a harmonic voltage or a harmonic current of a specific order. Examples of the specific order include the fifth-order harmonic. Further, examples of the parameter regarding the apparent power include a total harmonic distortion (THD: Total Harmonic Distortion) of the current and the THD of the voltage. Here, the THD of the current is calculated from Equation (1) below. Moreover, the THD of the voltage is calculated from Equation (2) below.

$$THD = \sqrt{\sum\nolimits_{n=2}^{40} \left(\frac{I_n}{I_1}\right)^2} \tag{1}$$

$$THD = \sqrt{\sum\nolimits_{n=2}^{40} \left(\frac{V_n}{V_1}\right)^2} \tag{2}$$

In Equation (1) above, $I_1$ is a fundamental current. Furthermore, $I_n$ is an n-th order harmonic current.

In Equation (2) above, $V_1$ is a fundamental voltage. Further, $V_n$ is an n-th order harmonic voltage.

For example, the electric line sensor 10S detects the above-described parameter regarding the apparent power at predetermined time intervals. Hereinafter, the parameter regarding the apparent power in the electric line may be referred to as power information. Further, the predetermined time may be any time, but is for example one hour. Further, when the power information is detected, the electric line sensor 10S transmits the detected power information to the instruction server 40 together with electric line identification information for identifying the electric line to be detected.

Further, although the one supply-side substation 13 is illustrated in the power system 10 in the illustrated example, the number of the supply-side substations 13 is not limited to the one illustrated. The power system 10 may include the two or more supply-side substations 13 that convert the same or different voltages.

Further, although the one reception-side substation 16 is illustrated in the power system 10 in the illustrated example, the number of the reception-side substations 16 is not limited to the one illustrated. The power system 10 may include the two or more reception-side substations 16 that convert the same voltage or different voltages.

Further, the numbers of the supply-side distribution lines 14 and the reception-side distribution lines 17 are not limited to the illustrated example. The power system 10 may include the supply-side distribution lines 14 and the reception-side distribution lines 17 that are larger in number than those illustrated in the drawing. In this case, the electric line sensor 10S may be provided for each of the supply-side distribution lines 14, or the electric line sensor 10S may be provided for each of the reception-side distribution lines 17.

Further, the power information detected by the electric line sensor 10S is not limited to one type of parameter regarding the apparent power. The electric line sensor 10S may detect a plurality of types of parameters among the above-described parameters. Further, the power information indicating each of the plurality of types of parameters detected may be transmitted to the instruction server 40. Moreover, the electric line sensor 10S may be provided for each type of parameter to be detected.

The power consumption facility 20 is a facility that receives and consumes the power supplied from the power plant 11 through the demander-side distribution line 19. Each of the power consumption facilities 20 includes a heat pump system (HPS: Heat Pump System) 21 and a load 22.

The HPS 21, which is an example of a device, uses the power received from the power system 10 to adjust the temperature and humidity. Examples of the target to be adjusted by the HPS 21 include the temperature and humidity of the space in the power consumption facility 20. Further, examples of the target to be adjusted by the HPS 21 include the temperature of the liquid provided in the power consumption facility 20.

Furthermore, the HPS 21 according to the present embodiment may supply the current. The HPS 21 supplies the current to adjust the above parameters regarding the apparent power in the HPS 21. Moreover, the HPS 21 may supply the current to the electric line in the power system 10. The HPS 21 supplies the current to the electric line in the power system 10 to adjust the above parameters regarding the apparent power in the electric line.

An example of the technique for adjusting the parameter regarding the apparent power in the electric line by the HPS 21 will be described. When the harmonic current occurs in the electric line, the HPS 21 supplies, to the electric line, the current having a phase canceling the harmonic current to reduce the harmonic current in the electric line.

Another example of the technique for adjusting the parameter regarding the apparent power in the electric line by the HPS 21 will be described. When the reactive power occurs in the electric line, the HPS 21 supplies the current to the electric line to reduce the reactive power in the electric line. Further, as the reactive power in the electric line decreases, the power factor in the electric line is improved.

As described above, according to the present embodiment, the HPS 21 is used to adjust the parameter regarding the apparent power in the electric line of the power system 10. Further, the HPS 21 adjusts the parameter regarding the apparent power in the HPS 21 by using a technique similar to that for adjusting the electric line. Here, as the parameter regarding the apparent power changes, the apparent power also changes. Therefore, in a broad sense, the adjustment of each of the above-described parameters regarding the apparent power may be regarded as the adjustment of the apparent power. Hereinafter, each of the parameters regarding the apparent power to be adjusted may be collectively referred to as "apparent power".

Examples of the HPS 21 include a system that adjusts the temperature and humidity. More specific examples of the HPS 21 include devices used in an HVAC (Heating Ventilation and Air Conditioning) system, such as air conditioning apparatuses, showcases for conditioning the internal temperature, coolers, refrigerating machines, and water heaters.

When an instruction for adjusting the apparent power in the electric line is received from the control server 30, the HPS 21 supplies the current to the electric line in response to the received instruction to adjust the apparent power in the electric line.

The load 22 receives and consumes the power supplied from the power plant 11 through the demander-side distribution line 19.

Furthermore, according to the present embodiment, an HPS sensor 21S is provided in each of the power consumption facilities 20. The HPS sensor 21S detects information on the apparent power in the HPS 21. Moreover, the HPS sensor 21S will be described below in detail.

Further, the one power consumption facility 20 is provided for each of the demander-side distribution lines 19 in the illustrated example, but is not limited thereto. The power consumption facilities 20 may be provided for each of the demander-side distribution lines 19. Further, the numbers of the HPSes 21 and the loads 22 provided in the power consumption facility 20 are not limited to the illustrated example. The power consumption facility 20 may include the HPSes 21 and the loads 22 that are larger in number than those illustrated in the drawing. Further, the power consumption facility 20 may include none of the HPSes 21 or the loads 22.

The control server 30 is a server device that controls an operation of the HPS 21. More specifically, the control server 30 controls an operation of the HPS 21 to adjust the apparent power in the electric line of the power system 10. Adjusting the apparent power refers to adjusting one or both of the active power and the reactive power. In other words, adjusting the apparent power refers to adjusting at least one of the active power and the reactive power. When receiving the instruction for adjusting the apparent power in the electric line from the instruction server 40, the control server 30 determines the current value to be supplied by the HPS 21 for the adjustment, the current value per unit time, or the current value in a predetermined time. The instruction for adjusting the apparent power refers to the instruction for adjusting one or both of the active power and the reactive power. In other words, the instruction for adjusting the apparent power refers to the instruction for adjusting at least one of the active power and the reactive power. Furthermore, the current value, the current value per unit time, and the current value in the predetermined time may be simply and collectively referred to as "current value" when they are not distinguished from each other in particular in the description. Moreover, the current value to be supplied by the HPS 21 in order to adjust the apparent power in the electric line of the power system 10 may be hereinafter referred to as electric line adjustment amount.

Furthermore, according to the present embodiment, the control server 30 controls an operation of the HPS 21 to adjust the apparent power in the HPS 21. Specifically, the adjustment by the HPS 21 to the apparent power in the HPS is limited based on the electric line adjustment amount.

The instruction server 40 is a server device that gives an instruction to adjust the apparent power in the electric line of the power system 10. When acquiring the power information from the electric line sensor 10S, the instruction server 40 specifies the electric line for which the adjustment of the apparent power is necessary from the acquired power information. More specifically, the instruction server 40 specifies the electric line whose apparent power specified from the power information has reached an adjustment threshold as the electric line for which the adjustment of the apparent power is necessary. The adjustment threshold is a threshold used for determining whether it is necessary to adjust the apparent power in the electric line. The adjustment threshold is set as a threshold at which the apparent power in the electric line needs to be improved.

When specifying the electric line whose apparent power needs to be adjusted, the instruction server 40 transmits the instruction for adjusting the apparent power in the electric line to the control server 30. In this case, the instruction server 40 transmits, to the control server 30, a plurality of pieces of information including the power information on the electric line that needs to be adjusted, the information on the adjustment threshold, etc.

The instruction server 40 and the control server 30 are implemented by, for example, a computer. The instruction server 40 and the control server 30 may be configured by a single computer or may be implemented by distributed processing using a plurality of computers. Further, the instruction server 40 and the control server 30 may be implemented on virtual hardware provided by cloud computing. Moreover, in the following description, the instruction server 40 and the control server 30 may be simply referred to as "servers" when they are not distinguished from each other in particular.

According to the present embodiment, the control server 30 is connected to each device provided in each of the power consumption facilities 20 and the instruction server 40 via a network (not illustrated). Further, the instruction server 40 is connected to each of the electric line sensors 10S via a network (not illustrated). These networks may be any network that enables data transmission and reception. Furthermore, a communication line used for transmitting and receiving data may be wired, wireless, or power line communication (PLC: Power Line Communication). Furthermore, the configuration may include the connection to a communication destination via a plurality of networks or communication lines.

Further, the numbers of the control servers 30 and the instruction servers 40 are not limited to the illustrated example. The power control system 1 may include the two or more control servers 30 or the two or more instruction servers 40. Moreover, the control server 30 may be provided for each of the power consumption facilities 20, for example.

Figure 2:
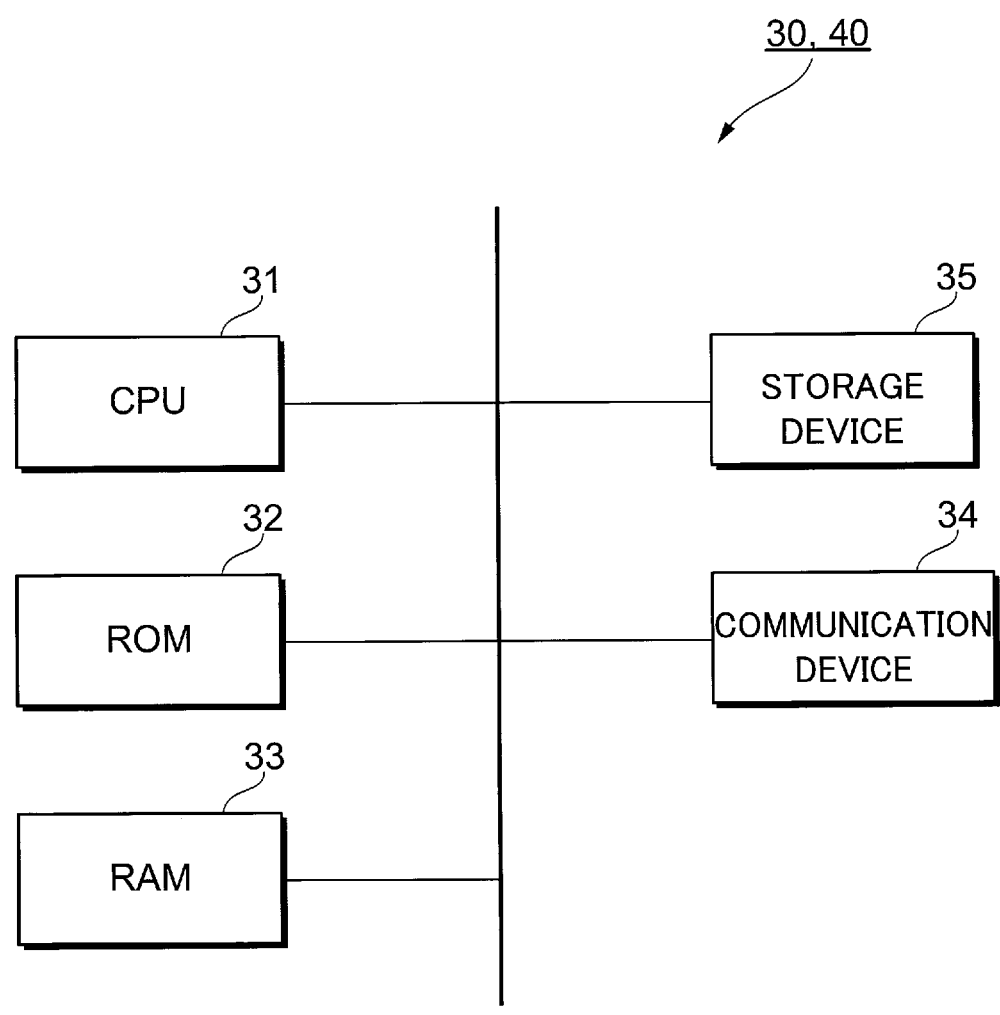
FIG. 2 is a diagram illustrating a hardware configuration of a control server and an instruction server.

FIG. 2 is a diagram illustrating a hardware configuration of the control server 30 and the instruction server 40.

The server includes a CPU 31, a ROM (Read Only Memory) 32, and a RAM (Random Access Memory) 33. Further, the server includes a storage device 35 that is configured by a hard disk device, or the like, to store information. Further, the server includes a communication device 34 (communication I/F) that performs communications with an external unit.

In addition, the server includes an input device used for inputting information, such as a keyboard and a mouse, and a display device, such as a liquid crystal display.

The ROM 32 and the storage device 35 store programs to be executed by the CPU 31. The CPU 31 reads a program stored in the ROM 32 or the storage device 35 and executes the program using the RAM 33 as a work area.

The CPU 31 executes a program stored in the ROM 32 and the storage device 35 to thus implement each functional unit described below.

Here, the program to be executed by the CPU 31 may be provided to the server by being stored in a computer-readable recording medium such as magnetic recording medium (e.g., magnetic tape and magnetic disk), optical recording medium (e.g., optical disk), magneto-optical recording medium, and semiconductor memory. Further, the program to be executed by the CPU 31 may be provided to the server using a communication unit such as the Internet.

Figure 3:
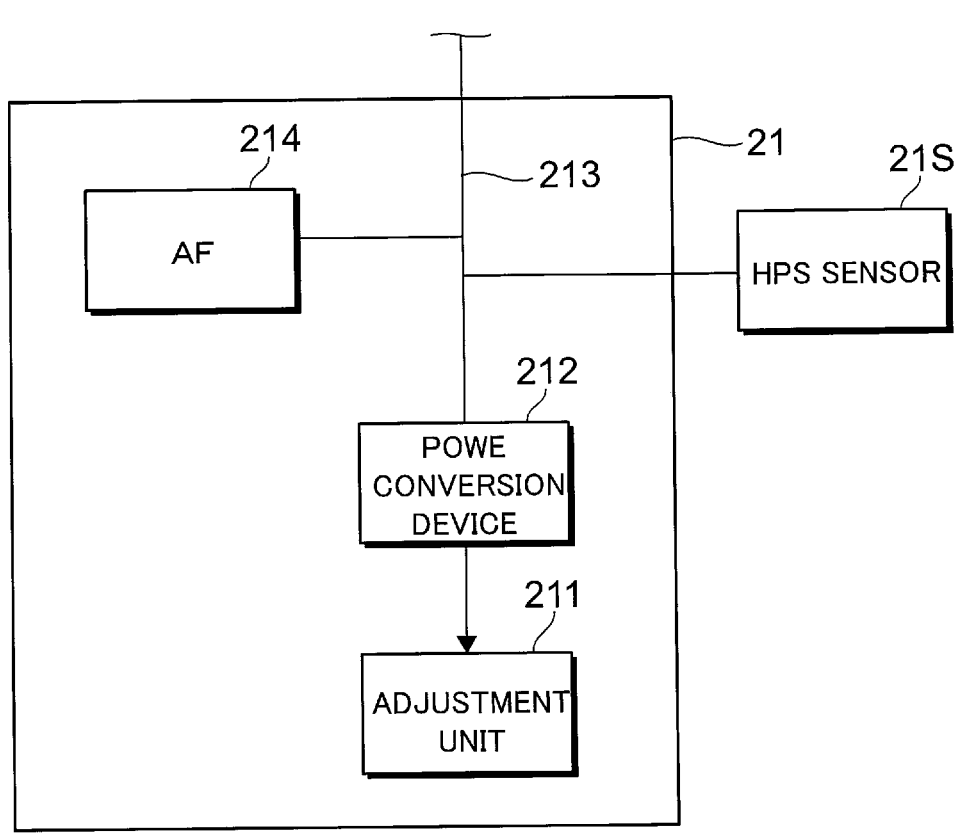
FIG. 3 is a diagram illustrating a functional configuration of an HPS.

FIG. 3 is a diagram illustrating a functional configuration of the HPS 21.

The HPS 21 includes an adjustment unit 211, a power conversion device 212, a power reception path 213, and an active filter (AF: Active Filter) 214.

The adjustment unit 211 adjusts the temperature and humidity. The adjustment unit 211 includes a motor (not illustrated) that operates using the received power. Furthermore, the adjustment unit 211 includes a heat exchanger (not illustrated) so that the air and liquid in the power consumption facility 20 exchanges heat through the heat exchanger.

The power conversion device 212 includes an inverter (not illustrated) and a converter (not illustrated). The power conversion device 212 uses the inverter and the converter to convert the power received from the power system 10 into power having a specific voltage and a specific frequency. The specific voltage and the specific frequency are the voltage and the frequency needed for the operation of the motor provided in the adjustment unit 211. The power conversion device 212 supplies the converted power to the adjustment unit 211.

The power reception path 213 is a path to pass the power received by the power conversion device 212 in the HPS 21.

The AF 214, which is an example of an adjustment unit, is electrically connected to the power reception path 213 of the power conversion device 212 in parallel with the power conversion device 212. The AF 214 supplies the current to the power reception path 213 of the power conversion device 212 to adjust the apparent power in the power reception path 213.

Furthermore, the AF 214 supplies the current to the electric line of the power system 10 to adjust the apparent power in the electric line.

Further, the HPS sensor 21S detects the apparent power in the power reception path 213 of the power conversion device 212. The HPS sensor 21S detects the apparent power at predetermined time intervals, for example. The predetermined time may be any time, but is for example one hour. Further, after detecting the apparent power, the HPS sensor 21S transmits the detected information to the control server 30 together with HPS identification information for identifying the HPS 21 to be detected.

Although FIG. 3 illustrates the functional configuration of the HPS 21, the device used for adjustment of the apparent power in the electric line of the power system 10 is not limited to the HPS 21.

The device used for adjustment of the apparent power in the electric line of the power system 10 may be any device that may supply the current to the electric line. Examples of the device that may supply the current to the electric line include a device including a power conversion device. More specifically, examples of the device that may supply the current to the electric line include a device including a power conversion device including at least one of an inverter and a converter. Furthermore, examples of the device including the power conversion device include an electric vehicle and a storage battery. Further, examples of the device including the power conversion device include a system that generates renewable energy such as a solar power generation system and a wind power generation system.

Figure 4:
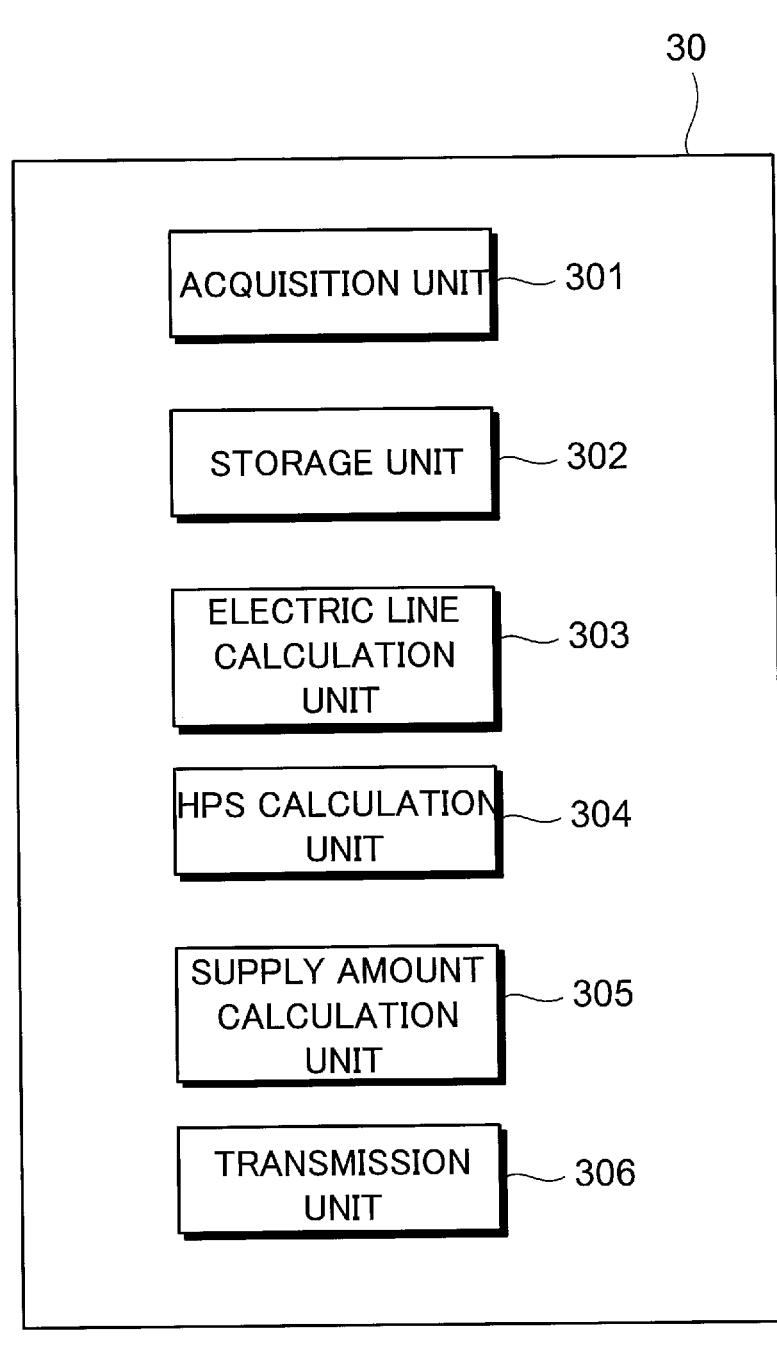
FIG. 4 is a diagram illustrating a functional configuration of the control server.

FIG. 4 is a diagram illustrating a functional configuration of the control server 30.

The control server 30 includes an acquisition unit 301, a storage unit 302, an electric line calculation unit 303, an HPS calculation unit 304, a supply amount calculation unit 305, and a transmission unit 306.

The acquisition unit 301, which is an example of an acquisition unit, acquires information transmitted to the control server 30 or information input to the control server 30. The storage unit 302 stores the information acquired by the acquisition unit 301.

The storage unit 302 stores information. The information stored in the storage unit 302 will be described below in detail.

The electric line calculation unit 303 calculates an electric line adjustment amount. When the control server 30 receives the instruction for adjusting the apparent power in the electric line from the instruction server 40, the electric line calculation unit 303 calculates the current value necessary for improving the apparent power in the electric line to be adjusted. More specifically, the electric line calculation unit 303 calculates the current value necessary for improving the apparent power in the electric line to be adjusted based on the power information and the adjustment threshold transmitted to the control server 30 together with the instruction for adjusting the electric line. Hereinafter, the current value necessary for improving the apparent power in the electric line may be referred to as electric line necessary amount. Furthermore, the electric line that is a target for the adjustment of the apparent power is hereinafter referred to as adjustment target electric line. As the difference between the apparent power indicated in the power information and the adjustment threshold is larger, the electric line calculation unit 303 may calculate a larger electric line necessary amount. Furthermore, the electric line calculation unit 303 calculates the electric line adjustment amount based on the calculated electric line necessary amount. More specifically, the electric line calculation unit 303 determines whether to calculate the electric line necessary amount as the electric line adjustment amount or calculate a value larger than the electric line necessary amount as the electric line adjustment amount based on the tendency of the apparent power in the adjustment target electric line.

The HPS calculation unit 304 calculates the current value necessary for improving the apparent power in the power reception path 213 of the power conversion device 212 in the HPS 21. Further, the current value necessary for improving the apparent power in the power reception path 213 of the power conversion device 212 in the HPS 21 is hereinafter referred to as HPS necessary amount. The HPS calculation unit 304 uses the information detected by the HPS sensor 21S to calculate the HPS necessary amount. The HPS calculation unit 304 calculates the latest HPS necessary amount each time the detection result by the HPS sensor 21S is transmitted to the control server 30.

The supply amount calculation unit 305 calculates the current value to be supplied from the AF 214 of the HPS 21 to the electric line in the power system 10. More specifically, the supply amount calculation unit 305 calculates the current value to be supplied from the AF 214 to the electric line in the power system 10 based on the electric line adjustment amount calculated by the electric line calculation unit 303 and the HPS necessary amount calculated by the HPS calculation unit 304. Furthermore, the current value supplied from the AF 214 to the electric line in the power system 10 is hereinafter referred to as electric line supply amount. The electric line supply amount is the total value of the current value supplied by the AF 214 for the adjustment of the apparent power in the electric line and the current value supplied by the AF 214 for the adjustment of the apparent power in the power reception path 213 of the HPS 21.

The transmission unit 306 transmits the information indicating the electric line supply amount to the HPS 21.

FIG. 5 is a diagram illustrating an electric line management table. The electric line management table is a table to manage the electric lines in the power system 10. The instruction server 40 stores the electric line management table.

In the electric line management table, "electric line" indicates the electric line identification information. "14" indicated in "electric line" represents the supply-side distribution line 14. Furthermore, "17" indicated in "electric line" represents the reception-side distribution line 17. Moreover, "A" and "B" accompanied with "17" are information for identifying the corresponding ones of the reception-side distribution lines 17.

Furthermore, in the electric line management table, "latest value" indicates the latest power information on "electric line". In other words, "power information" indicates the latest detection result of "electric line" by the electric line sensor 10S.

Further, in the electric line management table, "previous value" indicates the past power information on "electric line". More specifically, "previous value" indicates the previous detection result of "electric line" by the electric line sensor 10S.

Each time the latest detection result by the electric line sensor 10S is acquired, the acquisition unit 301 writes the power information indicated in "latest value" in "previous value" and writes the power information as the latest detection result in "latest value". Further, in the electric line management table, "prediction value" indicates the prediction value of the apparent power in "electric line". More specifically, "prediction value" indicates the value calculated as the apparent power in "electric line" after a predetermined time elapses. In other words, "prediction value" indicates the value calculated as the future apparent power in "electric line". The predetermined time may be any time, but is for example one hour.

An example of the technique for calculating the future apparent power will be described. The instruction server 40 may calculate the tendency of the apparent power in "electric line" from "latest value" and "previous value" and calculate the future apparent power in "electric line" from the calculated tendency. Furthermore, the instruction server 40 may accumulate the past power information in "electric line" and use the accumulated power information to calculate the future apparent power. More specifically, the instruction server 40 accumulates the power information for each period, such as the power information for each season and the power information for each time zone of the day. Further, the power information in the period closest to the target period for which the future apparent power is calculated may be extracted from the accumulated power information, and the future apparent power may be calculated so as to approximate the extracted power information.

Each time "latest value" and "previous value" are updated, the instruction server 40 calculates the future apparent power in "electric line" and writes the calculated value in "prediction value".

Furthermore, in the electric line management table, "available capacity" indicates the available amount up to the capacity of the current value in "electric line". The capacity of the current value in the electric line is the maximum current value that may flow in the electric line.

An example of the technique for calculating the available amount up to the capacity of the current value will be described. A user of the power control system 1 previously inputs the capacity of each electric line to the instruction server 40. Further, the instruction server 40 calculates the current value flowing through "electric line" from "latest value". Then, the calculated current value is subtracted from the capacity of "electric line" to calculate "available capacity".

Each time "latest value" is updated, the instruction server 40 calculates the available amount up to the capacity of the current value in "electric line" and writes the calculated value in "available capacity".

An example of the content of the electric line management table will be described. For the reception-side distribution line 17 specified from "17A" of "electric line", "P2" is indicated as "latest value", "Pa2" is indicated as "previous value", "Pr2" is indicated as "prediction value", and "M2" is indicated as "available capacity".

When giving an instruction to the control server 30 to adjust the apparent power in the electric line, the instruction server 40 transmits the instruction information about the adjustment target electric line to the control server 30. The instruction information is information about the instruction for adjusting the apparent power in the adjustment target electric line. The instruction information includes the instruction for adjusting the apparent power in the adjustment target electric line, latest value information, previous value information, and prediction value information. The latest value information is information indicating "latest value" for the adjustment target electric line. The previous value information is information indicating "previous value" for the adjustment target electric line. The prediction value information is information indicating "prediction value" for the adjustment target electric line. Furthermore, the instruction server 40 transmits available capacity information together with the instruction information to the control server 30. The available capacity information is information indicating "available capacity" for the adjustment target electric line. Further, the instruction information may also be regarded as the electric line information on the electric line. Moreover, the available capacity information may also be regarded as the capacity information on the capacity of the electric line.

FIG. 6 is a diagram illustrating an HPS management table. The HPS management table is a table to manage the HPS 21. The storage unit 302 stores the HPS management table.

In the HPS management table, "HPS" indicates the HPS identification information. "A" to "J" accompanied with "21" of "HPS" are information for identifying the corresponding ones of the HPSes 21.

Furthermore, in the HPS management table, "pass-through electric line" indicates the electric line identification information. The electric line identification information indicated in "pass-through electric line" is the electric line identification information on the electric line that is passed through when the power is supplied from the power system 10 to "HPS". "A" and "B" accompanied with "17" of "pass-through electric line" are information for identifying the corresponding ones of the reception-side distribution lines 17.

For each of the HPSes 21, the user of the power control system 1 inputs, to the control server 30, the electric line identification information on the electric line that is passed through when the power is supplied to the HPS 21. When acquiring the electric line identification information acquired by the control server 30, the acquisition unit 301 writes the electric line identification information in "pass-through electric line" associated with the target "electric line".

Furthermore, in the HPS management table, "capacity" indicates the capacity of the current value of the AF 214 in the HPS 21. The capacity of the current value of the AF 214 is the maximum current value that may be generated by the AF 214. As the capacity of the current value of the AF 214, the information described in specifications of the HPS 21 may be used.

For each of the HPSes 21, the user of the power control system 1 inputs, to the control server 30, the current capacity information indicating the capacity of the current value of the AF 214. When acquiring the current capacity information, the acquisition unit 301 writes the capacity of the current value indicated in the current capacity information to "capacity" associated with the target "electric line". Here, the current capacity information may also be regarded as capability information on the capability of the HPS 21 to generate the current.

Furthermore, in the HPS management table, "HPS necessary amount" indicates the HPS necessary amount calculated by the HPS calculation unit 304. Each time the latest HPS necessary amount is calculated, the HPS calculation unit 304 writes the calculated latest HPS necessary amount in "HPS necessary amount" associated with the target "electric line".

An example of the content of the HPS management table will be described. "HPS" specified from "21A" is associated with "17A" as "pass-through electric line", "35" as "capacity", and "10" as "HPS necessary amount".

Figure 7:
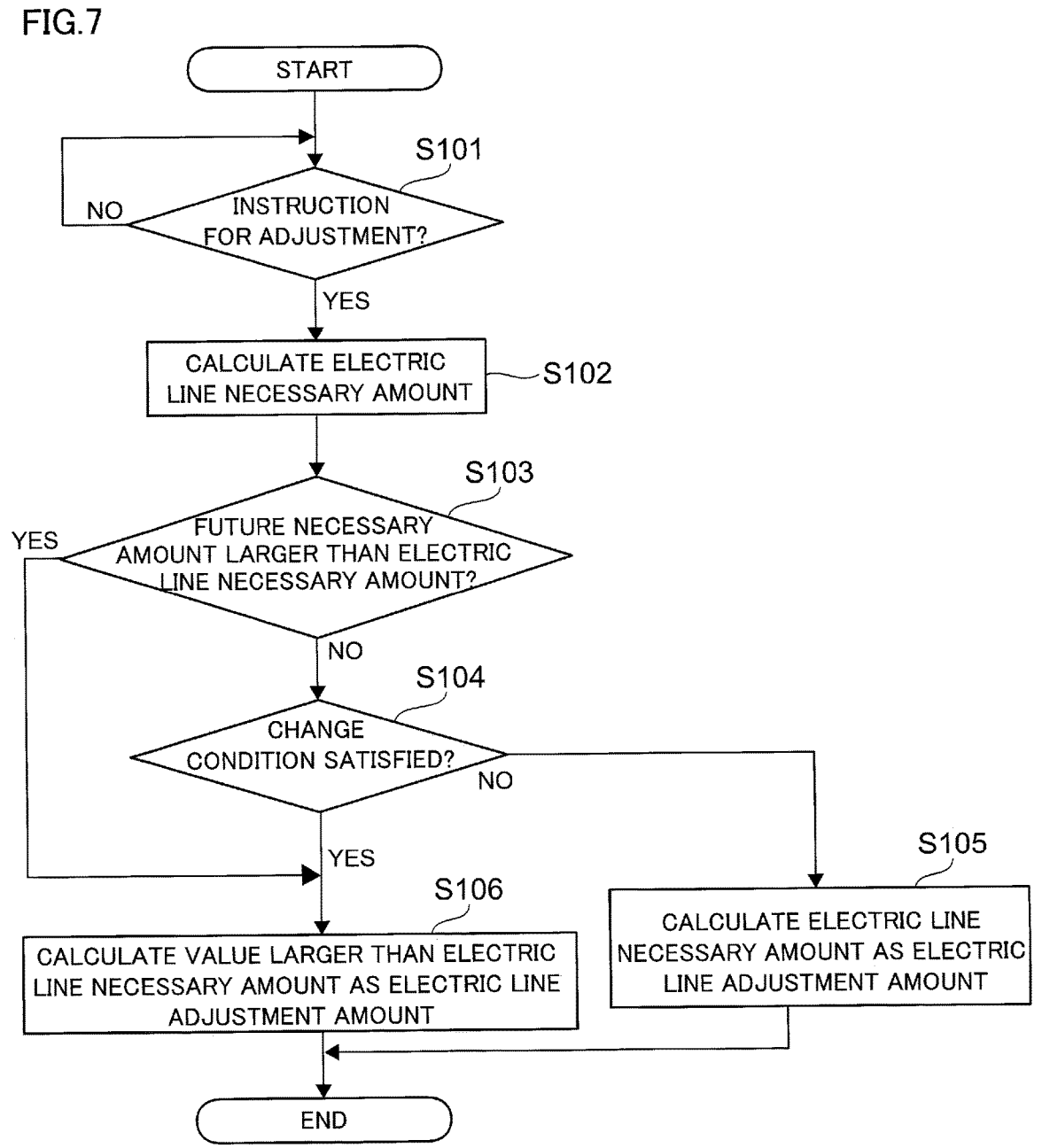
FIG. 7 is a flowchart illustrating a flow of an electric line calculation process.

FIG. 7 is a flowchart illustrating the flow of an electric line calculation process. The electric line calculation process is a process in which the control server 30 calculates the electric line adjustment amount.

The acquisition unit 301 determines whether the instruction for adjusting the apparent power in the electric line has been received (Step (hereinafter referred to as "S") 101). The acquisition unit 301 makes the above determination depending on whether the instruction information has been acquired from the instruction server 40. While a negative result continues, the acquisition unit 301 repeats the determination in Step 101. Conversely, when the acquisition unit 301 has acquired the instruction information, a positive result is obtained, and the process proceeds to Step 102.

The electric line calculation unit 303 calculates the electric line necessary amount based on the latest power information included in the instruction information (S102).

The case where the electric line calculation unit 303 calculates the electric line necessary amount as "100" will be described below.

The electric line calculation unit 303 calculates whether the current value necessary for improving the future apparent power in the adjustment target electric line is larger than the electric line necessary amount (S103). The current value necessary for improving the future apparent power in the electric line may be hereinafter referred to as future necessary amount. The electric line calculation unit 303 calculates the future necessary amount from the prediction information included in the instruction information. Then, the above-described determination is made depending on whether the calculated future necessary amount is larger than the electric line necessary amount.

When the future necessary amount is equal to or smaller than the electric line necessary amount (NO in S103), the process proceeds to the subsequent step. The electric line calculation unit 303 determines whether the latest power information satisfies a change condition (S104). The change condition is a condition set with respect to the tendency of change in the apparent power in the adjustment target electric line. According to the present embodiment, the change condition is set from the viewpoint of improving the future apparent power in the adjustment target electric line even when there is a large tendency of change in the apparent power in the adjustment target electric line. Furthermore, the change condition according to the present embodiment is that "latest value" associated with the adjustment target electric line in the electric line management table (see FIG. 5) has changed with respect to "previous value" by more than a predetermined rate. The predetermined rate may be any rate, but is 10%, for example. The electric line calculation unit 303 determines whether the latest power information satisfies the change condition based on the latest value information and the previous value information included in the instruction information.

When the latest power information does not satisfy the change condition (NO in S104), the electric line calculation unit 303 calculates the electric line necessary amount as the electric line adjustment amount (S105). In this example, "100", which is the electric line necessary amount, is calculated as the electric line adjustment amount.

Conversely, when the future necessary amount is larger than the electric line necessary amount (YES in S103), or when the latest power information satisfies the change condition (YES in 104), the electric line calculation unit 303 calculates a value larger than the electric line necessary amount as the electric line adjustment amount (S106). In this example, "110" that is larger than "100", which is the electric line necessary amount, is calculated as the electric line adjustment amount.

Figure 8:
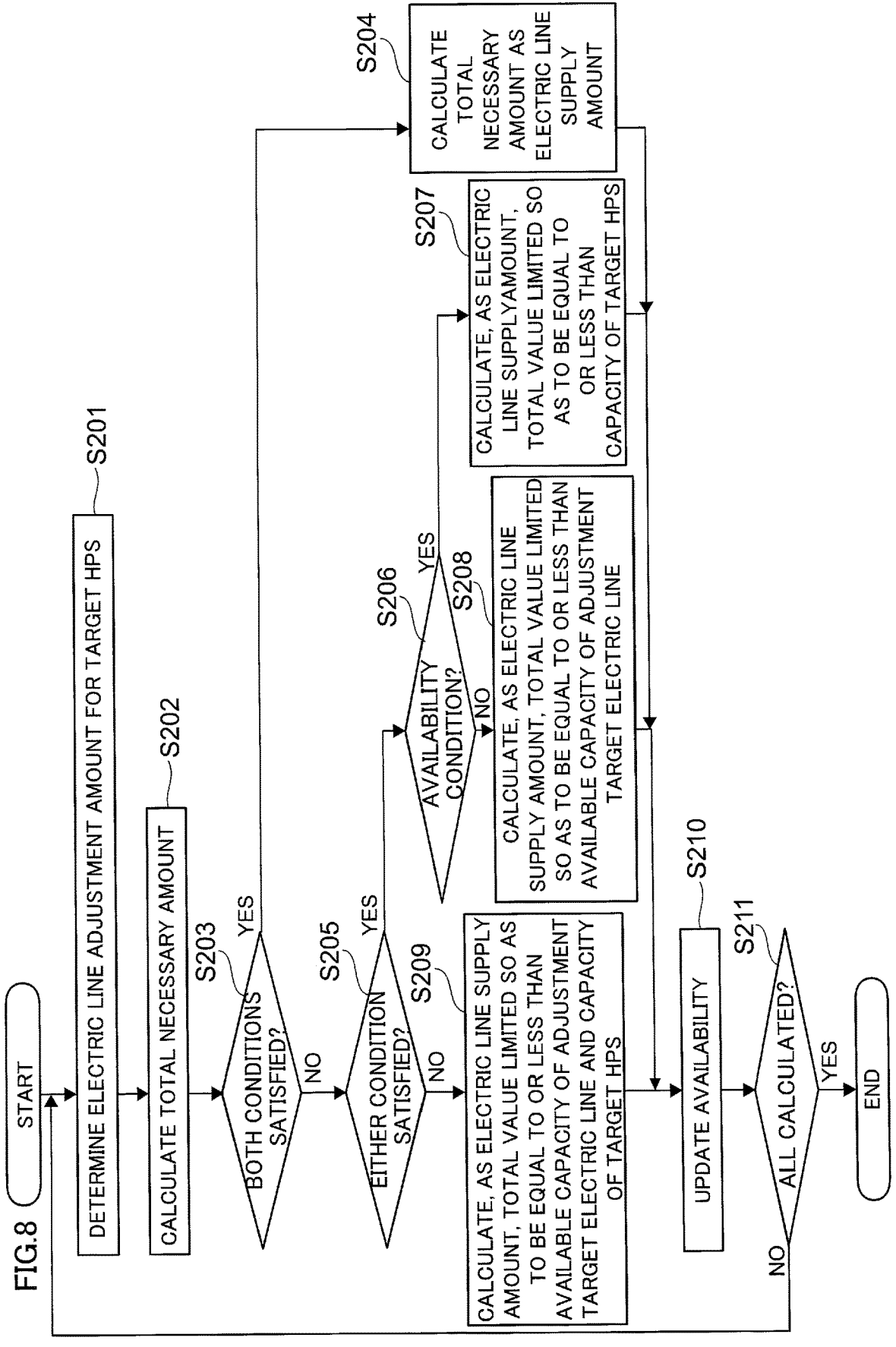
FIG. 8 is a flowchart illustrating a flow of a supply amount calculation process.

FIG. 8 is a flowchart illustrating the flow of a supply amount calculation process. The supply amount calculation process is a process in which the control server 30 calculates the electric line supply amount.

The control server 30 determines that "HPS" for which the electric line identification information on the adjustment target electric line is associated with "pass-through electric line" in the HPS management table (see FIG. 6) is the HPS 21 to be used for the adjustment. Further, the supply amount calculation process is performed for the HPS 21 that is determined to be used for the adjustment. Furthermore, the HPS 21 that is the target of the supply amount calculation process may be hereinafter referred to as the target HPS 21. Moreover, the AF 214 in the target HPS 21 may be hereinafter referred to as the target AF 214.

The electric line calculation unit 303 determines the electric line adjustment amount for the one target HPS 21 from the electric line adjustment amount calculated during the electric line calculation process (see FIG. 7) (S201). In addition, during the electric line calculation process, the total electric line adjustment amount for all the HPSes 21 used for adjustment of the apparent power in the adjustment target electric line is calculated. Conversely, during the supply amount calculation process, the electric line adjustment amount for the one HPS 21 is calculated.

The electric line calculation unit 303 refers to the HPS management table (see FIG. 6). Further, the electric line adjustment amount for the target HPS 21 is determined from "capacity" associated with the target HPS 21. The electric line calculation unit 303 may set the larger electric line adjustment amount for the target HPS 21 as "capacity" of the target HPS 21 is larger.

The supply amount calculation unit 305 calculates the total value of the electric line adjustment amount of the target HPS 21 and the HPS necessary amount of the target HPS 21 (S202). Hereinafter, the total value of the electric line adjustment amount of the target HPS 21 and the HPS necessary amount of the target HPS 21 may be referred to as total necessary amount. The supply amount calculation unit 305 calculates the total value of "HPS necessary amount" of the target HPS 21 indicated in the HPS management table and the electric line adjustment amount of the target HPS 21 as the total necessary amount.

The supply amount calculation unit 305 determines whether the calculated total necessary amount satisfies both an availability condition and a current capacity condition (S203).

The availability condition is a condition set for the relation between the available amount up to the capacity of the current value in the adjustment target electric line and the total necessary amount. According to the present embodiment, the availability condition is set from the viewpoint of flowing the total necessary amount of current through the adjustment target electric line without causing a short circuit or ignition in the adjustment target electric line. Further, according to the present embodiment, the availability condition is set such that the available amount up to the capacity of the current value in the adjustment target electric line is equal to or more than the total necessary amount. The supply amount calculation unit 305 determines whether the total necessary amount satisfies the availability condition depending on whether "available capacity" of the adjustment target electric line indicated in the available capacity information is equal to or more than the total necessary amount.

The current capacity condition is a condition set for the relation between the capacity of the current value of the target AF 214 and the total necessary amount. According to the present embodiment, the current capacity condition is set from the viewpoint of suppressing occurrence of a failure in the target AF 214. Furthermore, according to the present embodiment, the current capacity condition is set such that the capacity of the current value of the target AF 214 is equal to or more than the total necessary amount. The supply amount calculation unit 305 refers to the HPS management table. Further, it is determined whether the total necessary amount satisfies the current capacity condition depending on whether "capacity" of the target HPS 21 is equal to or more than the total necessary amount.

When the total necessary amount satisfies both the availability condition and the current capacity condition (YES in S203), the supply amount calculation unit 305 calculates the total necessary amount as the electric line supply amount of the target HPS 21 (S204).

Conversely, when the total necessary amount does not satisfy at least one of the availability condition and the current capacity condition (NO in S203), the supply amount calculation unit 305 determines whether the total necessary amount satisfies either one of the availability condition and the current capacity condition (S205).

When the total necessary amount satisfies either one of the availability condition and the current capacity condition (YES in S205), the supply amount calculation unit 305 determines whether the satisfied condition is the availability condition (S206).

When the satisfied condition is the availability condition (YES in S206), it means that the total necessary amount does not satisfy the current capacity condition. In this case, the supply amount calculation unit 305 sets the current value, which is supplied by the target AF 214 to adjust the apparent power in the power reception path 213 of the target HPS 21, smaller than the HPS necessary amount. Hereinafter, the current value supplied by the target AF 214 to adjust the apparent power in the power reception path 213 of the target HPS 21 may be referred to as HPS adjustment amount. The supply amount calculation unit 305 puts a limitation on the HPS adjustment amount such that the total value of the HPS adjustment amount and the electric line adjustment amount of the target HPS 21 is equal to or less than "capacity" of the target HPS 21. Further, the total value of the limited HPS adjustment amount and the electric line adjustment amount is calculated as the electric line supply amount (S207).

Further, when a negative result is obtained in Step 206, it means that the total necessary amount satisfies the current capacity condition but does not satisfy the availability condition. In this case, the supply amount calculation unit 305 sets the HPS adjustment amount smaller than the HPS necessary amount. More specifically, the supply amount calculation unit 305 puts a limitation on the HPS adjustment amount such that the total value of the HPS adjustment amount and the electric line adjustment amount of the target HPS 21 is equal to or less than "available capacity" of the adjustment target electric line. Further, the total value of the limited HPS adjustment amount and the electric line adjustment amount is calculated as the electric line supply amount (S208).

Furthermore, when the total necessary amount satisfies neither the availability condition nor the current capacity condition (NO in the S205), the supply amount calculation unit 305 sets the current value, which is supplied by the target AF 214 to adjust the apparent power in the power reception path 213 of the target HPS 21, smaller than the HPS necessary amount. More specifically, the supply amount calculation unit 305 puts a limitation on the HPS adjustment amount such that the total value of the HPS adjustment amount and the electric line adjustment amount of the target HPS 21 is equal to or less than "available capacity" of the adjustment target electric line and equal to or less than "capacity" of the target HPS 21. Further, the total value of the limited HPS adjustment amount and the electric line adjustment amount is calculated as the electric line supply amount (S209).

When any of Step 204, Step 207, Step 208, and Step 209 is processed, the supply amount calculation unit 305 updates the available amount up to the capacity of the current value in the adjustment target electric line (S210). More specifically, the supply amount calculation unit 305 makes an update by using the value obtained by subtracting the electric line supply amount from the available amount up to the capacity of the current value in the adjustment target electric line as the latest available amount up to the capacity of the current value in the adjustment target electric line.

It is determined whether the electric line supply amount has been calculated for all the HPSes 21 used for adjustment of the apparent power in the adjustment target electric line (S211).

When the electric line supply amount has not been calculated for any of all the HPSes 21 used for the adjustment (NO in S211), the process in Step 201 and subsequent steps is repeated for the HPS 21 for which the electric line supply amount has not been calculated.

Furthermore, when the electric line supply amount has been calculated for all the HPSes 21 (YES in S211), the supply amount calculation process ends.

The transmission unit 306 transmits the information indicating the electric line supply amount determined during the supply amount calculation process as an operation instruction to the HPS 21 targeted for the instruction. When receiving the instruction, the HPS 21 operates according to the content of the received instruction. More specifically, the HPS 21, which has received the instruction, supplies the current having the instructed electric line supply amount to the adjustment target electric line in the power system 10.

As described above, according to the present embodiment, the electric line calculation unit 303, the supply amount calculation unit 305, and the transmission unit 306 control the adjustment of the apparent power in the adjustment target electric line by the HPS 21. Therefore, the electric line calculation unit 303, the supply amount calculation unit 305, and the transmission unit 306 may also be regarded as a control unit.

A description will be given below of the supply amount calculation process that is sequentially performed when the five HPSes 21 having the HPS identification information "21A" to "21E" (see FIG. 6) are used for the adjustment of the apparent power in the electric line having the electric line identification information "17A" (see FIG. 5).

In this example, it is assumed that the electric line adjustment amount is calculated as "100" during the electric line calculation process (see FIG. 7). Furthermore, it is assumed that the available amount up to the capacity of the current value in the electric line "17A" is "140". Moreover, it is assumed that the electric line adjustment amounts of the HPSes 21 "21A", "21B", "21C", "21D", and "21E" are "25", "25", "25", "20", and "5", respectively.

First, the supply amount calculation process is performed for the HPS 21 "21A". The electric line calculation unit 303 determines that the electric line adjustment amount for the HPS 21 "21A" is "25" as described above (S201).

The supply amount calculation unit 305 calculates the total necessary amount of the HPS 21 "21A" (S202). The HPS necessary amount of the HPS 21 "21A" is "10" (see FIG. 6). Therefore, the total necessary amount that is the total value of the electric line adjustment amount and the HPS necessary amount of the HPS 21 "21A" is "35".

The supply amount calculation unit 305 determines whether the total necessary amount of the HPS 21 "21A" satisfies both the availability condition and the current capacity condition (S203). Here, the total necessary amount "35" of the HPS 21 "21A" is smaller than "140" that is the available amount up to the capacity of the current value in the electric line "17A". Therefore, the total necessary amount satisfies the availability condition. Further, the total necessary amount "35" is "35" that is "capacity" of the HPS 21 "21A". Therefore, the total necessary amount also satisfies the current capacity condition (YES in S203).

In this case, the supply amount calculation unit 305 calculates the total necessary amount "35" as the electric line supply amount of the HPS 21 "21A" (S204).

The supply amount calculation unit 305 makes an update by using the value "105" obtained by subtracting "35", which is the electric line supply amount of the HPS 21 "21A", from "140", which is the available amount up to the capacity of the current value in the electric line "17A", as the latest available amount (S210).

The supply amount calculation unit 305 determines whether the electric line supply amount has been calculated for all the HPSes 21 (S211). In this example, as the electric line supply amounts for the HPSes 21 from "21B" to "21E" have not been calculated (NO in S211), the process returns to Step 201.

Subsequently, the supply amount calculation process is performed for the HPS 21 "21B". The electric line calculation unit 303 determines that the electric line adjustment amount for the HPS 21 "21B" is "25" as described above (S201). Further, as the HPS necessary amount of HPS 21 "21B" is "10" (see FIG. 6), the supply amount calculation unit 305 calculates the total necessary amount as "35"

(S202). The total necessary amount is smaller than "105", which is the latest available amount up to the capacity of the current value in the electric line "17A", and is "35", which is "capacity" of the HPS 21 "21B". Therefore, the total necessary amount satisfies both the availability condition and the current capacity condition (YES in S203).

The supply amount calculation unit 305 calculates the total necessary amount "35" as the electric line supply amount of the HPS 21 "21B" (S204).

The supply amount calculation unit 305 makes an update by using "70", which is the value obtained by subtracting "35", which is the electric line supply amount of the HPS 21 "21B", from "105", which is the available amount up to the capacity of the current value in the electric line "17A", as the latest available amount (S210).

The supply amount calculation unit 305 determines whether the electric line supply amount has been calculated for all the HPSes 21 (S211). In this example, as the electric line supply amounts for the HPS 21 from "21C" to "21E" have not been calculated (NO in S211), the process returns to Step 201.

Subsequently, the supply amount calculation process is performed for the HPS 21 "21C". The electric line calculation unit 303 determines that the electric line adjustment amount for the HPS 21 "21C" is "25" as described above (S201). Further, as the HPS necessary amount of HPS 21 "21C" is "10" (see FIG. 6), the supply amount calculation unit 305 calculates the total necessary amount as "35" (S202). The total necessary amount is smaller than "70", which is the latest available amount up to the capacity of the current value in the electric line "17A", and is "35", which is "capacity" of the HPS 21 "21C". Therefore, the total necessary amount satisfies both the availability condition and the current capacity condition (YES in S203).

The supply amount calculation unit 305 calculates the total necessary amount "35" as the electric line supply amount of the HPS 21 "21C" (S204).

The supply amount calculation unit 305 makes an update by using "35", which is the value obtained by subtracting "35", which is the electric line supply amount of the HPS 21 "21C", from "70", which is the available amount up to the capacity of the current value in the electric line "17A", as the latest available amount (S210).

The supply amount calculation unit 305 determines whether the electric line supply amount has been calculated for all the HPSes 21 (S211). In this example, as the electric line supply amounts for the HPSes 21 "21D" and "21E" have not been calculated (NO in S211), the process returns to Step 201.

Subsequently, the supply amount calculation process is performed for the HPS 21 "21D". The electric line calculation unit 303 determines that the electric line adjustment amount for the HPS 21 "21D" is "20" as described above (S201). Furthermore, as the HPS necessary amount of the HPS 21 "21D" is "10" (see FIG. 6), the supply amount calculation unit 305 calculates the total necessary amount as "30" (S202). The total necessary amount is smaller than "35" that is the latest available amount up to the capacity of the current value in the electric line "17A". Conversely, the total necessary amount is larger than "25" that is "capacity" of the HPS 21 "21D". Therefore, the total necessary amount satisfies the availability condition but does not satisfy the current capacity condition (YES in S206).

In this case, the supply amount calculation unit 305 limits the HPS adjustment amount to "5", which is smaller than "10" that is the HPS necessary amount, such that the total value of the HPS adjustment amount and the electric line adjustment amount for the HPS 21 "21D" becomes "25" or less. Further, "25" that is the total value of "5", which is the limited HPS adjustment amount, and "20", which is the electric line adjustment amount, is calculated as the electric line supply amount of the HPS 21 "21D" (S207).

The supply amount calculation unit 305 makes an update by using "10", which is the value obtained by subtracting "25", which is the electric line supply amount of the HPS 21 "21D", from "35", which is the available amount up to the capacity of the current value in the electric line "17A", as the latest available amount (S210).

The supply amount calculation unit 305 determines whether the electric line supply amount has been calculated for all the HPSes 21 (S211). In this example, as the electric line supply amount for the HPS 21 "21E" has not been calculated (NO in S211), the process returns to Step 201.

Subsequently, the supply amount calculation process is performed for the HPS 21 "21E". The electric line calculation unit 303 determines that the electric line adjustment amount for the HPS 21 "21E" is "5" as described above (S201). Furthermore, as the HPS necessary amount of the HPS 21 "21E" is "10" (see FIG. 6), the supply amount calculation unit 305 calculates the total necessary amount as "15" (S202). The total necessary amount is smaller than "20" that is "capacity" of the HPS 21 "21D". Conversely, the total necessary amount is larger than "10" that is the latest available amount up to the capacity of the current value in the electric line "17A". Therefore, the total necessary amount satisfies the current capacity condition but does not satisfy the availability condition (NO in S206).

In this case, the supply amount calculation unit 305 limits the HPS adjustment amount to "5", which is smaller than "10" that is the HPS necessary amount, such that the total value of the HPS adjustment amount and the electric line adjustment amount for the HPS 21 "21E" becomes "10" or less. Further, "10" that is the total value of "5", which is the limited HPS adjustment amount, and "5", which is the electric line adjustment amount, is calculated as the electric line supply amount of the HPS 21 "21E" (S207).

The supply amount calculation unit 305 makes an update by using "0", which is the value obtained by subtracting "10", which is the electric line supply amount of the HPS 21 "21E", from "10", which is the available amount up to the capacity of the current value in the electric line "17A", as the latest available amount (S210). Further, as the electric line supply amount for the HPS 21 "21E" has been calculated, the electric line supply amounts for all the HPSes 21 have been calculated. Thus, the supply amount calculation process ends.

As described above, according to the present embodiment, after the acquisition unit 301 of the control server 30 acquires the instruction information from the instruction server 40, the supply amount calculation unit 305 calculates the electric line supply amount for the HPS 21. Furthermore, the transmission unit 306 transmits the information indicating the electric line supply amount calculated by the supply amount calculation unit 305 as an operation instruction to the HPS 21 targeted for the instruction. When receiving the instruction, the HPS 21 supplies the current having the instructed electric line supply amount to the adjustment target electric line in the power system 10. In other words, the supply amount calculation unit 305 according to the present embodiment causes the HPS 21 to generate the current used for adjustment of the apparent power in the adjustment target electric line based on the instruction information acquired by the acquisition unit 301.

Here, there is a possible configuration for adjusting the apparent power in the adjustment target electric line according to a mode different from the present embodiment. Examples include a configuration in which the HPS 21 supplies the current to the power consumption facility 20 or the demander-side distribution line 19 to improve the apparent power in the power consumption facility 20 or the apparent power in the demander-side distribution line 19. With this configuration, when the apparent power in the power consumption facility 20 and the apparent power in the demander-side distribution line 19 are improved, the apparent power in the supply-side distribution line 14 and the apparent power in the reception-side distribution line 17 may be accordingly improved. However, with this configuration, when a failure has occurred in the apparent power in any of the demander-side distribution lines 19 coupled to the reception-side distribution line 17, it is difficult to improve the apparent power in the supply-side distribution line 14 and the apparent power in the reception-side distribution line 17. The case where a failure has occurred in the apparent power is a case where the power factor has lowered, or the like.

Conversely, in the configuration according to the present embodiment where the HPS 21 supplies the current to the adjustment target electric line, the effect of the state of the demander-side distribution line 19 may be less likely to occur on the adjustment of the apparent power in the adjustment target electric line.

In particular, according to the present embodiment, the power consumption facilities 20 are coupled to the supply-side distribution line 14 and the reception-side distribution line 17 via the pole transformer 18 and the demander-side distribution line 19. Here, due to a failure occurring in the apparent power in any of the power consumption facilities 20, a failure may also occur in the apparent power in the supply-side distribution line 14 or the reception-side distribution line 17 coupled to the power consumption facility 20 where the failure has occurred. Even in this case, by improving the apparent power in the adjustment target electric line using the HPS 21, the apparent power is improved not only in the adjustment target electric line but also in the facility provided closer to the power reception side than the adjustment target electric line, such as the power consumption facility 20 where the failure has occurred. In other words, the HPS 21 provided in the specific power consumption facility 20 may improve the apparent power that is faulty in the power consumption facility 20 different from the specific power consumption facility 20.

Furthermore, the HPS 21 according to the present embodiment may adjust the apparent power in the HPS. Furthermore, when the HPS 21 generates the current used for adjustment of the apparent power in the adjustment target electric line, the supply amount calculation unit 305 puts a limitation on the adjustment by the HPS 21 to the apparent power in the HPS 21.

In this case, the limitation on the adjustment of the apparent power in the adjustment target electric line by the HPS 21 is reduced corresponding to the limitation on the adjustment by the HPS 21 to the apparent power in the HPS 21. Therefore, as compared with the case where the adjustment by the HPS 21 to the apparent power in the HPS 21 is unconditionally performed, insufficient adjustment of the apparent power in the adjustment target electric line is suppressed.

In particular, according to the present embodiment, the supply amount calculation unit 305 puts a limitation on the adjustment by the HPS 21 to the apparent power in the HPS 21 based on the available capacity information.

In this case, as the adjustment of the apparent power in the HPS 21 is limited based on the capacity of the adjustment target electric line, the current exceeding the capacity of the adjustment target electric line is prevented from flowing through the adjustment target electric line. Therefore, as compared with the case where the adjustment of the apparent power in the adjustment target electric line and the adjustment of the apparent power in the HPS 21 are performed regardless of the capacity of the adjustment target electric line, it is possible to suppress the occurrence of a short circuit or ignition in the adjustment target electric line.

Further, according to the present embodiment, the supply amount calculation unit 305 puts a limitation on the adjustment by the HPS 21 to the apparent power in the HPS 21 based on the current capacity information.

In this case, there is a reduction in the load on the HPS 21 corresponding to the limitation on the adjustment of the apparent power in the HPS 21 based on the capability of the HPS 21 to generate the current. Therefore, as compared with the case where the adjustment of the apparent power in the adjustment target electric line and the adjustment of the apparent power in the HPS 21 are performed regardless of the capability of the HPS 21 to generate the current, it is possible to suppress the occurrence of a failure in the HPS 21.

Furthermore, according to the present embodiment, the electric line calculation unit 303 calculates the electric line adjustment amount larger than the electric line necessary amount. Further, the supply amount calculation unit 305 calculates the electric line supply amount equal to or more than the electric line adjustment amount. Further, the HPS 21 supplies the current of the electric line supply amount to the adjustment target electric line in the power system 10. In other words, the electric line calculation unit 303 and the supply amount calculation unit 305 cause the HPS 21 to generate the current larger than the current necessary for improvement in the apparent power in the adjustment target electric line.

In a case where the apparent power in the adjustment target electric line changes over time, the current necessary for improvement in the apparent power in the adjustment target electric line may be larger than the electric line necessary amount when the current is supplied from the HPS 21 to the adjustment target electric line. Even in this case, the current larger than the electric line necessary amount is supplied to the adjustment target electric line so that it is possible to improve the apparent power in the adjustment target electric line. Therefore, as compared with the case where the HPS 21 generates the current equal to or less than the amount necessary for improving the apparent power in the adjustment target electric line, it is possible to prevent insufficient adjustment of the apparent power in the adjustment target electric line due to changes in the apparent power in the adjustment target electric line.

Furthermore, according to the present embodiment, the electric line calculation unit 303 calculates the future necessary amount from the prediction information included in the instruction information and, when the calculated future necessary amount is larger than the electric line necessary amount, calculates the electric line adjustment amount larger than the electric line necessary amount. Further, when the latest power information included in the instruction information satisfies the change condition, the electric line calculation unit 303 calculates the electric line adjustment amount larger than the electric line necessary amount. In other words, when the instruction information satisfies a predetermined condition, the electric line calculation unit 303 and the supply amount calculation unit 305 cause the HPS 21 to generate the current larger than the current necessary for improvement in the apparent power in the adjustment target electric line. An example of the predetermined condition may be that the future necessary amount calculated from the prediction information included in the instruction information is larger than the electric line necessary amount. Further, an example of the predetermined condition may be that the latest power information included in the instruction information satisfies the change condition.

In this case, as compared with the case where the HPS 21 generates the current equal to or less than the amount necessary for improving the apparent power in the adjustment target electric line regardless of the content of the instruction information, it is possible to prevent insufficient adjustment of the apparent power in the adjustment target electric line due to changes in the apparent power in the adjustment target electric line.

In particular, according to the present embodiment, the predetermined condition is that the future necessary amount is larger than the electric line necessary amount. In other words, the predetermined condition is set for the future apparent power in the adjustment target electric line.

In this case, as compared with the case where the HPS 21 generates the current equal to or less than the amount necessary for improving the apparent power in the adjustment target electric line regardless of the future apparent power in the adjustment target electric line, it is possible to prevent insufficient adjustment of the apparent power in the adjustment target electric line due to changes in the apparent power in the adjustment target electric line.

Further, according to the present embodiment, while the HPS adjustment amount is limited, the current larger than the electric line necessary amount flows through the adjustment target electric line. Therefore, even when the HPS adjustment amount is limited, it is possible to improve the apparent power in the power reception path 213 of the power conversion device 212 in the HPS 21.

Furthermore, according to the present disclosure, the HPS calculation unit 304 calculates the HPS necessary amount, but is not limited thereto.

The HPS calculation unit 304 may calculate the current value supplied from the AF 214 in order to adjust the apparent power in the power reception path 213 of the power conversion device 212 in the HPS 21. Further, the calculated current value may be used for calculation of the electric line supply amount by the supply amount calculation unit 305.

Furthermore, the information used for the calculation of the future necessary amount by the electric line calculation unit 303 is not limited to the above example.

The acquisition unit 301 may acquire information on the amount of power generated by a system that generates renewable energy, such as a solar power generation system or a wind power generation system. Further, the electric line calculation unit 303 may calculate the tendency of the apparent power in the adjustment target electric line from the information on the amount of power acquired by the acquisition unit 301 to calculate the future necessary amount. Furthermore, the acquisition unit 301 may acquire information on the weather in a region where the adjustment target electric line is provided. Further, the electric line calculation unit 303 may calculate the tendency of the power demand from the information on the weather acquired by the acquisition unit 301. Moreover, the tendency of the apparent power in the adjustment target electric line may be calculated from the calculated tendency of the power demand to calculate the future necessary amount.

Furthermore, according to the present disclosure, the control server 30 calculates the electric line adjustment amount, the electric line necessary amount, and the future necessary amount, but is not limited thereto.

For example, the instruction server 40 may have the function of the control server 30. In other words, the instruction server 40 may have the functions of the acquisition unit 301, the storage unit 302, the electric line calculation unit 303, and the like. Moreover, the instruction server 40 may calculate the electric line adjustment amount, the electric line necessary amount, and the future necessary amount and transmit the information indicating the calculation results to the control server 30.

Furthermore, in the description according to the present disclosure, the supply amount calculation unit 305 of the control server 30 puts a limitation on the adjustment by the HPS 21 to the apparent power in the HPS 21. Here, putting a limitation on the adjustment by the HPS 21 to the apparent power in the HPS 21 includes preventing the HPS 21 from adjusting the apparent power in the HPS 21.

Furthermore, in the description according to the present disclosure, the instruction information includes the latest value information, the previous value information, and the prediction value information, but is not limited thereto. The instruction server 40 may transmit the latest value information, the previous value information, and the prediction value information to the control server 30 separately from the instruction for adjusting the apparent power in the adjustment target electric line. Moreover, the instruction server 40 may transmit the available capacity information to the control server 30 separately from the instruction for adjusting the apparent power in the adjustment target electric line.

Furthermore, in the description according to the present disclosure, the instruction server 40 and the control server 30 are provided for the power system 10, but is not limited thereto. A single server provided in the power system 10 may have the functions of the instruction server 40 and the control server 30. Furthermore, the single server may specify the electric line whose apparent power needs to be adjusted and give an instruction to the HPS 21 to adjust the apparent power in the electric line.

Further, in the description according to the present disclosure, the control server 30 gives an instruction to the HPS 21 to adjust the apparent power in the electric line, but is not limited thereto. Another server different from the control server 30 may receive an instruction from the control server 30 to adjust the apparent power in the electric line and send the received instruction to the HPS 21.

Further, in the example described according to the present disclosure, the parameters such as the electric line adjustment amount, the electric line necessary amount, the HPS necessary amount, "available capacity" of the electric line, the future necessary amount, the electric line supply amount, the total necessary amount, and the HPS adjustment amount are current values, but is not limited thereto. Each parameter may be any of the parameters described above as parameters regarding the apparent power.

Furthermore, in the configuration according to the present disclosure, the control server 30 controls the operation of the HPS 21, but is not limited thereto.

For example, the HPS 21 may have the function of the control server 30. In other words, the HPS 21 may include the CPU 31 (see FIG. 2), the ROM 32, the RAM 33, the communication device 34, and the storage device 35 to perform various functions. Further, the HPS 21 may have the functions of the acquisition unit 301, the storage unit 302, the electric line calculation unit 303, the HPS calculation unit 304, the supply amount calculation unit 305, the transmission unit 306, and the like, of the control server 30. Further, the HPS 21 may acquire the instruction information. Further, the HPS 21 may calculate the electric line supply amount based on the acquired instruction information and supply the current of the calculated electric line supply amount to the adjustment target electric line. Moreover, the HPS 21 may put a limitation on the adjustment by the HPS 21 to the apparent power in the HPS 21.

Second Embodiment

An embodiment will be described below with reference to the accompanying drawings.

Figure 9:
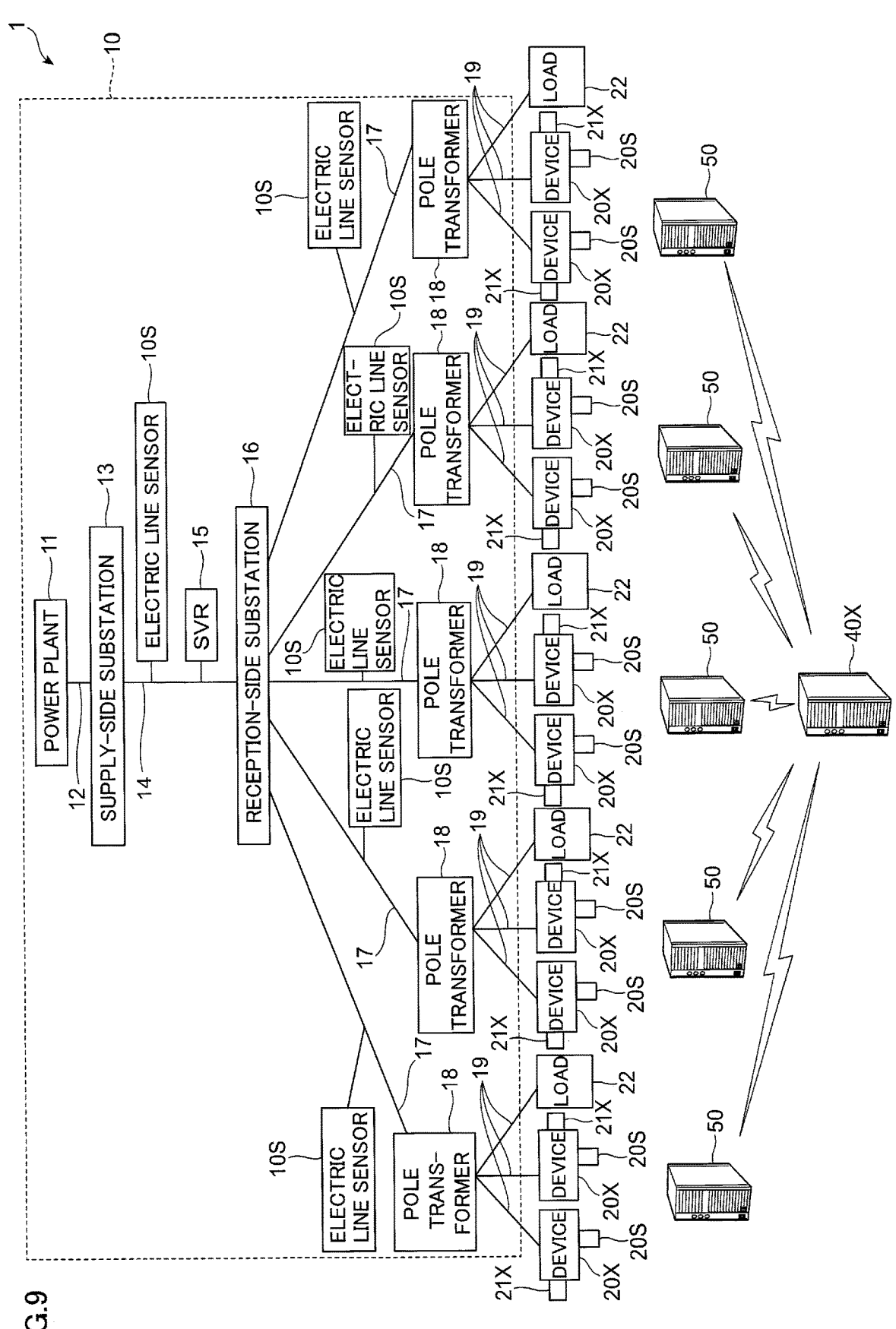
FIG. 9 is a diagram illustrating an example of the power control system according to a second embodiment.

FIG. 9 is a diagram illustrating an example of the power control system 1 according to a second embodiment.

The power control system 1, which is an example of an information processing system, is a system that controls apparent power.

The power control system 1 includes the power system 10, a plurality of devices 20X, the plurality of loads 22, an instruction server 40X, and a reception server 50.

The power system 10 is a system in which a facility is provided to supply the power to a power demander. The power system 10 includes the power plant 11, the transmission line 12, the supply-side substation 13, the supply-side distribution line 14, the automatic voltage regulator (SVR: Step Voltage Regulator) 15, the reception-side substation 16, the reception-side distribution line 17, the pole transformer 18, and the demander-side distribution line 19.

The power plant 11 is a facility that generates power. Examples of the power plant 11 include a thermal power plant, a hydraulic power plant, a nuclear power plant, a solar power plant, a wind power plant, and a geothermal power plant.

The transmission line 12 is a line to flow the current forming the power generated by the power plant 11. The transmission line 12 is provided from the power plant 11 to the supply-side substation 13.

The supply-side substation 13 is a facility that converts the voltage. The supply-side substation 13 is provided closer to the power supply side than the reception-side substation 16. According to the present embodiment, the facility located closest to the power supply side is the power plant 11. Furthermore, the facility located closest to the power reception side is the device 20X, the load 22, and the like.

The supply-side substation 13 converts the voltage supplied through the transmission line 12. Examples of the supply-side substation 13 include a substation that converts a voltage of 500000 V into 154000 V, a substation that converts a voltage of 154000 V into 66000 V, and a substation that converts a voltage of 66000 V into 22000 V.

The supply-side distribution line 14, which is an example of a first electric line, is a line to flow the current generated by applying the voltage converted by the supply-side substation 13. The supply-side distribution line 14 is provided from the supply-side substation 13 to the reception-side substation 16. Furthermore, the supply-side distribution line 14 is provided closer to the power supply side than the reception-side distribution line 17.

The SVR 15 regulates the voltage supplied to the supply-side distribution line 14. More specifically, the SVR 15 detects the voltage supplied to the supply-side distribution line 14. Further, when the detected voltage does not fall within a predetermined range, the SVR 15 regulates the voltage such that the voltage falls within the predetermined range.

The reception-side substation 16 is a facility that converts the voltage supplied through the supply-side distribution line 14. Therefore, a transformer (not illustrated) provided in the reception-side substation 16 may be regarded as a distribution transformer. Examples of the reception-side substation 16 include a substation that converts the supplied voltage into 6600 V.

The reception-side distribution line 17, which is an example of a second electric line, is a line to flow the current generated by applying the voltage converted by the reception-side substation 16. The reception-side distribution line 17 is provided from the reception-side substation 16 to the pole transformer 18. Further, according to the present embodiment, the supply-side distribution line 14 and the reception-side distribution line 17 may be simply referred to as "electric lines" when they are not distinguished from each other in particular in the description.

The pole transformer 18, which is an example of a distribution transformer, is a facility that converts the voltage supplied through the reception-side distribution line 17. Examples of the pole transformer 18 include a transformer that converts a voltage of 6600 V to 200 V and a transformer that converts a voltage of 6600 V to 100 V.

The demander-side distribution line 19 is a line to flow the current generated when the voltage converted by the pole transformer 18 is applied. The power system 10 includes a plurality of the demander-side distribution lines 19. A part of the demander-side distribution lines 19 are provided from the pole transformer 18 to the device 20X, and another part of the demander-side distribution lines 19 are provided from the pole transformer 18 to the load 22.

Furthermore, the power system 10 includes the plurality of electric line sensors 10S. The electric line sensor 10S is coupled to the supply-side distribution line 14. More specifically, the electric line sensor 10S is coupled to a portion of the supply-side distribution line 14 closer to the power supply side than the SVR 15. The electric line sensors 10S are coupled to the reception-side distribution lines 17 provided in the power system 10, respectively. In other words, the electric line sensor 10S is provided for each of the supply-side distribution line 14 and the reception-side distribution line 17.

The electric line sensor 10S detects a parameter regarding the apparent power in the coupled electric line. The parameter regarding the apparent power is a parameter that affects the apparent power. Examples of the parameter regarding the apparent power include apparent power, reactive power, reactive voltage, harmonic voltage, current, power factor, apparent power amount and reactive power amount in a predetermined period, and the like. The current as a parameter regarding the apparent power includes a harmonic current. Furthermore, the harmonic voltage or the harmonic current may be a harmonic voltage or a harmonic current of a specific order. Examples of the specific order include the fifth-order harmonic. Further, examples of the parameter regarding the apparent power include a total harmonic distortion (THD: Total Harmonic Distortion) of the current and the THD of the voltage. Here, the THD of the current is calculated from Equation (3) below. Further, the THD of the voltage is calculated from the Equation (4) below.

$$THD = \sqrt{\sum_{n=2}^{40} \left(\frac{I_n}{I_1}\right)^2} \tag{3}$$

-continued $$THD = \sqrt{\sum_{n=2}^{40}\left(\frac{V_n}{V_1}\right)^2} \qquad (4)$$

In Equation (3) above, $I_1$ is a fundamental current. Furthermore, $I_n$ is an n-th order harmonic current.

In Equation (4) above, $V_1$ is a fundamental voltage. Further, $V_n$ is an n-th order harmonic voltage.

For example, the electric line sensor 10S detects the above-described parameter regarding the apparent power at predetermined time intervals. The predetermined time may be any time, but is for example 60 seconds. When detecting the parameter regarding the apparent power, the electric line sensor 10S transmits the information indicating the detected parameter to the instruction server 40X together with the electric line identification information for identifying the electric line to be detected. Here, the information indicating the parameter detected in the electric line sensor 10S may be regarded as the power information on the apparent power in the electric line. Furthermore, as described above, the power information may also be regarded as information included in the electric line information described in the first embodiment.

Further, the parameter detected by the electric line sensor 10S is not limited to one type of parameter. The electric line sensor 10S may detect a plurality of types of parameters among the above-described parameters. Further, the power information indicating each of the plurality of types of parameters detected may be transmitted to the instruction server 40X. Moreover, the parameters detected by the electric line sensor 10S may be the same type of parameters for each of the electric line sensors 10S or may be different types of parameters for each of the electric line sensors 10S.

Furthermore, although the one supply-side substation 13 is illustrated in the power system 10 in the illustrated example, the number of the supply-side substations 13 is not limited to the one illustrated. The power system 10 may include the two or more supply-side substations 13 that convert the same or different voltages.

Further, although the one reception-side substation 16 is illustrated in the power system 10 in the illustrated example, the number of the reception-side substations 16 is not limited to the one illustrated. The power system 10 may include the two or more reception-side substations 16 that convert the same voltage or different voltages.

Further, the numbers of the supply-side distribution lines 14 and the reception-side distribution lines 17 are not limited to the illustrated example. The power system 10 may include the supply-side distribution lines 14 and the reception-side distribution lines 17 that are larger in number than those illustrated in the drawing. Further, the electric line sensor 10S may be provided for each of the supply-side distribution lines 14, or the electric line sensor 10S may be provided for each of the reception-side distribution lines 17.

The device 20X receives and consumes the power supplied from the power plant 11 through the demander-side distribution line 19. Furthermore, according to the present embodiment, a current supply device 21X that supplies the current to the power system 10 is provided in each of the devices 20X. The current supply device 21X may control the device 20X in which the current supply device 21X is provided and may adjust the above parameters regarding the apparent power in the electric line.

An example of the technique for controlling an operation of the device 20X by the current supply device 21X will be described. When the device 20X is an air conditioning device, an active filter, which is an example of the current supply device 21X, supplies the current to a power reception path of a power conversion unit, such as inverter or converter, provided in the air conditioning device to improve the power factor and reduce harmonics.

Another example of the technique for controlling the operation of the device 20X by the current supply device 21X will be described. When the device 20X is a solar power generation device, a power conversion unit, which is an example of the current supply device 21X, converts the alternating current received from the power system 10 into a direct current and supplies it to the device, or converts the direct current generated by the device into an alternating current and supplies it to the power system 10.

An example of the technique for adjusting the parameter regarding the apparent power in the electric line by the device 20X will be described. When a harmonic current occurs in the electric line, the current supply device 21X of the device 20X supplies the current having the phase canceling the harmonic current to the electric line to reduce the harmonic current in the electric line.

Another example of the technique for adjusting the parameter regarding the apparent power in the electric line by the device 20X will be described. When a reactive power occurs in the electric line, the current supply device 21X of the device 20X supplies the current to the electric line to reduce the reactive power in the electric line.

As described above, according to the present embodiment, the device 20X is used to adjust the parameter regarding the apparent power in the electric line. Here, as the parameter regarding the apparent power changes, the apparent power also changes. Therefore, in a broad sense, the adjustment of each of the above-described parameters regarding the apparent power may be regarded as the adjustment of the apparent power. Hereinafter, each of the parameters regarding the apparent power to be adjusted may be collectively referred to as "apparent power".

Examples of the device 20X include an electric vehicle and a storage battery. Furthermore, examples of the device 20X include a system that generates renewable energy such as a solar power generation system and a wind power generation system. Further, examples of the device 20X include a heat pump system. Examples of the heat pump system include devices used in an HVAC (Heating Ventilation and Air Conditioning) system, such as air conditioning apparatuses, showcases for conditioning the internal temperature, coolers, refrigerating machines, and water heaters.

When receiving the instruction for adjusting the apparent power in the electric line from the reception server 50, the device 20X adjusts the apparent power in the electric line in response to the received instruction. Adjusting the apparent power refers to adjusting one or both of the active power and the reactive power. In other words, adjusting the apparent power refers to adjusting at least one of the active power and the reactive power. The instruction for adjusting the apparent power refers to the instruction for adjusting one or both of the active power and the reactive power. In other words, the instruction for adjusting the apparent power refers to the instruction for adjusting at least one of the active power and the reactive power.

Furthermore, the device 20X is not limited to the specific example described above. As described above, the device 20X may be any device including the current supply device 21X.

Furthermore, the power control system 1 according to the present embodiment includes a plurality of device sensors 20S. According to the present embodiment, the device sensor 20S is provided for each of the devices 20X. The device sensor 20S detects the value of the current supplied from the current supply device 21X in the device 20X at predetermined time intervals. The predetermined time may be any time, but is for example 60 seconds. When detecting the current value, the device sensor 20S transmits current value information indicating the detected current value to the reception server 50 together with the device identification information for identifying the device 20X to be detected.

The load 22 receives and consumes the power supplied from the power plant 11 through the demander-side distribution line 19.

Furthermore, in the illustrated example, the one device 20X or the one load 22 is coupled to each of the demander-side distribution lines 19, but is not limited thereto. The plurality of devices 20X or the plurality of loads 22 may be coupled to the demander-side distribution line 19. Further, the number of the devices 20X and the number of the loads 22 included in the power control system 1 are not limited to the illustrated example. In the power control system 1, the devices 20X and the loads 22 larger in number than those illustrated in the drawing may be coupled to the demander-side distribution line 19.

The instruction server 40X is a server device that controls the apparent power in the electric line. When acquiring the power information from the electric line sensor 10S, the instruction server 40X determines whether it is necessary to adjust the apparent power in the electric line from the acquired power information. Further, when it is determined that it is necessary to adjust the apparent power, the instruction server 40X transmits the instruction for adjusting the apparent power corresponding to the device 20X to the reception server 50.

The reception server 50 is a server device that gives, to the device 20X, the instruction acquired from the instruction server 40X for adjustment of the apparent power in the electric line from the instruction server 40X. According to the present embodiment, the reception server 50 is provided for each of the pole transformers 18. The one reception server 50 manages the device 20X that receives the power via the corresponding pole transformer 18. When acquiring the current value information from the device sensor 20S, the reception server 50 calculates, from the acquired current value information, the current value, the current per unit time, or the current value in a predetermined time that may be supplied by the current supply device 21X in the device 20X to adjust the apparent power in the electric line. The current value, the current value per unit time, and the current value in the predetermined time that may be supplied by the current supply device 21X of the device 20X to adjust the apparent power in the electric line are hereinafter referred to as adjustable amount.

An example of the technique for calculating the adjustable amount of the device 20X by the reception server 50 will be described. For each of the devices 20X, the reception server 50 previously stores the maximum value of the current that may be supplied by the current supply device 21X of the device 20X. Further, after acquiring the current value information, the reception server 50 subtracts the current value indicated in the current value information from the maximum value of the current that may be supplied by the current supply device 21X of the device 20X to calculate the adjustable amount of the device 20X.

The reception server 50 transmits possible amount information indicating the calculated adjustable amount to the instruction server 40X together with the device identification information for identifying the target device 20X. Furthermore, the reception server 50 receives, from the instruction server 40X, the instruction for adjusting the apparent power in the electric line by the device 20X. When receiving the instruction, the reception server 50 transmits the received instruction to the device 20X indicated in the received instruction.

The instruction server 40X and the reception server 50 are implemented by, for example, a computer. The instruction server 40X and the reception server 50 may be configured by a single computer or may be implemented by distributed processing using a plurality of computers. Further, the instruction server 40X and the reception server 50 may be implemented on virtual hardware provided by cloud computing. Moreover, in the following description, the instruction server 40X and the reception server 50 may be simply referred to as "servers" when they are not distinguished from each other in particular.

According to the present embodiment, the instruction server 40X is connected to each of the electric line sensors 10S and each of the reception servers 50 via a network (not illustrated). Further, the reception server 50 is connected to each of the device sensors 20S via a network (not illustrated). These networks may be any network that enables data transmission and reception. Furthermore, a communication line used for transmitting and receiving data may be wired, wireless, or power line communication (PLC: Power Line Communication). Furthermore, the configuration may include the connection to a communication destination via a plurality of networks or communication lines.

Further, in the illustrated example, the reception server 50 is provided for each of the pole transformers 18, but is not limited thereto. The reception server 50 may be provided for each of the devices 20X, for example. Further, the reception server 50 may be provided for each facility (not illustrated) where the device 20X and the load 22 are set.

Figure 10:
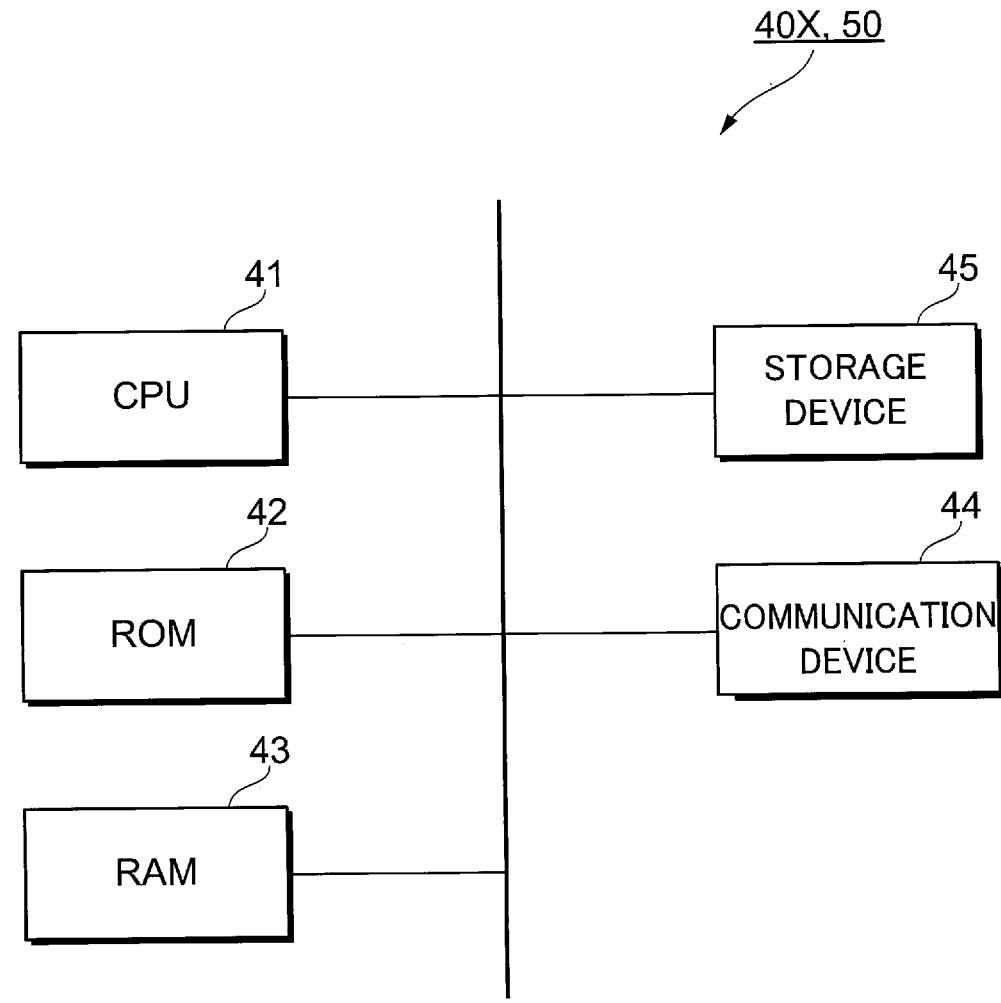
FIG. 10 is a diagram illustrating a hardware configuration of an instruction server and a reception server.

FIG. 10 is a diagram illustrating a hardware configuration of the instruction server 40X and the reception server 50.

The server includes a CPU 41, a ROM (Read Only Memory) 42, and a RAM (Random Access Memory) 43. Further, the server includes a storage device 45 that is configured by a hard disk device, or the like, to store information. Further, the server includes a communication device 44 (communication I/F) that performs communications with an external unit.

In addition, the server includes an input device used for inputting information, such as a keyboard and a mouse, and a display device, such as a liquid crystal display.

The ROM 42 and the storage device 45 stores a program to be executed by the CPU 41. The CPU 41 reads a program stored in the ROM 42 or the storage device 45 and executes the program using the RAM43 as a work area.

The CPU 41 executes a program stored in the ROM 42 and the storage device 45 to thus implement each functional unit described below.

Here, the program to be executed by the CPU 41 may be provided to the server by being stored in a computer-readable recording medium such as magnetic recording medium (e.g., magnetic tape and magnetic disk), optical recording medium (e.g., optical disk), magneto-optical recording medium, and semiconductor memory. Further, the program to be executed by the CPU 41 may be provided to the server using a communication unit such as the Internet.

Figure 11:
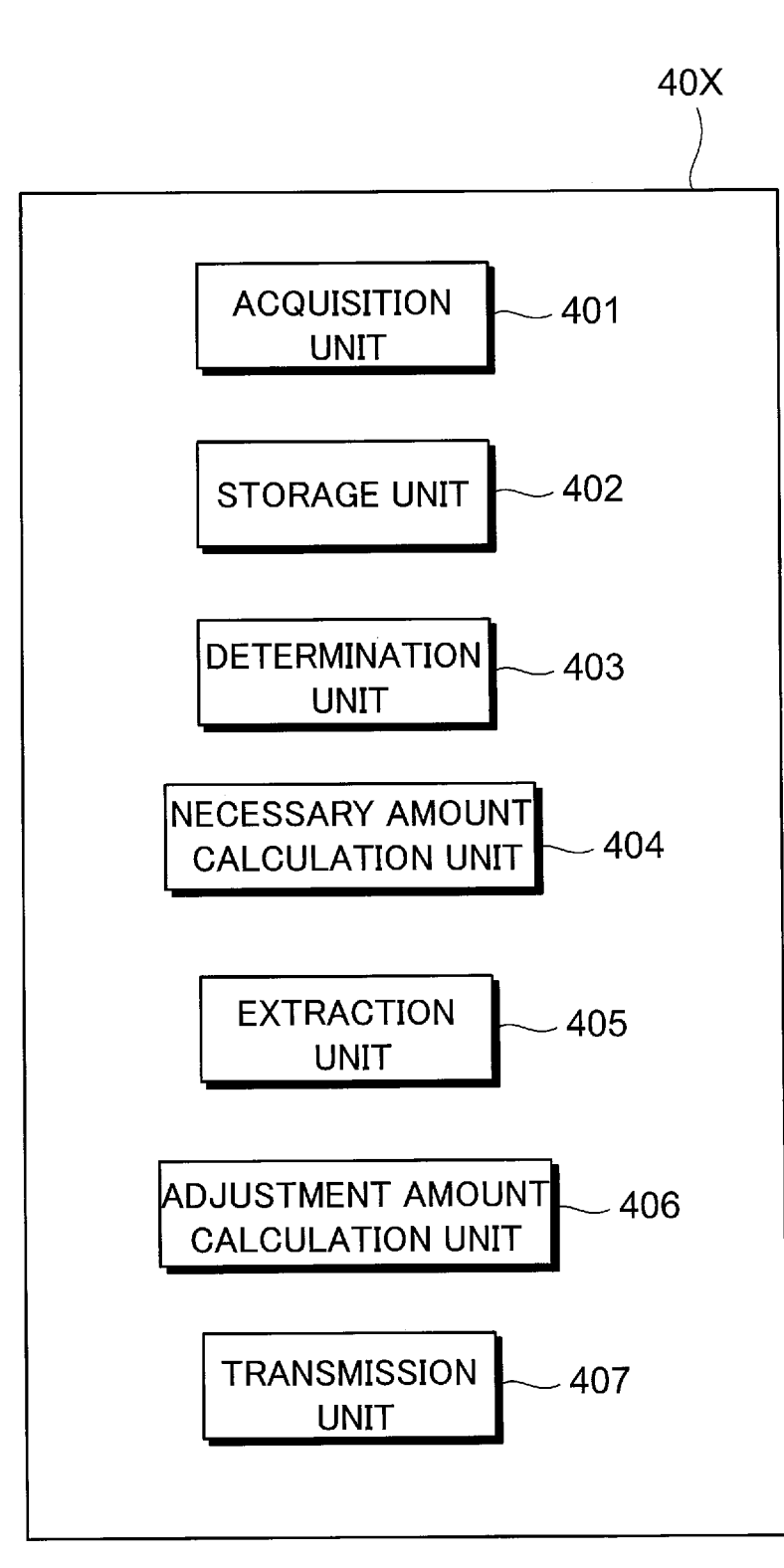
FIG. 11 is a diagram illustrating a functional configuration of the instruction server.

FIG. 11 is a diagram illustrating a functional configuration of the instruction server 40X.

The instruction server 40X includes an acquisition unit 401, a storage unit 402, a determination unit 403, a necessary amount calculation unit 404, an extraction unit 405, an adjustment amount calculation unit 406, and a transmission unit 407.

The acquisition unit 401, which is an example of a power information acquisition unit, acquires the power information and the electric line identification information from the electric line sensor 10S. Therefore, the acquisition unit 401 may also be regarded as an electric line information acquisition unit that acquires the electric line identification information. Further, the acquisition unit 401 acquires the possible amount information and the device identification information from the reception server 50. Therefore, the acquisition unit 401 may also be regarded as a device information acquisition unit that acquires the device identification information. The storage unit 402 stores the information acquired by the acquisition unit 401.

The storage unit 402 stores information. The information stored in the storage unit 402 will be described below in detail.

The determination unit 403, which is an example of an electric line determination unit, determines the electric line whose apparent power needs to be adjusted. When the acquisition unit 401 acquires the power information, the determination unit 403 determines whether it is necessary to adjust the apparent power in the electric line based on the acquired power information. More specifically, when the parameter indicated in the power information reaches a predetermined threshold, the determination unit 403 determines that it is necessary to adjust the apparent power in the electric line. The threshold is defined as a threshold at which it is necessary to improve the apparent power in the electric line.

The necessary amount calculation unit 404 calculates the current value, the current value per unit time, or the current value in the predetermined time necessary for adjusting the apparent power for the electric line for which the necessity of adjustment of the apparent power is determined by the determination unit 403. The current value, the current value per unit time, and the current value in the predetermined time necessary for adjusting the apparent power are hereinafter referred to as adjustment necessary amount. The necessary amount calculation unit 404 calculates the adjustment necessary amount from the relation between the parameter indicated in the power information for the electric line, for which the necessity of adjustment is determined by the determination unit 403, and the threshold used for the determination by the determination unit 403.

An example of the technique for calculating the adjustment necessary amount by the necessary amount calculation unit 404 will be described. The necessary amount calculation unit 404 calculates a larger adjustment necessary amount as there is a larger difference between the parameter indicated in the power information and the threshold used by the determination unit 403.

The extraction unit 405, which is an example of a device determination unit, extracts the candidate of the device 20X to be used for the adjustment of the apparent power in the electric line. The extraction unit 405 extracts, from the devices 20X included in the power control system 1, the device 20X that receives the power through the electric line for which the necessity of adjustment is determined by the determination unit 403 as the candidate of the device 20X to be used for adjustment of the electric line.

The adjustment amount calculation unit 406 determines the current value, the current value per unit time, or the current value in the predetermined time supplied by the current supply device 21X of the device 20X to adjust the apparent power in the electric line. The current value, the current value per unit time, and the current value in the predetermined time supplied by the current supply device 21X of the device 20X to adjust the apparent power in the electric line are hereinafter referred to as adjustment amount. The adjustment amount calculation unit 406 calculates the adjustment amount based on the adjustment necessary amount calculated by the necessary amount calculation unit 404 and the adjustable amount of the device 20X. The adjustment amount calculation unit 406 generates adjustment amount information indicating the calculated adjustment amount.

The transmission unit 407, which is an example of an output unit, transmits the adjustment amount information generated by the adjustment amount calculation unit 406 to the reception server 50 together with the device identification information for identifying the device 20X related to the adjustment amount information.

FIG. 12 is a diagram illustrating the electric line management table. The electric line management table is a table to manage the electric lines. The storage unit 402 stores the electric line management table.

In the electric line management table, "electric line" indicates the electric line identification information. "14" indicated in "electric line" represents the supply-side distribution line 14. Furthermore, "17" indicated in "electric line" represents the reception-side distribution line 17. Moreover, "A" to "E" accompanied with "17" are information for identifying the corresponding ones of the reception-side distribution lines 17.

Furthermore, in the electric line management table, "position" indicates the information about the position of "electric line" in the power system 10. "Position" indicates "supply side" and "reception side". "Supply side" refers to being closer to a power supply side in the power system 10 than "reception side".

Further, in the electric line management table, "power information" indicates a parameter included in the power information. This parameter is a parameter regarding the apparent power in "electric line" detected by the electric line sensor 10S. When the acquisition unit 401 acquires the latest power information, "power information" associated with the target "electric line" is overwritten with the parameter included in the power information.

Furthermore, in the electric line management table, "threshold" indicates the threshold set for the apparent power in "electric line". As described above, the "threshold" is a threshold used for determination by the determination unit 403 as to whether the adjustment of the apparent power in the electric line is necessary. As "threshold", a value higher than the upper limit value of "power information" may be set, based on which the determination unit 403 determines that the adjustment of the apparent power in "electric line" is unnecessary, a value lower than the lower limit value may be set, or both of them may be set. Further, a range of numerical values may be set for the "threshold". Furthermore, as "threshold", a threshold may be set for each of the above-described parameters regarding the apparent power.

An example of the threshold will be described. When the parameter to be determined by the determination unit 403 is the power factor, the threshold is set to a predetermined power factor. The predetermined power factor may be any value, but is for example 0.7. In this case, when the power factor indicated in "power information" of the target "electric line" is equal to or less than 0.7, the determination unit 403 determines that the adjustment of the power factor of the "electric line" is necessary.

Another example of the threshold will be described. When the parameter to be determined by the determination unit 403 is reactive power, the threshold is set to a predetermined range with respect to predetermined reactive power. The predetermined range may be any range, but is for example a range of ±10% of predetermined reactive power. In this case, when the reactive power indicated in "power information" in the target "electric line" falls outside the range of ±10% of the predetermined reactive power, the determination unit 403 determines that the adjustment of the reactive power in the "electric line" is necessary.

"Position" and "threshold" indicated in the electric line management table are previously set for each "electric line" by the user of the power control system 1.

An example of the content of the electric line management table will be described. For the reception-side distribution line 17 specified from "17A" of "electric line", "reception side" is set as "position", "P2" is indicated as "power information", and "T2" is set as "threshold".

FIG. 13 is a diagram illustrating a device management table. The device management table is a table to manage the devices 20X. The storage unit 402 stores the device management table.

In the device management table, "device" indicates the device identification information. "A" to "J" accompanied with "20X" of "device" are information for identifying the corresponding ones of the devices 20X.

Furthermore, in the device management table, "pass-through electric line" indicates the electric line identification information. The electric line identification information indicated in "pass-through electric line" is the electric line identification information on the electric line that is passed through when the power is supplied to "device". Furthermore, "supply side" of "pass-through electric line" indicates "electric line" associated with "supply side" in the electric line management table (see FIG. 12). Furthermore, "reception side" of "pass-through electric line" indicates "electric line" associated with "reception side" in the electric line management table.

In the device management table, the ten "devices" are associated with "14" of "pass-through electric line", while the two "devices" are associated with each of "17A" to "17E" of "pass-through electric line". In other words, according to the present embodiment, the number of the devices 20X to which the power is supplied through the one supply-side distribution line 14 is larger than the number of the devices 20X to which the power is supplied through the one reception-side distribution line 17.

"Pass-through electric line" indicated in the device management table is previously set by the user of the power control system 1.

Furthermore, in the device management table, "adjustable amount" indicates the adjustable amount calculated by the reception server 50 for "device". When the latest possible amount information is acquired by the acquisition unit 401, "adjustable amount" associated with the target "device" is overwritten with the adjustable amount indicated in the acquired possible amount information.

An example of the content of the device management table will be described. For the device 20X specified from "20XA" of "device", "14" is set as "supply side" of "pass-through electric line", "17A" is set as "reception side" of "pass-through electric line", and "50" is indicated as "adjustable amount".

Figure 14:
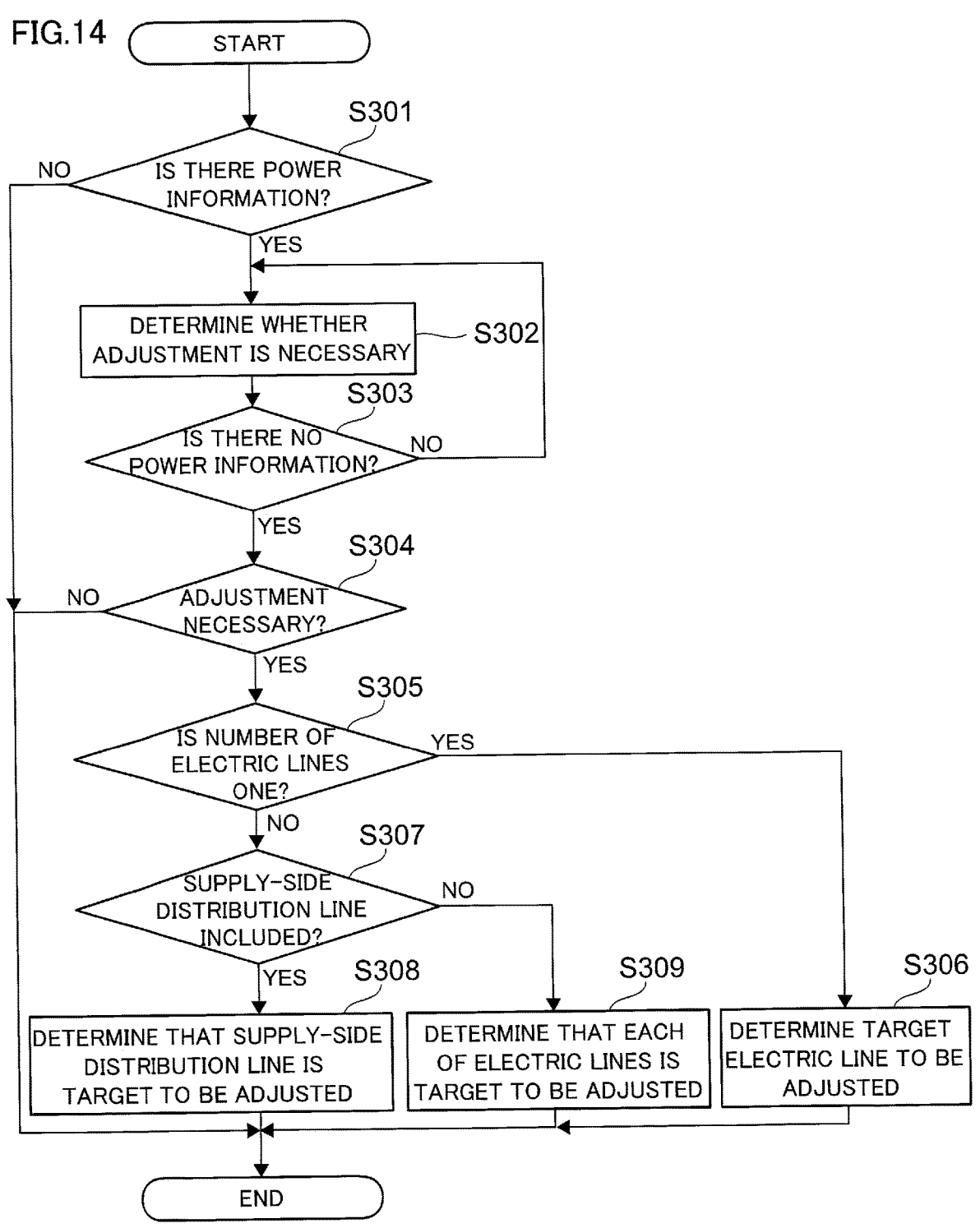
FIG. 14 is a flowchart illustrating a flow of an electric line determination process.

FIG. 14 is a flowchart illustrating the flow of an electric line determination process. The electric line determination process is a process in which the instruction server 40X determines the target electric line whose apparent power is to be adjusted. The electric line determination process is performed at predetermined time intervals. The predetermined time may be any time, but is for example 60 seconds.

Furthermore, when there is an electric line whose apparent power is being adjusted, the electric line determination process for this electric line may be omitted.

The determination unit 403 determines whether there is the latest power information that has not been used for determination as to whether the apparent power is to be adjusted (Step (hereinafter referred to as S) 301). More specifically, the determination unit 403 refers to the electric line management table (see FIG. 12). Further, it is determined whether, among "power information" indicated in the electric line management table, there is the power information that has not been used for determination as to whether the apparent power is to be adjusted.

When there is no power information that has not been used for the determination (NO in S301), the electric line determination process ends.

Conversely, when there is power information that has not been used for the determination (YES in S301), the process proceeds to the subsequent step.

The determination unit 403 determines whether the adjustment of the apparent power is necessary for the electric line related to the one piece of power information that has not been used for the determination (S302). More specifically, the determination unit 403 refers to the electric line management table. Then, it is determined whether the adjustment of the apparent power in "electric line" is necessary depending on whether "power information" associated with the target "electric line" has reached "threshold" associated with the "electric line".

The determination unit 403 determines whether there is no more power information that has not been used for the determination as to whether the apparent power is to be adjusted (S303). When there is power information that has not been used for the determination (NO in S303), the determination unit 403 repeats the process at Step 302 and the subsequent steps for the power information that has not been used for the determination. In other words, the determination unit 403 determines whether the adjustment of the apparent power is necessary for all pieces of power information that have not been used for the determination.

Conversely, when there is no more power information that has not been used for the determination (YES in S303), the process proceeds to the subsequent step.

The determination unit 403 determines whether there is an electric line for which it is determined that the adjustment of the apparent power is necessary (S304). When there is no electric line for which it is determined that the adjustment of the apparent power is necessary (NO in S304), the electric line determination process ends.

Conversely, when there is an electric line for which it is determined by the determination unit 403 that the adjustment of the apparent power is necessary (YES in S304), the process proceeds to the subsequent step.

The determination unit 403 determines whether the number of electric lines for which it is determined that the adjustment of the apparent power is necessary is one (S305). When the number of electric lines for which it is determined that the adjustment of the apparent power is necessary is one (YES in S305), the determination unit 403 determines that the electric line for which it is determined that the adjustment of the apparent power is necessary is the target electric line whose apparent power is to be adjusted (S306).

When there is a plurality of electric lines for which the determination unit 403 determines that the adjustment of the apparent power is necessary (NO in S305), the determination unit 403 determines whether the plurality of electric lines includes the supply-side distribution line 14 (S307). More specifically, the determination unit 403 refers to the electric line management table. Then, it is determined whether the "electric lines" for which it is determined that the adjustment of the apparent power is necessary includes "electric line" whose "position" is "supply side", and thus the above determination is made. When the plurality of electric lines includes the supply-side distribution line 14 (YES in S307), the determination unit 403 determines that the supply-side distribution line 14 is the target electric line whose apparent power is to be adjusted (S308).

Furthermore, when the plurality of electric lines does not include the supply-side distribution line 14 (NO in S307), it means that all of the electric lines are the reception-side distribution lines 17. In this case, the determination unit 403 determines that each of the electric lines is the target whose apparent power is to be adjusted (S309).

Figure 15:
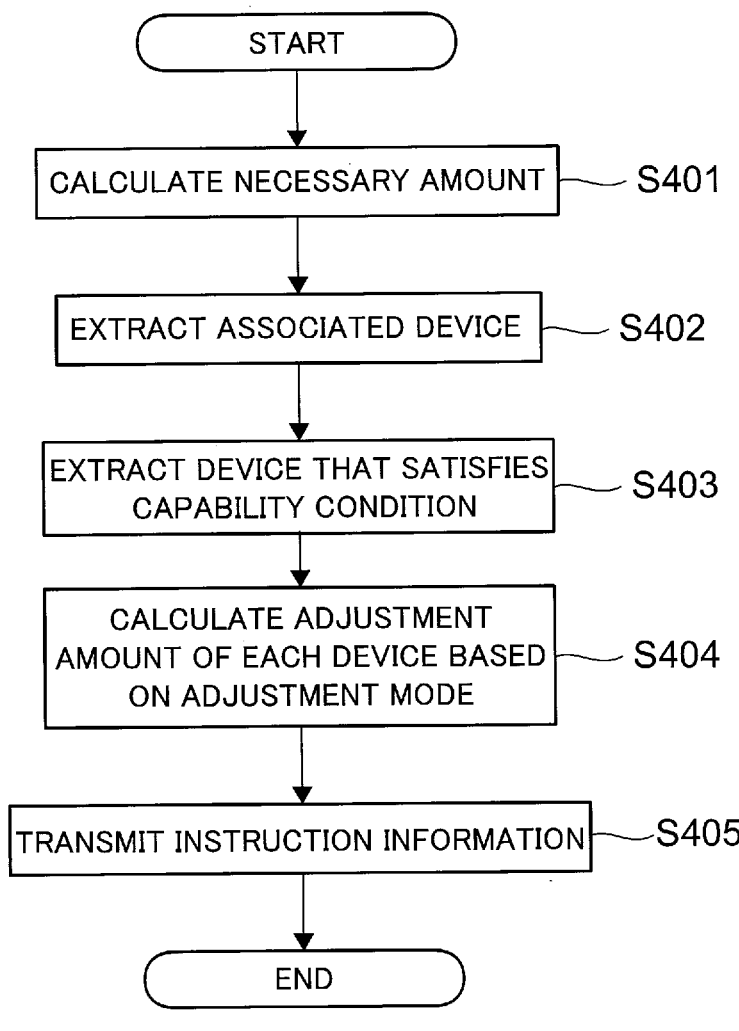
FIG. 15 is a flowchart illustrating a flow of an instruction output process.

FIG. 15 is a flowchart illustrating the flow of an instruction output process. The instruction output process is a process in which the instruction server 40X outputs, to the device 20X, the instruction for adjusting the apparent power in the electric line. When the target electric line for the adjustment of the apparent power is determined during the electric line determination process (see FIG. 14), the instruction output process is started.

Further, during the electric line determination process, when a plurality of electric lines is determined as the target electric lines whose apparent power is to be adjusted (see S309 in FIG. 14), the instruction output process is performed for each of the electric lines. Moreover, the electric line determined by the determination unit 403 as the target electric line for the adjustment of the apparent power during the electric line determination process is hereinafter referred to as adjustment target electric line.

The necessary amount calculation unit 404 calculates the adjustment necessary amount for the adjustment target electric line (S401). More specifically, the necessary amount calculation unit 404 refers to the electric line management table (see FIG. 12). Then, the adjustment necessary amount is calculated according to the difference between "power information" and "threshold" for the adjustment target electric line.

The extraction unit 405 extracts the candidate of the device 20X to be used for the adjustment of the apparent power in the adjustment target electric line. More specifically, the extraction unit 405 refers to the device management table (see FIG. 13). Then, "device" for which the electric line identification information on the adjustment target electric line is associated with "pass-through electric line" is extracted as the candidate of the device 20X to be used for the adjustment (S402).

An example of the extraction technique by the extraction unit 405 will be described. When the reception-side distribution line 17 whose electric line identification information is "17A" is the adjustment target electric line, the extraction unit 405 extracts the two devices 20X "20XA" and "20XB" for which "pass-through electric line" in the device management table is associated with "17A". Furthermore, when the supply-side distribution line 14 whose electric line identification information is "14" is the adjustment target electric line, the extraction unit 405 extracts the devices 20X "20XA" to "20XJ" for which "pass-through electric line" in the device management table is associated with "14".

The extraction unit 405 further limits the candidates of the device 20X to be used for adjustment of the apparent power from the extracted devices 20X. More specifically, the extraction unit 405 extracts the device 20X that satisfies a predetermined capability condition from the devices 20X extracted in Step 402 (S403). The capability condition is a condition set for the adjustable amount of the device 20X. The capability condition is set from a viewpoint of contribution of the device 20X to the adjustment of the apparent power in the adjustment target electric line. According to the present embodiment, the capability condition is set such that the adjustable amount of the device 20X is equal to or more than a predetermined rate of the adjustment necessary amount for the adjustment target electric line. The predetermined rate may be any rate, but is assumed to be 2% in the example below.

An example of the extraction technique by the extraction unit 405 will be described. In this example, it is assumed that the adjustment target electric line is the supply-side distribution line 14. Further, it is assumed that the adjustment necessary amount for the supply-side distribution line 14 is "100". In this case, the device 20X that satisfies the capability condition is the device 20X for which the adjustable amount is set to a value equal to or more than "2" that is obtained by multiplying "100", which is the adjustment necessary amount, by 2%, which is the predetermined rate. Therefore, the extraction unit 405 extracts the seven devices 20X "20XA", "20XB", "20XC", "20XD", "20XE", "20XG", and "20X1" for which a value equal to or more than "2" is indicated in "adjustable amount" of the device management table.

The adjustment amount calculation unit 406 calculates the adjustment amount for each of the devices 20X extracted by the extraction unit 405. More specifically, the adjustment amount calculation unit 406 calculates the adjustment amount of each of the devices 20X based on a predetermined adjustment mode (S404). According to the present embodiment, the adjustment amount calculation unit 406 calculates the adjustment amount by a predetermined adjustment rate with respect to the adjustable amount of the device 20X, starting from the device 20X having a large adjustable amount among the devices 20X extracted by the extraction unit 405. The predetermined adjustment rate may be any rate, but is assumed to be 60% in the example below.

An example of the technique for calculating the adjustment amount by the adjustment amount calculation unit 406 will be described. In this example, it is assumed that the adjustment target electric line is the supply-side distribution line 14 and the adjustment necessary amount is "100". Furthermore, it is assumed that the seven devices 20X "20XA", "20XB", "20XC", "20XD", "20XE", "20XG", and "20XI" (see FIG. 13) are extracted by the extraction unit 405 as the candidates of the device 20X to be used for the adjustment of the apparent power.

The adjustment amount calculation unit 406 first calculates the adjustment amounts of the devices 20X "20XA" and "20XC" having the largest "adjustable amount" among the seven devices 20X extracted by the extraction unit 405. The adjustment amount calculation unit 406 multiplies "50", which is "adjustable amount" of the two devices 20X, by 60%, which is a predetermined adjustment rate, to calculate "30" as the adjustment amounts of the devices 20X "20XA" and "20XC". Subsequently, the adjustment amount calculation unit 406 calculates the adjustment amounts of the devices 20X "20XB" and "20XG" having the largest "adjustable amount" next to the devices 20X "20XA" and "20XC". The adjustment amount calculation unit 406 multiplies "30", which is "adjustable amount" of the two devices 20X, by 60% to calculate "18" as the adjustment amounts of the devices 20X "20XB" and "20XG". Further, the adjustment amount calculation unit 406 calculates the adjustment amount of the device 20X "20XI" having the largest "adjustable amount" next to the devices 20X "20XB" and "20XG". Here, "20X", which is the adjustable amount of the device 20X, is multiplied by the predetermined adjustment rate to obtain the value "12". Furthermore, the adjustment amounts calculated for the devices 20X "20XA", "20XC", "20XB", and "20XG" are subtracted from "100", which is the adjustment necessary amount, to obtain the value "100−(30+30+18+18)=4". In this case, the adjustment amount calculation unit 406 calculates "4", which is the remaining adjustment necessary amount, as the adjustment amount of the device 20X "20XI".

In this example, when the devices 20X "20XA", "20XB", "20XC", "20XG", and "20XI" adjust the apparent power in the adjustment target electric line by the adjustment amounts calculated by the adjustment amount calculation unit 406, the apparent power in the adjustment target electric line is improved, and the apparent power in the adjustment target electric line does not reach the threshold. In this case, the devices 20X "20XD" and "20XE" among the seven devices 20X extracted by the extraction unit 405 are not used for adjusting the apparent power in the adjustment target electric line.

In this way, the device 20X having a high capability to adjust the apparent power in the electric line may be preferentially used for the adjustment. Furthermore, the apparent power in the adjustment target electric line may be improved without applying a load for adjustment to the devices 20X "20XD" and "20XE". Here, in a broad sense, the adjustment amount calculation unit 406 may be regarded as a device determination unit that determines the device 20X to be used for adjustment of the apparent power in the electric line.

When calculating the adjustment amount of each of the devices 20X, the adjustment amount calculation unit 406 generates, for each of the devices 20X used for the adjustment, the instruction information for giving an instruction to the device 20X to adjust the apparent power in the adjustment target electric line. In other words, the pieces of instruction information generated correspond to the number of the devices 20X used for the adjustment. Furthermore, the instruction information generated for the one device 20X as an instruction target includes the information indicating the adjustment amount of the target device 20X as the content of the instruction. Therefore, the content of the instruction in each piece of instruction information is different for each of the target devices 20X.

The transmission unit 407 transmits the instruction information generated by the adjustment amount calculation unit 406 to the reception server 50, which manages the device 20X as the instruction target, together with the device identification information for identifying the device 20X as the instruction target (S405).

Then, when receiving the instruction information, the reception server 50 gives an instruction to the device 20X, which is the instruction target, to adjust the apparent power in the adjustment target electric line by the adjustment amount indicated in the instruction information generated for the device 20X as a target. When receiving the instruction, the device 20X uses the current supply device 21X to supply the current having the instructed adjustment amount to the adjustment target electric line.

As described above, according to the present embodiment, the determination unit 403 determines that the electric line whose power information has reached the threshold is the adjustment target electric line. Further, the necessary amount calculation unit 404 calculates the adjustment necessary amount based on the power information on the adjustment target electric line. Further, the extraction unit 405 extracts, as the device 20X to be used for the adjustment, each of the devices 20X specified from the device identification information associated with the electric line identification information on the adjustment target electric line. Further, the adjustment amount calculation unit 406 calculates the adjustment amount of each of the extracted devices 20X based on the adjustment necessary amount calculated by the necessary amount calculation unit 404. Further, the transmission unit 407 transmits the instruction information indicating the adjustment amount for each of the devices 20X to the reception server 50. In other words, when any of the electric lines satisfies the power condition set for the apparent power, the transmission unit 407 outputs the instruction information that is related to the apparent power, which is adjusted by the specific device 20X among the devices 20X and corresponds to the device 20X, and that is based on the power information. The power condition is, for example, that the power information reaches the threshold. Furthermore, the specific device 20X is the device 20X specified from the device identification information associated with the electric line identification information on the adjustment target electric line that satisfies the power condition among the devices 20X. Further, each of the devices 20X used for the adjustment adjusts the apparent power in the adjustment target electric line in accordance with the content corresponding to the instruction from the reception server 50.

Here, there is a possible configuration for adjusting the apparent power in the electric line according to a technique different from the present embodiment. Examples include a configuration in which the instruction server 40X gives an instruction for the adjustment by the same adjustment amount to each of the devices 20X used for the adjustment of the apparent power in the electric line. However, when the adjustable amount is different for each of the devices 20X, the instruction for the adjustment by the same adjustment amount to each of the devices may result in the device 20X whose adjustable amount is smaller than the adjustment amount. Furthermore, there may be the device 20X whose adjustment amount is excessively small with respect to the adjustable amount. In other words, the content of the adjustment may be inappropriate for some of the devices 20X.

Conversely, according to the present embodiment, each of the devices 20X receives an instruction for adjustment of the apparent power by the adjustment amount corresponding to the device 20X. Therefore, as compared with the case where the instruction server 40X outputs the information on the apparent power to be adjusted according to the same content by each of the devices 20X, it is possible to adjust the apparent power in the electric line according to the content of adjustment suitable for each of the devices 20X.

Furthermore, according to the present embodiment, the extraction unit 405 extracts the device 20X to be used for the adjustment of the apparent power in the electric line based on the adjustable amount for each of the devices 20X. In other words, the extraction unit 405 determines the device 20X to be used for adjustment for the electric line that satisfies the power condition among the devices 20X based on the capability of the device 20X to adjust the apparent power in the electric line.

In this case, the apparent power may be adjusted by the device 20X having the adjustment capability suitable for the adjustment of the apparent power in the electric line.

In particular, according to the present embodiment, the extraction unit 405 determines that the device that satisfies the capability condition is the device 20X to be used for adjustment of the apparent power in the electric line.

In this case, it is possible to prevent the device 20X that does not satisfy the capability condition from being used to adjust the apparent power in the electric line.

Further, according to the present embodiment, the capability condition is set from the relation between the adjustable amount and the adjustment necessary amount. In other words, the capability condition is set from the relation between the adjustment capability of the device 20X and the degree of adjustment necessary for the electric line that satisfies the power condition.

In this case, the device 20X that satisfies the condition set from the relation between the adjustable amount and the adjustment necessary amount is used to adjust the apparent power in the electric line. Therefore, the apparent power may be adjusted by the device 20X having the adjustable amount suitable for the adjustment necessary amount.

Further, according to the present embodiment, the adjustment amount calculation unit 406 calculates the adjustment amount of the device 20X based on the adjustable amount of the device 20X. Further, the transmission unit 407 transmits, to the reception server 50, the instruction information in which the calculated adjustment amount is included in the content of the instruction. In other words, the transmission unit 407 outputs the instruction information based on the capability of the device 20X to adjust the apparent power in the electric line.

In this case, the apparent power may be adjusted by the device 20X according to the content of adjustment suitable for the adjustable amount of the device 20X.

Further, according to the present embodiment, the device identification information on the device 20X that receives the power via the reception-side distribution line 17 "17A" is associated with the electric line identification information on the supply-side distribution line 14 and the electric line identification information on the reception-side distribution line 17 "17A".

In this case, the device 20X that receives the power via the reception-side distribution line 17 "17A" may be used not only for adjustment of the apparent power in the reception-side distribution line 17 "17A" but also for adjustment of the apparent power in the supply-side distribution line 14.

Further, according to the present embodiment, the device identification information on the device 20X that does not receive the power via the reception-side distribution line 17 "17A" but receives the power via the reception-side distribution line 17 "17B" is associated with the electric line identification information on the supply-side distribution line 14 and the electric line identification information on the reception-side distribution line 17 "17B".

In this case, both the device 20X that receives the power via the reception-side distribution line 17 "17A" and the device 20X that receives the power via the reception-side distribution line 17 "17B" may be used to adjust the apparent power in the supply-side distribution line 14.

Further, according to the present embodiment, the determination unit 403 determines the electric line whose apparent power is preferentially adjusted among the electric lines that satisfy the power condition.

In this case, the apparent power may be adjusted, starting from the electric line having a high necessity of adjusting the apparent power.

Furthermore, according to the present embodiment, when both the supply-side distribution line 14 and the reception-side distribution line 17 satisfy the power condition, the determination unit 403 determines that the supply-side distribution line 14 is the electric line to be adjusted in preference to the reception-side distribution line 17.

In a case where the adjustment of both the apparent power in the supply-side distribution line 14 and the apparent power in the reception-side distribution line 17 is necessary, when the apparent power in the supply-side distribution line 14 is improved, the apparent power in the reception-side distribution line 17 may also be improved accordingly. In other words, when the apparent power at a specific location in the power system 10 is improved, the voltage at the specific location is stabilized, and as a result, the apparent power at a location closer to the power reception side than the specific location may also be improved. In this way, the electric line located closer to the supply side in the power system 10 is adjusted in preference to the electric line located closer to the reception side in the power system 10 so that it is possible to improve the efficiency of improvement of the apparent power in the electric line.

According to the present embodiment, after the apparent power in the supply-side distribution line 14 is adjusted by the device 20X in preference to the reception-side distribution line 17, the electric line determination process (see FIG. 14) is performed again. At this time, when the determination unit 403 determines again that the adjustment of the apparent power in the reception-side distribution line 17 is necessary, the apparent power in the reception-side distribution line 17 is adjusted by the device 20X.

(Modification 1)

Next, a modification of the technique in which the adjustment amount calculation unit 406 calculates the adjustment amount of the device 20X will be described.

In the description using FIG. 15, the adjustment amount calculation unit 406 calculates, for each of the devices 20X, the adjustment amount by the predetermined adjustment rate with respect to the adjustable amount of the device 20X. Here, the technique for calculating the adjustment amount by the adjustment amount calculation unit 406 is not limited to the above example.

A modification of the technique for calculating the adjustment amount by the adjustment amount calculation unit 406 will be described. In this example, it is assumed that the adjustment target electric line is the supply-side distribution line 14 and the adjustment necessary amount is "100". Furthermore, it is assumed that the seven devices 20X "20XA", "20XB", "20XC", "20XD", "20XE", "20XG", and "20XI" (see FIG. 13) are extracted by the extraction unit 405 as the candidates of the devices 20X to be used for the adjustment of the apparent power.

The adjustment amount calculation unit 406 first calculates the adjustment amounts of the devices 20X "20XA" and "20XC" having the largest "adjustable amount" among the seven devices 20X extracted by the extraction unit 405. The adjustment amount calculation unit 406 calculates "50", which is "adjustable amount" of the two devices 20X, as adjustment amounts of the devices 20X "20XA" and "20XC". Furthermore, the transmission unit 407 transmits, to the reception server 50, the instruction information indicating the adjustment amount "50" for the devices 20X "20XA" and "20XC" as targets.

In this example, when the devices 20X "20XA" and "20XC" adjust the apparent power in the adjustment target electric line by the adjustment amounts calculated by the adjustment amount calculation unit 406, the apparent power in the adjustment target electric line is improved, and the apparent power in the adjustment target electric line does not reach the threshold. In this case, the devices 20X "20XB", "20XD", "20XE", "20XG", and "20XI" among the seven devices 20X extracted by the extraction unit 405 are not used for adjustment of the apparent power in the adjustment target electric line.

(Modification 2)

Next, another modification (modification 2) of the technique for calculating the adjustment amount of the device 20X by the adjustment amount calculation unit 406 will be described. In this example, it is assumed that the adjustment target electric line is the supply-side distribution line 14 and the adjustment necessary amount is "100". Furthermore, it is assumed that the seven devices 20X "20XA", "20XB", "20XC", "20XD", "20XE", "20XG", and "20XI" (see FIG. 13) are extracted by the extraction unit 405 as the candidates of the device 20X to be used for the adjustment of the apparent power.

The adjustment amount calculation unit 406 first calculates the total sum of the adjustable amounts of the devices 20X extracted by the extraction unit 405. In this example, the sum total of the adjustable amounts of the devices 20X "20XA", "20XB", "20XC", "20XD", "20XE", "20XG", and "20XI" is "50+30+50+10+10+30+20=200". Subsequently, the adjustment amount calculation unit 406 divides the adjustment necessary amount by the calculated total sum of the adjustable amounts. The division value is "100±200=0.5". Then, the adjustment amount calculation unit 406 multiplies the adjustable amount of each of the devices 20X by the division value to calculate the adjustment amount of each of the devices 20X. In this case, the adjustment amount of the device 20X "20XA" is "50× 0.5=25". Furthermore, by the same calculation, "15", "25", "5", "5", "15", and "10" are calculated as the adjustment amounts of the devices 20X "20XB", "20XC", "20XD", "20XE", "20XG", and "20XI". For each of the devices 20X as a target, the transmission unit 407 transmits, to the reception server 50, the instruction information for each of the devices 20X indicating the adjustment amount of the target device 20X.

Here, the total sum of the adjustment amounts of the devices 20X calculated by the adjustment amount calculation unit 406 is "25+15+25+5+5+15+10=100". Therefore, each of the devices 20X adjusts the apparent power in the adjustment target electric line by the adjustment amount calculated by the adjustment amount calculation unit 406 so that the apparent power in the adjustment target electric line may be improved.

As described above, according to the present embodiment, the adjustment amount calculation unit 406 calculates the adjustment amount of each of the devices 20X based on the relation between the adjustable amount of the device 20X and the adjustment necessary amount of the adjustment target electric line. Further, the transmission unit 407 transmits the instruction information indicating the adjustment amount for each of the devices 20X to the reception server 50. In other words, the transmission unit 407 outputs the instruction information based on the relation between the adjustment capability of the device 20X and the degree of adjustment necessary for the adjustment target electric line that satisfies the power condition.

In this case, the adjustment instruction is output by the adjustment amount calculated by the adjustment amount calculation unit 406 based on the relation between the adjustment necessary amount and the adjustable amount. Therefore, the device 20X may adjust the apparent power according to the content of adjustment suitable for the adjustable amount with respect to the adjustment necessary amount.

Furthermore, according to the present embodiment, the adjustment amount calculation unit 406 calculates the adjustment amount of each of the devices 20X based on the number of the devices 20X used for the adjustment of the apparent power. Further, the transmission unit 407 transmits, to the reception server 50, the instruction information indicating the adjustment amount for each of the devices 20X. In other words, the transmission unit 407 outputs the instruction information based on the number of the devices 20X used for the adjustment of the adjustment target electric line that satisfies the power condition.

In this case, the device 20X may adjust the apparent power according to the content of the adjustment suitable for the number used for the adjustment of the apparent power in the electric line.

Third Embodiment

Next, the power control system 1 according to a third embodiment will be described.

Figure 16:
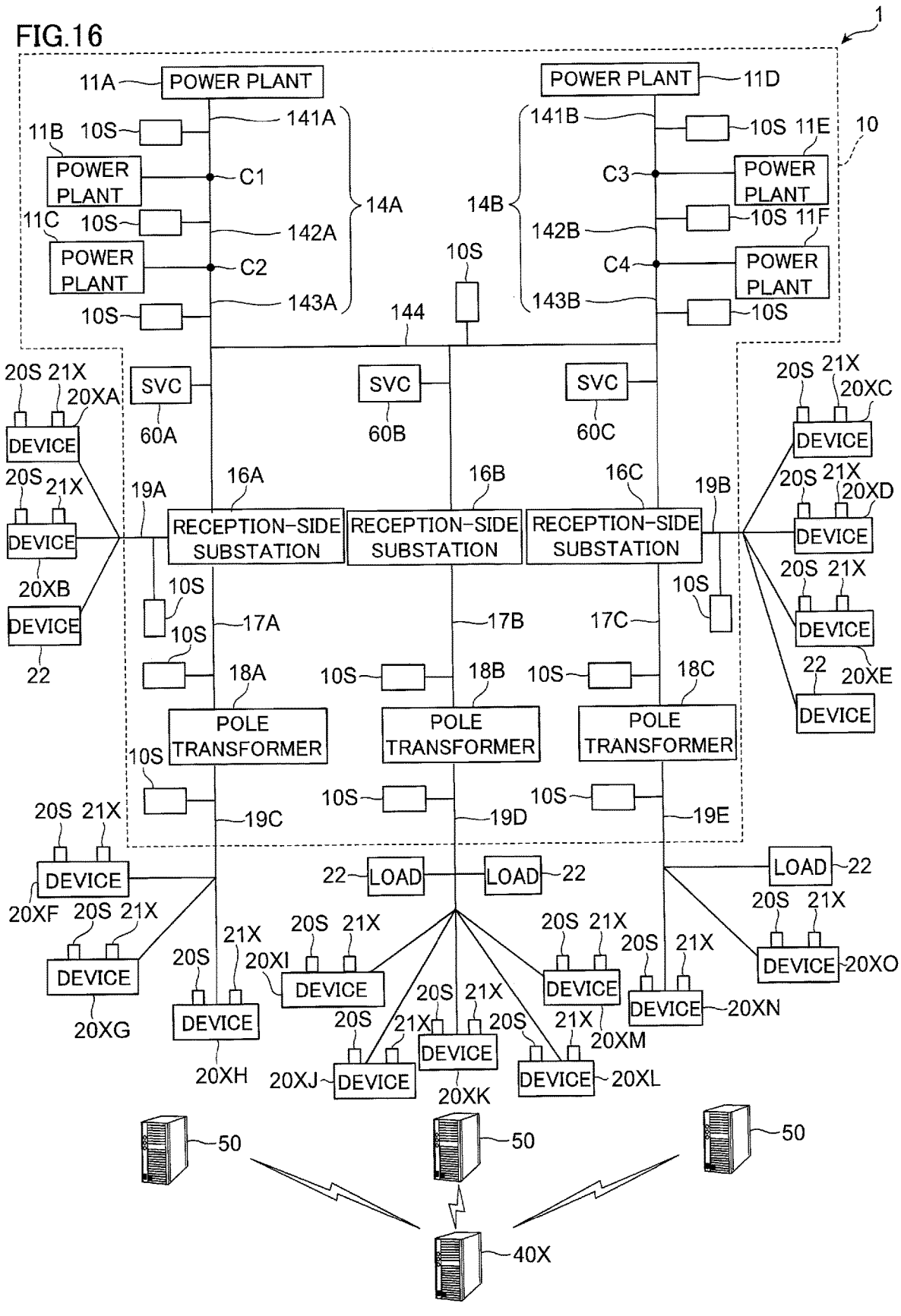
FIG. 16 is a diagram illustrating an example of the power control system according to a third embodiment.

FIG. 16 is a diagram illustrating an example of the power control system 1 according to the third embodiment.

Furthermore, the same components as those in the second embodiment are denoted by the same reference numerals below. Furthermore, a description of the same configuration as that in the second embodiment may be omitted.

The power control system 1 according to the present embodiment includes the power system 10, the plurality of devices 20X, the plurality of loads 22, the instruction server 40X, and the reception server 50.

The power system 10 includes the power plant 11, the supply-side distribution line 14, a coupling line 144, a reactive power compensation device (SVC: Static Var Compensator) 60, the reception-side substation 16, the reception-side distribution line 17, the pole transformer 18, the demander-side distribution line 19, and the electric line sensor 10S.

The power system 10 includes a plurality of the power plants 11. The example illustrated includes the six power plants 11 including a power plant 11A to a power plant 11F. Further, the power plant 11A to the power plant 11F may be simply referred to as the power plants 11 when they are not distinguished from each other in the description in particular.

The power system 10 includes a plurality of the supply-side distribution lines 14. The illustrated example includes the two supply-side distribution lines 14 including a supply-side distribution line 14A and a supply-side distribution line 14B. Further, the supply-side distribution line 14A and the supply-side distribution line 14B may be simply referred to as the supply-side distribution lines 14 when they are not distinguished from each other in the description in particular.

The supply-side distribution line 14A includes an upstream distribution line 141A, a midstream distribution line 142A, and a downstream distribution line 143A. Furthermore, the supply-side distribution line 14B includes an upstream distribution line 141B, a midstream distribution line 142B, and a downstream distribution line 143B. Further, the upstream distribution line 141A and the upstream distribution line 141B may be simply referred to as upstream distribution lines 141 when they are not distinguished from each other in the description in particular. Further, the midstream distribution line 142A and the midstream distribution line 142B may be simply referred to as midstream distribution lines 142 when they are not distinguished from each other in the description in particular. Moreover, the downstream distribution line 143A and the downstream distribution line 143B may be simply referred to as downstream distribution lines 143 when they are not distinguished from each other in the description in particular.

The upstream distribution line 141, the midstream distribution line 142, and the downstream distribution line 143 are different electric lines. The upstream distribution line 141 is provided closest to the power supply side among the supply-side distribution lines 14. Further, the downstream distribution line 143 is provided closest to the power reception side among the supply-side distribution lines 14.

According to the present embodiment, the power plant 11A is coupled to the upstream distribution line 141A, and the current forming the power generated by the power plant 11A flows through the upstream distribution line 141A. Further, the power plant 11B is coupled to a coupling point C1 between the upstream distribution line 141A and the midstream distribution line 142A, and the current forming the power generated by the power plant 11B and the current passing through the upstream distribution line 141A flow into the midstream distribution line 142A. Further, the power plant 11C is coupled to a coupling point C2 between the midstream distribution line 142A and the downstream distribution line 143A, and the current forming the power generated by the power plant 11C and the current passing through the midstream distribution line 142A flow into the downstream distribution line 143A. Furthermore, the downstream distribution line 143A is provided from the coupling point C2 to the reception-side substation 16A.

Further, the power plant 11D is coupled to the upstream distribution line 141B, and the current forming the power generated by the power plant 11D flows into the upstream distribution line 141B. Further, the power plant 11E is coupled to a coupling point C3 between the upstream distribution line 141B and the midstream distribution line 142B, and the current forming the power generated by the power plant 11E and the current passing through the upstream distribution line 141B flow into the midstream distribution line 142B. Further, the power plant 11F is coupled to a coupling point C4 between the midstream distribution line 142B and the downstream distribution line 143B, and the current forming the power generated by the power plant 11F and the current passing through the midstream distribution line 142B flow into the downstream distribution line 143B. Moreover, the downstream distribution line 143B is provided from the coupling point C4 to the reception-side substation 16C.

The coupling line 144 is a line coupling the downstream distribution line 143A and the downstream distribution line 143B. The coupling line 144 is provided over the reception-side substation 16B.

The SVC 60 is a facility that continuously changes the reactive power to regulate the reactive power. Although not illustrated in the drawing, the SVC 60 includes a transformer, a phase-lead capacitor, a phase-delay reactor, and a thyristor. The power system 10 includes a plurality of the SVCs 60. The example illustrated includes the three SVCs 60 including an SVC 60A to an SVC 60C. Further, the SVC 60A to the SVC 60C may be simply referred to as the SVCs 60 when they are not distinguished from each other in the description in particular. The SVC 60A regulates the reactive power in the downstream distribution line 143A. Further, the SVC 60B regulates the reactive power in the coupling line 144. Moreover, the SVC 60C regulates the reactive power in the downstream distribution line 143B.

The power system 10 includes a plurality of the reception-side substations 16. The illustrated example includes the three reception-side substations 16 including a reception-side substation 16A to a reception-side substation 16C. Furthermore, the reception-side substation 16A to the reception-side substation 16C may be simply referred to as the reception-side substations 16 when they are not distinguished from each other in the description in particular.

The reception-side substation 16A converts the voltage supplied through the downstream distribution line 143A. Further, the reception-side substation 16B converts the voltage supplied through the coupling line 144. Moreover, the reception-side substation 16C converts the voltage supplied through the downstream distribution line 143B.

The power system 10 includes a plurality of the reception-side distribution lines 17. The illustrated example includes the three reception-side distribution lines 17 including a reception-side distribution line 17A to a reception-side distribution line 17C. Furthermore, the reception-side distribution line 17A to the reception-side distribution line 17C may be simply referred to as the reception-side distribution lines 17 when they are not distinguished from each other in the description in particular.

The current generated by applying the voltage converted by the reception-side substation 16A flows through the reception-side distribution line 17A. Further, the current generated by applying the voltage converted by the reception-side substation 16B flows through the reception-side distribution line 17B. Moreover, the current generated by applying the voltage converted by the reception-side substation 16C flows through the reception-side distribution line 17C.

The power system 10 includes a plurality of the pole transformers 18. The illustrated example includes the three pole transformers 18 including a pole transformer 18A to a pole transformer 18C. Further, the pole transformer 18A to the pole transformer 18C may be simply referred to as the pole transformers 18 when they are not distinguished from each other in the description in particular.

The pole transformer 18A converts the voltage supplied through the reception-side distribution line 17A. Further, the pole transformer 18B converts the voltage supplied through the reception-side distribution line 17B. Moreover, the pole transformer 18C converts the voltage supplied through the reception-side distribution line 17C.

The power system 10 includes a plurality of the demander-side distribution lines 19. The illustrated example includes the five demander-side distribution lines 19 including a demander-side distribution line 19A to a demander-side distribution line 19E. Furthermore, the demander-side distribution line 19A to the demander-side distribution line 19E may be simply referred to as the demander-side distribution lines 19 when they are not distinguished from each other in the description in particular.

The current generated by applying the voltage converted by the reception-side substation 16A flows through the demander-side distribution line 19A. Further, the current generated by applying the voltage converted by the reception-side substation 16C flows through the demander-side distribution line 19B. As described above, the demander-side distribution line 19 may be a line through which the current generated by applying the voltage converted by the reception-side substation 16 flows. Furthermore, the current generated by applying the voltage converted by the pole transformer 18A flows through the demander-side distribution line 19C. Further, the current generated by applying the voltage converted by the pole transformer 18B flows through the demander-side distribution line 19D. Moreover, the current generated by applying the voltage converted by the pole transformer 18C flows through the demander-side distribution line 19E.

The power system 10 includes a plurality of the electric line sensors 10S. In the illustrated example, the electric line sensor 10S is provided individually for the upstream distribution line 141, the midstream distribution line 142, the downstream distribution line 143, the coupling line 144, the reception-side distribution line 17, and the demander-side distribution line 19.

The power control system 1 includes a plurality of the devices 20X. The illustrated example includes the 15 devices 20X including the device 20XA to a device 20X0. Further, the device 20XA to the device 20X0 may be simply referred to as the devices 20X when they are not distinguished from each other in the description in particular.

The device 20XA and the device 20XB receive the power supplied through the demander-side distribution line 19A. Furthermore, the device 20XC to the device 20XE receive the power supplied through the demander-side distribution line 19B. Further, the device 20XF to the device 20XH receive the power supplied through the demander-side distribution line 19C. Further, the device 20XI to the device 20XM receive the power supplied through the demander-side distribution line 19D. Moreover, the device 20XN and the device 20X0 receive the power supplied through the demander-side distribution line 19E.

The power control system 1 includes a plurality of the device sensors 20S. In the illustrated example, the device sensor 20S is provided for each of the devices 20X.

According to the present embodiment, the instruction server 40X is connected to each of the power plants 11, each of the reception-side substations 16, each of the electric line sensors 10S, and each of the reception servers 50 via a network (not illustrated). Furthermore, the reception server 50 is connected to each of the device sensors 20S via a network (not illustrated).

Furthermore, the number of components provided in the power control system 1 is not limited to the illustrated example.

FIG. 17 is a diagram illustrating a power plant management table. The power plant management table is a table to manage the power plants 11. The storage unit 402 (see FIG. 11) of the instruction server 40X stores the power plant management table.

In the power plant management table, "power plant" indicates the power plant identification information for identifying the power plant. "11A" to "11F" indicated in "power plant" are information for identifying the corresponding ones of the power plant 11A to the power plant 11F.

Furthermore, in the power plant management table, "output" indicates the output value of "power plant". More specifically, "output" indicates the current value forming the power generated by "power plant".

The instruction server 40X acquires the information on the output value from the power plant 11 through the network at predetermined time intervals. The predetermined time may be any time, but is for example 60 seconds. The information from the power plant 11 acquired by the instruction server 40X is written in "output" associated with the target "power plant". Furthermore, the instruction server 40X may calculate the output value of the power plant 11 from the power information acquired from the electric line sensor 10S corresponding to the supply-side distribution line 14 and write the calculated output value in "output".

Furthermore, in the power plant management table, "coupled electric line" indicates the electric line identification information on the electric line coupled to "power plant". "Coupled electric line" is previously set for each "power plant" by the user of the power control system 1.

An example of the content of the power plant management table will be described. For the power plant 11A specified from "11A" of "power plant", "40" is indicated as "output", and "141A" is associated as "coupled electric line".

FIG. 18 is a diagram illustrating an electric line, etc. management table. The electric line, etc. management table is a table to manage the electric lines and the reception-side substations 16. The storage unit 402 stores the electric line, etc. management table.

In the electric line, etc. management table, "electric line, etc." indicates the electric line identification information or the substation identification information for identifying the reception-side substation 16. "141A" and "141B" indicated in "electric line, etc." are information for identifying the upstream distribution line 141A and the upstream distribution line 141B, respectively. Furthermore, "142A" and "142B" are information for identifying the midstream distribution line 142A and the midstream distribution line 142B, respectively. Further, "143A" and "143B" are information for identifying the downstream distribution line 143A and the downstream distribution line 143B, respectively. Further, "144" is information for identifying the coupling line 144. Further, "16A" to "16C" are information for identifying the corresponding ones of the reception-side substation 16A to the reception-side substation 16C, respectively. Moreover, "17A" to "17C" are information for identifying the corresponding ones of the reception-side distribution line 17A to the reception-side distribution line 17C.

Furthermore, in the electric line, etc. management table, "supply side" indicates the identification information on the electric line or the reception-side substation 16 coupled to "electric line, etc." closer to the power supply side than the "electric line, etc.". Further, "supply side" of "electric line, etc." of "16A" is associated with "143A", which is the downstream distribution line 143A, and "144", which is the coupling line 144. Further, "supply side" of "electric line, etc." of "16B" is associated with "144", which is the coupling line 144. Further, "supply side" of "electric line, etc." of "16C" is associated with "143B", which is the downstream distribution line 143B, and "144", which is the coupling line 144.

Moreover, in the electric line, etc. management table, "capacity" indicates the capacity of the current in "electric line, etc.". More specifically, "capacity" indicates the current value that may flow through "electric line, etc." without causing a short circuit or ignition in "electric line, etc.". In other words, "capacity" indicates the allowable current in "electric line, etc.".

"Supply side" and "capacity" are previously set by the user of the power control system 1.

Furthermore, in the electric line, etc. management table, "margin amount" indicates the value of the margin up to "capacity" of the current that may flow through "electric line, etc.". More specifically, "margin amount" indicates the value obtained by subtracting the current value flowing through "electric line, etc." from "capacity". According to the present embodiment, the adjustment amount calculation unit 406 (see FIG. 11) of the instruction server 40X calculates "margin amount".

An example of the technique for calculating "capacity" will be described. The adjustment amount calculation unit 406 subtracts "output" associated with the specific "power plant" in the power plant management table from "capacity" associated with the target "electric line, etc." in the electric line, etc. management table to calculate "margin amount". Here, the specific "power plant" is "power plant" for which "coupled electric line" in the power plant management table is associated with the identification information indicated in the target "electric line, etc." or "supply side" of the target "electric line, etc.". When the target "electric line, etc." is "141A", the value "70–40=30" obtained by subtracting "output" of "11A", which is "power plant" associated with "141A" as "coupled electric line", from "capacity" of "141A" is calculated as "margin amount" of "141A". Furthermore, when the target "electric line, etc." is "142A", the value "100–(40+30)=30" obtained by subtracting "output" of "11A" and "11B", which are "power plants" associated with "142A" or "141A" which is "supply side" of "142A" as "coupled electric lines", from "capacity" of "142A" is calculated as "margin amount" of "142A".

Furthermore, the adjustment amount calculation unit 406 may calculate the current value flowing through "electric line, etc." from the power information acquired from the electric line sensor 10S corresponding to the target "electric line, etc." and write the value obtained by subtracting the calculated current value from "capacity" in "margin amount" of the target "electric line, etc.".

The adjustment amount calculation unit 406 calculates "margin amount" of each "electric line, etc." at predetermined time intervals. The predetermined time may be any time, but is for example 60 seconds.

Furthermore, "power information" and "threshold" are indicated in the electric line, etc. management table. The "power information" and "threshold" are the same as "power information" and "threshold" in the electric line management table (see FIG. 12).

An example of the content of the electric line, etc. management table will be described. For the midstream distribution line 142A specified from "142A" of "electric line, etc.", "141A" is set as "supply side", "100" is set as "capacity", "30" is calculated as "margin amount", "P12" is indicated as "power information", and "T12" is set as "threshold".

FIG. 19 is a diagram illustrating a device management table according to the present embodiment. The device management table according to the present embodiment has the same content as that of the device management table (see FIG. 13) according to the second embodiment. In addition, "pass-through electric line" in the device management table according to the present embodiment is associated with the electric line identification information on the electric line closest to "device" among the supply-side distribution lines 14 and the reception-side distribution lines 17.

Figure 20:
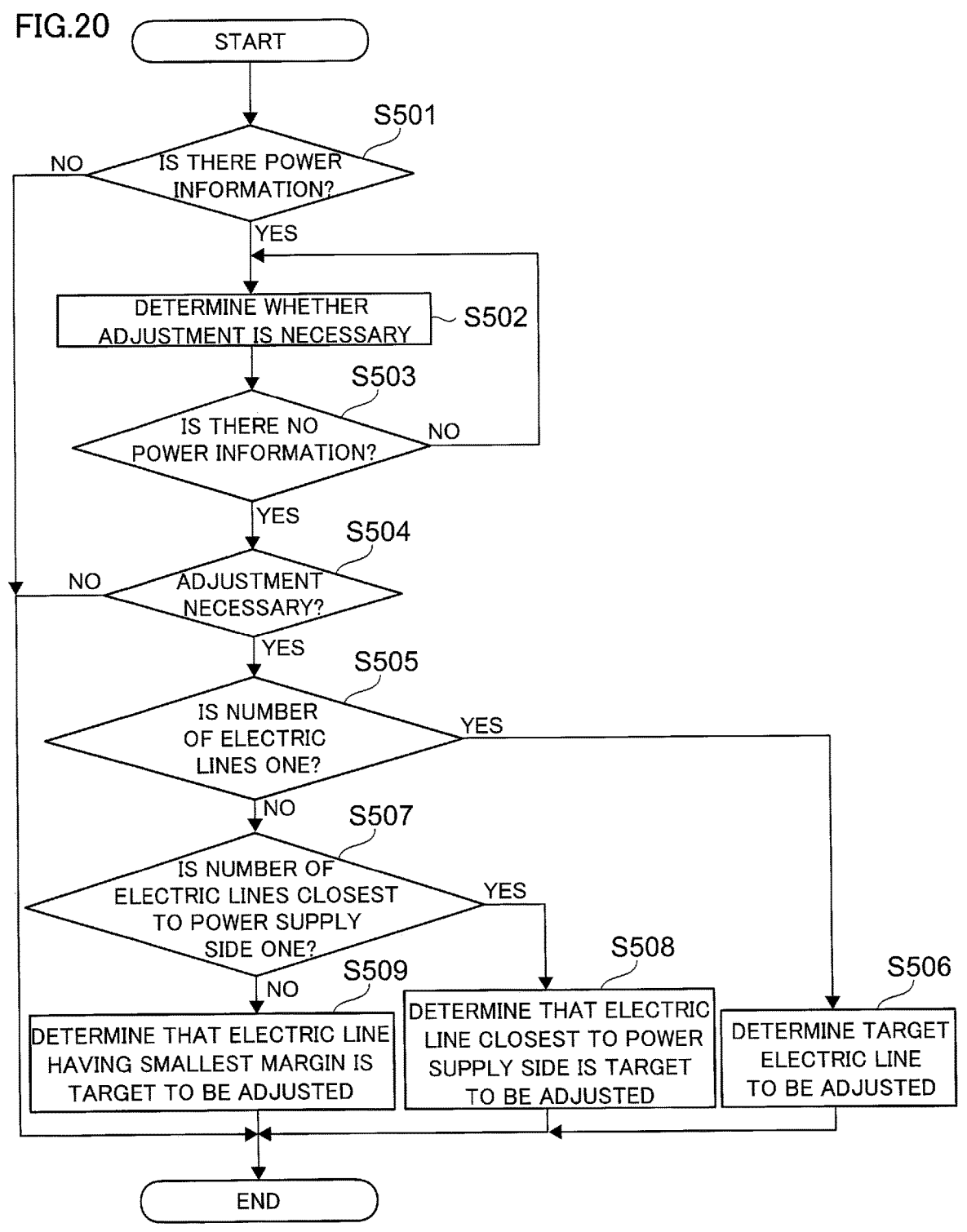
FIG. 20 is a flowchart illustrating a flow of an electric line determination process according to the third embodiment.

FIG. 20 is a flowchart illustrating a flow of an electric line determination process according to the present embodiment.

In the electric line determination process according to the present embodiment, Steps 501 to 506 have the same process as that of Steps 301 to 306 in the electric line determination process (see FIG. 14) according to the second embodiment.

When there is a plurality of electric lines for which the determination unit 403 has determined that the adjustment of the apparent power is necessary (NO in S505), the determination unit 403 determines whether the number of electric lines provided closest to the power supply side among the electric lines is one (S507). The determination unit 403 refers to the electric line, etc. management table (see FIG. 18). Further, the above-described determination is made using the information indicated in "supply side" of the electric lines.

An example of the determination technique in Step 507 will be described. It is assumed that the electric lines for which the determination unit 403 has determined that the adjustment of the apparent power is necessary are the upstream distribution line 141A, the midstream distribution line 142A, and the downstream distribution line 143A. In this case, there is one electric line provided closest to the power supply side, i.e., the upstream distribution line 141A. In this case, the determination unit 403 determines that the number of electric lines provided closest to the power supply side is one (YES in S507).

Another example of the determination technique in Step 507 will be described. It is assumed that the electric lines for which the determination unit 403 has determined that the adjustment of the apparent power is necessary are the upstream distribution line 141A and the upstream distribution line 141B. In this case, there are two electric lines provided closest to the power supply side, i.e., the upstream distribution line 141A and the upstream distribution line 141B. In this case, the determination unit 403 determines that the number of electric lines provided closest to the power supply side is not one (NO in S507).

Another example of the determination technique in Step 507 will be described. It is assumed that the electric lines for which the determination unit 403 has determined that the adjustment of the apparent power is necessary are the midstream distribution line 142A, the downstream distribution line 143A, and the downstream distribution line 143B. In this case, there is one electric line provided closest to the power supply side, i.e., the midstream distribution line 142A. In this case, the determination unit 403 determines that the number of electric line provided closest to the power supply side is one (YES in S507).

When the number of electric lines provided closest to the power supply side is one (YES in S507), the determination unit 403 determines that the one electric line provided closest to the power supply side is the target electric line whose apparent power is to be adjusted (S508).

Furthermore, when the number of electric lines provided closest to the power supply side is not one (NO in S507), the process proceeds to the subsequent step.

The determination unit 403 determines that the target electric line whose apparent power is to be adjusted is the electric line having the smallest margin value up to the capacity of current that may flow through the electric line among the electric lines for which it is determined that the adjustment of the apparent power is necessary (S509). More specifically, the determination unit 403 refers to the electric line, etc. management table (see FIG. 18). Further, it is determined that the target electric line whose apparent power is to be adjusted is the electric line specified from "electric line, etc." having the smallest "margin amount" among the plurality of "electric lines, etc." for which it is determined that the adjustment of the apparent power is necessary.

Furthermore, after the apparent power of the electric line determined in any of Step 506, Step 508, and Step 509 is adjusted, there may be remaining electric lines for which the adjustment of the apparent power is necessary. These electric lines are sequentially determined as the target for adjusting the apparent power in the subsequent electric line determination process, and the apparent power is adjusted.

As described above, according to the present embodiment, the determination unit 403 determines the electric line whose apparent power is to be adjusted among the electric lines based on the current value flowing through each electric line. In other words, the determination unit 403 determines the electric line whose apparent power is preferentially adjusted based on the apparent power in the electric line for each of the electric lines that satisfy the power condition.

In electric lines used as paths for receiving the power by the large number of the loads 22 and the devices 20X, large voltage fluctuations in the electric line and a small margin up to the capacity of the current that may flow in the electric line are likely to cause instability. In this case, with the configuration for determining the electric line whose apparent power is to be preferentially adjusted based on the current value flowing through the electric line, it is possible to determine the electric line whose apparent power is adjusted based on the instability of the electric line.

Figure 21:
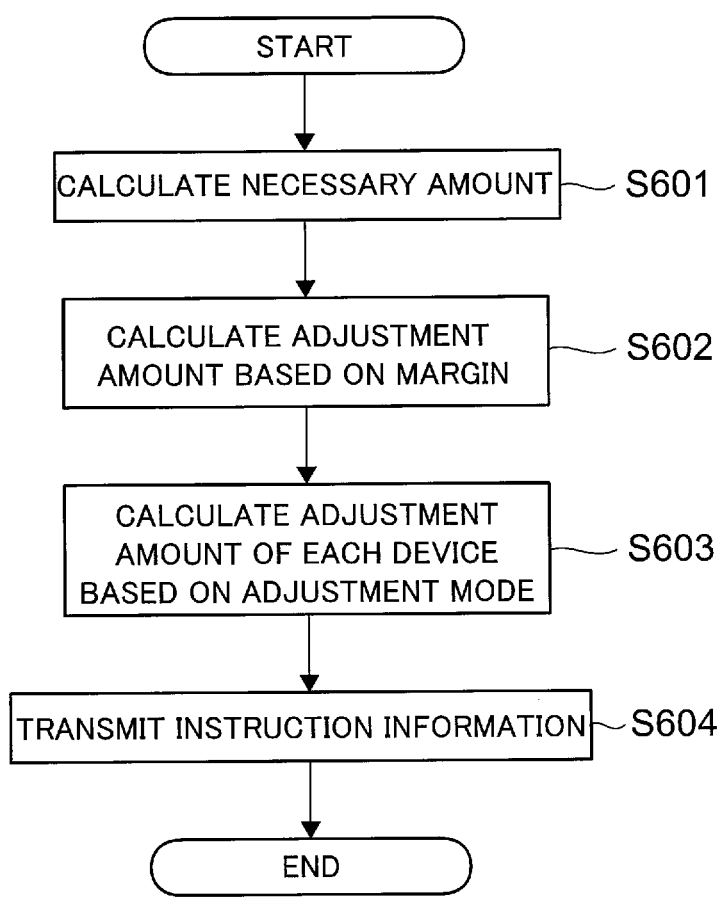
FIG. 21 is a flowchart illustrating a flow of an instruction output process according to the third embodiment.

FIG. 21 is a flowchart illustrating the flow of an instruction output process according to the present embodiment. In the electric line determination process according to the present embodiment, Step 601 is the same process as the process of Step 401 in the instruction output process (see FIG. 15) according to the second embodiment.

The adjustment amount calculation unit 406 calculates the adjustment amount based on the margin up to the capacity of the current that may flow through the adjustment target electric line (S602). More specifically, the adjustment amount calculation unit 406 calculates the adjustment amount such that the current flowing through the adjustment target electric line does not exceed the capacity of the adjustment target electric line.

An example of the calculation technique in Step 602 will be described. In the description below, the upstream distribution line 141A is the adjustment target electric line, and the adjustment necessary amount is "50".

When the adjustment necessary amount is calculated as "50", it is desirable to supply a current of "50" to the upstream distribution line 141A by using the device 20X in order to improve the apparent power in the upstream distribution line 141A. However, the value of the margin up to the capacity of the current that may flow in the upstream distribution line 141A is "30" (see FIG. 18). In this case, in Step 602, the adjustment amount calculation unit 406 calculates the adjustment amount as "30".

The adjustment amount calculation unit 406 calculates the adjustment amount of each of the devices 20X based on a predetermined adjustment mode in consideration of the adjustment amount calculated in Step 602 (S603). According to the present embodiment, the adjustment amount calculation unit 406 calculates the adjustment amount of each of the devices 20X based on the margin up to the capacity of the current that may flow through the electric line other than the adjustment target electric line.

An example of the technique for calculating the adjustment amount by the adjustment amount calculation unit 406 will be described. In the description below, the upstream distribution line 141A is the adjustment target electric line, and the device 20XA, the device 20XB, the device 20XF, the device 20XG, and the device 20XH adjust the apparent power.

In Step 602, the adjustment amount of the upstream distribution line 141A is calculated as "30". Further, when the device 20X supplies the current to the upstream distribution line 141A, the current also flows into the midstream distribution line 142A and the downstream distribution line 143A, which are provided closer to the power reception side than the upstream distribution line 141A. Here, the value of the margin up to the capacity of the current that may flow through the downstream distribution line 143A is "20" (see FIG. 18). In this case, when the device 20X supplies a current of "30" to the upstream distribution line 141A, it exceeds the capacity of current that may flow through the downstream distribution line 143A, and there is a possibility that a short circuit or ignition occurs in the downstream distribution line 143A. Therefore, the adjustment amount calculation unit 406 calculates the adjustment amount of the device 20X as "20". In this example, the adjustment amount calculation unit 406 calculates the adjustment amounts of the device 20XA, the device 20XB, the device 20XF, the device 20XG, and the device 20XH as "5", "5", "4", "4", and "2", respectively, based on the adjustable amount of each of the devices 20X.

When calculating the adjustment amount of each of the devices 20X, the adjustment amount calculation unit 406 generates, for each of the devices 20X used for the adjustment, the instruction information for giving an instruction to the device 20X to adjust the apparent power in the adjustment target electric line.

The transmission unit 407 transmits the instruction information generated by the adjustment amount calculation unit 406 to the reception server 50, which manages the device 20X that is the target for the instruction, together with the device identification information for identifying the device 20X that is the target for the instruction (S604).

As described above, according to the present embodiment, the adjustment amount of each of the devices 20X to adjust the apparent power in the upstream distribution line 141A is calculated based on the current flowing through the midstream distribution line 142A and the downstream distribution line 143A. Further, the transmission unit 407 transmits the instruction information indicating the adjustment amount for each of the devices 20X to the reception server 50. In other words, when the first electric line satisfies the power condition, the transmission unit 407 outputs the instruction information based on the apparent power in the second electric line. The first electric line is, for example, the upstream distribution line 141A. The second electric line is, for example, the midstream distribution line 142A or the downstream distribution line 143A.

In this case, the apparent power in the first electric line may be adjusted according to the content of adjustment suitable for the apparent power in the second electric line.

In particular, according to the present embodiment, the current supplied from the device 20X, which is used for adjustment of the first electric line, flows to the first electric line after the second electric line.

In this case, the apparent power in the first electric line may be adjusted according to the content of adjustment suitable for the electric line through which the current flows for the adjustment of the apparent power in the first electric line by the device 20X.

Furthermore, according to the present embodiment, the adjustment amount calculation unit 406 calculates the adjustment amount of the upstream distribution line 141A smaller than the adjustment necessary amount based on the value of the margin up to the capacity of the current that may flow through the downstream distribution line 143A. In other words, the adjustment amount calculation unit 406 puts a limitation on the adjustment of the apparent power in the first electric line based on the margin up to the capacity regarding the apparent power in the second electric line. Therefore, the adjustment amount calculation unit 406 may also be regarded as a limitation unit that puts a limitation on the adjustment of the apparent power in the electric line.

In this case, as compared with the case where the adjustment amount of the first electric line is not limited, it is possible to suppress the occurrence of a failure related to the second electric line when the apparent power in the first electric line is adjusted.

Furthermore, according to the present embodiment, when the value of the margin up to the capacity of the current that may flow through the specific electric line is "0", the apparent power is not adjusted for the specific electric line and the electric line provided closer to the power supply side than the specific electric line. In this way, when there is the specific electric line in which the value of the margin up to the capacity of the current that may flow is "0", the specific electric line or the electric line provided closer to the power supply side than the specific electric line may be excluded from the target electric lines for the adjustment of the apparent power in the electric line determination process.

(Modification 1)

Next, a modification of the technique for calculating the adjustment amount of the device 20X by the adjustment amount calculation unit 406 will be described.

In the instruction output process described with reference to FIG. 21, the adjustment amount calculation unit 406 calculates the adjustment amount of each of the devices 20X based on the margin up to the capacity of the current that may flow through the electric line other than the adjustment target electric line. Here, the technique for calculating the adjustment amount of each of the devices 20X by the adjustment amount calculation unit 406 is not limited to the above example.

A modification of the technique for calculating the adjustment amount of each of the devices 20X by the adjustment amount calculation unit 406 will be described. In the case described according to this example, the downstream distribution line 143A is the adjustment target electric line, the adjustment amount of the downstream distribution line 143A is calculated as "20", and the device 20XC to the device 20XE, the device 20XN, and the device 20X0 adjust the apparent power.

The device 20XC to the device 20XE, the device 20XN, and the device 20X0 may supply the apparent power to the downstream distribution line 143A via the reception-side substation 16C, the downstream distribution line 143B, and the coupling line 144. Furthermore, the value of the margin up to the capacity of the current that may flow through the reception-side substation 16C is "15" (see FIG. 18) that is smaller than "20" that is the adjustment amount of the downstream distribution line 143A. In this case, the adjustment amount calculation unit 406 calculates the adjustment amount of the device 20X as "15". In this example, based on the adjustable amount of each of the devices 20X, the adjustment amount calculation unit 406 calculates all the adjustment amounts of the device 20XC, the device 20XD, the device 20XE, the device 20XN, and the device 20X0 as "3".

As described above, when the device 20X supplies the apparent power to the electric line via the reception-side substation 16, the adjustment amount calculation unit 406 calculates the adjustment amount of each of the devices 20X based on the reception-side substation 16 having the smallest "margin amount" (see FIG. 18) among the three reception-side substations 16.

Moreover, the adjustment amount calculation unit 406 may calculate the adjustment amount of each of the devices 20X based on the smallest "margin amount" among the three reception-side substations 16 and the respective electric lines provided between the device 20X and the adjustment target electric line.

(Modification 2)

Next, another modification (modification 2) of the technique for calculating the adjustment amount of the device 20X by the adjustment amount calculation unit 406 will be described. In the case described according to this example, the downstream distribution line 143A is the adjustment target electric line, the adjustment amount when the power factor of the downstream distribution line 143A is 1.0 is calculated as "16", the power factor of the downstream distribution line 143A is a leading power factor of 0.7, and the device 20XA, the device 20XB, and the device 20XF to the device 20XH adjust the apparent power.

When the power factor in the downstream distribution line 143A is a leading power factor of 0.7, it is desirable that the device 20X supply the current to the downstream distribution line 143A by setting the power factor to a lagging power factor of 0.7. Furthermore, in order for the device 20X to supply "16", which is the adjustment amount when the power factor of the downstream distribution line 143A is 1.0, with a lagging power factor of 0.7, it is necessary to supply a current of "16÷0.7≈23". Here, the value of the margin up to the capacity of the current that may flow through the downstream distribution line 143A is "20" (see FIG. 18), and a current of "23" exceeds the capacity of the current that may flow through the downstream distribution line 143A. Therefore, the adjustment amount calculation unit 406 calculates a lagging power factor of 0.8 as the power factor when the device 20X supplies the current. Here, the current value for the device 20X to supply "16", which is the adjustment amount when the power factor of the downstream distribution line 143A is 1.0, by a lagging power factor of 0.8 is "16÷0.8=20", and it corresponds to the upper limit value of the capacity of the current that may flow through the downstream distribution line 143A. In this example, the adjustment amount calculation unit 406 calculates the adjustment amounts of the device 20XA, the device 20XB, the device 20XF, the device 20XG, and the device 20XH as "5", "5", "4", "4", and "2", respectively, based on the adjustable amount of each of the devices 20X.

When calculating the adjustment amount of each of the devices 20X, the adjustment amount calculation unit 406 generates, for each of the devices 20X used for the adjustment, the instruction information for giving an instruction to the device 20X to adjust the apparent power in the adjustment target electric line. In this case, each piece of instruction information includes the information indicating the adjustment amount and the power factor "0.8" of the target device 20X as the content of the instruction.

As described above, according to the present embodiment, the adjustment amount calculation unit 406 calculates the adjustment amount of each of the devices 20X for adjusting the apparent power in the adjustment target electric line based on the margin up to the capacity of the current that may flow through the adjustment target electric line. Furthermore, the transmission unit 407 transmits the instruction information indicating the adjustment amount for each of the devices 20X to the reception server 50. In other words, the transmission unit 407 outputs the instruction information based on the margin up to the capacity regarding the apparent power of the adjustment target electric line that satisfies the power condition.

In this case, the apparent power in the adjustment target electric line may be adjusted according to the content of adjustment suitable for the margin up to the capacity of the current that may flow through the adjustment target electric line.

Furthermore, according to the present embodiment, when the device 20X adjusts the apparent power in the electric line with the reduced power factor, the adjustment amount calculation unit 406 limits the reduction of the power factor and calculates the adjustment amount of each of the devices 20X based on the value of the margin up to the capacity of the current that may flow through the adjustment target electric line. Furthermore, the transmission unit 407 transmits the instruction information indicating the adjustment amount for each of the devices 20X to the reception server 50. In other words, the transmission unit 407 outputs the information based on the margin up to the capacity regarding the apparent power of the adjustment target electric line with regard to the power factor for adjustment by the device 20X.

In this case, the apparent power in the adjustment target electric line may be adjusted by the power factor suitable for the capacity of the current that may flow through the adjustment target electric line.

Further, according to the present embodiment, when the leading power factor is detected as the power factor of the adjustment target electric line, the adjustment amount calculation unit 406 sets the lagging power factor as the power factor when the device 20X supplies the current. Furthermore, when the lagging power factor is detected as the power factor of the adjustment target electric line, the adjustment amount calculation unit 406 may set the leading power factor as the power factor when the device 20X supplies the current. In other words, the adjustment amount calculation unit 406 may cause the device 20X to adjust the power flow in accordance with the power flow of the apparent power detected in the adjustment target electric line.

(Modification 3)

Next, another modification (modification 3) of the technique for calculating the adjustment amount of the device 20X by the adjustment amount calculation unit 406 will be described. In the case described according to this example, the downstream distribution line 143B is the adjustment target electric line, the adjustment amount of the downstream distribution line 143B is calculated as "12", and the device 20XF, the device 20XG, the device 20XJ, the device 20XK, and the device 20XN adjust the apparent power.

The adjustment amount calculation unit 406 divides "12", which is the adjustment amount of the downstream distribution line 143B, by "3", which is the number of the reception-side distribution lines 17 that are passed through before the power is supplied to each of the devices 20X. Further, the obtained "4" is set as the adjustment amount of the device 20X that receives the power via the reception-side distribution line 17A, the adjustment amount of the device 20X that receives the power via the reception-side distribution line 17B, and the adjustment amount of the device 20X that receives the power via the reception-side distribution line 17C. In this example, the adjustment amount calculation unit 406 calculates the adjustment amounts of the device 20XF, the device 20XG, the device 20XJ, the device 20XK, and the device 20XN as "2", "2", "2", "2", and "4", respectively.

In this way, the load generated in the device 20X for adjusting the apparent power in the electric line may be made uniform for each of the areas divided corresponding to the electric lines.

(Modification 4)

Next, another modification (modification 4) of the technique for calculating the adjustment amount of the device 20X by the adjustment amount calculation unit 406 will be described. In the case described according to this example, the coupling line 144 is the adjustment target electric line, the adjustment amount of the coupling line 144 is calculated as "15", and the device 20XI, the device 20XJ, the device 20XK, the device 20XL, and the device 20XM adjust the apparent power.

The adjustment amount calculation unit 406 divides "15", which is the adjustment amount of the coupling line 144, by "5", which is the number of the devices 20X used for the adjustment. Further, the obtained "3" is calculated as each adjustment amount of the device 20XI to the device 20XM.

As described above, in the adjustment of the apparent power in the electric line, the loads generated in the devices 20X coupled to the identical electric line may be made uniform.

(Modification 5)

Next, another modification (modification 5) of the technique for calculating the adjustment amount of the device 20X by the adjustment amount calculation unit 406 will be described. In the case described according to this example, the downstream distribution line 143A is the adjustment target electric line and the adjustment amount of the downstream distribution line 143A is calculated as "10".

The adjustment amount calculation unit 406 determines that the device 20X closest to the adjustment target electric line is the device 20X used for adjusting the apparent power in the adjustment target electric line. In this example, the adjustment amount calculation unit 406 determines that the devices 20X "20XA" and "20XB", for which "143A" is associated with "pass-through electric line" in the device management table (see FIG. 19), are the devices 20X used for the adjustment. Further, the adjustment amount calculation unit 406 calculates the adjustment amounts of both the device 20XA and the device 20XB as "5".

In this way, in order to reduce the power loss when the device 20X supplies the current to the adjustment target electric line, the apparent power may be adjusted by the device 20X closest to the adjustment target electric line.

Furthermore, in the example described according to the present disclosure, the parameters such as the adjustable amount, the adjustment necessary amount, the adjustment amount, the output value of the power plant 11, and the capacity or margin of the electric line are the current, but is not limited thereto. Each parameter may be any of the parameters described above as parameters regarding the apparent power.

Further, according to the present disclosure, the instruction server 40X transmits the instruction information to the reception server 50, and the reception server 50 gives an instruction to the target device 20X to adjust the apparent power in the electric line, but is not limited thereto.

The instruction server 40X may transmit the instruction information to the target device 20X, and the target device 20X may adjust the apparent power in the electric line based on the received instruction information. In other words, the instruction server 40X may give an instruction to the device 20X to adjust the apparent power in the electric line without using the reception server 50.

Fourth Embodiment

An embodiment will be described below with reference to the accompanying drawings.

Figure 22:
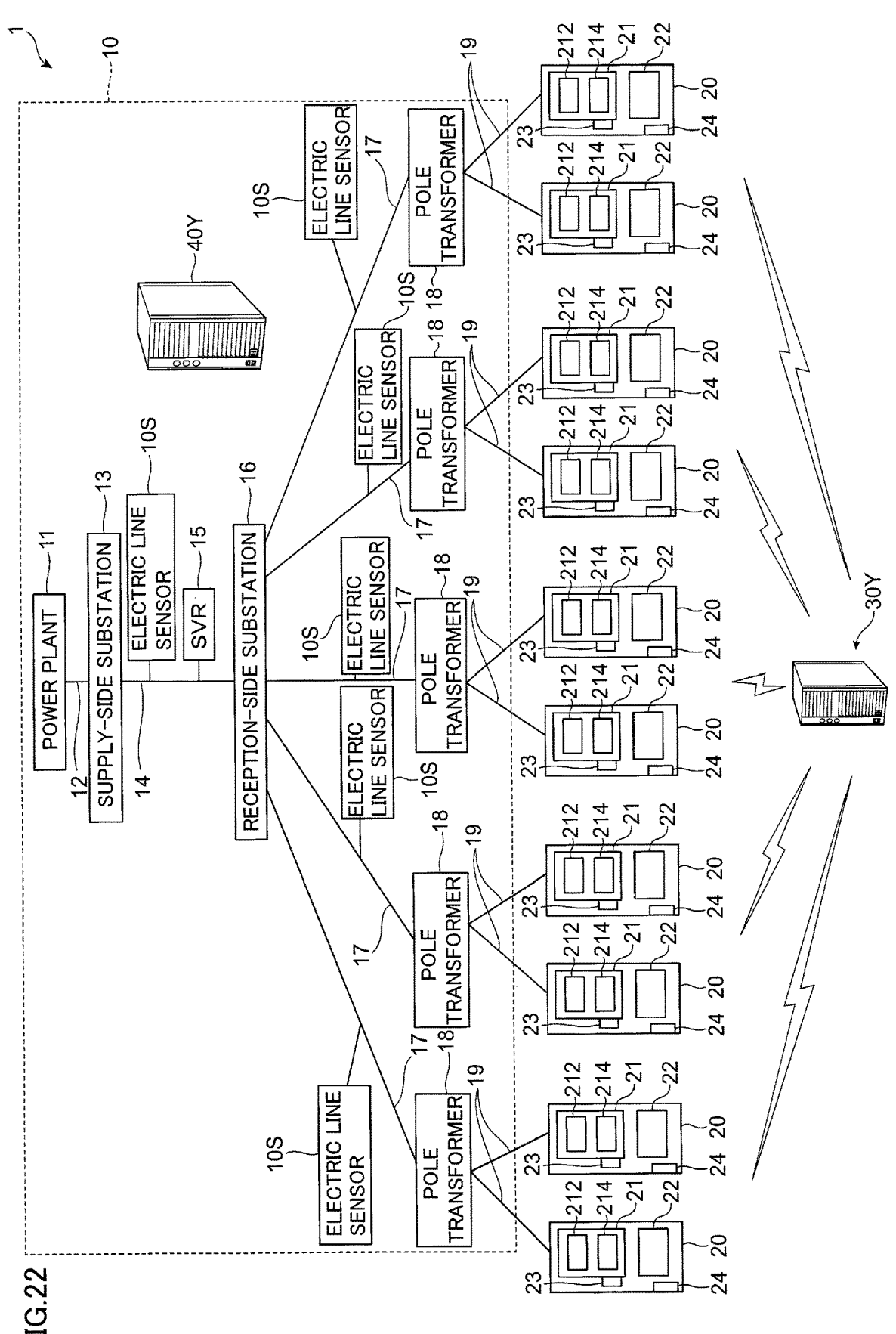
FIG. 22 is a diagram illustrating an example of the power control system according to a fourth embodiment.

FIG. 22 is a diagram illustrating an example of the power control system 1 according to a fourth embodiment.

The power control system 1, which is an example of an information processing system, is a system that controls apparent power.

The power control system 1 includes the power system 10, a plurality of the power consumption facilities 20, a calculation server 30Y, and an instruction server 40Y.

The power system 10 is a system in which a facility is provided to supply the power to a power demander. The power system 10 includes the power plant 11, the transmission line 12, the supply-side substation 13, the supply-side distribution line 14, the automatic voltage regulator (SVR: Step Voltage Regulator) 15, the reception-side substation 16, the reception-side distribution line 17, the pole transformer 18, and the demander-side distribution line 19.

The power plant 11 is a facility that generates power. Examples of the power plant 11 include a thermal power plant, a hydraulic power plant, a nuclear power plant, a solar power plant, a wind power plant, and a geothermal power plant.

The transmission line 12 is a line to flow the current forming the power generated by the power plant 11. The transmission line 12 is provided from the power plant 11 to the supply-side substation 13.

The supply-side substation 13 is a facility that converts the voltage. The supply-side substation 13 is provided closer to the power supply side than the reception-side substation 16. According to the present embodiment, the facility located closest to the power supply side is the power plant 11. Furthermore, the facility located closest to the power reception side is the power consumption facility 20.

The supply-side substation 13 converts the voltage supplied through the transmission line 12. Examples of the supply-side substation 13 include a substation that converts a voltage of 500000 V into 154000 V, a substation that converts a voltage of 154000 V into 66000 V, and a substation that converts a voltage of 66000 V into 22000 V.

The supply-side distribution line 14 is a line to flow the current generated by applying the voltage converted by the supply-side substation 13. The supply-side distribution line 14 is provided from the supply-side substation 13 to the reception-side substation 16. Furthermore, the supply-side distribution line 14 is provided closer to the power supply side than the reception-side distribution line 17.

The SVR 15 regulates the voltage supplied to the supply-side distribution line 14. More specifically, the SVR 15 detects the voltage supplied to the supply-side distribution line 14. Further, when the detected voltage does not fall within a predetermined range, the SVR 15 regulates the voltage such that the voltage falls within the predetermined range.

The reception-side substation 16 is a facility that converts the voltage supplied through the supply-side distribution line 14. Examples of the reception-side substation 16 include a substation that converts the supplied voltage into 6600 V.

The reception-side distribution line 17 is a line to flow the current generated by applying the voltage converted by the reception-side substation 16. The reception-side distribution line 17 is provided from the reception-side substation 16 to the pole transformer 18. Further, according to the present embodiment, the supply-side distribution line 14 and the reception-side distribution line 17 may be simply referred to as "electric lines" when they are not distinguished from each other in particular in the description.

The pole transformer 18 is a facility that converts the voltage supplied through the reception-side distribution line 17. Examples of the pole transformer 18 include a transformer that converts a voltage of 6600 V to 200 V and a transformer that converts a voltage of 6600 V to 100 V.

The demander-side distribution line 19 is a line to flow the current generated when the voltage converted by the pole transformer 18 is applied. The power system 10 includes a plurality of the demander-side distribution lines 19. More specifically, the demander-side distribution line 19 is provided for each of the power consumption facilities 20. Each of the demander-side distribution lines 19 is provided from the pole transformer 18 to the power consumption facility 20.

As described above, the power system 10 is a system provided outside the power consumption facility 20 and is a system that distributes the generated power to demanders of the power. Therefore, the power system 10 may also be regarded as a distribution system.

Furthermore, the power system 10 includes the plurality of electric line sensors 10S. The electric line sensor 10S is coupled to the supply-side distribution line 14. More specifically, the electric line sensor 10S is coupled to a portion of the supply-side distribution line 14 closer to the power supply side than the SVR 15. The electric line sensors 10S are connected to the reception-side distribution lines 17 provided in the power system 10, respectively. In other words, the electric line sensor 10S is provided for each of the supply-side distribution line 14 and the reception-side distribution line 17.

The electric line sensor 10S detects a parameter regarding the apparent power in the coupled electric line. The parameter regarding the apparent power is a parameter that affects the apparent power. Examples of the parameter regarding the apparent power include apparent power, reactive power, reactive voltage, harmonic voltage, current, power factor, apparent power amount and reactive power amount in a predetermined period, and the like. The current as a parameter regarding the apparent power includes a harmonic current. Furthermore, the harmonic voltage or the harmonic current may be a harmonic voltage or a harmonic current of a specific order. Examples of the specific order include the fifth-order harmonic. Further, examples of the parameter regarding the apparent power include a total harmonic distortion (THD: Total Harmonic Distortion) of the current and the THD of the voltage. Here, the THD of the current is calculated from Equation (5) below. Further, the THD of the voltage is calculated from Equation (6) below.

$$THD = \sqrt{\sum_{n=2}^{40} \left(\frac{I_n}{I_1}\right)^2} \tag{5}$$

$$THD = \sqrt{\sum_{n=2}^{40} \left(\frac{V_n}{V_1}\right)^2} \tag{6}$$

In Equation (5) above, $I_1$ is a fundamental current. Furthermore, $I_n$ is an n-th order harmonic current.

In Equation (6) above, $V_1$ is a fundamental voltage. Further, $V_n$ is an n-th order harmonic voltage.

For example, the electric line sensor 10S detects the above-described parameter regarding the apparent power at predetermined time intervals. The predetermined time may be any time, but is for example 60 seconds. When detecting the parameter regarding the apparent power, the electric line sensor 10S transmits the information indicating the detected parameter to the instruction server 40Y together with the electric line identification information for identifying the electric line to be detected.

Further, although the one supply-side substation 13 is illustrated in the power system 10 in the illustrated example, the number of the supply-side substations 13 is not limited to the one illustrated. The power system 10 may include the two or more supply-side substations 13 that convert the same or different voltages.

Further, although the one reception-side substation 16 is illustrated in the power system 10 in the illustrated example, the number of the reception-side substations 16 is not limited to the one illustrated. The power system 10 may include the two or more reception-side substations 16 that convert the same voltage or different voltages.

Further, the numbers of the supply-side distribution lines 14 and the reception-side distribution lines 17 are not limited to the illustrated example. The power system 10 may include the supply-side distribution lines 14 and the reception-side distribution lines 17 that are larger in number than those illustrated in the drawing. In this case, the electric line sensor 10S may be provided for each of the supply-side distribution lines 14, or the electric line sensor 10S may be provided for each of the reception-side distribution lines 17.

The power consumption facility 20 is a facility that receives and consumes the power supplied from the power plant 11 through the demander-side distribution line 19. Each of the power consumption facilities 20 includes the heat pump system (HPS: Heat Pump System) 21, the load 22, a setting value sensor 23, and an environment sensor 24.

The HPS 21 uses the power received from the power system 10 to adjust the temperature and humidity. Examples of the target to be adjusted by the HPS 21 include the temperature and humidity of the space in the power consumption facility 20. Further, examples of the target to be adjusted by the HPS 21 include the temperature of the liquid provided in the power consumption facility 20. According to the present embodiment, each of the HPSes 21 includes the power conversion device 212 and the active filter (AF: Active Filter) 214.

The power conversion device 212, which is an example of a conversion unit, includes an inverter (not illustrated) and a converter (not illustrated). The power conversion device 212 uses the inverter and the converter to convert the received power into power having a specific voltage and a specific frequency. The specific voltage and the specific frequency are the voltage and frequency necessary for an operation of a motor (not illustrated) provided in the HPS 21. The power conversion device 212 supplies the converted power to the motor to control the operation of the motor. By this control, the adjustment of the temperature and humidity by the HPS 21 is performed.

The AF 214, which is an example of an adjustment unit, supplies the current to a path through which the power received by the power conversion device 212 passes in the HPS 21, thereby improving the power factor and reducing harmonics in the path. Hereinafter, the path through which the power received by the power conversion device 212 passes in the HPS 21 may be referred to as power reception path.

Furthermore, according to the present embodiment, both the power conversion device 212 and the AF 214 supply the current to the power system 10. The power conversion device 212 and the AF 214 control the operation of the HPS 21 and also supply the current to the electric line in the power system 10 to adjust the above parameter regarding the apparent power in the electric line. In other words, the power conversion device 212 and the AF 214 according to the present embodiment adjust the apparent power in the electric line of the distribution system. Adjusting the apparent power refers to adjusting one or both of the active power and the reactive power. In other words, adjusting the apparent power refers to adjusting at least one of the active power and the reactive power.

An example of the technique for adjusting the parameter regarding the apparent power in the electric line by the HPS 21 will be described. When a harmonic current occurs in the electric line, the power conversion device 212 or the AF 214 in the HPS 21 supplies the current having the phase canceling the harmonic current to the electric line to reduce the harmonic current in the electric line.

Another example of the technique for adjusting the parameter regarding the apparent power in the electric line by the HPS 21 will be described. When a reactive power occurs in the electric line, the power conversion device 212 or the AF 214 in the HPS 21 supplies the current to the electric line to reduce the reactive power in the electric line.

As described above, according to the present embodiment, the HPS 21 is used to adjust the parameter regarding the apparent power in the electric line of the power system 10. Here, as the parameter regarding the apparent power changes, the apparent power also changes. Therefore, in a broad sense, the adjustment of each of the above-described parameters regarding the apparent power may be regarded as the adjustment of the apparent power. Hereinafter, each of the parameters regarding the apparent power to be adjusted may be collectively referred to as "apparent power".

Examples of the HPS 21 include a system that conditions the temperature and humidity. More specific examples of the HPS 21 include devices used in an HVAC (Heating Ventilation and Air Conditioning) system, such as air conditioning apparatuses, showcases for conditioning the internal temperature, coolers, refrigerating machines, and water heaters. In the description below, it is assumed that the HPS 21 is an air conditioning apparatus.

When receiving the instruction to adjust the apparent power in the electric line of the power system 10 from the calculation server 30Y, the HPS 21 adjusts the apparent power in the electric line according to the received instruction.

The load 22 receives and consumes the power supplied from the power plant 11 through the demander-side distribution line 19.

The setting value sensor 23 detects a setting value in the HPS 21. Examples of the setting value in the HPS 21 include the value set in the HPS 21 as the target temperature of the space in the power consumption facility 20 where the HPS 21 is provided, and the value set in the HPS 21 as the target humidity of the space in the power consumption facility 20 where the HPS 21 is provided.

The environment sensor 24 detects the weather, air temperature, and humidity in an area where the HPS 21 is provided.

The setting value sensor 23 and the environment sensor 24 detect the above-described target information at predetermined time intervals. The predetermined time may be any time, but is for example 3 hours. When detecting the target information, the setting value sensor 23 and the environment sensor 24 transmit the detection value information indicating the detection value to the calculation server 30Y together with the HPS identification information for identifying the HPS 21 as a detection target and the time information indicating the date and time when the target information is detected. Here, the detection value information may be regarded as system information on the HPS 21.

Furthermore, when the HPS 21 is not operating at the detection time of the setting value sensor 23, the detection value information is not generated in the setting value sensor 23. In this case, the setting value sensor 23 transmits the HPS identification information and the time information, but does not transmit the detection value information.

Furthermore, the two or more setting value sensors 23 may be provided for each of the HPSes 21, and each of the setting value sensors 23 may detect a different type of setting value. Furthermore, the two or more environment sensors 24 may be provided for each of the HPSes 21, and each of the environment sensors 24 may detect different type of information.

Furthermore, in the illustrated example, the one power consumption facility 20 is provided for each of the demander-side distribution lines 19, but is not limited thereto. The power consumption facilities 20 may be provided for each of the demander-side distribution lines 19. Further, the numbers of the HPSes 21 and the loads 22 provided in the power consumption facility 20 are not limited to the illustrated example. The power consumption facility 20 may include the HPSes 21 and the loads 22 that are larger in number than those illustrated in the drawing. Further, there may be the power consumption facility 20 in which the HPS 21 and the load 22 are not provided.

The calculation server 30Y is a server device that calculates the current value, the current value per unit time, or the current value in a predetermined time that may be supplied by the HPS 21 to adjust the apparent power in the electric line of the power system 10. Furthermore, the current value, the current value per unit time, and the current value in the predetermined time may be simply and collectively referred to as "current value" when they are not distinguished from each other in particular in the description. When the large current value is necessary for improving the apparent power in the electric line of the power system 10, the contribution of the HPS 21 to the improvement of the apparent power in the electric line becomes larger as the current value that may be supplied by the HPS 21 to the electric line is larger. Therefore, the calculation server 30Y uses the detection value information transmitted from the setting value sensor 23 or the environment sensor 24 to calculate the current value that may be supplied by the HPS 21 to adjust the apparent power in the electric line. The current value that may be supplied by the HPS 21 to adjust the apparent power in the electric line of the power system 10 is hereinafter referred to as adjustable amount.

The calculation server 30Y transmits the possible amount information indicating the calculated adjustable amount to the instruction server 40Y together with the HPS identification information for identifying the target HPS 21 and the time information indicating the target date and time. Furthermore, the calculation server 30Y receives, from the instruction server 40Y, the instruction for adjusting the apparent power in the electric line of the power system 10 by the HPS 21. In accordance with the received instruction, the calculation server 30Y gives an instruction to the HPS 21 indicated in the instruction to adjust the apparent power in the electric line of the power system 10. The instruction for adjusting the apparent power is the instruction for adjusting one or both of the active power and the reactive power. In other words, the instruction for adjusting the apparent power refers to the instruction for adjusting at least one of the active power and the reactive power.

The instruction server 40Y is a server device that controls the apparent power in the electric line of the power system 10. When acquiring the information on the detection value transmitted from the electric line sensor 10S, the instruction server 40Y specifies the electric line for which the adjustment of the apparent power is necessary from the acquired information. Furthermore, the instruction server 40Y acquires the possible amount information from the calculation server 30Y. Further, the instruction server 40Y uses the acquired possible amount information to transmit, to the calculation server 30Y, the instruction to the HPS 21 for adjusting the apparent power in the electric line.

The instruction server 40Y and the calculation server 30Y are implemented by, for example, a computer. The instruction server 40Y and the calculation server 30Y may be configured by a single computer or may be implemented by distributed processing using a plurality of computers. Further, the instruction server 40Y and the calculation server 30Y may be implemented on virtual hardware provided by cloud computing. Moreover, in the following description, the instruction server 40Y and the calculation server 30Y may be simply referred to as "servers" when they are not distinguished from each other in particular.

According to the present embodiment, the calculation server 30Y is connected to each of the power consumption facilities 20 and the instruction server 40Y via a network (not illustrated). Further, the instruction server 40Y is connected to each of the electric line sensors 10S via a network (not illustrated). These networks may be any network that enables data transmission and reception. Furthermore, a communication line used for transmitting and receiving data may be wired, wireless, or power line communication (PLC: Power Line Communication). Furthermore, the configuration may include the connection to a communication destination via a plurality of networks or communication lines.

Further, the number of the calculation servers 30Y is not limited to the illustrated example. The power control system 1 may include the two or more calculation servers 30Y. Furthermore, the calculation server 30Y may be provided for each of the power consumption facilities 20, for example.

FIG. 23 is a diagram illustrating a hardware configuration of the calculation server 30Y and the instruction server 40Y.

The server includes the CPU 31, the ROM (Read Only Memory) 32, and the RAM (Random Access Memory) 33. Further, the server includes the storage device 35 that is configured by a hard disk device, or the like, to store information. Further, the server includes the communication device 34 (communication I/F) that performs communications with an external unit.

In addition, the server includes an input device used for inputting information, such as a keyboard and a mouse, and a display device, such as a liquid crystal display.

The ROM 32 and the storage device 35 store programs to be executed by the CPU 31. The CPU 31 reads a program stored in the ROM 32 or the storage device 35 and executes the program using the RAM 33 as a work area.

The CPU 31 executes a program stored in the ROM 32 and the storage device 35 to thus implement each functional unit described below.

Here, the program to be executed by the CPU 31 may be provided to the server by being stored in a computer-readable recording medium such as magnetic recording medium (e.g., magnetic tape and magnetic disk), optical recording medium (e.g., optical disk), magneto-optical recording medium, and semiconductor memory. Further, the program to be executed by the CPU 31 may be provided to the server using a communication unit such as the Internet.

FIG. 24 is a diagram illustrating a functional configuration of the HPS 21.

As described above, the HPS 21 includes the power conversion device 212 and the AF 214. Furthermore, the HPS 21 includes the adjustment unit 211 and the power reception path 213 of the power conversion device 212.

The adjustment unit 211, which is an example of the load, adjusts the temperature and humidity. The adjustment unit 211 includes a motor (not illustrated). The motor operates by receiving the power converted to a specific voltage and a specific frequency by the power conversion device 212.

According to the present embodiment, the AF 214 is electrically connected to the power reception path 213 of the power conversion device 212 in parallel with the power conversion device 212. The AF 214 supplies the current to the power reception path 213 of the power conversion device 212 to adjust the apparent power in the power reception path 213.

FIG. 25 is a diagram illustrating a functional configuration of the calculation server 30Y.

The calculation server 30Y includes an acquisition unit 301Y, a storage unit 302Y, a use amount calculation unit 303Y, a setting value calculation unit 304Y, a possible amount calculation unit 305Y, a margin amount calculation unit 306Y, and a transmission unit 307Y.

The acquisition unit 301Y, which is an example of a system information acquisition unit, acquires the information transmitted to the calculation server 30Y or the information input to the calculation server 30Y. The storage unit 302Y stores the information acquired by the acquisition unit 301Y.

The storage unit 302Y stores information. The information stored in the storage unit 302Y will be described below in detail.

The use amount calculation unit 303Y calculates the current value used in the HPS 21 along with the operation of the HPS 21 to adjust the temperature and humidity. The current value used in the HPS 21 along with the operation of the HPS 21 to adjust the temperature and humidity is hereinafter referred to as use amount. According to the present embodiment, the detection value information is used to calculate the use amount of the HPS 21. More specifically, the use amount calculation unit 303Y calculates the use amount of the power conversion device 212 in HPS 21 and the use amount of the AF 214 in the HPS 21. Furthermore, the use amount calculation unit 303Y calculates the past use amount and the future use amount of the power conversion device 212 or the AF 214.

The setting value calculation unit 304Y calculates the future setting value of the HPS 21. The setting value calculation unit 304Y calculates the future setting value of the HPS 21 based on a prediction result of the future weather, use schedule of the HPS 21, etc.

The possible amount calculation unit 305Y, which is an example of a capability calculation unit, calculates the future adjustable amount of the HPS 21. More specifically, the possible amount calculation unit 305Y calculates the future adjustable amount of the HPS 21 based on the result calculated by the use amount calculation unit 303Y as the future use amount of the HPS 21. Further, the possible amount calculation unit 305Y calculates the adjustable amount of the power conversion device 212 and the adjustable amount of the AF 214.

The margin amount calculation unit 306Y, which is an example of a margin calculation unit, calculates the current value that may be further supplied by the HPS 21 to adjust the apparent power in the electric line when the HPS 21 adjust the apparent power in the electric line. In other words, the margin amount calculation unit 306Y calculates the amount of margin up to the limit of the current value that may be supplied by the HPS 21 to adjust the apparent power in the electric line when the HPS 21 adjusts the apparent power in the electric line. The amount of margin up to the limit of the current value that may be supplied by the HPS 21 to adjust the apparent power in the electric line when the HPS 21 adjusts the apparent power in the electric line is hereinafter referred to as margin amount.

The transmission unit 307Y, which is an example of an output unit, transmits the information generated by the possible amount calculation unit 305Y or the margin amount calculation unit 306Y to the instruction server 40Y.

FIG. 26 is a diagram illustrating a relation management table. The relation management table is a table to manage, for example, the relation between the HPS 21 and the electric line. The storage unit 302Y stores the relation management table.

In the relation management table, "HPS" indicates the HPS identification information. "A" to "J" accompanied with "21" of "HPS" are information for identifying the corresponding ones of the HPSes 21.

Furthermore, in the relation management table, "pass-through electric line" indicates the electric line identification information. The electric line identification information indicated in "pass-through electric line" is the electric line identification information on the electric line that is passed through when the power is supplied to "HP S".

Further, "pass-through electric line" indicates "supply side" and "reception side". "Supply side" refers to being in a position closer to the power supply side in the power system 10 (see FIG. 22) than "reception side". Here, "14" indicated in "supply side" refers to the supply-side distribution line 14. Further, "17" indicated in "reception side" refers to the reception-side distribution line 17. Moreover, "A" to "E" accompanied with "17" are information for identifying the corresponding ones of the reception-side distribution lines 17.

In the relation management table, the ten "HPSes" are associated with "14" of "pass-through electric line", while the two "HPSes" are associated with each of "17A" to "17E" of "pass-through electric line". In other words, according to the present embodiment, the number of the HPSes 21 to which the power is supplied through the one supply-side distribution line 14 is larger than the number of the HPSes 21 to which the power is supplied through the one reception-side distribution line 17.

"Pass-through electric line" in the relation management table is previously set by the user of the power control system 1.

Furthermore, in the relation management table, "capacity" indicates the capacity of the current value that may be generated by the HPS 21. In other words, "capacity" indicates the maximum current value that may be generated by the HPS 21. "Power conversion device" in "capacity" indicates the maximum current value that may be generated by the power conversion device 212. Furthermore, "AF" in "capacity" indicates the maximum current value that may be generated by the AF 214.

"Capacity" in the relation management table is previously set by the user of the power control system 1.

An example of the content of the relation management table will be described. For "HPS" specified from "21A", "14" is associated as "pass-through electric line" of "supply side", "17A" is associated as "pass-through electric line" of "reception side", "10" is associated as "capacity" of "power conversion device", and "20" is associated as "capacity" of "AF".

Furthermore, in the illustrated example, "capacity" of "AF" is larger than "capacity" of "power conversion device" for any "HPS", but is not limited thereto. There may be "HPS" in which "capacity" of "power conversion device" is larger than "capacity" of "AF". Further, there may be "HPS" in which "capacity" of "power conversion device" and "capacity" of "AF" are identical.

FIG. 27A is a diagram illustrating a past information management table, and FIG. 27B is a diagram illustrating a future information management table. The past information management table is a table to manage past information, and the future information management table is a table to manage future information. The storage unit 302Y stores both the past information management table and the future information management table. Furthermore, both the past information management table and the future information management table are provided for each of the HPSes 21. Both the past information management table illustrated in FIG. 27A and the future information management table illustrated in FIG. 27B are targeted for the HPS 21 whose HPS identification information is "21A".

In the following description, it is assumed that the current time is "Feb. 9, 2020".

In the past information management table illustrated in FIG. 27A, "date and time" indicates the date and time indicated in the time information transmitted from the setting value sensor 23 or the environment sensor 24. When the acquisition unit 301Y acquires the time information, the date and time indicated in the acquired time information are written in "date and time" of the past information management table.

Further, in the past information management table, "day of week" indicates the day of week corresponding to "date and time".

Further, in the past information management table, "weather" indicates the weather in the area where the HPS 21 is provided. The "weather" is the weather on the associated "date and time".

Further, in the past information management table, "air temperature (° C.)" indicates the air temperature in the area where the HPS 21 is provided. The "air temperature (° C.)" is the air temperature on the associated "date and time".

Further, in the past information management table, "humidity (%)" indicates the humidity in the area where the HPS 21 is provided. The "humidity (%)" is the humidity on the associated "date and time".

When the acquisition unit 301Y acquires the detection value information transmitted from the environment sensor 24, the detection values indicated in the acquired detection value information are written in "weather", "air temperature (° C.)", and "humidity (%)" of the past information management table.

Further, in the past information management table, "operation history" indicates the operation history of the HPS 21 on "date and time". "O" indicated in "operation history" means that the HPS 21 was operating to adjust the temperature and humidity. Furthermore, "-" indicated in "operation history" means that the HPS 21 was not operating.

Further, in the past information management table, "setting value" indicates the setting value of the HPS 21 on "date and time". "Temperature (° C.)" of "setting value" refers to the setting value of the temperature in the HPS 21. Further, "humidity (%)" in "setting value" refers to the setting value of the humidity in the HPS 21.

When the acquisition unit 301Y acquires the detection value information transmitted from the setting value sensor 23, the detection values indicated in the acquired detection value information are written in "temperature (° C.)" and "humidity (%)" of the past information management table. Moreover, when the detection value information is transmitted from the setting value sensor 23 together with the time information, "O" is written in "operation history" associated with "date and time" indicated in the time information. Conversely, when the time information is transmitted from the setting value sensor 23 but the detection value information is not transmitted, "-" is written in "operation history" associated with "date and time" indicated in the time information.

Furthermore, in the past information management table, "use amount" indicates the use amount calculated by the use amount calculation unit 303Y "Power conversion device" in "use amount" refers to the use amount of the power conversion device 212. Moreover, "AF" in "use amount" refers to the use amount of the AF 214.

An example of the content of the past information management table will be described. With "date and time" specified from "2020/02/03/9:00", "Mon" of "day of week" is associated, "fine" of "weather" is associated, "5" of "air temperature (° C.)" is associated, "45" of "humidity (%)" is associated, "O" of "operation history" is associated, "22" of "setting value" of "temperature (° C.)" is associated, and "60" of "setting value" of "humidity (%)" is associated.

In the future information management table illustrated in FIG. 27B, "date and time" indicates future dates and times at predetermined time intervals. The predetermined time may be any time, but is for example three hours.

Further, in the future information management table, "day of week" indicates the day of the week corresponding to "date and time".

Further, in the future information management table, "prediction weather" indicates the prediction result of the weather in the area where the HPS 21 is provided. The prediction result of the weather is a prediction result of the weather on the associated "date and time".

Further, in the future information management table, "prediction air temperature (° C.)" indicates the prediction result of the air temperature in the area where the HPS 21 is provided. The prediction result of the air temperature is a prediction result of the air temperature on the associated "date and time".

Moreover, in the future information management table, "prediction humidity (%)" indicates the prediction result of the humidity in the area where the HPS 21 is provided. The prediction result of the humidity is a prediction result of the humidity on the associated "date and time".

The calculation server 30Y may acquire, via a network (not illustrated), prediction results of the weather, temperature, and humidity on the target "date and time" in the area where the HPS 21 is provided. Further, the user of the power control system 1 may input the weather, temperature, and humidity on the target "date and time" in the area where the HPS 21 is provided. When the acquisition unit 301Y acquires the prediction results transmitted to the calculation server 30Y and the information input by the user, they are written in "day of week", "prediction weather", "prediction air temperature (° C.)", and "prediction humidity (%)" associated with the target "date and time" in the future information management table.

Further, in the future information management table, "operation schedule" indicates the schedule of the operation of the HPS 21 for adjusting the temperature and humidity. "O" indicated in "operation schedule" means that the HPS 21 is scheduled to operate on the associated "date and time". Further, "-" indicated in "operation schedule" means that the HPS 21 is not scheduled to operate on the associated "date and time".

The calculation server 30Y may acquire information on the operation schedule of the HPS 21 on the target "date and time" via a network (not illustrated). Examples of the information on the operation schedule of the HPS 21 include the information on the target whose temperature or humidity is to be adjusted by the HPS 21. Hereinafter, the information on the target whose temperature or humidity is to be adjusted by the HPS 21 is referred to as target information. Examples of the target information include the information on whether the power consumption facility 20, in which the HPS 21 is provided, is scheduled to be used or not. Furthermore, examples of the target information include the information on whether the specific object is scheduled to be used or not when the HPS 21 adjusts the temperature or humidity of the specific object. Further, when the power consumption facility 20, in which the HPS 21 is provided, is scheduled to be used or the specific object is scheduled to be used, the user of the power control system 1 may input the operation schedule of the HPS 21 on the target "date and time" to generate the target information. When the acquisition unit 301Y acquires the target information transmitted to the calculation server 30Y via the network or the target information input by the user, they are written in "operation schedule" associated with the target "date and time" in the future information management table. Moreover, the target information is information on the HPS 21. Therefore, in a broad sense, the target information may also be regarded as the system information on the HPS 21.

Furthermore, in the future information management table, "prediction setting value" indicates a calculation result by the setting value calculation unit 304Y as a future setting value of the HPS 21. "Temperature (° C.)" of "prediction setting value" is the setting value of the temperature of the HPS 21 on the associated "date and time". Moreover, "humidity (%)" of "prediction setting value" is the setting value of the humidity of the HPS 21 on the associated "date and time".

Furthermore, in the future information management table, "prediction use amount" indicates a calculation result by the use amount calculation unit 303Y as a future use amount of the HPS 21. "Power conversion device" of "prediction use amount" is the use amount of the power conversion device 212 on the associated "date and time". Further, "AF" of "prediction use amount" is the use amount of the AF 214 on the associated "date and time".

Furthermore, in the future information management table, "adjustable amount" indicates a calculation result by the possible amount calculation unit 305Y as an adjustable amount of the HPS 21. "Power conversion device" of "adjustable amount" is the adjustable amount of the power conversion device 212 on the associated "date and time". Moreover, "AF" of "adjustable amount" is the adjustable amount of the AF 214 on the associated "date and time".

An example of the content of the future information management table will be described. With "date and time" specified from "2020/02/10/9:00", "Mon" of "day of week" is associated, "rain" of "prediction weather" is associated, "3" of "prediction air temperature (° C.)" is associated, "85%" of "prediction humidity (%)" is associated, and "O" of "operation schedule" is associated.

(Process of Setting Value Calculation Unit 304Y)

Next, a process of the setting value calculation unit 304Y will be described. The setting value calculation unit 304Y calculates the setting value of the HPS 21 on "date and time" in which "O" is indicated in "operation schedule" in the future information management table (see FIG. 27B).

The setting value calculation unit 304Y may calculate the setting values of the temperature and the humidity of the HPS 21 from the viewpoint of keeping the temperature and the humidity, which are to be adjusted by the HPS 21, at predetermined values. Furthermore, the setting value calculation unit 304Y may calculate the setting values of the temperature and the humidity of the HPS 21 based on the "prediction weather", "prediction air temperature (° C.)", and "prediction humidity (%)" on the target "date and time". Further, when the heating function is used as the HPS 21, the setting value calculation unit 304Y may calculate a higher setting value of the temperature of the HPS 21 as "prediction air temperature (° C.)" on the target "date and time" is lower. Further, when the cooling function is used as the HPS 21, the setting value calculation unit 304Y may calculate a lower setting value of the temperature of the HPS 21 as "prediction air temperature (° C.)" on the target "date and time" is higher. Further, the setting value calculation unit 304Y may calculate a lower setting value of the humidity of the HPS 21 as "prediction humidity (%)" on the target "date and time" is higher or may calculate a higher setting value of the humidity of the HPS 21 as "prediction humidity (%)" on the target "date and time" is lower.

Further, the setting value calculation unit 304Y may use the information in the past information management table (see FIG. 27A) to calculate the future setting value of the HPS 21. The setting value calculation unit 304Y extracts "date and time" in the past information management table associated with "day of week", "weather", "air temperature (° C.)", and "humidity (%)" identical to or similar to "day of week", "prediction weather", "prediction air temperature (° C.)", and "prediction humidity (%)" on the target "date and time" in the future information management table. Further, the setting value on the target "date and time" may be calculated based on "setting value" associated with the extracted "date and time".

When the setting value calculation unit 304Y calculates the setting value of the HPS 21 in each "date and time", as illustrated in FIG. 28A, the calculation results by the setting value calculation unit 304Y are written in "temperature (° C.)" and "humidity (%)" in "prediction setting value" of the future information management table.

(Process of Use Amount Calculation Unit 303Y)

Next, a process of the use amount calculation unit 303Y will be described.

The use amount calculation unit 303Y calculates the use amount of the HPS 21 on each "date and time" in the past information management table (see FIG. 27A).

The use amount calculation unit 303Y uses the information on "weather", "air temperature (° C.)", "humidity (%)", "operation history", and "setting value" associated with the target "date and time" to calculate the use amount of the power conversion device 212 and the use amount of the AF 214 on the "date and time". The use amount calculation unit 303Y may calculate a larger use amount of the power conversion device 212 on the "date and time" as there is a larger difference between "air temperature (° C.)" and "humidity (%)" associated with the target "date and time" and "temperature (° C.)" and "humidity (%)" in "setting value". Furthermore, the use amount calculation unit 303Y calculates the use amount of the AF 214 based on the calculated use amount of the power conversion device 212. The use amount calculation unit 303Y may calculate a larger use amount of the AF 214 as the use amount of the power conversion device 212 is larger. Moreover, when "-" is indicated in "operation history" associated with the target "date and time", the use amount calculation unit 303Y calculates both the use amount of the power conversion device 212 and the use amount of the AF 214 on the "date and time" as "0".

When the use amount calculation unit 303Y calculates the use amount of the power conversion device 212 and the use amount of the AF 214 on each "date and time", as illustrated in FIG. 28B, the calculation results by the use amount calculation unit 303Y are written in "use amount" of "power conversion device" and "AF" in the past information management table.

Further, "use amount" written in the past information management table may be an actually measured value of the use amount. In this case, the setting value sensor 23 detects the use amount of the power conversion device 212 and the use amount of the AF 214 on each "date and time". When the acquisition unit 301Y acquires the detection value detected by the setting value sensor 23, the detection values are written in "use amount" of "power conversion device" and "AF" associated with each "date and time" in the past information management table.

Further, the use amount calculation unit 303Y calculates the use amount of the HPS 21 on each "date and time" in the future information management table (see FIG. 28A).

The use amount calculation unit 303Y uses the information on "prediction weather", "prediction air temperature (° C.)", "prediction humidity (%)", "operation schedule", and "prediction set value" associated with the target "date and time" to calculate the use amount of the power conversion device 212 and the use amount of the AF 214 on the "date and time". The use amount calculation unit 303Y may calculate the use amount of the power conversion device 212 and the use amount of the AF 214 in the future by using the same technique as the technique described above for the calculation of the use amount in the past.

Further, the use amount calculation unit 303Y may use the information in the past information management table to calculate the use amount of the power conversion device 212 and the use amount of the AF 214 in the future. The use amount calculation unit 303Y extracts "date and time" in the past information management table associated with "day of week", "weather", "air temperature (° C.)", "humidity (%)", and "setting value" that are identical to or close to "day of week", "prediction weather", "prediction air temperature (° C.)", "prediction humidity (%)", and "prediction setting value" on the target "date and time" in the future information management table. Further, the use amount on the target "date and time" may be calculated based on "use amount" associated with the extracted "date and time".

When the use amount calculation unit 303Y calculates the use amount of the power conversion device 212 and the use amount of the AF 214 on each "date and time", as illustrated in FIG. 28C, the calculation results by the use amount calculation unit 303Y are written in "prediction use amount"

of "power conversion device" and "AF" in the future information management table.

FIG. 29 is a flowchart illustrating a flow of a possible amount calculation process. The possible amount calculation process is a process in which the possible amount calculation unit 305Y calculates the adjustable amount of the HPS 21. According to the present embodiment, when the instruction server 40Y transmits, to the calculation server 30Y, the request for adjusting the apparent power in the specific electric line of the power system 10, the possible amount calculation process is started. Furthermore, the request transmitted from the instruction server 40Y to the calculation server 30Y includes the electric line identification information for identifying the electric line to be adjusted.

The possible amount calculation unit 305Y extracts the HPS 21 associated with the electric line that is the target of the adjustment requested from the instruction server 40Y (Step (hereinafter referred to as "S") 701). More specifically, the possible amount calculation unit 305Y refers to the relation management table (see FIG. 26). Further, the HPS 21 is extracted, which is specified from "HPS" for which the electric line identification information on the electric line to be adjusted is associated with "pass-through electric line".

The possible amount calculation unit 305Y uses the future information management table (see FIG. 28C) targeted for the extracted HPS 21 to calculate the adjustable amount of the HPS 21 (S702).

An example of the technique for calculating the adjustable amount by the possible amount calculation unit 305Y will be described. An example of calculating the use amount of the power conversion device 212 and the use amount of the AF 214 in "2020/02/10/9:00" in the HPS 21 "21A" will be described below.

The possible amount calculation unit 305Y refers to the relation management table (see FIG. 26). Further, "prediction use amount" associated with the target "date and time" in the future information management table (see FIG. 28C) is subtracted from "capacity" associated with the target "HPS" to calculate the adjustable amount of the HPS 21 on the target "date and time". In this example, "3" that is "prediction use amount" of "power conversion device" associated with "2020/02/10/9:00" that is the target "date and time" in the future information management table is subtracted from "10" that is "capacity" of "power conversion device" associated with "21A" in the relation management table. Then, the value "10−3=7" obtained by the subtraction is set as the adjustable amount of the power conversion device 212. Similarly, the adjustable amount of "AF" in "2020/02/10/9:00" is calculated as "20−6=14".

The possible amount calculation unit 305Y calculates the adjustable amount of the power conversion device 212 and the adjustable amount of the AF 214 on each "date and time" in the future information management table (see FIG. 28C). Although not illustrated, the possible amount calculation unit 305Y calculates the adjustable amount for each of the HPSes 21 extracted in Step 701.

When the possible amount calculation unit 305Y calculates the adjustable amount of the power conversion device 212 and the adjustable amount of the AF 214 on each "date and time", as illustrated in FIG. 30, the calculation results by the possible amount calculation unit 305Y are written in "adjustable amount" of "power conversion device" and "AF" in the future information management table.

The possible amount calculation unit 305Y determines whether the calculated adjustable amount satisfies a transmission condition (S703). The transmission condition is a condition set for determining whether the information on the adjustable amount calculated by the possible amount calculation unit 305Y is to be transmitted to the instruction server 40Y. According to the present embodiment, the transmission condition is set such that the adjustable amount is equal to or more than a predetermined rate with respect to the current value necessary for adjusting the apparent power in the electric line. The predetermined rate may be any rate, but is for example 1% or more.

The possible amount calculation unit 305Y determines whether the transmission condition is satisfied for each calculated adjustable amount.

The transmission unit 307Y transmits, to the instruction server 40Y, the possible amount information indicating the adjustable amount that satisfies the transmission condition together with the time information indicating "date and time" associated with the adjustable amount and the HPS identification information identifying the target HPS 21 (S704). Conversely, the transmission unit 307Y does not transmit, to the instruction server 40Y, the information on the adjustable amount that does not satisfy the transmission condition.

Based on the possible amount information, the time information, and the HPS identification information transmitted from the calculation server 30Y, the instruction server 40Y determines the HPS 21 to be used for the adjustment of the apparent power in the electric line, the current value to be supplied for the adjustment, and the time zone to be adjusted. Further, the instruction server 40Y transmits, to the calculation server 30Y, the instruction to the HPS 21 for adjusting the apparent power in the electric line. This instruction includes the HPS identification information on the HPS 21 to be used for the adjustment of the apparent power in the electric line and the information such as the current value to be supplied for the adjustment and the time zone to be adjusted. Furthermore, the information on the current value to be supplied for the adjustment includes the information on the current value to be supplied by the power conversion device 212 and the information on the current value to be supplied by the AF 214. When receiving the instruction, the calculation server 30Y gives an instruction to the HPS 21, which is the instruction target, to adjust the apparent power in the electric line by using the current value indicated in the instruction in the time zone indicated in the instruction. When receiving the instruction, the HPS 21 supplies the current from the power conversion device 212 or the AF 214 to the electric line.

As described above, according to the present embodiment, the possible amount calculation unit 305Y calculates, based on the system information, the index regarding the capability of adjustment of the apparent power in the electric line when the HPS 21 adjusts the temperature and humidity. The index is, for example, the adjustable amount.

In this case, the instruction server 40Y may determine the current value to be supplied by the HPS 21 to adjust the apparent power in the electric line of the power system 10 based on the adjustable amount calculated by the possible amount calculation unit 305Y. Further, the HPS 21 supplies the current value determined by the instruction server 40Y to the electric line in accordance with the instruction of the instruction server 40Y. Therefore, when the HPS 21 adjusts the temperature and humidity, it is possible to achieve the adjustment of the apparent power in the electric line of the power system 10 by the HPS 21.

Furthermore, according to the present embodiment, the possible amount calculation unit 305Y determines whether the calculated adjustable amount satisfies the transmission condition. Further, the transmission unit 307Y transmits, to the instruction server 40Y, the possible amount information indicating the adjustable amount for which the possible amount calculation unit 305Y has determined that the transmission condition is satisfied. That is, according to the present embodiment, the transmission unit 307Y outputs the possible amount information regarding the adjustable amount that satisfies the condition set for the adjustment of the apparent power.

In this case, as compared with the case where the possible amount information is output regardless of whether the adjustable amount satisfies the transmission condition, it is possible to suppress output of the possible amount information having the content unsuitable for the adjustment of the apparent power in the electric line.

Furthermore, according to the present embodiment, the possible amount information on the adjustable amount for the HPS 21 that receives the power through the electric line, which is the target of the adjustment of the apparent power, is transmitted to the instruction server 40Y. In other words, according to the present embodiment, the condition for the transmission unit 307Y to output the possible amount information is that the adjustable amount indicated in the possible amount information is the adjustable amount calculated for the HPS 21 that receives the power through the electric line that is the target of the adjustment of the apparent power.

In this case, as compared with the case where the possible amount information is output regardless of whether the adjustable amount satisfies the condition, it is possible to suppress output of the possible amount information for the HPS 21 that does not receive the power through the electric line that is the adjustment target.

Furthermore, according to the present embodiment, the transmission condition is set for the capability to adjust the apparent power.

In this case, as compared with the case where the possible amount information is output regardless of whether the adjustable amount satisfies the transmission condition, it is possible to suppress the output of the possible amount information that is not suitable for the capability to adjust the apparent power in the electric line.

Further, according to the present embodiment, the transmission condition is set based on the relation between the capability to adjust the apparent power and the degree of adjustment necessary for the apparent power in the electric line of the power system 10.

In this case, as compared with the case where the possible amount information is output regardless of whether the adjustable amount satisfies the transmission condition, it is possible to suppress the output of the possible amount information that is not suitable for the relation between the adjustable amount and the degree of necessary adjustment.

Further, according to the present embodiment, the possible amount calculation unit 305Y calculates the adjustable amount by the power conversion device 212 and the adjustable amount by the AF 214.

In this case, the instruction server 40Y may determine the current value to be supplied by the power conversion device 212 and the current value to be supplied by the AF 214 to adjust the apparent power in the electric line of the power system 10 based on the adjustable amount calculated by the possible amount calculation unit 305Y. Moreover, the power conversion device 212 and the AF 214 supply the current value determined by the instruction server 40Y to the electric line in accordance with the instruction from the instruction server 40Y. Therefore, when the HPS 21 adjusts the temperature and the humidity, it is possible to achieve the adjustment of the apparent power in the electric line of the power system 10 by the power conversion device 212 and the AF 214.

Furthermore, according to the present embodiment, the system information includes the target information on the target whose temperature and humidity are adjusted by the HPS 21.

In this case, as compared with the case where the adjustable amount is calculated without using the target information by the possible amount calculation unit 305Y, it is possible to calculate the adjustable amount suitable for the target whose temperature and humidity are adjusted by the HPS 21.

Furthermore, according to the present embodiment, the possible amount calculation unit 305Y calculates the subtraction value of "prediction use amount" indicated in the future information management table (see FIG. 28C) with respect to the capacity as the adjustable amount for both the power conversion device 212 and the AF 214, but is not limited thereto.

The possible amount calculation unit 305Y may further subtract a correction factor from the above-described subtraction value, which is calculated for the power conversion device 212, to calculate the adjustable amount of the power conversion device 212. The correction factor may be determined based on the current value to be supplied by the power conversion device 212 to adjust the temperature and humidity. Further, the possible amount calculation unit 305Y may calculate the adjustable amount of the power conversion device 212 so as to be lower than the adjustable amount of the AF 214. In this case, the adjustable amount of the AF 214 may be regarded as a first index regarding a predetermined capability. Moreover, the adjustable amount of the power conversion device 212 may be regarded as a second index regarding a capability lower than the capability of the AF 214.

When the calculated adjustable amount of the power conversion device 212 is larger than the adjustable amount of the AF 214, the current value supplied by the power conversion device 212 may be larger than the current value supplied by the AF 214 to adjust the apparent power in the electric line based on the calculation result. In this case, the current value supplied from the power conversion device 212 to the motor (not illustrated) of the adjustment unit 211 becomes small, which may affect the function of adjusting the temperature and humidity by the HPS 21.

Therefore, the calculated adjustable amount of the power conversion device 212 is made lower than the adjustable amount of the AF 214 so that it is possible to suppress the effect on the function of adjusting the temperature and humidity by the HPS 21.

FIG. 31A is a diagram illustrating a during-adjustment management table. The during-adjustment management table is a table to manage the HPS 21 by which the apparent power in the electric line of the power system 10 is being adjusted. The storage unit 302Y stores the during-adjustment management table. Furthermore, it is assumed below that, in 0:00 on Feb. 10, 2020, the power conversion device 212 in the HPS 21 "21A" supplies a current of "5", and the AF 214 supplies a current of "10" so that the HPS 21 adjusts the apparent power in the electric line.

In the during-adjustment management table, "date and time" indicates the present time and future dates and times at predetermined time intervals. The predetermined time may be any time, but is for example three hours.

Furthermore, in the during-adjustment management table, "prediction use amount" indicates the calculation result of the use amount calculation unit 303Y as the use amount of the HPS 21 on "date and time". The "prediction use amount" is the same information as "prediction use amount" in the future information management table (see FIG. 28C).

Further, in the during-adjustment management table, "prediction adjustment amount" indicates the prediction value of the current supplied by the HPS 21 to adjust the apparent power in the electric line. The prediction value is a prediction value on the associated "date and time". Here, "power conversion device" in "prediction adjustment amount" is a prediction value of the current supplied by the power conversion device 212. Moreover, "AF" in "prediction adjustment amount" is a prediction value of the current supplied by the AF 214. According to the present embodiment, the current value being supplied by the HPS 21 is written in "prediction adjustment amount" on each "date and time".

Furthermore, in the during-adjustment management table, "margin amount" indicates the calculation result by the margin amount calculation unit 306Y as a margin amount of the HPS 21. The margin amount is the margin amount on the associated "date and time". "Power conversion device" in "margin amount" is the margin amount of the power conversion device 212. Moreover, "AF" in "margin amount" is the margin amount of the AF 214.

Furthermore, in the during-adjustment management table, "threshold" indicates the threshold for the margin amount. The threshold is used to determine whether to transmit a warning about the margin amount to the instruction server 40Y. "Power conversion device" in "threshold" is the threshold for the margin amount of the power conversion device 212. Furthermore, "AF" in "threshold" is the threshold for the margin amount of the AF 214.

"Threshold" is set by the calculation server 30Y based on the operating live of the power conversion device 212 or the AF 214. A higher "threshold" may be set as the operating life of the power conversion device 212 or the AF 214 is closer to the limit. Further, the operating lives of the power conversion device 212 and the AF 214 may be set based on the voltage value applied to the power conversion device 212 or the AF 214, the use period of the power conversion device 212 or the AF 214, the ambient temperature of the HPS 21, etc.

Moreover, "threshold" is set based on the degree to which the power conversion device 212 or the AF 214 is used to adjust the temperature or humidity. A higher "threshold" may be set as "prediction use amount" is larger. In the illustrated example, in "power conversion device" and "AF", "threshold" associated with "prediction use amount" indicating a value of 2 or more is set to be larger than "threshold" associated with "prediction use amount" of "0".

(Process of Margin Amount Calculation Unit 306Y)

Next, a process of the margin amount calculation unit 306Y will be described.

The margin amount calculation unit 306Y calculates the margin amount of the HPS 21 by using the during-adjustment management table.

An example of the technique for calculating the margin amount of the HPS 21 by the margin amount calculation unit 306Y will be described. The technique for calculating the margin amount of "power conversion device" and the margin amount of "AF" in the HPS 21 "21A" in "2020/02/10/9:00" will be described below.

The margin amount calculation unit 306Y calculates the relation management table (see FIG. 26). Further, "prediction adjustment amount" associated with the target "date and time" in the during-adjustment management table (see FIG.

31A) is subtracted from "capacity" associated with the target "HPS" to calculate the margin amount of the HPS 21 on the target "date and time". In this example, "5" that is "prediction adjustment amount" of "power conversion device" associated with "2020/02/10/9:00", which is the target "date and time" in the during-adjustment management table is subtracted from "10" that is "capacity" of "power conversion device" associated with "21A" in the relation management table. Further, the value "10-5=5" obtained by the subtraction is set as the margin amount of the power conversion device 212. Similarly, the margin amount of "AF" in "2020/02/10/9:00" is calculated as "20-10=10".

The margin amount calculation unit 306Y calculates the margin amount of the power conversion device 212 and the margin amount of the AF 214 on each "date and time" in the during-adjustment management table. Although not illustrated, the margin amount calculation unit 306Y calculates the margin amount for each of the HPSes 21 used for the adjustment of the apparent power in the electric line of the power system 10.

When the margin amount calculation unit 306Y calculates the margin amount of the power conversion device 212 and the margin amount of the AF 214 on each "date and time", as illustrated in FIGS. 31A and 31B, the calculation results by the margin amount calculation unit 306Y are written in "margin amounts" of "power conversion device" and "AF" in the during-adjustment management table.

Furthermore, when calculating the margin amount, the margin amount calculation unit 306Y determines whether the calculated margin amount has reached the threshold. More specifically, the margin amount calculation unit 306Y extracts "margin amount" indicating a value equal to or less than "threshold" on each "date and time". Further, the transmission unit 307Y transmits, to the instruction server 40Y, the warning information regarding the extracted "margin amount" together with the time information indicating "date and time" associated with the "margin amount" and the HPS identification information for identifying the target HPS 21. The warning information may be information for notifying the instruction server 40Y that the margin amount of the HPS 21 becomes insufficient on the target "date and time" when the target HPS 21 is used for the adjustment of the temperature and humidity.

In this example, the warnings are transmitted for "margin amount" of "power conversion device" and "margin amount" of "AF" in "2020/02/10/9:00" and "margin amount" of "power conversion device" and "margin amount" of "AF" in "2020/02/10/18:00" for which "margin amount" is equal to or less than "threshold".

Furthermore, the transmission unit 307Y may transmit, to the instruction server 40Y, the information indicating the margin amount calculated by the margin amount calculation unit 306Y together with the time information indicating "date and time" associated with the margin amount and the HPS identification information for identifying the target HPS 21. The instruction server 40Y appropriately changes the current value to be supplied by the HPS 21 under adjustment based on the information on the margin amount transmitted from the transmission unit 307Y.

As described above, according to the present embodiment, the margin amount calculation unit 306Y calculates the index regarding the margin of the capability of the adjustment in a case where the HPS 21 adjusts the apparent power in the electric line. The index is, for example, the margin amount.

In this case, the instruction server 40Y may change the current value to be supplied by the HPS 21 to adjust the apparent power in the electric line of the power system 10 based on the margin amount calculated by the margin amount calculation unit 306Y.

Furthermore, according to the present embodiment, the margin amount calculation unit 306Y determines whether the calculated margin amount has reached the threshold. Further, the transmission unit 307Y transmits, to the instruction server 40Y, the information on the warning about the margin amount that has reached the threshold as determined by the margin amount calculation unit 306Y. In other words, according to the present embodiment, the transmission unit 307Y outputs the information on the HPS 21 when the margin amount satisfies the condition set for the margin. The condition set for the margin is, for example, that the margin amount has reached the threshold.

In this case, as compared with the case where the information on the margin amount is output regardless of whether the margin amount calculated by the margin amount calculation unit 306Y satisfies the condition, it is possible to suppress the output of the information on the HPS 21 for which the margin amount having the content unsuitable for the change of the current value to be supplied by the HPS 21 is calculated.

Further, according to the present embodiment, the condition set for the margin is set based on the operating life regarding the HPS 21.

In this case, it is possible to change the current value supplied by the HPS 21 to adjust the apparent power in the electric line in consideration of the operating life regarding the HPS 21.

Further, according to the present embodiment, the condition set for the margin is set based on the use of the HPS 21 for adjusting the temperature and the humidity.

In this case, it is possible to change the current value to be supplied by the HPS 21 to adjust the apparent power in the electric line in consideration of the use of the HPS 21 for adjustment of the temperature and humidity.

Moreover, in the description according to the present embodiment, the setting value calculation unit 304Y calculates the future setting value of the HPS 21, the use amount calculation unit 303Y calculates the future use amount of the HPS 21, and the possible amount calculation unit 305Y calculates the future adjustable amount of the HPS 21, but is not limited thereto.

The setting value calculation unit 304Y may calculate the setting value of the HPS 21 at the current time. Furthermore, the use amount calculation unit 303Y may calculate the use amount of the HPS 21 at the current time. Further, the possible amount calculation unit 305Y may calculate the adjustable amount of the HPS 21 at the current time. Here, the "index regarding the capability of adjustment of the apparent power in the electric line when the HPS 21 adjusts the temperature and/or humidity" includes not only the future adjustable amount but also the adjustable amount at the current time.

Furthermore, according to the present embodiment, the possible amount calculation process (see FIG. 29) is started when the instruction server 40Y requests the calculation server 30Y to adjust the apparent power in a state where the calculation of the use amount by the use amount calculation unit 303Y and the calculation of the setting value by the setting value calculation unit 304Y have been previously performed, but is not limited thereto.

The instruction server 40Y may request the calculation server 30Y to adjust the apparent power in a state where the calculation of the use amount by the use amount calculation unit 303Y and the calculation of the setting value by the setting value calculation unit 304Y have not been performed. In this case, when the calculation server 30Y receives the request for adjustment, the calculation of the use amount by the use amount calculation unit 303Y and the calculation of the setting value by the setting value calculation unit 304Y are performed. Further, the possible amount calculation unit 305Y calculates the adjustable amount based on the calculation results of the use amount calculation unit 303Y and the setting value calculation unit 304Y.

Further, the calculation of the use amount by the use amount calculation unit 303Y, the calculation of the setting value by the setting value calculation unit 304Y, and the calculation of the adjustable amount by the possible amount calculation unit 305Y may be performed in a state where the instruction server 40Y has not requested the calculation server 30Y to adjust the apparent power. In this case, the transmission unit 307Y may transmit, to the instruction server 40Y, the information on the adjustable amount in a state where the instruction server 40Y have not requested the calculation server 30Y to adjust the apparent power.

Furthermore, according to the present embodiment, the information on the adjustable amount that satisfies the transmission condition is transmitted to the instruction server 40Y, but the information on the adjustable amount may be transmitted to the instruction server 40Y regardless of whether the adjustable amount satisfies the transmission condition.

Moreover, according to the present embodiment, the information on the margin amount that has reached the threshold is transmitted to the instruction server 40Y, but the information on the margin amount may be transmitted to the instruction server 40Y regardless of whether the margin amount has reached the threshold.

Furthermore, "prediction adjustment amount" on each "date and time" in the during-adjustment management table (see FIG. 31B) may be updated each time the instruction of the current value to be supplied by the HPS 21 for adjustment of the apparent power in the electric line of the power system 10 is changed. In this case, each time "prediction adjustment amount" is updated, the margin amount calculation unit 306Y may determine whether to calculate the margin amount and transmit the information on the margin amount to the instruction server 40Y based on the updated "prediction adjustment amount".

Further, according to the present embodiment, the possible amount calculation unit 305Y calculates the adjustable amount of the power conversion device 212 smaller than the adjustable amount of the AF 214, but is not limited thereto. The possible amount calculation unit 305Y may calculate the adjustable amount of the power conversion device 212 larger than the adjustable amount of the AF 214.

Further, "operation schedule" may be written in the future information management table illustrated in FIG. 27B by a technique different from the above-described technique.

The calculation server 30Y may estimate the future operation schedule of the HPS 21 based on a result of machine learning. More specifically, the calculation server 30Y uses, as teaching data, "day of week" of the specific "date and time" in the past information management table (see FIG. 27A), information such as the presence or absence of use of the power consumption facility 20 where the HPS 21 is provided on the "date and time", and "operation history" on the "date and time" to learn the relation among "day of week", the presence or absence of use of the power consumption facility 20, and the presence or absence of operation of the HPS 21. Based on the learning result, the calculation server 30Y generates a learning model that outputs the operation schedule of the HPS 21 by using, as inputs, "day of week" on the specific "date and time" in the future information management table and the presence or absence of use schedule of the power consumption facility 20 on "date and time". Furthermore, based on the generated learning model, the operation schedule of the HPS 21 on the "date and time" may be estimated from "day of week" on the specific "date and time" in the future information management table or the presence or absence of use schedule of the power consumption facility 20 on the "date and time". Further, the estimated operation schedule may be written in "operation schedule" on the "date and time".

Furthermore, "prediction setting value" may be written in the future information management table illustrated in FIG. 27B by a technique different from the above-described technique.

The setting value calculation unit 304Y may estimate the future setting value of the HPS 21 based on a result of machine learning. More specifically, the setting value calculation unit 304Y uses, as teaching data, "date and time", "day of week", "weather", "air temperature (° C.)", "humidity (%)", "operation history", and "setting value", which are associated with each other in the past information management table (see FIG. 27A) to learn the relation between the setting value of the HPS 21 and "date and time", "day of week", "weather", "air temperature (° C.)", "humidity (%)", and "operation history". Based on the learning result, the setting value calculation unit 304Y generates a learning model that uses, as inputs, "date and time", "day of week", "prediction weather", "prediction air temperature (° C.)", "prediction humidity (%)", and "operation schedule", which are associated with each other in the future information management table, to output the setting value of the HPS 21. Furthermore, based on the generated learning model, the setting value of the HPS 21 on the specific "date and time" in the future information management table may be estimated from "day of week", "prediction weather", "prediction air temperature (° C.)", "prediction humidity (%)", and "operation schedule" on the "date and time". Further, the estimated setting value may be written in "prediction setting value" on the "date and time".

Further, "prediction use amount" may be written in the future information management table illustrated in FIG. 28A by a technique different from the above-described technique.

The use amount calculation unit 303Y may estimate the future use amount of the HPS 21 based on a result of machine learning. More specifically, the use amount calculation unit 303Y uses, as teaching data, "date and time", "day of week", "weather", "air temperature (° C.)", "humidity (%)", "operation history", "setting value", and "use amount", which are associated with each other in the past information management table (see FIG. 28B), to learn the relation between the use amount of the HPS 21 and "date and time", "day of week", "weather", "air temperature (° C.)", "humidity (%)", "operation history", and "setting value". Based on the learning result, the use amount calculation unit 303Y generates a learning model that uses, as inputs, "date and time", "day of week", "prediction weather", "prediction air temperature (° C.)", "prediction humidity (%)", "operation schedule", and "prediction setting value", which are associated with each other in the future information management table, to output the use amount of the HPS 21. Further, based on the generated learning model, the use amount of the HPS 21 on the specific "date and time" in the future information management table may be estimated from "day of week", "prediction weather", "prediction air temperature (° C.)", "prediction humidity (%)", "operation schedule", and "prediction setting value" on the "date and time". Further, the estimated use amount may be written in "prediction use amount" on the "date and time".

Further, according to the present embodiment, the calculation server 30Y is configured to calculate the capability of the HPS 21 to adjust the apparent power in the electric line of the power system 10, but is not limited thereto.

For example, the HPS 21 may have the function of the calculation server 30Y. In other words, the HPS 21 may include the CPU 31 (see FIG. 23), the ROM 32, the RAM 33, the communication device 34, and the storage device 35 to perform various functions. Moreover, the HPS 21 may have the functions of the acquisition unit 301Y, the storage unit 302Y, the use amount calculation unit 303Y, the setting value calculation unit 304Y, the possible amount calculation unit 305Y, the margin amount calculation unit 306Y, the transmission unit 307Y, and the like, of the calculation server 30Y.

Furthermore, in the example described according to the present disclosure, the parameters such as the use amount, the adjustable amount, and the margin amount are the current values, but is not limited thereto. Each parameter may be any of the parameters described above as parameters regarding the apparent power.

Fifth Embodiment

An embodiment will be described below with reference to the accompanying drawings.

FIG. 32 is a diagram illustrating an example of the power control system 1 according to a fifth embodiment.

The power control system 1, which is an example of an information processing system, is a system that controls apparent power.

The power control system 1 includes the power system 10, a plurality of the power consumption facilities 20, a control server 30Z, and a management server 40Z.

The power system 10 is a system in which a facility is provided to supply the power to a power demander. The power system 10 includes the power plant 11, the transmission line 12, the supply-side substation 13, the supply-side distribution line 14, the automatic voltage regulator (SVR: Step Voltage Regulator) 15, the reception-side substation 16, the reception-side distribution line 17, the pole transformer 18, and the demander-side distribution line 19.

The power plant 11 is a facility that generates power. Examples of the power plant 11 include a thermal power plant, a hydraulic power plant, a nuclear power plant, a solar power plant, a wind power plant, and a geothermal power plant.

The transmission line 12 is a line to flow the current forming the power generated by the power plant 11. The transmission line 12 is provided from the power plant 11 to the supply-side substation 13.

The supply-side substation 13 is a facility that converts the voltage. The supply-side substation 13 is provided closer to the power supply side than the reception-side substation 16. According to the present embodiment, the facility located closest to the power supply side is the power plant 11. Furthermore, the facility located closest to the power reception side is the power consumption facility 20.

The supply-side substation 13 converts the voltage supplied through the transmission line 12. Examples of the supply-side substation 13 include a substation that converts a voltage of 500000 V into 154000 V, a substation that converts a voltage of 154000 V into 66000 V, and a substation that converts a voltage of 66000 V into 22000 V.

The supply-side distribution line 14, which is an example of the electric path, is a line to flow the current generated by applying the voltage converted by the supply-side substation 13. The supply-side distribution line 14 is provided from the supply-side substation 13 to the reception-side substation 16. Furthermore, the supply-side distribution line 14 is provided closer to the power supply side than the reception-side distribution line 17.

The SVR 15 regulates the voltage supplied to the supply-side distribution line 14. More specifically, the SVR 15 detects the voltage supplied to the supply-side distribution line 14. Further, when the detected voltage does not fall within a predetermined range, the SVR 15 regulates the voltage such that the voltage falls within the predetermined range.

The reception-side substation 16 is a facility that converts the voltage supplied through the supply-side distribution line 14. Examples of the reception-side substation 16 include a substation that converts the supplied voltage into 6600 V.

The reception-side distribution line 17, which is an example of the electric path, is a line to flow the current generated by applying the voltage converted by the reception-side substation 16. The reception-side distribution line 17 is provided from the reception-side substation 16 to the pole transformer 18.

The pole transformer 18 is a facility that converts the voltage supplied through the reception-side distribution line 17. Examples of the pole transformer 18 include a transformer that converts a voltage of 6600 V to 200 V and a transformer that converts a voltage of 6600 V to 100 V.

The demander-side distribution line 19 is a line to flow the current generated when the voltage converted by the pole transformer 18 is applied. The power system 10 includes a plurality of the demander-side distribution lines 19. More specifically, the demander-side distribution line 19 is provided for each of the power consumption facilities 20. Each of the demander-side distribution lines 19 is provided from the pole transformer 18 to the power consumption facility 20.

As described above, the power system 10 is a system provided outside the power consumption facility 20 and is a system that distributes the generated power to demanders of the power.

Furthermore, the power system 10 includes the plurality of electric line sensors 10S. The electric line sensor 10S is coupled to the supply-side distribution line 14. More specifically, the electric line sensor 10S is coupled to a portion of the supply-side distribution line 14 closer to the power supply side than the SVR 15. Moreover, the electric line sensors 10S are coupled to the reception-side distribution lines 17, respectively. In other words, the electric line sensor 10S is provided for each of the supply-side distribution line 14 and the reception-side distribution line 17.

The electric line sensor 10S detects a parameter regarding the apparent power in the coupled supply-side distribution line 14 or the reception-side distribution line 17. The parameter regarding the apparent power is a parameter that affects the apparent power. Examples of the parameter regarding the apparent power include apparent power, reactive power, reactive voltage, harmonic voltage, current, power factor, apparent power amount and reactive power amount in a predetermined period, and the like. The current as a parameter regarding the apparent power includes a harmonic current. Furthermore, examples of the harmonic voltage and the harmonic current include a high-order harmonic voltage and a high-order harmonic current. Examples of the high order include an order of a harmonic higher than a predetermined order. Furthermore, the predetermined order is, for example, the 13th order. Moreover, examples of the harmonic voltage and the harmonic current include a low-order harmonic voltage and a low-order harmonic current. Examples of the low order include an order equal to or less than a predetermined order.

Further, examples of the parameter regarding the apparent power include a total harmonic distortion (THD: Total Harmonic Distortion) of the current and the THD of the voltage. Here, the THD of the current is calculated from Equation (7) below. Further, the THD of the voltage is calculated from Equation (8) below.

$$THD = \sqrt{\sum_{n=2}^{40} \left(\frac{I_n}{I_1}\right)^2} \tag{7}$$

$$THD = \sqrt{\sum_{n=2}^{40} \left(\frac{V_n}{V_1}\right)^2} \tag{8}$$

In Equation (7) above, $I_1$ is a fundamental current. Furthermore, $I_n$ is an n-th order harmonic current.

In Equation (8) above, $V_1$ is a fundamental voltage. Further, $V_n$ is an n-th order harmonic voltage.

For example, the electric line sensor 10S detects the above-described parameter regarding the apparent power at predetermined time intervals. Hereinafter, the parameter regarding the apparent power in the electric line may be referred to as power information. Examples of the power information include information indicating a parameter regarding the apparent power in the electric line. Further, the power information may be information indicating a waveform of a current in the electric line. Further, the predetermined time may be any time, but is for example one hour. Furthermore, when detecting the power information, the electric line sensor 10S transmits the detected power information to the management server 40Z together with the electric line identification information for identifying the electric line to be detected.

Further, although the one supply-side substation 13 is illustrated in the power system 10 in the illustrated example, the number of the supply-side substations 13 is not limited to the one illustrated. The power system 10 may include the two or more supply-side substations 13 that convert the same or different voltages.

Further, although the one reception-side substation 16 is illustrated in the power system 10 in the illustrated example, the number of the reception-side substations 16 is not limited to the one illustrated. The power system 10 may include the two or more reception-side substations 16 that convert the same voltage or different voltages.

Further, the numbers of the supply-side distribution lines 14 and the reception-side distribution lines 17 are not limited to the illustrated example. The power system 10 may include the supply-side distribution lines 14 and the reception-side distribution lines 17 that are larger in number than those illustrated in the drawing. In this case, the electric line sensor 10S may be provided for each of the supply-side distribution lines 14, or the electric line sensor 10S may be provided for each of the reception-side distribution lines 17.

The power consumption facility 20 is a facility that receives and consumes the power supplied from the power plant 11 through the demander-side distribution line 19.

Each of the power consumption facilities 20 includes a power reception facility 201, an in-facility electric line 202, and an in-facility electric line sensor 20SZ.

The power reception facility 201, which is an example of an electric path, receives the power supplied from the power system 10. Furthermore, the power reception facility 201 converts the voltage of the received power into a voltage used in a facility inside the power consumption facility 20. Examples of the power reception facility 201 include a switchboard and a distribution board.

The in-facility electric line 202, which is an example of an electric path, is a line to flow the current forming the power received by the power reception facility 201. The in-facility electric line 202 is provided from the power reception facility 201 to each device that consumes the power in the power consumption facility 20. Furthermore, according to the present embodiment, the supply-side distribution line 14, the reception-side distribution line 17, and the in-facility electric line 202 may be simply referred to as "electric lines" when they are not distinguished from each other in particular in the description.

For example, the in-facility electric line sensor 20SZ detects the power information on the apparent power in the in-facility electric line 202 at predetermined time intervals. The predetermined time may be any time, but is for example one hour. Furthermore, when detecting the power information, the in-facility electric line sensor 20SZ transmits the detected power information to the control server 30Z together with the electric line identification information for identifying the in-facility electric line 202 to be detected.

Further, the power information detected by the electric line sensor 10S and the in-facility electric line sensor 20SZ is not limited to one type of parameter regarding the apparent power. The electric line sensor 10S and the in-facility electric line sensor 20SZ may detect a plurality of types of parameters among the above-described parameters. Further, the power information indicating each of the detected plurality of types of parameters may be transmitted to the control server 30Z or the management server 40Z. Further, the electric line sensor 10S and the in-facility electric line sensor 20SZ may be provided for each type of parameter to be detected. Moreover, as described above, the power information may be regarded as information included in the electric line information described in the first embodiment.

Furthermore, each of the power consumption facilities 20 includes the plurality of heat pump systems (HPS: Heat Pump System) 21 and the load 22.

The HPS 21, which is an example of the device, uses the power received from the power system 10 to adjust the temperature and humidity. Examples of the target to be adjusted by the HPS 21 include the temperature and humidity of the space in the power consumption facility 20. Further, examples of the target to be adjusted by the HPS 21 include the temperature of the liquid provided in the power consumption facility 20.

Furthermore, the HPS 21 according to the present embodiment may supply the current. The HPS 21 supplies the current to adjust the above parameters regarding the apparent power in the HPS 21. Further, the HPS 21 may supply the current to the electric line. The HPS 21 supplies the current to the electric line to adjust the above parameter regarding the apparent power in the electric line.

An example of the technique for adjusting the parameter regarding the apparent power in the electric line by the HPS 21 will be described. When the harmonic current of a specific order occurs in the electric line, the HPS 21 supplies, to the electric line, the current having a phase canceling the harmonic current of the specific order to reduce the harmonic current of the specific order in the electric line.

Another example of the technique for adjusting the parameter regarding the apparent power in the electric line by the HPS 21 will be described. When the reactive power occurs in the electric line, the HPS 21 supplies the current to the electric line to reduce the reactive power in the electric line. Further, as the reactive power in the electric line decreases, the power factor in the electric line is improved.

As described above, according to the present embodiment, the parameter regarding the apparent power in the electric line is adjusted by using the HPS 21. Further, the HPS 21 adjusts the parameter regarding the apparent power in the HPS 21 by using a technique similar to that for adjusting the electric line. Here, as the parameter regarding the apparent power changes, the apparent power also changes. Therefore, in a broad sense, the adjustment of each of the above-described parameters regarding the apparent power may be regarded as the adjustment of the apparent power. Hereinafter, each of the parameters regarding the apparent power to be adjusted may be collectively referred to as "apparent power".

Examples of the HPS 21 include a system that adjusts the temperature and humidity. More specific examples of the HPS 21 include devices used in an HVAC (Heating Ventilation and Air Conditioning) system, such as air conditioning apparatuses, showcases for conditioning the internal temperature, coolers, refrigerating machines, and water heaters.

When receiving, from the control server 30Z, the instruction for adjusting the apparent power in the electric line, the HPS 21 supplies the current to the electric line in accordance with the received instruction to adjust the apparent power in the electric line. Adjusting the apparent power refers to adjusting one or both of the active power and the reactive power. In other words, adjusting the apparent power refers to adjusting at least one of the active power and the reactive power. The instruction for adjusting the apparent power refers to the instruction for adjusting one or both of the active power and the reactive power. In other words, the instruction for adjusting the apparent power refers to the instruction for adjusting at least one of the active power and the reactive power.

The load 22 receives and consumes the power supplied from the power plant 11 through the demander-side distribution line 19.

Furthermore, according to the present embodiment, the HPS sensor 21S is provided in each of the power consumption facilities 20. The HPS sensor 21S detects the power supplied from the HPS 21, the power amount, or the power amount in a predetermined time. Furthermore, the power, the power amount, and the power amount in the predetermined time may be collectively and simply referred to as "power" when they are not distinguished from each other in particular in the description.

The HPS sensor 21S detects the power supplied from the HPS 21 at predetermined time intervals, for example. The predetermined time may be any time, but is for example one hour. Furthermore, the information detected by the HPS sensor 21S as the information indicating the power supplied from the HPS 21 may be hereinafter referred to as supply information. When detecting the supply information, the HPS sensor 21S transmits the detected supply information to the control server 30Z together with the HPS identification information for identifying the HPS 21 to be detected.

Further, the one power consumption facility 20 is provided for each of the demander-side distribution lines 19 in the illustrated example, but is not limited thereto. The power consumption facilities 20 may be provided for each of the demander-side distribution lines 19. Further, the numbers of the HPSes 21 and the loads 22 provided in the power consumption facility 20 are not limited to the illustrated example. The power consumption facility 20 may include the HPSes 21 and the loads 22 that are larger in number than those illustrated in the drawing. Further, the power consumption facility 20 may include none of the HPSes 21 or the loads 22. Moreover, the power consumption facility 20 may include a device different from the HPS 21.

The control server 30Z is a server device that controls an operation of the HPS 21. More particularly, the control server 30Z controls the operation of the HPS 21 to adjust the apparent power in the electric line. When acquiring the power information from the management server 40Z, the control server 30Z determines whether to adjust the apparent power in the electric line based on the acquired power information. Furthermore, when it is determined that the apparent power in the electric line is to be adjusted, the HPS 21 adjusts the apparent power in the electric line that is the adjustment target.

Furthermore, according to the present embodiment, the HPS 21 adjusts a plurality of adjustment targets for the apparent power in the electric line. The adjustment target for the apparent power in the electric line is a parameter set as an adjustment target among the above-described parameters regarding the apparent power in the electric line.

The control server 30Z controls the adjustment by the HPS 21 to a plurality of adjustment targets for the apparent power in the electric line based on the index regarding the capacity of power in the HPS 21. Further, the control server 30Z controls the adjustment by the HPS 21 to the plurality of adjustment targets based on the relation of each of the adjustment targets.

The management server 40Z is a server device that manages the power information. When acquiring the power information from the electric line sensor 10S, the management server 40Z transmits the acquired power information to the control server 30Z together with the electric line identification information for identifying the electric line that is the target of the power information.

The management server 40Z and the control server 30Z are implemented by, for example, a computer. The management server 40Z and the control server 30Z may be configured by a single computer or may be implemented by distributed processing using a plurality of computers. Further, the management server 40Z and the control server 30Z may be implemented on virtual hardware provided by cloud computing. Moreover, in the following description, the management server 40Z and the control server 30Z may be simply referred to as "servers" when they are not distinguished from each other in particular.

According to the present embodiment, the control server 30Z is connected to each device provided in the power consumption facility 20 and the management server 40Z via a network (not illustrated). Furthermore, the management server 40Z is connected to each of the electric line sensors 10S via a network (not illustrated). These networks may be any network that enables data transmission and reception. Furthermore, a communication line used for transmitting and receiving data may be wired, wireless, or power line communication (PLC: Power Line Communication). Furthermore, the configuration may include the connection to a communication destination via a plurality of networks or communication lines.

Furthermore, the numbers of the control servers 30Z and the management servers 40Z are not limited to the illustrated example. The power control system 1 may include the two or more control servers 30Z and the two or more management servers 40Z. Moreover, the control server 30Z may be provided for each of the power consumption facilities 20, for example.

FIG. 33 is a diagram illustrating the hardware configuration of the control server 30Z and the management server 40Z.

The server includes the CPU 31, the ROM (Read Only Memory) 32, and the RAM (Random Access Memory) 33. Further, the server includes the storage device 35 that is configured by a hard disk device, or the like, to store information. Further, the server includes the communication device 34 (communication I/F) that performs communications with an external unit.

In addition, the server includes an input device used for inputting information, such as a keyboard and a mouse, and a display device, such as a liquid crystal display.

The ROM 32 and the storage device 35 store programs to be executed by the CPU 31. The CPU 31 reads a program stored in the ROM 32 or the storage device 35 and executes the program using the RAM 33 as a work area.

The CPU 31 executes a program stored in the ROM 32 and the storage device 35 to thus implement each functional unit described below.

Here, the program to be executed by the CPU 31 may be provided to the server by being stored in a computer-readable recording medium such as magnetic recording medium (e.g., magnetic tape and magnetic disk), optical recording medium (e.g., optical disk), magneto-optical recording medium, and semiconductor memory. Further, the program to be executed by the CPU 31 may be provided to the server using a communication unit such as the Internet.

FIG. 34 is a diagram illustrating a functional configuration of the HPS 21.

The HPS 21 includes the adjustment unit 211, the power conversion device 212, the power reception path 213, and the active filter (AF: Active Filter) 214.

The adjustment unit 211 adjusts the temperature and humidity. The adjustment unit 211 includes a motor (not illustrated) that operates using the received power. Furthermore, the adjustment unit 211 includes a heat exchanger (not illustrated) so that the air and liquid in the power consumption facility 20 exchanges heat through the heat exchanger.

The power conversion device 212 includes an inverter (not illustrated) and a converter (not illustrated). The power conversion device 212 uses the inverter and the converter to convert the power received from the power system 10 into power having a specific voltage and a specific frequency. The specific voltage and the specific frequency are the voltage and the frequency needed for the operation of the motor provided in the adjustment unit 211. The power conversion device 212 supplies the converted power to the adjustment unit 211.

The power reception path 213 is a path to pass the power received by the power conversion device 212 in the HPS 21.

The AF 214 is electrically connected to the power reception path 213 of the power conversion device 212 in parallel with the power conversion device 212. The AF 214 supplies the current to the power reception path 213 of the power conversion device 212 to adjust the apparent power in the power reception path 213.

Furthermore, the AF 214 supplies the current to the electric line to adjust the apparent power in the electric line.

Moreover, the power to be detected by the HPS sensor 21S (see FIG. 32) is the power supplied from the AF 214.

Furthermore, although the functional configuration of the HPS 21 is illustrated in FIG. 34, the device used for adjusting the apparent power in the electric line is not limited to the HPS 21.

The device used for adjusting the apparent power in the electric line may be any device that may supply the current to the electric line. Examples of the device that may supply the current to the electric line include a device including a power conversion device. More specifically, examples of the device that may supply the current to the electric line include a device including a power conversion device including at least one of an inverter and a converter. Furthermore, examples of the device including the power conversion device include an electric vehicle and a storage battery. Further, examples of the device including the power conversion device include a system that generates renewable energy such as a solar power generation system and a wind power generation system.

FIG. 35 is a diagram illustrating a functional configuration of the control server 30Z.

The control server 30Z includes an acquisition unit 301Z, a storage unit 302Z, a target determination unit 303Z, a necessary amount calculation unit 304Z, an extraction unit 305Z, a possible amount calculation unit 306Z, an adjustment amount calculation unit 307Z, and a transmission unit 308Z.

The acquisition unit 301Z, which is an example of a power information acquisition unit, acquires the information transmitted to the control server 30Z or the information input to the control server 30Z. For example, the acquisition unit 301Z acquires the power information transmitted from the management server 40Z or the in-facility electric line sensor 20SZ to the control server 30Z. Further, the acquisition unit 301Z acquires the supply information transmitted from the HPS sensor 21S. Further, the acquisition unit 301Z acquires, from each of the HPSes 21, the information on the capacity of power that may be supplied by the AF 214 of each of the HPSes 21. The capacity of power that may be supplied by the AF 214 is the maximum power that may be supplied by the AF 214. Further, the information on the capacity of power may be hereinafter referred to as capacity information. Therefore, the acquisition unit 301Z may also be regarded as a capacity information acquisition unit that acquires the capacity information. Examples of the capacity information include the information indicating the capacity of power that may be supplied by the AF 214. Furthermore, the user of the power control system 1 may input the capacity information on each of the HPSes 21 to the control server 30Z so that the acquisition unit 301Z acquires the capacity information. The storage unit 302Z stores the information acquired by the acquisition unit 301Z.

The storage unit 302Z, which is an example of a storage unit, stores information. The information stored in the storage unit 302Z will be described below in detail.

The target determination unit 303Z determines the target to be adjusted by the HPS 21. More specifically, the target determination unit 303Z determines the electric line to be adjusted by the HPS 21. Based on the power information acquired by the acquisition unit 301Z, the target determination unit 303Z determines whether it is necessary to adjust the apparent power in the electric line related to the power information. Hereinafter, the target electric line for which the target determination unit 303Z determines that the adjustment of the apparent power is necessary may be referred to as adjustment target electric line. Furthermore, the target determination unit 303Z determines the parameter regarding the apparent power to be adjusted by the HPS 21 for the adjustment target electric line. In other words, the target determination unit 303Z specifies the type of target for which the adjustment is necessary in the adjustment target electric line. The target determination unit 303Z determines the parameter to be adjusted by the HPS 21 among the parameters regarding the apparent power in the adjustment target electric line based on the power information on the adjustment target electric line. Moreover, among the parameters regarding the apparent power in the adjustment target electric line, the parameter determined as the adjustment target by the target determination unit 303Z may be hereinafter referred to as adjustment target.

The necessary amount calculation unit 304Z calculates the necessary power to be supplied to the adjustment target electric line in order to improve the adjustment target. Hereinafter, the necessary power to be supplied to the adjustment target electric line in order to improve the adjustment target may be referred to as adjustment necessary amount. The necessary amount calculation unit 304Z calculates the adjustment necessary amount based on the power information on the adjustment target electric line. Further, when there is a plurality of adjustment targets, the necessary amount calculation unit 304Z calculates the adjustment necessary amount for each adjustment target.

The extraction unit 305Z extracts the HPS 21 to be used for the adjustment of the adjustment target electric line. The extraction unit 305Z extracts, as the HPS 21 to be used for the adjustment of the adjustment target electric line, the HPS 21 that receives the power through the adjustment target electric line from the HPSes 21 provided in the power control system 1.

The possible amount calculation unit 306Z calculates the power that may be supplied by the AF 214 of the HPS 21 to adjust the apparent power in the electric line. Hereinafter, the power that may be supplied by the AF 214 of the HPS 21 to adjust the apparent power in the electric line may be referred to as adjustable amount. The possible amount calculation unit 306Z calculates the adjustable amount based on the capacity information and the supply information on the HPS 21.

The adjustment amount calculation unit 307Z, which is an example of a determination unit, calculates the power to be supplied to the adjustment target electric line to adjust the adjustment target. Hereinafter, the power supplied to the adjustment target electric line to adjust the adjustment target may be referred to as adjustment amount. Furthermore, when there is a plurality of adjustment targets, the adjustment amount calculation unit 307Z calculates the adjustment amount for each of the adjustment targets. In this case, the adjustment amount calculation unit 307Z calculates the adjustment amount for each of the adjustment targets based on the adjustment necessary amount calculated by the necessary amount calculation unit 304Z, the adjustable amount calculated by the possible amount calculation unit 306Z, and the relation between the adjustment targets. Further, based on the calculated adjustment amount, the adjustment amount calculation unit 307Z calculates the power to be supplied from the AF 214 to adjust the adjustment target. Moreover, the power supplied from the AF 214 to adjust the adjustment target may be hereinafter referred to as supply amount.

The transmission unit 308Z transmits the information indicating the supply amount calculated by the adjustment amount calculation unit 307Z to each of the HPSes 21. More specifically, the transmission unit 308Z transmits, to the target HPS 21 to which the power corresponding to the supply amount is supplied, the information indicating the supply amount together with the electric line identification information for identifying the adjustment target electric line to which the power corresponding to the supply amount is supplied.

FIG. 36 is a diagram illustrating an electric line management table. The electric line management table is a table to manage the electric lines. The storage unit 302Z of the control server 30Z stores the electric line management table.

In the electric line management table, "electric line" indicates the electric line identification information. "14" indicated in "electric line" represents the supply-side distribution line 14. Furthermore, "17" indicated in "electric line" represents the reception-side distribution line 17. Moreover, "A" and "B" accompanied with "17" are information for identifying the corresponding ones of the reception-side distribution lines 17. Further, "202" indicated in "electric line" refers to the in-facility electric line 202. Moreover, "A" to "F" accompanied with "202" are the information for identifying the corresponding ones of the in-facility electric lines 202.

Furthermore, in the electric line management table, "power information" indicates the power information detected by the electric line sensor 10S or the in-facility electric line sensor 20SZ. When the acquisition unit 301Z acquires the latest power information, "power information" associated with the target "electric line" is overwritten with the power information.

Furthermore, in the electric line management table, "threshold" indicates the threshold set for the apparent power in "electric line". The "threshold" is a threshold used for determination by the target determination unit 303Z as to whether the adjustment of the apparent power in the electric line is necessary. As "threshold", the upper limit value of "power information" may be set, based on which the target determination unit 303Z determines that the adjustment of the apparent power in "electric line" is unnecessary, or a value higher than the upper limit value may be set. Furthermore, as "threshold", the lower limit value of "power information" may be set, based on which the target determination unit 303Z determines that the adjustment of the apparent power in "electric line" is unnecessary, or a value lower than the lower limit value may be set. Furthermore, the range of values of "power information" based on which the target determination unit 303Z determines that the adjustment of the apparent power in "electric line" is unnecessary may be set as "threshold". Further, the range of values of "power information" based on which the target determination unit 303Z determines that the adjustment of the apparent power in "electric line" is necessary may be set as "threshold". Moreover, as "threshold", a threshold may be set for each of the above-described parameters regarding the apparent power.

According to the present embodiment, each "threshold" indicates at least the threshold set for a low-order harmonic current, a threshold set for a high-order harmonic current, and a threshold set for a power factor. Further, as the threshold set for a low-order harmonic current, there are a threshold set for the fifth-order harmonic current, a threshold set for the seventh-order harmonic current, and a threshold set for a harmonic current of an order different from the fifth order and the seventh order among the low orders.

An example of the content of the electric line management table will be described. For the reception-side distribution line 17 specified from "17A" of "electric line", "P22" is indicated as "power information", and "T22" is indicated as "threshold".

FIG. 37 is a diagram illustrating a relation management table. The relation management table is a table to manage the relation of adjustment by the HPS 21 for a plurality of adjustment targets. The storage unit 302Z of the control server 30Z stores the relation management table.

In the relation management table, "electric line" indicates the type of electric line. "14" indicated in "electric line" represents the supply-side distribution line 14. Furthermore, "17" indicated in "electric line" represents the reception-side distribution line 17. Further, "202" indicated in "electric line" refers to the in-facility electric line 202.

Further, in the relation management table, "adjustment target" indicates the type of adjustment target. "Low-order harmonic" indicated in "adjustment target" means that the adjustment target is a low-order harmonic current. Furthermore, "power factor" indicated in "adjustment target" means that the adjustment target is a power factor.

Moreover, "high-order harmonic" is indicated in "adjustment target" associated with "electric line" of "202". "High-order harmonic" means that the adjustment target is a high-order harmonic current.

Furthermore, "adjustment-needed order" and "other orders" are indicated in "low-order harmonic" associated with "electric line" of "14" and "17". "Adjustment-needed order" is an order that is determined to have a higher necessity of adjustment than "other orders" among the orders as low-order harmonic currents. Further, according to the present embodiment, it is assumed that the adjustment-needed orders are the fifth order and the seventh order. Further, "other orders" is an order different from "adjustment-needed order" among the orders as the low-order harmonic currents.

As "adjustment-needed order", an order different from the fifth order and the seventh order among the orders as the low-order harmonic currents may be determined.

Further, "adjustment-needed power factor" and "other power factors" are indicated in "power factor" associated with "electric line" of "14" and "17". "Adjustment-needed power factor" is a power factor that is determined to have a higher need of adjustment than "other power factors". Further, according to the present embodiment, the adjustment-needed power factor is a power factor less than 75%. Further, "other power factors" is a power factor different from "adjustment-needed power factor".

Further, a power factor different from the power factor less than 75% may be set as "adjustment-needed power factor".

Furthermore, according to the present embodiment, "high-order harmonic" is not provided in "adjustment target" of "electric line" of "14" and "17".

According to the present embodiment, harmonics may occur due to devices provided in the power consumption facility 20 such as the HPSes 21. Furthermore, the harmonics occurring in the power consumption facility 20 may not only stay in the power consumption facility 20 but also propagate to the power system 10. Here, high-order harmonic currents are less likely to propagate from the power consumption facility 20 to the power system 10 than low-order harmonic currents. Therefore, according to the present embodiment, high-order harmonic currents are not set as adjustment targets in the supply-side distribution line 14 and the reception-side distribution line 17. On the other hand, in the power consumption facility 20, devices provided in the power consumption facility 20 may be affected by high-order harmonic currents. Therefore, high-order harmonic currents in the in-facility electric line 202 are set as adjustment targets.

However, "high-order harmonic" may also be provided in "adjustment target" of "electric line" of "14" and "17".

Furthermore, according to the present embodiment, "adjustment-needed order" and "other orders" are not provided in "low-order harmonic" that is "adjustment target" of "electric line" of "202". Furthermore, "adjustment-needed power factor" and "other power factors" are not provided in "power factor" that is "adjustment target" of "electric line" of "202".

However, "adjustment-needed order" and "other orders" may also be provided for "low-order harmonic" that is "adjustment target" of "electric line" of "202". Moreover, "adjustment-needed power factor" and "other power factors" may be provided for "power factor" that is "adjustment target" of "electric line" of "202".

Furthermore, in the relation management table, "priority order" indicates the priority order of the adjustment of each "adjustment target". According to the present embodiment, among "adjustment targets" indicated in the relation management table, "adjustment target" having a smaller value indicated in "priority order" is adjusted with a higher priority.

According to the present embodiment, "adjustment-needed order" of "low-order harmonic" in "electric line" of "14" is set as "adjustment target" having "priority order" of "1". Further, "adjustment-needed power factor" of "power factor" in "electric line" of "14" is set as "adjustment target" having "priority order" of "2". Further, "high-order harmonic" in "electric line" of "202" is set as "adjustment target" having "priority order" of "3". Further, "other orders" of "low-order harmonic" in "electric line" of "14" is set as "adjustment target" having "priority order" of "4". Further, "other power factors" of "power factor" in "electric line" of "14" is set as "adjustment target" having "priority order" of "5". Further, "adjustment-needed order" of "low-order harmonic" in "electric line" of "17" is set as "adjustment target" having "priority order" of "6". Further, "adjustment-needed power factor" of "power factor" in "electric line" of "17" is set as "adjustment target" having "priority order" of "7". Further, "other orders" of "low-order harmonic" in "electric line" of "17" is set as "adjustment target" having "priority order" of "8". Further, "other power factors" of "power factor" in "electric line" of "17" is set as "adjustment target" having "priority order" of "9". Further, "low-order harmonic" in "electric line" of "202" is set as "adjustment target" having "priority order" of "10". Moreover, "power factor" in "electric line" of "202" is set as "adjustment target" having "priority order" of "11".

The user of the power control system 1 inputs each "adjustment target" and each "priority order" in the relation management table.

The relation of adjustment by the HPS 21 for "adjustment target" indicated in the relation management table will be described in detail.

It is determined that "adjustment target" in the supply-side distribution line 14 is adjusted in preference to "adjustment target" in the reception-side distribution line 17.

Due to the failure occurring in the apparent power in the reception-side distribution line 17, a failure may also occur in the apparent power in the supply-side distribution line 14 coupled to the reception-side distribution line 17 in which the failure has occurred. Even in this case, when the apparent power in the supply-side distribution line 14 is improved by the adjustment using the HPS 21, the apparent power may be improved not only in the supply-side distribution line 14 but also in the reception-side distribution line 17 where the failure has occurred. For example, as the power factor in the supply-side distribution line 14 is improved, the power factor in the reception-side distribution line 17 may also be improved. Furthermore, as another example, as the harmonic current of a specific order in the supply-side distribution line 14 is reduced, the harmonic current of the specific order in the reception-side distribution line 17 may also be reduced. In other words, when the apparent power in a specific adjustment target electric line is improved, the apparent power in a facility provided closer to the power reception side than the specific adjustment target electric line may also be improved. Therefore, according to the present embodiment, it is determined that the apparent power in the supply-side distribution line 14 is adjusted in preference to the apparent power in the reception-side distribution line 17.

Furthermore, according to the present embodiment, it is determined that the low-order harmonic current that is "adjustment-needed order" in the supply-side distribution line 14 is adjusted with the highest priority among "adjustment targets" indicated in the relation management table.

According to the present embodiment, the harmonic current of "adjustment-needed order" is determined as a harmonic current that more easily affects the power system 10 than harmonic currents of "other orders". Therefore, it is determined that the harmonic current of "adjustment-needed order" is adjusted with the highest priority among the "adjustment targets".

Further, according to the present embodiment, it is determined that the harmonic in the electric line is adjusted in preference to the power factor in the electric line. For example, it is determined that "low-order harmonic" of "other orders" in the supply-side distribution line 14 is adjusted in preference to "other power factors" in the supply-side distribution line 14. Further, as another example, it is determined that "low-order harmonic" of "other orders" in the reception-side distribution line 17 is adjusted in preference to "other power factors" in the reception-side distribution line 17.

According to the present embodiment, it is determined that the harmonic current in the electric line more easily affects the electric line than the power factor in the electric line. Therefore, it is determined that the harmonic in the electric line is adjusted in preference to the power factor in the electric line.

Further, according to the present embodiment, it is determined that "high-order harmonic" in the in-facility electric line 202 is adjusted in preference to "low-order harmonic" and "power factor" in the reception-side distribution line 17. In other words, when "high-order harmonic" in the in-facility electric line 202 is adjusted, it is determined that the apparent power in the in-facility electric line 202 is adjusted in preference to the apparent power in the reception-side distribution line 17.

When the high-order harmonic current in the in-facility electric line 202 is adjusted, the HPS 21 that may be used for the adjustment is limited to the HPS 21 in the power consumption facility 20 where the in-facility electric line 202, which is an adjustment target, is provided. On the other hand, when the apparent power in the reception-side distribution line 17 is adjusted, the HPS 21 that may be used for the adjustment is each of the HPSes 21 in the power consumption facilities 20 that receive the power via the reception-side distribution line 17 that is an adjustment target. In other words, the HPS 21 used for adjusting the high-order harmonic current in the in-facility electric line 202 is less likely to be replaced by the different HPS 21 for the adjustment. Therefore, according to the present embodiment, it is determined that the high-order harmonic current in the in-facility electric line 202 is adjusted in preference to the apparent power in the reception-side distribution line 17. This prevents the failure to adjust the high-order harmonic current in the in-facility electric line 202 as the HPS 21 that may be used to adjust the high-order harmonic current in the in-facility electric line 202 is used to adjust the electric line such as the reception-side distribution line 17.

Further, according to the present embodiment, it is determined that "low-order harmonic" and "power factor" in the reception-side distribution line 17 are adjusted in preference to "low-order harmonic" and "power factor" in the in-facility electric line 202. In other words, when "high-order harmonic" in the in-facility electric line 202 is not adjusted, the apparent power in the reception-side distribution line 17 is adjusted in preference to the apparent power in the in-facility electric line 202.

As the low-order harmonic current and the power factor in the reception-side distribution line 17 are improved, the low-order harmonic current and the power factor in the in-facility electric line 202 of the power consumption facility 20 that receives the power via the reception-side distribution line 17 may also be improved. In this case, it is not necessary to supply the power from the HPS 21 to the in-facility electric line 202 to adjust the low-order harmonic current and the power factor in the in-facility electric line 202. Therefore, according to the present embodiment, when the high-order harmonic current in the in-facility electric line 202 is not adjusted, it is determined that the apparent power in the reception-side distribution line 17 is adjusted in preference to the apparent power in the in-facility electric line 202.

Further, according to the present embodiment, it is determined that "adjustment-needed power factor" in the electric line is adjusted in preference to "low-order harmonic" of "other orders" in the electric line. For example, it is determined that "adjustment-needed power factor" in the supply-side distribution line 14 is adjusted in preference to "low-order harmonic" of "other orders" in the supply-side distribution line 14. Further, as another example, it is determined that "adjustment-needed power factor" in the reception-side distribution line 17 is adjusted in preference to "low-order harmonic" of "other orders" in the reception-side distribution line 17.

When the power factor in the electric line decreases, large power needs to be transmitted to the electric line to supply the power from the power system 10 to the power consumption facility 20. Further, in this case, when the power more than the capacity of power in the electric line is transmitted to the electric line, there is a possibility that a failure occurs in the electric line. Therefore, according to the present embodiment, when the power factor in the electric line decreases to "adjustment-needed power factor", it is determined that "adjustment-needed power factor" in the electric line is adjusted in preference to "low-order harmonic" of "other orders" in the electric line. In this case, the occurrence of a failure in the electric line due to a decrease in the power factor in the electric line is suppressed.

FIG. 38 is a diagram illustrating an HPS management table. The HPS management table is a table to manage the HPS 21. The storage unit 302Z of the control server 30Z stores the HPS management table.

In the HPS management table, "HPS" indicates the HPS identification information. "A" to "L" accompanied with "21" of "HPS" are information for identifying the corresponding ones of the HPSes 21.

Furthermore, in the HPS management table, "pass-through electric line" indicates the electric line identification information. The electric line identification information indicated in "pass-through electric line" is the electric line identification information on the electric line that is passed through when the power is supplied from the power system 10 to "HPS". Furthermore, "pass-through electric line" indicates "reception-side distribution line" and "in-facility electric line". "A" and "B" accompanied with "17" of "reception-side distribution line" are information for identifying the corresponding ones of the reception-side distribution lines 17. Further, "A" to "F" accompanied with "202" of "in-facility electric line" are information for identifying the corresponding ones of the in-facility electric lines 202.

For each of the HPSes 21, the user of the power control system 1 inputs, to the control server 30Z, the electric line identification information on the electric line that is passed through when the power is supplied to the HPS 21. When acquiring the electric line identification information input to the control server 30Z, the acquisition unit 301Z writes the electric line identification information in "pass-through electric line" associated with the target "electric line".

Furthermore, in the HPS management table, "adjustable amount" indicates the adjustable amount calculated by the possible amount calculation unit 306Z for "HPS".

An example of the technique for calculating the adjustable amount by the possible amount calculation unit 306Z will be described. The possible amount calculation unit 306Z subtracts the power supplied from "HPS" from the capacity of the power in "HPS" to calculate the adjustable amount. Further, the power supplied from "HPS" is the value specified from the supply information on "HPS". Further, the capacity of power in "HPS" is the value specified from the capacity information on "HPS".

The possible amount calculation unit 306Z calculates the adjustable amount at predetermined time intervals. The predetermined time may be any time, but is for example one hour. Moreover, the possible amount calculation unit 306Z writes the calculated adjustable amount in "adjustable amount" associated with the target "HPS".

An example of the content of the HPS management table will be described. With "HPS" specified from "21A", "reception-side distribution line" of "17A" and "in-facility electric line" of "202A" are associated as "pass-through electric lines", and "30" is associated as "adjustable amount".

FIG. 39 is a flowchart illustrating a flow of an adjustment amount calculation process. The adjustment amount calculation process is a process in which the control server 30Z calculates the adjustment amount. According to the present embodiment, the adjustment amount calculation process is started at predetermined time interval. The predetermined time may be any time, but is for example one hour.

The target determination unit 303Z determines whether the adjustment of the apparent power in the electric line is necessary (Step (hereinafter referred to as "S") 801). The target determination unit 303Z refers to the electric line management table (see FIG. 36). Further, "power information" associated with "electric line" to be determined in the electric line management table is compared with "threshold" associated with the "electric line" so that it is determined whether the adjustment of the apparent power in "electric line" is necessary. Furthermore, when there is a plurality of pieces of power information that has not been used for the determination in Step 801, the target determination unit 303Z makes a determination in Step 801 for each piece of power information. Moreover, when thresholds for a plurality of types of parameters regarding the apparent power are provided as "thresholds" in the electric line management table, the target determination unit 303Z makes a determination in Step 801 for each type of parameter.

When the target determination unit 303Z determines that there is no electric line for which the adjustment of the apparent power is necessary (NO in S801), the adjustment amount calculation process ends. In this case, the HPS 21 does not adjust the apparent power in the electric line.

Conversely, when there is an electric line for which the target determination unit 303Z determines that the adjustment of the apparent power is necessary (YES in S801), the process proceeds to the subsequent step.

The target determination unit 303Z determines whether there is a plurality of adjustment targets (S802). When there is an adjustment target for each of the electric lines, the target determination unit 303Z determines that there is a plurality of adjustment targets. Moreover, when there is a plurality of adjustment targets for one electric line, the target determination unit 303Z determines that there is a plurality of adjustment targets.

When the target determination unit 303Z determines that there is one adjustment target (NO in S802), the necessary amount calculation unit 304Z calculates the adjustment necessary amount for the one adjustment target.

An example of the technique for calculating the adjustment necessary amount by the necessary amount calculation unit 304Z will be described. The necessary amount calculation unit 304Z calculates a larger adjustment necessary amount as there is a larger difference between the parameter of the adjustment target specified from "power information" associated with the adjustment target electric line and "threshold" related to the adjustment target in the electric line management table (see FIG. 36).

Further, the adjustment amount calculation unit 307Z determines that the adjustment necessary amount calculated by the necessary amount calculation unit 304Z is the adjustment amount for the adjustment target. Further, the supply amount of the HPS 21 used for the adjustment is determined so that the determined adjustment amount is supplied to the adjustment target electric line (S803).

Conversely, when the target determination unit 303Z determines that there is a plurality of adjustment targets (YES in S802), the necessary amount calculation unit 304Z calculates the adjustment necessary amount for each adjustment target. Further, the necessary amount calculation unit 304Z calculates the total value of the calculated adjustment necessary amounts (S804).

The possible amount calculation unit 306Z calculates the total value of the adjustable amounts for the respective HPSes 21 used for the adjustment of the adjustment target (S805).

The adjustment amount calculation unit 307Z determines whether the total value of the adjustable amounts is equal to or more than the total value of the adjustment necessary amounts (S806).

When the adjustment amount calculation unit 307Z determines that the total value of the adjustable amounts is equal to or more than the total value of the adjustment necessary amounts (YES in S806), the adjustment amount calculation unit 307Z determines that the adjustment necessary amount calculated by the necessary amount calculation unit 304Z for each adjustment target is the adjustment amount for each adjustment target (S807). Further, the adjustment amount calculation unit 307Z determines the supply amount of the HPS 21 used for the adjustment so that the determined adjustment amount is supplied to the adjustment target electric line (S808).

Furthermore, when the adjustment amount calculation unit 307Z determines that the total value of the adjustable amounts is less than the total value of the adjustment necessary amounts (NO in S806), the adjustment amount calculation unit 307Z puts a limitation on the adjustment by the HPS 21 to at least one adjustment target among the plurality of adjustment targets. In this case, the adjustment amount calculation unit 307Z determines the adjustment amount for each adjustment target based on the priority order indicated in the relation management table for the adjustment of the adjustment targets (S809). Here, the adjustment amount calculation unit 307Z puts a limitation on the adjustment by the HPS 21 to the low-priority adjustment target indicated in the relation management table. Moreover, the adjustment amount calculation unit 307Z determines the supply amount of the HPS 21 used for the adjustment so that the determined adjustment amount is supplied to the adjustment target electric line (S810).

Next, an example of calculation of the adjustment amount during the adjustment amount calculation process (see FIG. 39) will be described.

It is assumed below that three adjustment targets are a high-order harmonic current in the in-facility electric line 202 "202A", a low-order harmonic current that is "other orders" in the reception-side distribution line 17 "17A", and "other power factors" in the reception-side distribution line 17 "17A". Further, it is assumed that the adjustment necessary amount of the high-order harmonic current in the in-facility electric line 202 is "20", the adjustment necessary amount of the low-order harmonic current that is "other orders" in the reception-side distribution line 17 is "40", and the adjustment necessary amount of "other power factors" in the reception-side distribution line 17 is "60".

The target determination unit 303Z determines that the adjustment of the apparent power in the electric line is necessary (YES in S801) and determines that there is a plurality of adjustment targets (YES in S802).

The necessary amount calculation unit 304Z calculates the total value of the adjustment necessary amounts for the respective adjustment targets (S804). In the above-described example, the necessary amount calculation unit 304Z calculates the total value of the adjustment necessary amounts as "20+40+60=120" (S804).

The possible amount calculation unit 306Z calculates the total value of the adjustable amounts for the HPSes 21 used for the adjustment (S805). As described above, the adjustment target electric lines are the in-facility electric line 202 "202A" and the reception-side distribution line 17 "17A". In this case, the extraction unit 305Z extracts, as the HPS 21 to be used for the adjustment, "HPS" for which the electric line identification information on any adjustment target electric line is associated with "pass-through electric line" in the HPS management table (see FIG. 38). In the above-described example, the extraction unit 305Z extracts, as the HPSes 21 to be used for the adjustment, the HPSes 21 "21A", "21B", "21C", "21D", "21E", and "21F" associated with at least one of the adjustment target electric lines "17A" and "202A" that are adjustment target electric lines. Furthermore, the possible amount calculation unit 306Z calculates the total value of the adjustable amounts for the HPSes 21 to be used for the adjustment as "30+20+15+15+10+ 10=100" from "adjustable amounts" indicated in the HPS management table (see FIG. 38) (S805).

The adjustment amount calculation unit 307Z determines that the total value of the adjustable amounts is less than the total value of the adjustment necessary amounts (NO in S806).

The adjustment amount calculation unit 307Z determines the adjustment amount for each adjustment target based on "priority order" indicated in the relation management table (see FIG. 37) (S809).

In the above-described example, "adjustment target" associated with the highest "priority order" in the relation management table among the three adjustment targets is "high-order harmonic" of "electric line" of "202". In this case, the adjustment amount calculation unit 307Z adjusts the high-order harmonic current in the in-facility electric line 202 "202A" with the highest priority among the three adjustment targets. More specifically, it is determined that the adjustment amount for the high-order harmonic current in the in-facility electric line 202 "202A" is "20" that is the adjustment necessary amount.

Further, "adjustment target" associated with the second highest "priority order" in the relation management table among the three adjustment targets is "other orders" of "electric line" of "17". In this case, the adjustment amount calculation unit 307Z determines that the adjustment amount for the low-order harmonic current that is "other orders" in the reception-side distribution line 17 "17A" is "40" that is the adjustment necessary amount.

The adjustment amount for the high-order harmonic current in "202A" and the adjustment amount for the low-order harmonic current that is "other orders" in "17A" are subtracted from "100" that is the total value of the adjustable amounts calculated by the possible amount calculation unit 306Z to obtain the value "100−(20+40)=40". On the other hand, the adjustment necessary amount for "other power factors" in "17A", which is "adjustment target" associated with the lowest "priority order" in the relation management table among the three adjustment targets, is "60" as described above. In this case, the adjustment amount calculation unit 307Z determines that the adjustment amount for "other power factors" in the reception-side distribution line 17 "17A" is "40". In other words, the adjustment amount calculation unit 307Z puts a limitation on the adjustment by the HPS 21 to "other power factors" in the reception-side distribution line 17 "17A".

Furthermore, the adjustment amount calculation unit 307Z determines the supply amount of the HPS 21 used for the adjustment so that each determined adjustment amount is supplied to the adjustment target electric line (S810).

In the above-described example, for the HPS 21 "21A", the adjustment amount calculation unit 307Z determines that the supply amount for the adjustment of "high-order harmonic" in "202A" is "20", the supply amount for the adjustment of "other orders" in "17A" is "10", and the total supply amount is "30". Further, the adjustment amount calculation unit 307Z determines that the supply amount for the HPS 21 "21B" is "20" that is the supply amount for the adjustment of "other orders" in "17A". Further, for the HPS 21 "21C", the adjustment amount calculation unit 307Z determines that the supply amount for the adjustment of "other orders" in "17A" is "10", the supply amount for the adjustment of "other power factors" in "17A" is "5", and the total supply amount is "15". Furthermore, the adjustment amount calculation unit 307Z determines that the supply amount for the HPS 21 "21D" is "15" that is the supply amount for the adjustment of "other power factors" in "17A". Further, the adjustment amount calculation unit 307Z determines that both the supply amounts for the HPSes 21 "21E" and "21F" are "10" that is the supply amount for the adjustment of "other power factors" in "17A".

In this way, the relation of adjustment to each adjustment target by the HPS 21 is determined.

The transmission unit 308Z of the control server 30Z gives an instruction to the HPS 21 used for the adjustment to adjust the apparent power in the adjustment target electric line. In this case, the transmission unit 308Z transmits the supply amount information indicating the supply amount determined by the adjustment amount calculation unit 307Z, the electric line identification information for identifying the electric line to which the power is supplied, and the target identification information for identifying the type of the adjustment target. Furthermore, when the one HPS 21 adjusts the apparent power in a plurality of adjustment target electric lines, the transmission unit 308Z transmits, to the one HPS 21, the supply amount information, the electric line identification information, and the target identification information for each of the adjustment target electric lines. Moreover, when the one HPS 21 adjusts a plurality of adjustment targets in one adjustment target electric line, the transmission unit 308Z transmits, to the one HPS 21, the supply amount information and the target identification information for each adjustment target.

The HPS 21 receives the instruction for adjusting the apparent power in the adjustment target electric line from the transmission unit 308Z and acquires the supply amount information, the electric line identification information, and the target identification information. In this case, the HPS 21 supplies the current necessary for supplying the power specified from the supply amount information to the adjustment target electric line specified from the electric line identification information. More specifically, the HPS 21 supplies, to the adjustment target electric line, the current having the waveform for adjusting the adjustment target specified from the target identification information.

As described above, according to the present embodiment, the target determination unit 303Z determines the adjustment target based on the power information. Furthermore, the necessary amount calculation unit 304Z calculates the adjustment necessary amount for the adjustment target based on the power information. Further, the possible amount calculation unit 306Z calculates the adjustable amount for the HPS 21 based on the capacity information. Further, when there is a plurality of adjustment targets, the adjustment amount calculation unit 307Z determines the adjustment amounts for the adjustment targets based on the adjustment necessary amount calculated by the necessary amount calculation unit 304Z and the adjustable amount calculated by the possible amount calculation unit 306Z. That is, according to the present embodiment, the target determination unit 303Z, the necessary amount calculation unit 304Z, the possible amount calculation unit 306Z, and the adjustment amount calculation unit 307Z determine the relation of adjustment by the HPS 21 for each of the adjustment targets in the adjustment target electric line based on the power information and the capacity information.

In this case, each of the adjustment targets is adjusted by the HPS 21 by the adjustment amount determined based on the capacity information for each of the adjustment targets. Therefore, the HPS 21 may adjust the adjustment targets based on the index regarding the capacity of power in the HPS 21.

In particular, when the HPS 21 adjusts a plurality of adjustment targets, the supply amount is likely to be large as compared with the case where the HPS 21 adjusts one adjustment target; however, according to the present embodiment, the relation of adjustment by the HPS 21 for each of the adjustment targets is determined based on the capacity information. In this case, as compared with the case where the HPS 21 adjusts the adjustment targets regardless of the index regarding to the capacity of power in the HPS 21, the HPS 21 may adjust the adjustment targets according to the content of adjustment suitable for the HPS 21.

Further, according to the present embodiment, the adjustment amount calculation unit 307Z puts a limitation on the adjustment by the HPS 21 to at least one of the adjustment targets based on the capacity information. Therefore, the adjustment amount calculation unit 307Z may also be regarded as a limitation unit that puts a limitation on the adjustment to the adjustment target by the HPS 21.

When the adjustment by the HPS 21 is not limited, the HPS 21 may receive an instruction for adjustment by the supply amount larger than the maximum power that may be supplied by the HPS 21. In this case, when the HPS 21 attempts to supply the power having the instructed supply amount, the load generated in the HPS 21 increases, and there is a possibility that a failure occurs in the HPS 21. Therefore, according to the present embodiment, the adjustment by the HPS 21 is limited based on the capacity information, and thus the occurrence of a failure in the HPS 21 is suppressed as compared with the configuration in which the adjustment by the HPS 21 is not limited.

In particular, according to the present embodiment, the adjustment by the HPS 21 is limited based on the relation between the adjustment targets. For example, the adjustment by the HPS 21 is limited based on a priority relation defined for the adjustment of the adjustment targets.

In this case, as compared with the case where the adjustment by the HPS 21 is limited regardless of the relation between the adjustment targets, it is possible to suppress the limitation on the adjustment of the adjustment target that is not suitable as the target to be limited.

Furthermore, according to the present embodiment, the adjustment targets include the power factor in the adjustment target electric line and harmonics in the adjustment target electric line. When the power factor of the adjustment target electric line satisfies a predetermined limitation condition, the adjustment amount calculation unit 307Z puts a limitation on the adjustment by the HPS 21 for the adjustment of the power factor in the adjustment target electric line rather than the adjustment of the harmonic in the adjustment target electric line. An example of the limitation condition may be that the power factor of the adjustment target electric line corresponds to "other power factors" indicated in "adjustment target" in the relation management table (see FIG. 37).

In this case, it is possible to determine the target to which the limitation on the adjustment by the HPS 21 is preferentially applied according to the power factor of the adjustment target electric line.

Furthermore, putting a limitation on the adjustment by the HPS 21 for the adjustment of the power factor in the adjustment target electric line rather than the adjustment of the harmonic in the adjustment target electric line includes putting no limitation on the adjustment of the harmonic in the adjustment target electric line.

Furthermore, according to the present embodiment, the adjustment amount calculation unit 307Z determines the relation of the adjustment by the HPS 21 for each of the adjustment targets based on the content stored in the storage unit 302Z that stores the relation of the adjustment by the HPS 21 for each of the adjustment targets in the electric line. As an example, the adjustment amount calculation unit 307Z determines the adjustment relation for each of the adjustment targets based on "priority order" in the relation management table (see FIG. 37) stored in the storage unit 302Z.

In this case, the processing load of the adjustment amount calculation unit 307Z for determining the relation of adjustment for each of the adjustment targets is reduced.

Further, according to the present embodiment, the adjustment amount calculation unit 307Z determines, based on the capacity information, the relation of adjustment by the HPS 21 between the adjustment target in one adjustment target electric line and the adjustment target in another adjustment target electric line different from the one adjustment target electric line.

In this case, as compared with the case where the HPS 21 adjusts the adjustment targets in the adjustment target electric lines regardless of the index regarding the capacity of power in the HPS 21, the HPS 21 may adjust the adjustment targets in the adjustment target electric lines according to the content of the adjustment suitable for the HPS 21.

Further, according to the present embodiment, the in-facility electric line 202, which is the adjustment target electric line, is provided closer to the power reception side than the reception-side distribution line 17 that is the adjustment target electric line. Further, the adjustment target in the in-facility electric line 202 includes a specific target different from any of the adjustment targets in the reception-side distribution line 17. Examples of the specific target include high-order harmonic currents.

In this case, as compared with the case where the HPS 21 adjusts the adjustment targets in the adjustment target electric lines regardless of the index regarding the capacity of power in the HPS 21, the HPS 21 may adjust the different adjustment targets corresponding to the adjustment target electric lines according to the content of the adjustment suitable for the HPS 21.

Next, another example for calculating the adjustment amount during the adjustment amount calculation process (see FIG. 39) will be described.

It is assumed below that four adjustment targets are a low-order harmonic current that is "adjustment-needed order" (see FIG. 37) in the reception-side distribution line 17 "17B", a low-order harmonic current that is "other orders" in the reception-side distribution line 17 "17B", "adjustment-needed power factor" in the reception-side distribution line 17 "17B", and "power factor" in the in-facility electric line 202 "202D". Further, it is assumed that the adjustment necessary amount of the low-order harmonic current that is "adjustment-needed order" in the reception-side distribution line 17 is "40", and the adjustment necessary amount of the low-order harmonic current that is "other orders" in the reception-side distribution line 17 is "20". Further, it is assumed that the adjustment necessary amount of "adjustment-needed power factor" in the reception-side distribution line 17 is "70", and the adjustment necessary amount of the power factor in the in-facility electric line 202 is "20".

The target determination unit 303Z determines that the adjustment of the apparent power in the electric line is necessary (YES in S801) and determines that there is a plurality of adjustment targets (YES in S802).

The necessary amount calculation unit 304Z calculates the total value of the adjustment necessary amounts for the respective adjustment targets (S804). In the above-described example, the necessary amount calculation unit 304Z calculates the total value of the adjustment necessary amounts as "40+20+70+20=150".

The possible amount calculation unit 306Z calculates the total value of the adjustable amount for the HPS 21 used for the adjustment (S805). As described above, the adjustment target electric lines are the reception-side distribution line 17 "17B" and the in-facility electric line 202 "202D". In this case, the extraction unit 305Z extracts, as the HPSes 21 used for the adjustment, the HPSes 21 "21G", "21H", "21I", "21J", "21K", and "21L" that receive the power through the adjustment target electric lines. Moreover, the possible amount calculation unit 306Z calculates the total value of the adjustable amounts for the HPSes 21 used for the adjustment as "30+30+10+10+10+10=100" from "adjustable amounts" indicated in the HPS management table (see FIG. 38).

The adjustment amount calculation unit 307Z determines that the total value of the adjustable amounts is less than the total value of the adjustment necessary amounts (NO in S806).

The adjustment amount calculation unit 307Z determines the adjustment amount for each adjustment target based on the priority order indicated in the relation management table (see FIG. 37) (S809).

In the above-described example, "adjustment target" associated with the highest "priority order" in the relation management table among the four adjustment targets is "adjustment-needed order" of "electric line" of "17". In this case, the adjustment amount calculation unit 307Z adjusts the low-order harmonic current that is "adjustment-needed order" in the reception-side distribution line 17 "17B" with the highest priority among the four adjustment targets. More specifically, it is determined that the adjustment amount for the low-order harmonic current that is "adjustment-needed order" in the reception-side distribution line 17 "17B" is "40" that is the adjustment necessary amount.

The adjustment amount for the low-order harmonic current, which is "adjustment-needed order" in the reception-side distribution line 17 "17B", is subtracted from "100", which is the total value of the adjustable amounts calculated by the possible amount calculation unit 306Z to obtain the value "100−40=60". On the other hand, the adjustment necessary amount for "adjustment-needed power factor" in "17", which is "adjustment target" associated with the second highest "priority order" in the relation management table among the four adjustment targets, is "70" as described above. In this case, the adjustment amount calculation unit 307Z determines that the adjustment amount for "adjustment-needed power factor" in "17B" is "60" that is a value limited with respect to "70" which is the adjustment necessary amount. Moreover, the adjustment amount calculation unit 307Z determines that both the adjustment amount for the low-order harmonic current which is "other orders" in "17B" and the adjustment amount for "power factor" in "202D" among the four adjustment targets are "0".

When the adjustment target is not "adjustment-needed power factor" in "17B" but "other power factors" in "17B", "priority order" of the "other power factors" in the relation management table is lower than "other orders" that is the adjustment target in "17B". In this case, the adjustment of "other power factors" in "17B" is more limited than the adjustment of "other orders" in "17B". In other words, when the adjustment target in "17B" is "adjustment-needed power factor", the limitation on the adjustment is reduced as compared with the case where the adjustment target in "17B" is "other power factors".

The adjustment amount calculation unit 307Z determines the supply amount of the HPS 21 used for the adjustment so that the determined adjustment amount is supplied to the adjustment target electric line (S810).

In the above-described example, the adjustment amount calculation unit 307Z determines that the supply amount for the HPS 21 "21G" is "30" that is the supply amount for adjusting the low-order harmonic current which is "adjustment-needed order" in "17B". Further, for the HPS 21 "21H", the adjustment amount calculation unit 307Z determines that the supply amount for the adjustment of "adjustment-needed order" in "17B" is "10", the supply amount for the adjustment of "adjustment-needed power factor" in "17B" is "20", and the total supply amount is "30". Moreover, the adjustment amount calculation unit 307Z determines that all the supply amounts for the HPSes 21 "21I", "21J", "21K", and "21L" are "10" which is the supply amount for adjusting "adjustment-needed power factor" in "17B".

In this way, the relation of adjustment by the HPS 21 for each adjustment target is determined.

As described above, according to the present embodiment, when the power factor in the adjustment target electric line satisfies a predetermined reduction condition, the adjustment amount calculation unit 307Z reduces the limitation on the adjustment of the power factor in the adjustment target electric line. An example of the reduction condition may be that the power factor in the adjustment target electric line corresponds to "adjustment-needed power factor" indicated in "adjustment target" in the relation management table (see FIG. 37).

In this case, when the adjustment by the HPS 21 to the power factor in the adjustment target electric line is limited, the degree of limitation on the adjustment may be determined according to the power factor in the adjustment target electric line.

Furthermore, according to the present embodiment, when the HPS 21 adjusts the high-order harmonic current in the in-facility electric line 202, the adjustment amount calculation unit 307Z determines the adjustment relation between the reception-side distribution line 17 and the in-facility electric line 202 such that the in-facility electric line 202 is adjusted in preference to the reception-side distribution line 17. Further, when the HPS 21 does not adjust the high-order harmonic current in the in-facility electric line 202, the adjustment amount calculation unit 307Z determines the relation of adjustment between the reception-side distribution line 17 and the in-facility electric line 202 such that the reception-side distribution line 17 is adjusted in preference to the in-facility electric line 202.

In this case, the adjustment target electric line to be preferentially adjusted may be determined based on whether the high-order harmonic current in the in-facility electric line 202 is adjusted.

Furthermore, in the description according to the present disclosure, the adjustment target in the supply-side distribution line 14 is adjusted in preference to the adjustment target in the reception-side distribution line 17, but is not limited thereto.

The adjustment target in the reception-side distribution line 17 may be adjusted in preference to the adjustment target in the supply-side distribution line 14.

Further, in the description according to the present disclosure, the high-order harmonic current is the adjustment target in the in-facility electric line 202 different from any of the adjustment targets in the supply-side distribution line 14 and the reception-side distribution line 17, but is not limited thereto. The adjustment target in the in-facility electric line 202 different from any of the adjustment targets in the supply-side distribution line 14 and the reception-side distribution line 17 may be any parameter different from the power factor and the harmonic current among the parameters described above regarding the apparent power.

Furthermore, the relation of adjustment by the HPS 21 for each of the adjustment targets is not limited to the example described in the relation management table.

As an example, it may be determined that "high-order harmonic" in the in-facility electric line 202 is adjusted with the highest priority among the "adjustment targets" indicated in the relation management table.

Further, in the description according to the present disclosure, the high-order harmonic current in the in-facility electric line 202 is adjusted in preference to the adjustment target in the reception-side distribution line 17. Here, when the high-order harmonic current in the in-facility electric line 202 is adjusted, the adjustment amount calculation unit 307Z may prevent the HPS 21 that may be used for adjusting the high-order harmonic current in the in-facility electric line 202 from being used for adjustment other than the adjustment of the in-facility electric line 202.

Furthermore, in the description according to the present disclosure, the adjustment amount calculation unit 307Z of the control server 30Z puts a limitation on the adjustment to the adjustment target by the HPS 21. Here, putting a limitation on the adjustment to the adjustment target by the HPS 21 includes causing the HPS 21 to supply the power smaller than the power necessary for improvement of the adjustment target. In other words, putting a limitation on the adjustment to the adjustment target by the HPS 21 is not limited to putting a limitation on the adjustment amount as compared with the result calculated by the necessary amount calculation unit 304Z. Further, putting a limitation on the adjustment to the adjustment target by the HPS 21 also includes not causing the HPS 21 to adjust the adjustment target.

Further, putting a limitation on the adjustment to the adjustment target by the HPS 21 also includes putting a limitation on the time of adjustment to the adjustment target by the HPS 21. An example of the time limitation may be that, in a case where the HPS 21 adjusts the adjustment target to which the adjustment limitation is not applied and the adjustment target to which the adjustment limitation is applied, after the HPS 21 adjusts the adjustment target to which the limitation is not applied, the HPS 21 adjusts the adjustment target to which the limitation is applied. In other words, putting a limitation on the adjustment to the adjustment target by the HPS 21 includes not only putting a limitation on the adjustment amount for the adjustment target but also putting a limitation on the adjustment to the adjustment target by the HPS 21 in any manner.

Furthermore, in the description according to the present disclosure, the adjustment amount calculation unit 307Z determines the relation of adjustment by the HPS 21 for each of the adjustment targets. Here, the adjustment amount calculation unit 307Z may determine the relation of adjustment for a plurality of adjustment targets in a plurality of electric lines or electric paths or may determine the relation of adjustment for a plurality of adjustment targets in one electric line. Further, the adjustment amount calculation unit 307Z may determine the relation of adjustment by the one HPS 21 for a plurality of adjustment targets or may determine the relation of adjustment by the plurality of HPSes 21 for a plurality of adjustment targets. In other words, the one or more HPSes 21 may be used for adjustment of a plurality of adjustment targets.

Furthermore, in the description according to the present disclosure, the capacity information is information indicating the maximum power that may be supplied by the AF 214 of the HPS 21, but is not limited thereto.

The capacity information may be information indicating the remaining power that may be supplied by the AF 214 of the HPS 21. In other words, the capacity information may be information indicating the adjustable amount for the AF 214. As described above, the capacity information may be any information as long as the information relates to the capacity of power in the HPS 21.

Further, according to the present disclosure, the control server 30Z determines the adjustment target electric line and the adjustment target and calculates the adjustment necessary amount, but is not limited thereto.

The management server 40Z may determine the adjustment target electric line and the adjustment target and calculate the adjustment necessary amount. More specifically, the management server 40Z may acquire the power information from the electric line sensor 10S or the in-facility electric line sensor 20SZ and determine the adjustment target electric line and the adjustment target based on the acquired power information. Furthermore, the management server 40Z may calculate the adjustment necessary amount for the adjustment target based on the power information. Moreover, the management server 40Z may transmit, to the control server 30Z, the information including the information indicating the calculated adjustment necessary amount, the electric line identification information for identifying the adjustment target electric line, and the target identification information for identifying the adjustment target as the power information on the apparent power in the electric line.

Furthermore, in the description according to the present disclosure, the power control system 1 includes the management server 40Z and the control server 30Z, but is not limited thereto. One server included in the power control system 1 may have the functions of the management server 40Z and the control server 30Z. Moreover, the one server may determine the adjustment target, determine the relation of adjustment for the plurality of adjustment targets, and give an instruction to the HPS 21 to adjust the apparent power in the electric line.

Furthermore, in the description according to the present disclosure, the control server 30Z gives an instruction to the HPS 21 to adjust the apparent power in the electric line, but is not limited thereto. Another server different from the control server 30Z may receive the instruction for adjusting the apparent power in the electric line from the control server 30Z and send the received instruction to the HPS 21.

Furthermore, in the description according to the present disclosure, the storage unit 302Z of the control server 30Z stores the relation management table, but is not limited thereto.

A storage unit of another server device different from the control server 30Z may store the relation management table. In this case, the control server 30Z may determine the relation of adjustment between the adjustment targets based on the content indicated in the relation management table stored in the storage unit of another server device.

Further, in the description according to the present disclosure, the supply-side distribution line 14, the reception-side distribution line 17, and the in-facility electric line 202 are the target electric lines whose apparent power is to be adjusted by the HPS 21, but is not limited thereto.

The target electric line whose apparent power is to be adjusted by the HPS 21 may be the transmission line 12 or the demander-side distribution line 19.

Furthermore, according to the present disclosure, the apparent power in the in-facility electric line 202 is set as an adjustment target in the power consumption facility 20, but is not limited thereto.

A parameter regarding the apparent power in the power reception facility 201 provided in the power consumption facility 20 may be set as an adjustment target.

Further, according to the present disclosure, the parameters indicated in the relation management table (see FIG. 37) are exemplified as adjustment targets, but is not limited thereto.

The adjustment target may be any of the parameters described above with regard to the apparent power.

Furthermore, in the example described according to the present disclosure, the parameters such as capacity, adjustment necessary amount, adjustable amount, adjustment amount, and supply amount are power, but is not limited thereto. Each parameter may be any of the parameters described above with regard to the apparent power.

Furthermore, in the description according to the present disclosure, the adjustment amount calculation unit 307Z determines the relation of adjustment between the adjustment targets based on the priority order set for the adjustment of the adjustment targets, but is not limited thereto.

The adjustment amount calculation unit 307Z may determine the relation of adjustment between the adjustment targets based on the adjustment ratio set for the adjustment targets. As an example, the ratio between the adjustment amount for the high-order harmonic current in the in-facility electric line 202 and the adjustment amount for the power factor in the reception-side distribution line 17 may be set to 2:1. Further, the adjustment amount calculation unit 307Z may determine the adjustment amount for the high-order harmonic current in the in-facility electric line 202 and the adjustment amount for the power factor in the reception-side distribution line 17 in accordance with the predetermined ratio of adjustment amounts. In other words, the technique by which the adjustment amount calculation unit 307Z determines the relation of adjustment for a plurality of adjustment targets is not limited to the determination technique based on the priority order of adjustment, but may be any technique.

Furthermore, according to the present disclosure, the control server 30Z is configured to control the operation of the HPS 21, but is not limited thereto.

For example, the HPS 21 may have the function of the control server 30Z. In other words, the HPS 21 may include the CPU 31 (see FIG. 33), the ROM 32, the RAM 33, the communication device 34, and the storage device 35 for performing various functions. Furthermore, the HPS 21 may have the functions of the acquisition unit 301Z, the storage unit 302Z, the target determination unit 303Z, the necessary amount calculation unit 304Z, the extraction unit 305Z, the possible amount calculation unit 306Z, the adjustment amount calculation unit 307Z, the transmission unit 308Z, and the like, of the control server 30Z. Furthermore, the HPS 21 may acquire the power information and determine the adjustment target based on the acquired power information. Further, the HPS 21 may acquire the capacity information and determine the relation of adjustment by the HPS 21 for each of the adjustment targets based on the power information and the capacity information. Furthermore, the HPS 21 may determine a priority relation of adjustment for a plurality of adjustment targets or may put a limitation on the adjustment by the HPS 21 to the apparent power in the HPS 21.

Here, each of the above-described embodiments may be understood as below.

The supply amount calculation unit 305 of the power control system 1 according to the present disclosure causes the HPS 21 to generate the current to be used for adjusting the apparent power in the adjustment target electric line based on the instruction information acquired by the acquisition unit 301.

In this case, as compared with the case where the apparent power in the adjustment target electric line is adjusted without supplying the current to the adjustment target electric line, it is possible to reduce the effect of the state in the demander-side distribution line 19 on the adjustment of the apparent power in the adjustment target electric line.

Furthermore, when the HPS 21 generates the current used for adjusting the apparent power in the adjustment target electric line, the supply amount calculation unit 305 puts a limitation on the adjustment by the HPS 21 to the apparent power in the HPS 21.

In this case, the limitation on the adjustment of the apparent power in the adjustment target electric line by the HPS 21 is reduced, and therefore, as compared with the case where the apparent power in the HPS 21 is unconditionally adjusted by the HPS 21, it is possible to suppress insufficient adjustment of the apparent power in the adjustment target electric line.

Further, the supply amount calculation unit 305 puts a limitation on the adjustment by the HPS 21 to the apparent power in the HPS 21 based on the available capacity information.

In this case, the current exceeding the capacity of the adjustment target electric line is prevented from flowing through the adjustment target electric line. Therefore, as compared with the case where the apparent power in the HPS 21 is adjusted regardless of the capacity of the adjustment target electric line, it is possible to suppress the occurrence of a short circuit or ignition in the adjustment target electric line.

Further, according to the present disclosure, the supply amount calculation unit 305 may put a limitation on the adjustment by the HPS 21 to the apparent power in the HPS 21 based on the current capacity information.

In this case, the load on the HPS 21 is reduced. Therefore, as compared with the case where the apparent power in the HPS 21 is adjusted regardless of the capability of the HPS 21 to generate the current, it is possible to suppress the occurrence of a failure in the HPS 21.

Furthermore, according to the present disclosure, the electric line calculation unit 303 and the supply amount calculation unit 305 cause the HPS 21 to generate a current larger than the electric line necessary amount.

In this case, even when the apparent power in the adjustment target electric line changes over time, the apparent power in the adjustment target electric line is easily improved. Therefore, as compared with the case where the HPS 21 generates a current equal to or less than the amount necessary for improving the apparent power in the adjustment target electric line, it is possible to prevent insufficient adjustment of the apparent power in the adjustment target electric line due to changes in the apparent power in the adjustment target electric line.

Furthermore, according to the present disclosure, when the instruction information satisfies a predetermined condition, the electric line calculation unit 303 and the supply amount calculation unit 305 cause the HPS 21 to generate a current larger than the electric line necessary amount.

In this case, as compared with the case where the HPS 21 generates a current equal to or less than the amount necessary for improving the apparent power in the adjustment target electric line regardless of the instruction information, it is possible to prevent insufficient adjustment of the apparent power in the adjustment target electric line due to changes in the apparent power in the adjustment target electric line.

Further, according to the present disclosure, the predetermined condition is set for the future apparent power in the adjustment target electric line.

In this case, as compared with the case where the HPS 21 generates a current equal to or less than the amount necessary for improving the apparent power in the adjustment target electric line regardless of the future apparent power in the adjustment target electric line, it is possible to prevent insufficient adjustment of the apparent power in the adjustment target electric line due to changes in the apparent power in the adjustment target electric line.

Furthermore, from another point of view, the HPS 21 according to the present disclosure adjusts the apparent power in the adjustment target electric line based on the instruction information acquired by the acquisition unit.

In this case, as compared with the case where the apparent power in the adjustment target electric line is adjusted without supplying the current to the adjustment target electric line, it is possible to reduce the effect of the state in the demander-side distribution line 19 on the adjustment of the apparent power in the adjustment target electric line.

Further, from another point of view, the supply amount calculation unit 305 of the control server 30 according to the present disclosure causes the HPS 21 to generate the current used for adjusting the apparent power in the adjustment target electric line based on the instruction information acquired by the acquisition unit 301.

In this case, as compared with the case where the apparent power in the adjustment target electric line is adjusted without supplying the current to the adjustment target electric line, it is possible to reduce the effect of the state in the demander-side distribution line 19 on the adjustment of the apparent power in the adjustment target electric line.

Furthermore, when any of the electric lines satisfies the power condition set for the apparent power, the transmission unit 407 according to the present disclosure outputs the instruction information that is related to the apparent power, which is adjusted by each of the specific devices 20X among the devices 20X and corresponds to the device 20X, and that is based on the power information. Furthermore, the specific device 20X is the device 20X specified from the device identification information associated with the electric line identification information on the adjustment target electric line that satisfies the power condition among the devices 20X.

In this case, each of the devices 20X receives an instruction to adjust the apparent power by the adjustment amount corresponding to the device 20X. Therefore, as compared with the case where the instruction server 40X outputs the information on the apparent power to be adjusted according to the same content by each of the devices 20X, it is possible to adjust the apparent power in the electric line according to the content of adjustment suitable for each of the devices 20X.

Furthermore, the extraction unit 405 according to the present disclosure determines the device 20X to be used for the adjustment for the adjustment target electric line that satisfies the power condition among the devices 20X based on the capability of the device 20X to adjust the apparent power in the electric line.

In this case, the apparent power may be adjusted by the device 20X having the adjustment capability suitable for the adjustment of the apparent power in the electric line.

In particular, the extraction unit 405 according to the present disclosure determines that the device that satisfies the capability condition is the device 20X to be used for the adjustment.

In this case, it is possible to prevent the device 20X that does not satisfy the capability condition from being used to adjust the apparent power in the electric line.

Furthermore, the capability condition is set from the relation between the adjustment capability of the device 20X and the degree of adjustment necessary for the electric line that satisfies the power condition.

In this case, the device 20X that satisfies the condition set from the relation between the adjustable amount and the adjustment necessary amount is used to adjust the apparent power in the electric line. Therefore, the apparent power may be adjusted by the device 20X having the adjustable amount suitable for the adjustment necessary amount.

Further, the device 20X that satisfies the capability condition includes a first device having a first capability as the capability to adjust the apparent power in the electric line and a second capability higher than the first capability as the capability. The first device is, for example, the device 20X "20XD" (see FIG. 13) according to the second embodiment. Further, the second device is, for example, the device 20X "20XA" according to the second embodiment. Further, the adjustment amount calculation unit 406 determines that the second device is the device 20X to be used for the adjustment and does not determine that the first device is the device to be used for the adjustment.

In this case, the device 20X having a high capability to adjust the apparent power in the electric line may be preferentially used for the adjustment.

Furthermore, in a case where the first device is not used for the adjustment but the second device is used for the adjustment, when the electric line, which is a target for the adjustment, does not satisfy the power condition, the adjustment amount calculation unit 406 according to the present disclosure determines that the first device is a device that is not used for the adjustment.

In this case, the apparent power in the adjustment target electric line may be improved without causing a load for adjustment to the first device.

Furthermore, the transmission unit 407 according to the present disclosure outputs the instruction information based on the capability of the device 20X to adjust the apparent power in the electric line.

In this case, the device 20X may adjust the apparent power according to the content of adjustment suitable for the adjustable amount of the device 20X.

Furthermore, the transmission unit 407 according to the present disclosure outputs the instruction information based on the relation between the adjustment capability of the device 20X and the degree of adjustment necessary for the adjustment target electric line that satisfies the power condition.

In this case, the adjustment instruction is output based on the adjustment amount calculated by the adjustment amount calculation unit 406 based on the relation between the adjustment necessary amount and the adjustable amount. Therefore, the device 20X may adjust the apparent power according to the content of adjustment suitable for the adjustable amount with respect to the adjustment necessary amount.

Furthermore, the transmission unit 407 according to the present disclosure outputs the instruction information based on the number of the devices 20X used for the adjustment of the adjustment target electric line that satisfies the power condition.

In this case, the device 20X may adjust the apparent power according to the content of the adjustment suitable for the number used for the adjustment of the apparent power in the electric line.

Furthermore, the device identification information on the device 20X that receives the power via the second electric line is associated with the electric line identification information on the first electric line and the electric line identification information on the second electric line 17. The first electric line is, for example, the supply-side distribution line 14 according to the second embodiment. Furthermore, the second electric line is, for example, the reception-side distribution line 17 "17A" (see FIG. 12) according to the second embodiment.

In this case, the device 20X that receives the power via the second electric line may be used not only to adjust the apparent power in the second electric line but also to adjust the apparent power in the first electric line.

Further, the device identification information on the device 20X that does not receive the power via the second electric line but receives the power via the third electric line is associated with the electric line identification information on the first electric line and the electric line identification information on the second electric line. The third electric line is, for example, the reception-side distribution line 17 "17B" according to the second embodiment.

In this case, both the device 20X that receives the power via the second electric line and the device 20X that receives the power via the third electric line may be used to adjust the apparent power in the first electric line.

Furthermore, the determination unit 403 according to the present disclosure determines the electric line whose apparent power is preferentially adjusted among the electric lines that satisfy the power condition.

In this case, the apparent power may be adjusted, starting from the electric line having a high necessity of adjusting the apparent power.

Furthermore, when both the supply-side distribution line 14 and the reception-side distribution line 17 satisfy the power condition, the determination unit 403 according to the present disclosure determines that the supply-side distribution line 14 is the electric line to be adjusted in preference to the reception-side distribution line 17.

In this case, it is possible to improve the efficiency of improvement in the apparent power in the electric line.

Furthermore, the determination unit 403 according to the present disclosure determines the electric line whose apparent power is preferentially adjusted based on the apparent power in the electric line for each of the electric lines that satisfy the power condition.

In this case, the electric line whose apparent power is to be adjusted may be determined based on the instability of the electric line.

Furthermore, when the first electric line satisfies the power condition, the transmission unit 407 according to the present disclosure outputs the instruction information based on the apparent power in the second electric line. The first electric line is, for example, the upstream distribution line 141A. The second electric line is, for example, the mid-stream distribution line 142A or the downstream distribution line 143A.

In this case, the apparent power in the first electric line may be adjusted according to the content of adjustment suitable for the apparent power in the second electric line.

In particular, the current supplied from the device 20X, which is used for adjustment of the first electric line, flows to the first electric line after the second electric line.

In this case, the apparent power in the first electric line may be adjusted according to the content of adjustment suitable for the electric line through which the current flows for the adjustment of the apparent power in the first electric line by the device 20X.

Furthermore, the adjustment amount calculation unit 406 according to the present disclosure puts a limitation on the adjustment of the apparent power in the first electric line based on the margin up to the capacity regarding the apparent power in the second electric line.

In this case, as compared with the case where the adjustment amount of the first electric line is not limited, it is possible to suppress the occurrence of a failure related to the second electric line when the apparent power in the first electric line is adjusted.

Furthermore, the transmission unit 407 according to the present disclosure outputs the instruction information based on the margin up to the capacity regarding the apparent power of the adjustment target electric line that satisfies the power condition.

In this case, the apparent power in the adjustment target electric line may be adjusted according to the content of adjustment suitable for the margin up to the capacity of the current that may flow through the adjustment target electric line.

Furthermore, the transmission unit 407 according to the present disclosure outputs the information based on the margin up to the capacity regarding the apparent power of the adjustment target electric line with regard to the power factor for adjustment by the device 20X.

In this case, the apparent power in the adjustment target electric line may be adjusted by the power factor suitable for the capacity of the current that may flow through the adjustment target electric line.

Furthermore, the possible amount calculation unit 305Y according to the present disclosure calculates, based on the system information, the adjustable amount when the HPS 21 adjusts the temperature and/or humidity.

In this case, the instruction server 40Y may determine the current value to be supplied by the HPS 21 to adjust the apparent power in the electric line of the power system 10 based on the adjustable amount calculated by the possible amount calculation unit 305Y. Therefore, when the HPS 21 adjusts the temperature and humidity, it is possible to achieve the adjustment of the apparent power in the electric line of the power system 10 by the HPS 21.

Furthermore, the margin amount calculation unit 306Y calculates the margin amount when the HPS 21 adjusts the apparent power in the electric line.

In this case, the instruction server 40Y may change the current value to be supplied by the HPS 21 to adjust the apparent power in the electric line of the power system 10 based on the margin amount calculated by the margin amount calculation unit 306Y.

Furthermore, the transmission unit 307Y outputs the information on the HPS 21 when the margin amount satisfies the condition set for the margin.

In this case, as compared with the case where the information on the margin amount is output regardless of whether the margin amount calculated by the margin amount calculation unit 306Y satisfies the condition, it is possible to suppress the output of the information on the HPS 21 for which the margin amount having the content unsuitable for the change of the current value to be supplied by the HPS 21 is calculated.

Further, the condition is set based on the operating life regarding the HPS 21.

In this case, it is possible to change the current value supplied by the HPS 21 to adjust the apparent power in the electric line in consideration of the operating life regarding the HPS 21.

Furthermore, the condition may be set based on the use of the HPS 21 for the adjustment of the temperature and/or humidity.

In this case, it is possible to change the current value to be supplied by the HPS 21 to adjust the apparent power in the electric line in consideration of the use of the HPS 21 for the adjustment of the temperature and humidity.

Furthermore, the transmission unit 307Y outputs the possible amount information on the adjustable amount that satisfies the transmission condition set for the adjustment of the apparent power.

In this case, as compared with the case where the information on the adjustable amount is output regardless of whether the adjustable amount satisfies the transmission condition, it is possible to suppress the output of the information on the adjustable amount having the content unsuitable for the adjustment of the apparent power in the electric line.

Furthermore, the condition is that the adjustable amount is the adjustable amount calculated for the HPS 21 that receives the power through the electric line that is the target of the adjustment of the apparent power.

In this case, as compared with the case where the possible amount information is output regardless of whether the adjustable amount satisfies the condition, it is possible to suppress output of the possible amount information for the HPS 21 that does not receive the power through the electric line that is the adjustment target.

Further, the transmission condition is set for the capability to adjust the apparent power.

In this case, as compared with the case where the possible amount information is output regardless of whether the adjustable amount satisfies the transmission condition, it is possible to suppress the output of the possible amount information that is not suitable for the capability to adjust the apparent power in the electric line.

Furthermore, the transmission condition is set based on the relation between the capability and the degree of adjustment necessary for the apparent power in the electric line.

In this case, as compared with the case where the possible amount information is output regardless of whether the adjustable amount satisfies the transmission condition, it is possible to suppress the output of the possible amount information that is not suitable for the relation between the adjustable amount and the degree of necessary adjustment.

Further, the possible amount calculation unit 305Y calculates the adjustable amount by the power conversion device 212 and the adjustable amount by the AF 214.

In this case, the instruction server 40Y may determine the current value to be supplied by the power conversion device 212 and the current value to be supplied by the AF 214 to adjust the apparent power in the electric line of the power system 10 based on the adjustable amount calculated by the possible amount calculation unit 305Y. Therefore, when the HPS 21 adjusts the temperature and the humidity, it is possible to achieve the adjustment of the apparent power in the electric line of the power system 10 by the power conversion device 212 and the AF 214.

Further, the possible amount calculation unit 305Y calculates the adjustable amount regarding the predetermined capability for the AF 214 and calculates the adjustable amount regarding the capability lower than that of the AF 214 for the power conversion device 212.

In this case, as compared with the case where the adjustable amount regarding the capability higher than that of the AF 214 is calculated for the power conversion device 212, it is possible to suppress the effect on the function of adjusting the temperature and humidity by the HPS 21.

Furthermore, the system information includes the target information on the target whose temperature and/or humidity is adjusted by the HPS 21.

In this case, as compared with the case where the adjustable amount is calculated without using the target information by the possible amount calculation unit 305Y, it is possible to calculate the adjustable amount suitable for the target whose temperature and humidity are adjusted by the HPS 21.

Furthermore, the HPS 21 according to the present disclosure calculates, based on the system information, the adjustable amount when the HPS 21 adjusts the temperature and/or humidity.

In this case, the instruction server 40Y may determine the current value to be supplied by the HPS 21 to adjust the apparent power in the electric line of the power system 10 based on the adjustable amount calculated by the HPS 21. Therefore, when the HPS 21 adjusts the temperature and humidity, it is possible to achieve the adjustment of the apparent power in the electric line of the power system 10 by the HPS 21.

Furthermore, the target determination unit 303Z, the necessary amount calculation unit 304Z, the possible amount calculation unit 306Z, and the adjustment amount calculation unit 307Z of the power control system 1 according to the present disclosure determine the relation of adjustment by the HPS 21 for each of the adjustment targets in the adjustment target electric line based on the power information and the capacity information.

In this case, the HPS 21 may adjust the adjustment targets based on the index regarding the capacity of power in the HPS 21. Therefore, as compared with the case where the HPS 21 adjusts the plurality of adjustment targets regardless of the index regarding the capacity of power in the HPS 21, the HPS 21 may adjust the plurality of adjustment targets according to the content of adjustment suitable for the HPS 21.

Further, the adjustment amount calculation unit 307Z puts a limitation on the adjustment by the HPS 21 to at least one of the adjustment targets based on the capacity information.

In this case, as compared with the configuration in which the adjustment by the HPS 21 is not limited, it is possible to suppress the occurrence of a failure in the HPS 21.

Furthermore, the adjustment amount calculation unit 307Z puts a limitation based on the relation between the adjustment targets.

As compared with the case where the adjustment by the HPS 21 is limited regardless of the relation between the adjustment targets, it is possible to suppress the limitation on the adjustment of the adjustment target that is not suitable as the limitation target.

Furthermore, when the power factor of the adjustment target electric line satisfies the predetermined limitation condition, the adjustment amount calculation unit 307Z puts a limitation on the adjustment of the power factor rather than the adjustment of the harmonic.

In this case, it is possible to determine the target to which the limitation on the adjustment by the HPS 21 is preferentially applied according to the power factor of the adjustment target electric line.

Further, when the power factor in the adjustment target electric line satisfies the predetermined reduction condition, the adjustment amount calculation unit 307Z reduces the limitation on the adjustment of the power factor in the adjustment target electric line.

When the adjustment by the HPS 21 to the power factor in the adjustment target electric line is limited, the degree of limitation on the adjustment may be determined according to the power factor in the adjustment target electric line.

Furthermore, the adjustment amount calculation unit 307Z determines the relation of the adjustment by the HPS 21 for the plurality of adjustment targets based on the content stored in the storage unit 302Z that stores the relation of adjustment by the HPS 21 for each of the adjustment targets in the adjustment target electric line.

In this case, the processing load of the adjustment amount calculation unit 307Z for determining the relation of adjustment for each of the adjustment targets is reduced.

Furthermore, based on the capacity information, the adjustment amount calculation unit 307Z determines the relation of adjustment by the HPS 21 for the adjustment target in the adjustment target electric line and the adjustment target in the electric path.

In this case, as compared with the case where the HPS 21 adjusts the adjustment targets in the adjustment target electric lines regardless of the index regarding the capacity of power in the HPS 21, the HPS 21 may adjust the adjustment targets in the adjustment target electric lines according to the content of the adjustment suitable for the HPS 21.

Furthermore, the adjustment target in the electric path includes a specific target different from any of the adjustment targets in the supply-side distribution line 14 and the reception-side distribution line 17.

In this case, as compared with the case where the HPS 21 adjusts the adjustment targets in the adjustment target electric lines regardless of the index regarding the capacity of power in the HPS 21, the HPS 21 may adjust the different adjustment targets corresponding to the adjustment target electric lines according to the content of the adjustment suitable for the HPS 21.

Furthermore, the adjustment amount calculation unit 307Z determines the relation between the reception-side distribution line 17 and the electric path such that the electric path is adjusted in preference to the reception-side distribution line 17 when the HPS 21 adjusts the specific target, and determines the relation such that the reception-side distribution line 17 is adjusted in preference to the electric path when the HPS 21 does not adjust the specific target.

In this case, the adjustment target electric line to be preferentially adjusted may be determined based on whether the high-order harmonic current in the in-facility electric line 202 is adjusted.

Furthermore, the HPS 21 according to the present disclosure determines the relation of adjustment for each of the adjustment targets in the adjustment target electric line based on the power information and the information on the capacity of power in the HPS 21.

Even in this case, the HPS 21 may adjust the adjustment targets based on the index regarding the capacity of power in the HPS 21. Therefore, as compared with the case where the HPS 21 adjusts the plurality of adjustment targets regardless of the index regarding the capacity of power in the HPS 21, the HPS 21 may adjust the plurality of adjustment targets according to the content of adjustment suitable for the HPS 21.

Furthermore, each configuration described above is not limited to the above-described embodiments and may be changed without departing from the spirit. In other words, it is understood that various changes may be made to forms and details without departing from the spirit and scope of the claims.

In addition to the configuration described above, a part of each configuration described above may be omitted, or other functions may be added to each configuration described above.

Further, although the embodiments have been described above, a configuration included in one embodiment may be replaced with a configuration included in another embodiment, or a configuration included in one embodiment may be added to another embodiment.

REFERENCE SIGNS LIST

1 . . . Power control system, 10 . . . Power system, 10S . . . Electric line sensor, 11 . . . Power plant, 14 . . . Supply-side distribution line, 16 . . . Reception-side substation, 17 . . . Reception-side distribution line, 19 . . . Demander-side distribution line, 20 . . . Power consumption facility, 21S . . . HPS sensor, 21 . . . HPS, 30 . . . Control server, 40 . . . Instruction server, 211 . . . Adjustment unit, 212 . . . Power conversion device, 213 . . . Power reception path, 214 . . . AF

The invention claimed is:

1. A power control system comprising:
a device that receives power from an electric line of a distribution system via a distribution transformer;
an acquisition unit that acquires electric line information on a supply side electric line provided closer to a power supply side than the distribution transformer; and
a control unit that causes the device to supply a current used for adjustment of apparent power to the supply side electric line based on the electric line information acquired by the acquisition unit.

2. The power control system according to claim 1, wherein
the device is configured to adjust apparent power in the device, and
when causing the device to generate the current used for the adjustment of the apparent power in the electric line, the control unit puts a limitation on the adjustment by the device to the apparent power in the device.

3. The power control system according to claim 2, wherein
the acquisition unit acquires capacity information on a capacity of the electric line, and
the control unit puts the limitation based on the capacity information.

4. The power control system according to claim 2, wherein
the acquisition unit acquires capability information on a capability of the device to generate the current, and
the control unit puts the limitation based on the capability information.

5. The power control system according to claim 1, wherein the control unit causes the device to generate a current larger than a current necessary for improvement in the apparent power in the electric line.

6. The power control system according to claim 5, wherein the control unit causes the device to generate a current larger than a current necessary for the improvement when the electric line information satisfies a predetermined condition.

7. The power control system according to claim 6, wherein
the electric line information includes information on the electric line in future, and
the condition is set for future apparent power in the electric line.

8. A device that receives power from an electric line of a distribution system via a distribution transformer, the device comprising:
an acquisition unit that acquires electric line information on a supply side electric line provided closer to a power supply side than the distribution transformer; and
an adjustment unit that adjusts apparent power in the electric line based on the electric line information acquired by the acquisition unit.

9. The device according to claim 8, wherein
the device is a heat pump system that is used for adjustment of apparent power in an electric line of a distribution system and is configured to adjust temperature and/or humidity, and
the device further comprises:
a system information acquisition unit that acquires system information on the heat pump system; and
a calculation unit that calculates, based on the system information, an index regarding a capability to adjust apparent power in the electric line when the heat pump system adjusts temperature and/or humidity.

10. The device according to claim 8, adjusting a plurality of adjustment targets for apparent power in the electric line, wherein
the electric line information includes power information on apparent power in the electric line, and
the device further comprises a determination unit that determines a relation of adjustment for each of the plurality of adjustment targets in the electric line based on the power information and information on a capacity of power in the device.

11. An information processing system comprising:
an acquisition unit that acquires electric line information on a supply side electric line provided closer to a power supply side than the distribution transformer; and
a control unit that causes a device, which receives power from the electric line via a distribution transformer, to supply a current used for adjustment of apparent power to the supply side electric line based on the electric line information acquired by the acquisition unit.

12. The information processing system according to claim 11, further comprising:
an electric line information acquisition unit that acquires electric line identification information for identifying the electric line;
a device information acquisition unit that acquires device identification information for identifying the device that controls the device, is configured to adjust apparent power in the electric line, and receives power from the electric line via the distribution transformer; and
an output unit that outputs, when any of a plurality of the electric lines satisfies a power condition set for apparent power, information that is related to apparent power, which is adjusted by each of specific devices among a plurality of the devices and corresponds to the device, and that is based on a power information, wherein the electric line information includes the power information on the apparent power in the electric line, and the specific device is a device specified from the device identification information associated with the electric line identification information on the electric line that satisfies the power condition among the plurality of the devices.

13. The information processing system according to claim 12, further comprising a device determination unit that determines a device used for the adjustment of the electric line that satisfies the power condition among the plurality of the devices based on a capability of the device for the adjustment of the apparent power in the electric line.

14. The information processing system according to claim 13, wherein the device determination unit determines that the device that satisfies a capability condition set for the capability is the device used for the adjustment.

15. The information processing system according to claim 14, wherein the capability condition is set from a relation between the capability and a degree of the adjustment necessary for the electric line that satisfies the power condition.

16. The information processing system according to claim 14, wherein the device that satisfies the capability condition includes a first device having a first capability as the capability and a second device having a second capability higher than the first capability as the capability, and the device determination unit determines that the second device is the device used for the adjustment and does not determine that the first device is the device used for the adjustment.

17. The information processing system according to claim 16, wherein, in a case where the first device is not used for the adjustment but the second device is used for the adjustment, when the electric line, which is a target for the adjustment, does not satisfy the power condition, the device determination unit determines that the first device is a device that is not used for the adjustment.

18. The information processing system according to claim 12, wherein the output unit outputs the information based on a capability of the device for the adjustment of the apparent power in the electric line.

19. The information processing system according to claim 18, wherein the output unit outputs the information based on a relation between the capability and a degree of the adjustment necessary for the electric line that satisfies the power condition.

20. The information processing system according to claim 12, wherein the output unit outputs the information based on a number of the devices used for the adjustment of the electric line that satisfies the power condition.

21. The information processing system according to claim 12, wherein the electric line includes a first electric line provided closer to a power supply side than the distribution transformer and a second electric line provided closer to a power reception side than the first electric line and closer to the power supply side than the distribution transformer, and the device identification information on the device that receives power via the second electric line is associated with the electric line identification information on the first electric line and the electric line identification information on the second electric line.

22. The information processing system according to claim 21, wherein the electric line further includes a third electric line provided closer to the power reception side than the first electric line and closer to the power supply side than the distribution transformer, and the device identification information on the device that does not receive power via the second electric line but receives power via the third electric line is associated with the electric line identification information on the first electric line and the electric line identification information on the third electric line.

23. The information processing system according to claim 12, further comprising an electric line determination unit that determines an electric line whose apparent power is preferentially adjusted among a plurality of the electric lines that satisfies the power condition.

24. The information processing system according to claim 23, wherein the electric line includes a first electric line provided closer to a power supply side than the distribution transformer and a second electric line provided closer to a power reception side than the first electric line and closer to the power supply side than the distribution transformer, and when both the first electric line and the second electric line satisfy the power condition, the electric line determination unit determines that the first electric line is an electric line to be adjusted in preference to the second electric line.

25. The information processing system according to claim 23, wherein, based on apparent power in the electric line for each of the plurality of the electric lines that satisfies the power condition, the electric line determination unit determines an electric line whose apparent power is preferentially adjusted.

26. The information processing system according to claim 12, wherein the electric line includes a first electric line and a second electric line through which a current supplied from the device flows, and the output unit outputs the information based on apparent power in the second electric line when the first electric line satisfies the power condition.

27. The information processing system according to claim 26, wherein a current supplied from the device used for adjustment of the first electric line flows into the first electric line after the second electric line.

28. The information processing system according to claim 27, further comprising a limitation unit that puts a limitation on adjustment of apparent power in the first electric line based on a margin up to a capacity regarding apparent power in the second electric line.

29. The information processing system according to claim 12, wherein the output unit outputs the information based on a margin up to a capacity regarding apparent power of the electric line that satisfies the power condition.

30. The information processing system according to claim 29, wherein the output unit outputs the information based on the margin with regard to a power factor to be adjusted by the device.

31. The information processing system according to claim 11, wherein the device is a heat pump system that is used to adjust apparent power in the electric line of the distribution system and is configured to adjust temperature and/or humidity, and the information processing system further comprises:

a system information acquisition unit that acquires system information on the heat pump system; and a capability calculation unit that calculates, based on the system information, an index regarding a capability of adjustment of the apparent power in the electric line when the heat pump system adjusts the temperature and/or humidity.

32. The information processing system according to claim 31, further comprising a margin calculation unit that calculates an index regarding a margin of a capability of the adjustment when the heat pump system adjusts the apparent power in the electric line.

33. The information processing system according to claim 32, further comprising an output unit that outputs information on the heat pump system when the index regarding the margin satisfies a condition set for the margin.

34. The information processing system according to claim 33, wherein the condition is set based on an operating life regarding the heat pump system.

35. The information processing system according to claim 33, wherein the condition is set based on use of the heat pump system for adjustment of temperature and/or humidity.

36. The information processing system according to claim 31, further comprising an output unit that outputs information on the index that satisfies a condition set for adjustment of apparent power.

37. The information processing system according to claim 36, wherein the condition is that the index is an index calculated for the heat pump system that receives power via the electric line that is a target for the adjustment of the apparent power.

38. The information processing system according to claim 36, wherein the condition is set for a capability to adjust the apparent power.

39. The information processing system according to claim 38, wherein the condition is set based on a relation between the capability and a degree of adjustment necessary for the apparent power in the electric line.

40. The information processing system according to claim 31, wherein the heat pump system includes a conversion unit that converts received power to supply the converted power to a load used for adjustment of temperature and/or humidity, and an adjustment unit that adjusts apparent power in a power reception path of the conversion unit, both the conversion unit and the adjustment unit are configured to adjust apparent power in the electric line, and the capability calculation unit calculates an index regarding a capability of the conversion unit to adjust the apparent power in the electric line and an index regarding a capability of the adjustment unit to adjust the apparent power in the electric line.

41. The information processing system according to claim 40, wherein the capability calculation unit calculates a first index regarding a predetermined capability for the adjustment unit and calculates a second index regarding a capability for the conversion unit lower than the capability of the adjustment unit.

42. The information processing system according to claim 31, wherein the system information includes target information on a target whose temperature and/or humidity is adjusted by the heat pump system.

43. The information processing system according to claim 11, causing the device to adjust a plurality of adjustment targets for apparent power in the electric line, wherein the electric line information includes power information on the apparent power in the electric line, and the information processing system further comprises:

a capacity information acquisition unit that acquires capacity information on a capacity of power in the device; and a determination unit that determines a relation of adjustment by the device for each of the plurality of adjustment targets in the electric line based on the power information and the capacity information.

44. The information processing system according to claim 43, further comprising a limitation unit that puts a limitation on adjustment by the device to at least one of the plurality of adjustment targets based on the capacity information.

45. The information processing system according to claim 44, wherein the limitation unit puts the limitation based on a relation between the plurality of adjustment targets.

46. The information processing system according to claim 44, wherein the plurality of adjustment targets includes a power factor in the electric line and a harmonic in the electric line, and the limitation unit puts the limitation on adjustment of the power factor rather than adjustment of the harmonic when the power factor satisfies a predetermined limitation condition.

47. The information processing system according to claim 44, wherein the plurality of adjustment targets includes a power factor in the electric line, and the limitation unit reduces the limitation on adjustment of the power factor when the power factor satisfies a predetermined reduction condition.

48. The information processing system according to claim 43, wherein the determination unit determines the relation based on content stored in a storage unit that stores a relation of adjustment by the device for each of the plurality of adjustment targets in the electric line.

49. The information processing system according to claim 43, wherein the device is configured to adjust an adjustment target for apparent power in an electric path different from the electric line, and the determination unit determines a relation of adjustment by the device for the adjustment target in the electric line and the adjustment target in the electric path based on the capacity information.

50. The information processing system according to claim 49, wherein the device receives power supplied via the electric line, the electric path is provided closer to a power reception side than the electric line, and the adjustment target in the electric path includes a specific target that is different from any of the plurality of adjustment targets in the electric line.

51. The information processing system according to claim 50, wherein the determination unit determines the relation between the electric line and the electric path such that the electric path is adjusted in preference to the electric line when the specific target is adjusted by the device and determines the relation such that the electric line is adjusted in preference to the electric path when the specific target is not adjusted by the device.

* * * * *